US009883262B2

(12) United States Patent
Hattori et al.

(10) Patent No.: US 9,883,262 B2
(45) Date of Patent: Jan. 30, 2018

(54) OPTICAL NETWORK SYSTEM, OPTICAL SWITCH NODE, MASTER NODE, AND NODE

(71) Applicant: NIPPON TELEGRAPH AND TELEPHONE CORPORATION, Chiyoda-ku, Tokyo (JP)

(72) Inventors: Kyota Hattori, Musashino (JP); Naoki Kimishima, Musashino (JP); Masahiro Nakagawa, Musashino (JP); Masaru Katayama, Musashino (JP); Akira Misawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 314 days.

(21) Appl. No.: 14/407,716

(22) PCT Filed: Jun. 13, 2013

(86) PCT No.: PCT/JP2013/066350
§ 371 (c)(1),
(2) Date: Dec. 12, 2014

(87) PCT Pub. No.: WO2013/187474
PCT Pub. Date: Dec. 19, 2013

(65) Prior Publication Data

US 2015/0131991 A1 May 14, 2015

(30) Foreign Application Priority Data

Jun. 13, 2012 (JP) ................................ 2012-133775
Jun. 13, 2012 (JP) ................................ 2012-133776
Feb. 21, 2013 (JP) ................................ 2013-032134

(51) Int. Cl.
*H04J 14/00* (2006.01)
*H04Q 11/00* (2006.01)
(Continued)

(52) U.S. Cl.
CPC ........ *H04Q 11/0005* (2013.01); *H04J 3/0655* (2013.01); *H04J 3/085* (2013.01);
(Continued)

(58) Field of Classification Search
CPC ....... H04Q 11/0005; H04Q 2011/0033; H04Q 2011/0045; H04Q 2011/005;
(Continued)

(56) References Cited

U.S. PATENT DOCUMENTS 5,452,115 A * 9/1995 Tomioka ............. H04J 14/0241 398/14
7,009,991 B2 * 3/2006 Shachar .................. H04L 12/43 370/436

(Continued)

FOREIGN PATENT DOCUMENTS

CN 101953098 A 1/2011
EP 1395067 A1 3/2004

(Continued)

OTHER PUBLICATIONS

Office Action for Japanese Patent Application No. 2014-521404 (dated Sep. 8, 2015).

(Continued)

*Primary Examiner* — M. R. Sedighian
(74) *Attorney, Agent, or Firm* — Merchant & Gould P.C.

(57) ABSTRACT

An optical network system includes a master node and a plurality of optical switch nodes, allowing the number of nodes without depending on the number of wavelengths. The master node is configured to: divide a wavelength path having an arbitrary wavelength into time slots each having a predetermined time period; and allocate the time slots to each of the optical switch nodes. Each of the optical switch nodes is configured to: synchronize the time slots based on (Continued)

information delivered from the master node; and thereby transmit or receive a data or performs route switching.

30 Claims, 171 Drawing Sheets

(51) Int. Cl.

| | |
|---|---|
| ***H04J 14/02*** | (2006.01) |
| ***H04J 14/08*** | (2006.01) |
| ***H04J 3/08*** | (2006.01) |
| ***H04J 3/06*** | (2006.01) |

(52) U.S. Cl.
CPC ...... *H04J 14/0212* (2013.01); *H04J 14/0257* (2013.01); *H04J 14/0267* (2013.01); *H04J 14/0286* (2013.01); *H04J 14/08* (2013.01); *H04J 14/0283* (2013.01); *H04J 14/0284* (2013.01); *H04Q 2011/005* (2013.01); *H04Q 2011/0033* (2013.01); *H04Q 2011/0045* (2013.01); *H04Q 2011/0086* (2013.01); *H04Q 2213/1301* (2013.01)

(58) Field of Classification Search
CPC ..... H04Q 2011/0086; H04Q 2213/1301; H04J 3/065; H04J 3/085; H04J 14/0212; H04J 14/0257; H04J 14/0267; H04J 14/0286; H04J 14/08; H04J 14/0283; H04J 14/0284
USPC ........................................ 398/47, 45, 51, 54
See application file for complete search history.

(56) References Cited

U.S. PATENT DOCUMENTS

| | | | |
|---|---|---|---|
| 7,280,550 | B1 | 10/2007 | Rosenboom |
| 2005/0147411 | A1 | 7/2005 | Hamou et al. |
| 2011/0020001 | A1 | 1/2011 | Kim et al. |

FOREIGN PATENT DOCUMENTS

| | | |
|---|---|---|
| JP | H11-313067 A | 11/1999 |
| JP | 2002-158615 | 5/2002 |
| JP | 2002-237824 | 8/2002 |
| WO | WO 03/084109 | 3/2003 |

OTHER PUBLICATIONS

Office Action for Chinese Patent Application No. 201380031284.4 (dated Jan. 17, 2017).
International Search Report for International Application No. PCT/JP2012/066350 dated Jul. 16, 2013 (4 pages).
Kazuo et al. "Introduction to Optical Network Becoming More Familiar (15), ROADM that can freely operate an optical core network." *Nikkei Business Publications, Inc*. Jun. 15, 2006 (4 pages).
Chiaroni et al. "Demonstration of Interconnection of Two Optical Packet Rings with a Hybrid Optoelectronic Packet Router. " Alcatel-Lucent Bell Labs, France. (3 pages).
Extended Search Report for European Patent Application No. 13803547.2, dated May 3, 2016.
Search Report for European Patent Application No. 17185579.4 (dated Nov. 29, 2017).

* cited by examiner

FIG. 7

| FIG. 7A | FIG. 7B |
|---|---|

FIG. 7A

| Trigger Output Interval | TS Output Unit | Ring Length | TS Info. Set to Node |
|---|---|---|---|
| For each TS length | 1 trigger 1 TS ※1 [constraint: one over integers of ring length] | Integral multiple of TS length | on all TSs [including TS whose node is not relevant to tmn. and receipt] |
| For each TS period | 1 trigger 1 TS period ※2 [constraint: one over integers of ring length] | Integral multiple of TS period | on all TSs |
| | | | on node of its own [Setting amount reduced compared to setting of all TSs] |
| For each TS period × N [N is natural number] | 1 trigger plural TS periods ※3 [constraint: one over integers of ring length] | | on all TSs |
| | | | on node of its own |

FIG. 7B

| How to Set TS Info. | Outline of Operations | No |
|---|---|---|
| Previous setting | Previously set TS info. to all nodes. Upon receipt of trg. transmitted from master node, each node performs first operation in TS info. after offset time elapses [data tmn. + optical SW ADD switch or optical SW DROP switch or no operation]. Upon receipt of subsq. trg, node performs second operation in TS info. Similarly, after operations that follow until m-th, node repeats first operation and thereafter. | 1001 |
| Previous setting | Upon receipt of trg, each node sequentially performs first to m-th operations in TS info. after offset time elapses. Upon receipt of another trg, node performs similar operations. | 1002 |
| Previous setting | Only TS whose node is relevant to tmn. and receipt is described in TS info. Upon receipt of trg. transmitted from master node, each node sequentially performs first to m-th operations in TS info. after offset time + TS No. × TS length elapses. Upon receipt of another trg, node performs similar operations. | 1003 |
| Previous setting | Upon receipt of trg transmitted from master node, each node sequentially repeats first to m-th operations in TS info. at TS periods. Upon receipt of another trg, node performs similar operations. | 1004 |
| Previous setting | Only TS whose node is relevant to tmn. and receipt is described in TS info. Basically similar operations to No. 1003. | 1005 |

[1] TS information

| TS No. | Data trn. source | Data trn. destination | Operation | Optical SW conn. port No. |
|---|---|---|---|---|
| 0 | A | B | ADD | 3⇒2 |
| 1 | — | — | — | — |
| 2 | A | C | ADD | 3⇒2 |

Common Info: Offset time=5, TS length=20

1~m

[2] TS information

| TS No. | Data trn. source | Data trn. destination | Operation | Optical SW conn. port No. |
|---|---|---|---|---|
| 0 | A | — | DROP | 1⇒3 |
| 1 | B | C | ADD | 3⇒2 |
| 2 | — | — | — | — |

Common Info: Offset time=5, TS length=20

| TS No. | Data trnn. source | Data trnn. destination | Operation | Optical SW conn. port No. |
|---|---|---|---|---|
| 0 | A | B | ADD | 3⇒2 |
| 1 | — | — | — | — |
| 2 | A | C | ADD | 3⇒2 |

| TS No. | Data trnn. source | Data trnn. destination | Operation | Optical SW conn. port No. |
|---|---|---|---|---|
| 0 | A | — | DROP | 1⇒3 |
| 1 | B | C | ADD | 3⇒2 |
| 2 | — | — | — | — |

FIG. 34

| How to Sync. TS | TS Output Unit | TS Info. Set to Node | How to Set TS Info. | How to Set Local Time of Node | How to Set TS Start Time | Outline | No |
|---|---|---|---|---|---|---|---|
| Time | TS | on all TSs | Previous setting or delivering | Setting of time stamp delivery [Necessary to transmit on same path as data] | Previous setting or delivery setting [Tmn. on different path from data possible] | Difference from sync. with trg: Master node transmits TS start time to each node. At TS start time, node performs first operation in TS info. Local time of node is set at time with delay difference, to thereby operate all nodes at TS start time. | 2001 |
| | TS period | on all TSs or TS of its own | id. | id. | id. | Basically similar operations to No. 2001. At TS start time, node operates at TS period. | 2002 |
| | TS period × N [N is natural number] | on all TSs or TS of its own | id. | id. | id. | Basically similar operations to No. 2001. At TS start time, node operates at TS period × N. | 2003 |

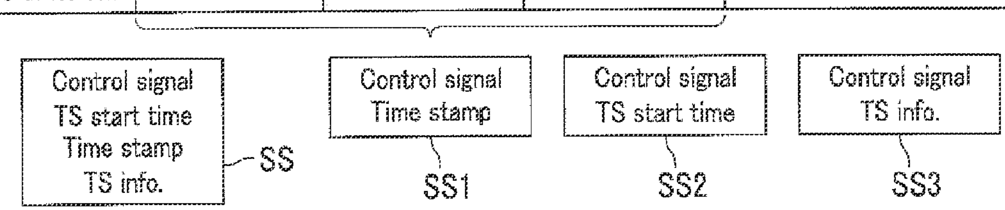

[1] TS information

| TS No. | Data trnn. source | Data trnn. destination | Operation | Optical SW conn. port No. |
|---|---|---|---|---|
| 0 | A | B | ADD | 3⇒2 |
| 1 | — | — | — | — |
| 2 | A | C | ADD | 3⇒2 |

Common Info: TS length=20 , TS period=60

[2] TS information

| TS No. | Data trnn. source | Data trnn. destination | Operation | Optical SW conn. port No. |
|---|---|---|---|---|
| 0 | A | — | DROP | 1⇒3 |
| 1 | B | C | ADD | 3⇒2 |
| 2 | — | — | — | — |

Common Info: TS length=20 , TS period=60

FIG. 41

| TS No. | Data tmn. source | Data tmn. destination | Operation | Optical SW port No. | Ring one-round time |
|---|---|---|---|---|---|
| 0 | 3 | Master node | DROP | 3⇒2 | a+b+c+d |

FIG. 43

| How to Sync. TS | How to Set Local Time | TS Output Unit | TS Info. Set to Node | How to Set TS Info. | How to Set TS Start Time | Outline | No |
|---|---|---|---|---|---|---|---|
| Time | Common time [Example: Time setting using GPS] | TS | on all TSs | Previous setting or delivering | Previous setting or delivery setting [Tmn. on different path from data possible] | Necessary to subtract delay time with adjacent node from TS start time so as to avoid TS collision because local times of nodes are common time. | 1 |
| | | TS period | on all TSs or TS of its own | id. | id. | Basically similar operations to No. 1. | 2 |
| | | TS period × N | id. | id. | id. | Basically similar operations to No. 1. | 3 |

FIG.57B

| | |
|---|---|
| TWC [A] | $\lambda$1b-8b |
| TWC 1 | $\lambda$2r,1g |
| TWC 2 | $\lambda$4r,2g |
| TWC 3 | $\lambda$6r,3g |
| TWC 4 | $\lambda$8r,4g |
| TWC 5 | $\lambda$1r,5g |
| TWC 6 | $\lambda$3r,6g |
| TWC 7 | $\lambda$5r,7g |
| TWC 8 | $\lambda$7r,8g |

FIG. 58B

| | |
|---|---|
| TWC [A] | λ1b-8b |
| TWC 1 | λ2r,3y,4y,5y,1g |
| TWC 2 | λ4r,3y,5y,6y,2g |
| TWC 3 | λ6r,4y,5y,6y,3g |
| TWC 4 | λ8r,5y,6y,7y,4g |
| TWC 5 | λ1r,2y,3y,4y,5g |
| TWC 6 | λ3r,2y,4y,5y,6g |
| TWC 7 | λ5r,3y,4y,6y,7g |
| TWC 8 | λ7r,4y,5y,6y,8g |

FIG. 59B

| | |
|---|---|
| TWC [A] | λ1b-8b |
| TWC 1 | λ2r,3y,4y,5y,6p,7p,8p,9p,1g |
| TWC 2 | λ4r,3y,5y,6y,7p,8p,9p,1p,2g |
| TWC 3 | λ6r,4y,5y,7y, 8p,9p,1p,2p,3g |
| TWC 4 | λ8r,5y,6y,7y, 9p,1p,2p,3p,4g |
| TWC 5 | λ1r,2y,3y,4y,6p,7p,8p,9p,5g |
| TWC 6 | λ3r,2y,4y,5y, 7p,8p,9p,1p,6g |
| TWC 7 | λ5r,3y,4y,6y,8p,9p,1p,2p,7g |
| TWC 8 | λ7r,4y,5y,6y, 9p,1p,2p,3p,8g |

TS: Time slot
Period t: According to calculation of allocated bandwidth
Period T: Period of TS reallocation

FIG. 72

| FIG. 72A | FIG. 72B |
|---|---|

FIG. 72A

| Trigger Output Interval | TS Output Unit | Ring Length | TS info. Set to Node |
|---|---|---|---|
| For each TS length | 1 trigger 1 TS ※1 [constraint: one over integers of ring length] | Integral multiple of TS length | on all TSs [including TS whose node is not relevant to tmn. and receipt] |
| For each TS period | 1 trigger 1 TS period ※2 [constraint: one over integers of ring length] | Integral multiple of TS period | on all TSs |
| | | | on node of its own [Setting amount reduced compared to setting of all TSs] |
| For each TS period × N [N is natural number] | 1 trigger plural TS periods ※3 [constraint: one over integers of ring length] | | on all TSs |
| | | | on node of its own |

FIG. 72B

| How to Set TS Info. | Outline of Operations | No |
|---|---|---|
| Previous setting | Previously set TS info. to all nodes. Upon receipt of trg. transmitted from master node, each node performs first operation in TS info. after offset time elapses [data tmn. + optical SW ADD switching or optical SW DROP switching or no operation]. Upon receipt of subsq. trg, node performs second operation in TS info. Similarly, after all operations that follow, node repeats first operation and thereafter. | 1011 |
| Previous setting | Upon receipt of trg, each node sequentially performs first to N-th operations in TS info. after offset time elapses. Then node repeats similar operations. | 1012 |
| Previous setting | Only TS whose node is relevant to tmn. and receipt is described in TS info. Upon receipt of trg, each node performs operations after offset time + TS No. × TS length elapses. Then node performs operations similarly. | 1013 |
| Previous setting | Upon receipt of trg transmitted from master node, each node repeats operations at TS periods. | 1014 |
| Previous setting | Only TS whose node is relevant to tmn. and receipt is described in TS info. Basically similar operations to No. 1014. | 1015 |

| TS No. | Data trnn. source | Data trnn. destination | Operation | Optical SW conn. port No. |
|---|---|---|---|---|
| 0 | A | B | ADD | 3⇒2 |
| 1 | — | — | — | — |
| 2 | A | C | ADD | 3⇒2 |

| TS No. | Data trnn. source | Data trnn. destination | Operation | Optical SW conn. port No. |
|---|---|---|---|---|
| 0 | A | — | DROP | 1⇒3 |
| 1 | B | C | ADD | 3⇒2 |
| 2 | — | — | — | — |

TS information

| TS No. | Data trnn. source | Data trnn. destination | Operation | Optical SW conn. port No. |
|---|---|---|---|---|
| 0 | A | B | ADD | 3⇒2 |
| 1 | — | — | — | — |
| 2 | A | C | ADD | 3⇒2 |

Common Info: Offset time=5, TS length=20

TS information

| TS No. | Data trnn. source | Data trnn. destination | Operation | Optical SW conn. port No. |
|---|---|---|---|---|
| 0 | A | — | DROP | 1⇒3 |
| 1 | B | C | ADD | 3⇒2 |
| 2 | — | — | — | — |

Common Info: Offset time=5, TS length=20

FIG. 81

| How to Sync. TS | TS Output Unit | TS Info. Set to Node | How to Set TS Info. | How to Set Local Time of Node | How to Set TS Start Time | Outline | No |
|---|---|---|---|---|---|---|---|
| Time | For each TS [constraint: one over integers of ring length] | on all TSs | Previous setting or delivering | Previous setting or setting of time stamp delivery [Tmn. on same path as data necessary] | Previous setting or delivery setting [Tmn. on different path from data possible] | Difference from sync. with trg: Master node transmits TS start time to each node. At TS start time, node performs first operation in TS info. Local time of node is set at time with delay difference, to thereby operate all nodes at TS start time. | 2001 |
| | For each TS period [constraint: one over integers of ring length] | on all TSs or TS of its own | id. | id. | id. | Basically similar operations to No. 2011. At TS start time, node operates at 1 TS period. | 2002 |
| | For each TS period × N [constraint: one over integers of ring length] | on all TSs or TS of its own | id. | id. | id. | Basically similar operations to No. 2011. At TS start time, node repeats 1 TS period. | 2003 |

FIG. 87B

| TS No. | Data tmn. source | Data tmn. destination | Operation | Optical SW port No. | Ring one-round time |
|---|---|---|---|---|---|
| 0 | 3 | Master node | DROP | 3⇒2 | a+b+c+d |

TS information

| TS No. | Data trnn. source | Data trnn. destination | Operation | Optical SW conn. port No. |
|---|---|---|---|---|
| 0 | A | B | ADD | 3⇒2 |
| 1 | — | — | — | — |
| 2 | A | C | ADD | 3⇒2 |

Common Info: TS length=20 , TS period=60

TS information

| TS No. | Data trnn. source | Data trnn. destination | Operation | Optical SW conn. port No. |
|---|---|---|---|---|
| 0 | A | — | DROP | 1⇒3 |
| 1 | B | C | ADD | 3⇒2 |
| 2 | — | — | — | — |

Common Info: TS length=20 , TS period=60

FIG. 89

| How to Sync. TS | How to Set Local Time | TS Output Unit | TS Info. Set to Node | How to Set TS Info. | How to Set TS Start Time | Outline | No |
|---|---|---|---|---|---|---|---|
| Time | Common time [Example: Time setting using GPS] | 1 TS [constraint: one over integers of ring length] | on all TSs | Previous setting or delivering | Previous setting or delivery setting [Tmn. on different path from data possible] | Necessary to subtract delay time compared to adjacent node from TS start time so as to avoid TS collision because local times of nodes are common time. | 1 |
| | | 1 TS period [constraint: one over integers of ring length] | on all TSs or TS of its own | id. | id. | Basically similar operations to No. 1. | 2 |
| | | TS period × N [constraint: one over integers of ring length] | id. | id. | id. | Basically similar operations to No. 1. | 3 |

FIG. 98

| | |
|---|---|
| FIG. 98A | FIG. 98B |

FIG.98A

| | | | K fiber/1 AWG | |
|---|---|---|---|---|
| | | | FWC present | |
| | | | ADD connection port | |
| | | | AWG prior stage | AWG subsq. stage |
| No. of fibers | k-fold | Inter-fiber wavelength exchange | [0a] Provide 2N×2N AWG and 1×N circular AWG for demultiplexing for each fiber | Null [No effect because FWC is present] |
| | | In-fiber wavelength exchange | [0b] Provide kN×kN AWG, 1×N circular AWG for demultiplexing for each fiber, and 1×N coupler for multiplexing | |

FIG.98B

| K fiber/1 AWG | | | 1 fiber/ 1 AWG |
| --- | --- | --- | --- |
| FWC absence | | | |
| ADD connection port | | | |
| None | AWG prior stage | AWG subsq. stage | |
| [1] k wavelength uses bandwidth for one wl. Provide kN × kN circular AWG. Provide k 1 × N circular AWGs and TWC capable of outputting k wl. at prior stage. | [1a] [1] + provide TWC for ADD | [1b] [1] + provide TWC and 1 × N AWG for ADD port | [3] Provide TWC for wiring between AWGs |
| [2] k wavelength uses bandwidth for one wl. Provide kN × kN circular AWG. Provide k 1 × N circular AWGs and TWC capable of outputting kN wl. at prior stage, and N × 1 coupler at subsq. stage. | [2a] [2] + provide TWC for ADD | [2b] [2] + provide TWC and 1 × N AWG for ADD port | |

FIG. 105B

| | Through Wavelength | DROP Wavelength | ADD Wavelength |
|---|---|---|---|
| TWC[A] | | | λ1~8 |
| TWC1 | λ2 | λ1 | |
| TWC2 | λ4 | λ2 | |
| TWC3 | λ6 | λ3 | |
| TWC4 | λ8 | λ4 | |
| TWC5 | λ1 | λ5 | |
| TWC6 | λ3 | λ6 | |
| TWC7 | λ5 | λ7 | |
| TWC8 | λ7 | λ8 | |

FIG. 106B

| | Through Wavelength | In-fiber Exchange Wavelength | DROP Wavelength | ADD Wavelength |
|---|---|---|---|---|
| TWC[A] | | | | λ1~8 |
| TWC1 | λ2 | λ3,4,5 | λ1 | |
| TWC2 | λ4 | λ3,5,6 | λ2 | |
| TWC3 | λ6 | λ4,5,7 | λ3 | |
| TWC4 | λ8 | λ5,6,7 | λ4 | |
| TWC5 | λ1 | λ2,3,4 | λ5 | |
| TWC6 | λ3 | λ2,4,5 | λ6 | |
| TWC7 | λ5 | λ3,4,6 | λ7 | |
| TWC8 | λ7 | λ4,5,6 | λ8 | |

FIG. 107B

| | Through Wavelength | In-fiber Exchange Wavelength | Inter-fiber Exchange Wavelength | DROP Wavelength | ADD Wavelength |
|---|---|---|---|---|---|
| TWC[A] | | | | | λ 1~8 |
| TWC1 | λ 2 | λ 3,4,5 | λ 6,7,8,9 | λ 1 | |
| TWC2 | λ 4 | λ 3,5,6 | λ 7,8,9,1 | λ 2 | |
| TWC3 | λ 6 | λ 4,5,7 | λ 8,9,1,2 | λ 3 | |
| TWC4 | λ 8 | λ 5,6,7 | λ 9,1,2,3 | λ 4 | |
| TWC5 | λ 1 | λ 2,3,4 | λ 6,7,8,9 | λ 5 | |
| TWC6 | λ 3 | λ 2,4,5 | λ 7,8,9,1 | λ 6 | |
| TWC7 | λ 5 | λ 3,4,6 | λ 8,9,1,2 | λ 7 | |
| TWC8 | λ 7 | λ 4,5,6 | λ 9,1,2,3 | λ 8 | |

FIG. 123B

| Types of TS | Upper Ring | Lower Ring |
|---|---|---|
| [1] Forward direction TS | TS delayed from forward direction TS inside M–C by time Dn | TS delayed from forward direction TS inside M–C by time Ds+Dp |
| [2] Backward direction TS | TS advanced from forward direction TS of its own by time 2Dn | TS advanced from forward direction TS of its own by time 2(Ds+Dp) |
| [3] Forward direction jump TS | TS advanced from forward direction TS of its own by time Dru TS | TS advanced from forward direction TS of its own by time Drl TS |
| [4] Backward direction jump TS | advanced from forward direction TS of its own by time 2Dn–Dru | advanced from forward direction TS of its own by time 2(Ds+Dp) |
| [5] TS for upper ring forward direction jump TS | — | TS advanced from forward direction TS of its own by time Dru+Drl |
| [6] TS for upper ring backward direction jump TS | — | TS advanced from forward direction TS of its own by time 2(Ds+Dp)–(Dru+Drl) |

| | Unidirectional comm. [Data arrives at each node unidirectionally] | | Bidirectional comm. [Data arrives at source node bidirectionally] |
|---|---|---|---|
| US and DS Paths | Symmetrical [Different US and DS fibers] | Asymmetrical | •Asymmetrical |
| No. of A/D IF for Node | One | One | One |
| How to control | [1] Realizable by shifting TS start position of node by propagation delay [Necessary to measure inter-node delay similarly to PON] | [2] Realizable by shifting TS start position of node by propagation delay [Just broadcast TS start signal in arrow direction, not necessary to measure inter-node delay] | None in conventional method |
| Problems of Control | None [Conditions: Guard band absorbs diff. between US and DS fixed fiber lengths. US and DS fiber length fluctuation differences are same.] | •How to sync. TS at ring one-round when upper ring one-round delay is not integral multiple. •How to sync. TS when TS is transmitted from lower ring to upper ring | •How to sync. CW and CCW TSs when CW and CCW TSs arrive at same output IF of same source node. |
| Image | 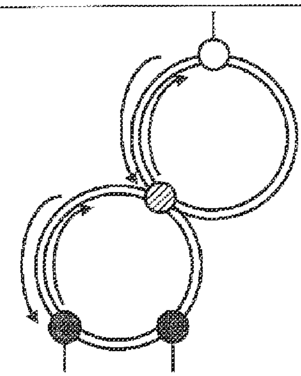 | 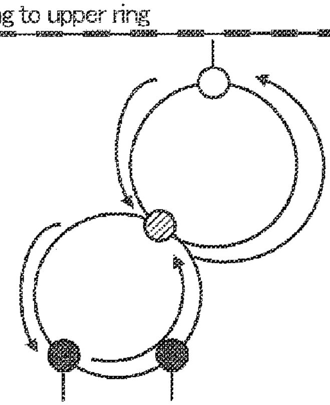 | 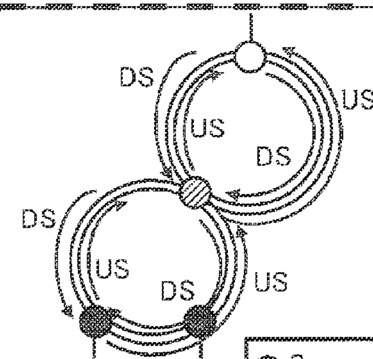  |

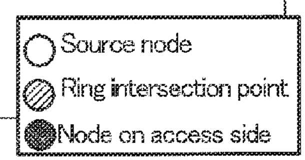

FIG. 143

| | Unidirectional comm. [Data arrives at each node unidirectionally] | | Bidirectional comm. [Data arrives at source node bidirectionally] |
|---|---|---|---|
| US and DS Paths | Symmetrical [Different US and DS fibers] | · Asymmetrical | |
| No. of A/D IF for Node | One | One／plural | One／plural |
| How to control | [1] Realizable by shifting TS start position of node on access side by propagation delay [Necessary to measure inter-node delay similarly to PON [Source node is OLT and access side node is ONU]] | Realizable by shifting TS start position of node by propagation delay [Just broadcast TS start signal in arrow direction, not necessary to measure inter-node delay] | None in conventional method |
| Problems of Control | None [Conditions: Guard band absorbs diff. between US and DS fixed fiber lengths. US and DS fiber length fluctuation differences are same.] | ·How to sync. TSs at ring one-round when ring one-round delay is not integral multiple. | ·How to sync. CW and CCW TSs when CW and CCW TSs arrive at same output IF of same source node. |

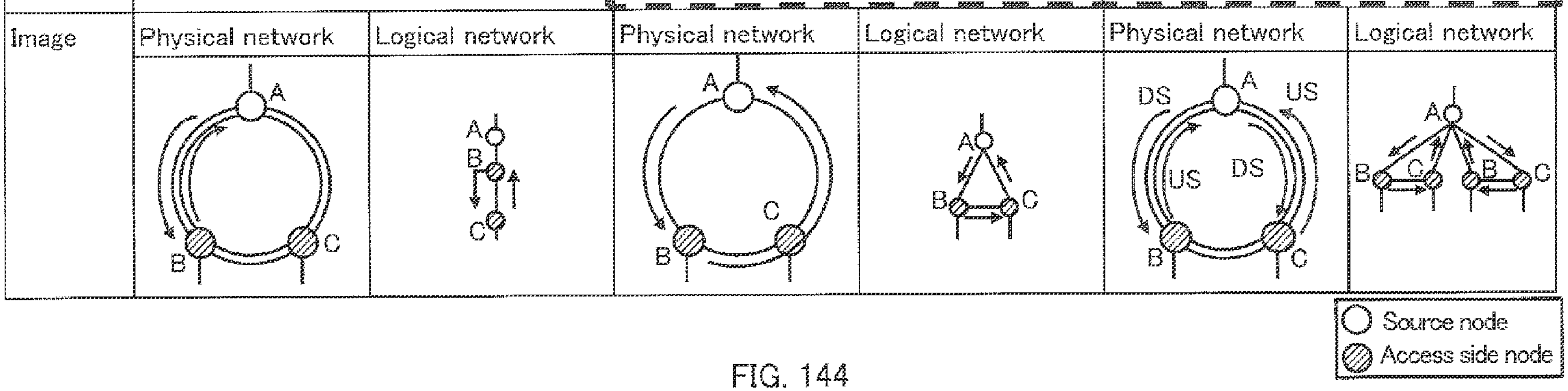

| | | No delay fluctuation | Delay fluctuation present |
|---|---|---|---|
| Problems | [1] How to sync. TSs in TS tmn. from lower to upper ring @Multi-ring | Perform just once when NW device is installed, [1] Synchronize reference time [2] Measure delay from ADD node (or THRU node) to ring intersection point on lower ring [Measurable by OTDR or the like] [3] Make all nodes from ADD node (or THRU node) to ring intersection point on lower ring tick TS for upper ring shifted by delay time of [2]. | In period shorter than time interval at which delay fluctuation larger than set guard band length is generated, [1] Synchronize reference time [2] Measure delay from ADD node (or THRU node) to ring intersection point on lower ring [3] Make all nodes from ADD node (or THRU node) to ring intersection point on lower ring tick TS for upper ring shifted by delay time of [2]. |
| | [2] How to sync. TSs at ring one-round when ring one-round delay is not integral multiple of TS @Single/Multi-ring | Perform just once when NW device is installed, [1] Synchronize reference time [2] Measure ring one-round delay [Measurable by OTDR or the like] [3] Make all nodes from ADD node to node at ring one-round tick TS for ring one-round such that TS arrival time at ring one-round is integral multiple of TS. | In period shorter than time interval at which delay fluctuation larger than set guard band length is generated, [1] Synchronize reference time [2] Measure ring one-round delay [3] Make TS for ring one-round shifted by delay time tick between ADD node and node at ring one-round such that TS arrival time at ring one-round is integral multiple of TS. |
| | [3] How to sync. CW and CCW TSs when CW and CCW TSs arrive at same output IF of same source node. @Single/Multi-ring | Perform just once when NW device is installed, [1] Synchronize reference time [2] Measure propagation delay as much as number of paths from ADD node to source node [Measurable by OTDR or the like] [3] Make all nodes from ADD node (or THRU node) to source node tick TS shifted by CW and CCW path difference delay time. | In period shorter than time interval at which delay fluctuation larger than set guard band length is generated, [1] Synchronize reference time [2] Measure propagation delay as much as number of paths from ADD node to source node [3] Make all nodes from ADD node (or THRU node) to source node tick TS shifted by CW and CCW path difference delay time. |

OPTICAL NETWORK SYSTEM, OPTICAL SWITCH NODE, MASTER NODE, AND NODE

This application is a National Stage Application of PCT/JP2013/066350, filed 13 Jun. 2013, which claims benefit of Serial No. 2012-133776, filed 13 Jun. 2012 in Japan, Serial No. 2012-133775, filed 13 Jun. 2012 and Serial No. 2013-032134, filed 21 Feb. 2013 and which applications are incorporated herein by reference. To the extent appropriate, a claim of priority is made to each of the above disclosed applications.

TECHNICAL FIELD

The present invention relates to an optical network system, an optical switch node, a master node, and a node.

BACKGROUND ART

An optical network system including an OADM (optical add/drop multiplexer) has been known as an optical switch node. An ROADM (Reconfigurable Optical Add/Drop Multiplexer), a type of the OADM, is disclosed in a non-patent document of "HAGIMOTO Kazuo, and two others, "Introduction to Optical Network Becoming More Familiar (15)> (which will be referred to as Non-Patent Document 1 hereinafter). The OADM as its basic configuration is described briefly below.

FIG. 146 is a block diagram illustrating an example of a configuration of a conventional OADM. As illustrated in FIG. 146, the OADM includes an optical SW (which may be used as an abbreviation of a switch hereinafter) setting unit 501, an optical SW unit 502, a demultiplexing unit 503, a multiplexing unit 504, and transmit-receive units 505-1 to 505-N.

FIG. 147 is a diagram illustrating an example of a configuration of a ring optical network system in which the OADMs illustrated in FIG. 146 are connected in a ring shape via transmission lines.

As illustrated in FIG. 147, four OADMs 510A to 510D are installed on land and are connected each other via a ring-shaped transmission 520. In a system illustrated in FIG. 147, a wavelength λ1 is allocated to an optical signal transmitted and received between the OADM 510A and the OADM 510C. A wavelength λ3 is allocated to an optical signal transmitted and received between the OADM 510A and the OADM 510D. A wavelength λ2 is allocated to an optical signal transmitted and received between the OADM 510B and the OADM 510C. And, a wavelength λ4 is allocated to an optical signal transmitted and received between the OADM 510B and the OADM 510D. As described above, different wavelength paths having different wavelengths are set for each point to point.

In a metro network which is established as the metropolitan area optical network, as illustrated in "Key Points of Network for Learner in One Week" (which will be referred to as Non-Patent Document 2), wavelength division multiplexing (WDM) is used from a viewpoint of band usage efficiency. As a network topology, a ring-shaped one is used, for example. FIG. 148 is a diagram illustrating a configuration of a conventional metro network. In the metro network illustrated in FIG. 148, a plurality of reconfigurable optical add/drop multiplexers (ROADMs) 530 are installed as nodes into a ring-shaped optical fiber network 531. Control of optical line switch type is provided using a wavelength path, and an appropriate bandwidth is allocated, by statically setting a wavelength path for each point to point in accordance with an estimated maximum value of a point-to-point traffic volume. In the illustrated example, a path having the wavelength λ1 is set between a point A and a point D; and, λ2, between a point B and the point D. FIG. 149A and FIG. 149B are diagrams each for explaining an operating principle of the conventional metro network using the ROADM as described above. For example, different paths having different wavelengths λ1 to λ3 are set from the points A to C, respectively, to the point D as illustrated in FIG. 149A. The point D thus receives temporally non-synchronous data (Data1 to Data4) from the points A to C as illustrated in FIG. 149B.

In the conventional optical network as described above, because a wavelength path is statically set for each point to point in accordance with the estimated maximum traffic. Improvement of bandwidth when a traffic volume is small becomes a problem to be solved. For example, even if an actual point-to-point traffic volume is smaller than an estimated value, which results in a free device resource or bandwidth, it is not possible to use one free bandwidth with a certain point-to-point wavelength path for a communication between another point to point. Conversely, if a given point-to-point traffic volume becomes larger than estimated, it is not possible to transmit or receive part of data at the point to point, using a wavelength path used in other point to point. Further, the number of wavelengths as much as the number of points to points need to be prepared, which causes a problem that the number of points to points is limited depending on types of wavelengths which the ROADM device can output.

An optical ring network (which may also be referred to as a "ring" where appropriate) has been known which can improve traffic accommodation efficiency by using a WDM technique and a TDM (Time Division Multiplexing) technique. Multistage connection of a plurality of such rings makes it possible to efficiently accommodate traffic in a further wide area.

A non-patent document of "Demonstration of the Interconnection of Two Optical Packet Rings with a Hybrid Optoelectronic Packet Router (Alcatel, ECOC2010)" (which will be referred to as Non-Patent Document 3) proposes a time slot (which may also be abbreviated to a "TS" hereinafter) exchange method between WDM/TDM rings, in a multi-ring network in which a plurality of the rings are connected in multiple stages.

In the conventional method disclosed in Non-Patent Document 3, adjustment of a fiber length between the rings allows time slots to be exchanged at a ring intersection point (a node connecting between rings), without collision between a time slot for communication in an upper ring (which may also be referred to as a first time slot) and a time slot for communication between rings from a lower ring to the upper ring (which may also be referred to as a second time slot).

RELATED ART DOCUMENTS

Non-Patent Documents

Non-Patent Document 1: HAGIMOTO Kazuo, and two others, "Introduction to Optical Network Becoming More Familiar (15), "ROADM" that can freely operate an optical core network, [online], Jun. 15, 2006, Nikkei Business Publications, Inc., [searched on May 30, 2012], Internet <URL:http://itpronikkeibp.co.jp/article/COLUMN/20060607/240199/>

Non-Patent Document 2: HAGIMOTO Kazuo, YAMABAYASHI Yoshiaki, and TAKAHASHI Tetsuo, "[online], Jun. 15, 2006, "Key Points of Network for Learner in One Week, Introduction to Optical Network Becoming More Familiar (15), "ROADM" that can freely operate an optical core network, [online], Nikkei Business Publications, Inc., Jun. 15, 2006, [searched on May 15, 2012], Internet <URL:http://itpro.nikkeibp.co.jp/article/COLUMN/20060607/240199/>

Non-Patent Document 3: Demonstration of the Interconnection of Two Optical Packet Rings with a Hybrid Optoelectronic Packet Router (Alcatel, ECOC2010)

SUMMARY OF THE INVENTION

Problem to be Solved by the Invention

As illustrated in FIG. 147, in the conventional OADM, the number of nodes which can be installed on a ring is limited by the number of wavelengths, because different wavelengths need to be set to different wavelength paths for each point-to-point. In the example illustrated in FIG. 147, the number of the wavelengths is four, namely, λ1 to λ4, while the number of nodes is also four, namely, 510A to 510D. That is, in the conventional ring-type optical network, the number of installable nodes is limited by the number of wavelengths.

Further, in the optical network as the conventional metro network using the WDM technique explained with reference to FIG. 148, FIG. 149A, and FIG. 149B, a wavelength path is statically set between points. This has such problems that improvement of efficiency in bandwidth usage cannot be expected and that it is not possible to handle a situation in which a traffic volume between certain points exceeds an estimated value.

In the conventional method disclosed in Non-Patent Document 3, in a multi-ring network, adjustment of a fiber length between the rings prevents collision between the first time slot and the second time slot.

In an actual commercially-available network, however, the fiber length varies depending on a change in outside air temperature. This results in a change in a ring length and a deviation of arrival timing of a time slot at a ring intersection point, which causes a problem of collision between the first time slot and the second time slot at the ring intersection point.

Also in a single ring network which is constituted by a single ring, when a time slot operates periodically (at intervals of a time t) at a master node as a source node on a ring (which may also be referred to as an "optical master node" or a "source node" hereinafter), if a processing timing of the time slot has a propagation delay time of one round of a ring is not a multiple integer of the time slot, a timing when a time slot transmitted from other node arrives at the master node is deviated from the time slot processing timing.

Thus, a problem occurs that the master node cannot process or transfer a time slot which arrives from other node.

The present invention has been made in an attempt to solve the above-described problems and provide an optical network system, an optical switch node, a master node, and a node in which: the number of nodes can be increased without depending on the number of wavelengths; traffic accommodation efficiency of an entire system can be improved by dynamic bandwidth allocation according to a traffic volume, using the WDM technique; and a master node can process and transfer a time slot which arrives from other node.

Means for Solving the Problem

An optical network system includes: a master node; and a plurality of optical switch nodes. The master node is configured to divide a wavelength path having an arbitrary wavelength into time slots each having a prescribed time period, and allocate the time slots to each of the optical switch nodes. Each of the optical switch nodes is configured to synchronize the time slots based on information on the allocation delivered from the master node, and thereby transmit or receive a data or perform route switching.

An optical switch node is connected to a master node via a transmission path. The optical switch node includes: a time slot synchronization unit that is configured to synchronize time slots at prescribed periods allocated to the master node, and thereby give an instruction of transmitting or receiving a data or performing route switching, based on information delivered from the master node; and an optical time slot switching unit that is configured to transmit or receive a data or perform route switching in accordance with the instruction from the time slot synchronization unit.

A master node is connected to a plurality of optical switch nodes via a transmission path. The master node includes: a time slot synchronization unit that is configured to divide a wavelength path having an arbitrary wavelength into a plurality of time slots each having a prescribed time period and allocate the time slots to each of the optical switch nodes; and an optical time slot switching unit that is configured to deliver, to each of the optical switch nodes, information for making each of the optical switch nodes synchronize the time slots allocated thereto by the time slot synchronization unit and thereby transmit or receive a data or perform route switching.

A node in an optical network system including a multi-ring network in which a single ring network including a single ring or a plurality of rings are connected in multiple stages, the node being present on the ring. The node includes: a time slot control unit that is configured to, if the node is a master node, set a time of each of nodes other than the master node; a reference time slot synchronization unit that is configured to, if the node is a node other than the master node, tick a first time slot starting from the time set by the master node; a delay measurement unit that is configured to, if the node is the master node, calculate an offset value of a specific node which is specified from among the nodes other than the master node and set the calculated offset value to the specific node, based on a propagation delay time between the master node and each of the nodes other than the master node and on a propagation delay time for one round on the ring; and a plural time slot management unit that is configured to, if the node is the specific node, tick a second time slot which is a time slot starting from a timing shifted from a start timing of the first time slot of its own node by the offset value set by the master node.

Effects of the Invention

In the present invention, the number of nodes can be increased without depending on the number of wavelengths.

In the present invention, a time TS allocation and a wavelength allocation to each of the optical switch node can be changed in accordance with an incoming traffic volume. This makes it possible to achieve such advantageous effects that: a dynamic bandwidth allocation can be realized in accordance with a point-to-point traffic volume; traffic accommodation efficiency of the entire system can be improved; and, with improvement of the traffic accommodation efficiency, the number of wavelengths or receivers used can be reduced.

Further, in the present invention, a master node makes each of nodes other than the master node have time slots of up to two types, based on a propagation delay time between the master node and each of the nodes other than the master node and on a propagation delay time for one round on a ring.

As described above, each of the nodes other than the master node is provided with two types of time slots for data. Thus, in a case of a multi-ring network, a node on a lower ring can have a time slot for upper ring synchronized with a reference time slot of a ring intersection point node. This makes it possible to achieve such an advantageous effect that collision of time slots at the ring intersection point node can be avoided.

In providing a time slot, a propagation delay time for one round of a ring is taken into account. This makes it possible to achieve such advantageous effects that, in a case of a single ring network, even when the propagation delay time for one round of the ring is not a multiple integer of the time slot, the master node can perform a processing of a time slot arrived and can transfer a time slot from other node.

BRIEF DESCRIPTION OF THE DRAWINGS

FIG. 7 is a diagram illustrating a variation in a case where a trigger is utilized with a TS start delivery function and a TS synchronization function.

FIG. 34 is a diagram illustrating a variation in a case where a time is utilized with a TS start delivery function and a TS synchronization function, and a time counter is set at a time with a delay difference added thereto.

FIG. 41 is a diagram illustrating an example of how to set TS information on the master node.

FIG. 43 is a diagram illustrating a variation in a case where a time counter is set at a common time.

FIG. 57B is a diagram illustrating TWC wavelength requirements of the optical TS-SW unit according to Example 6.

FIG. 58B is a diagram illustrating TWC wavelength requirements of the optical TS-SW unit according to Example 7.

FIG. 59B is a diagram illustrating TWC wavelength requirements of the optical TS-SW unit according to Example 8.

FIG. 72 is a diagram illustrating various assumed examples when TS start delivery and TS synchronization is performed using a trigger.

FIG. 81 is a diagram for explaining time setting using a time with delay difference.

FIG. 87B is a diagram for explaining an example of a setting of time slot information of a master node in the time synchronization type configuration using the time with delay difference.

FIG. 89 is a diagram for explaining time synchronization using a common time.

FIG. 92 is a time sequence diagram illustrating a processing of recognizing a topology in a case of a single control ring.

FIG. 93A is a block diagram illustrating a variation of a configuration for transmitting a trigger (or a control signal).

FIG. 93B is a block diagram illustrating another variation of the configuration for transmitting a trigger (or a control signal).

FIG. 93C is a block diagram illustrating a still another variation of the configuration for transmitting a trigger (or a control signal).

FIG. 93D is a block diagram illustrating a yet another variation of the configuration for transmitting a trigger (or a control signal).

FIG. 94A is a block diagram illustrating a configuration example of connection between the TS transmit-receive unit and the optical TS-SW unit.

FIG. 94B is a block diagram illustrating another configuration example of connection between the TS transmit-receive unit and the optical TS-SW unit.

FIG. 94C is a block diagram illustrating a still another configuration example of connection between the TS transmit-receive unit and the optical TS-SW unit.

FIG. 95A is a diagram illustrating an outline of a configuration of an optical TS-SW unit (a wavelength switch).

FIG. 95B is a diagram illustrating an outline of another configuration of the optical TS-SW unit (the wavelength switch).

FIG. 96 is a block diagram illustrating a basic configuration of the optical TS-SW unit.

FIG. 97A is a block diagram illustrating a structure of a variable wavelength converter (TWC).

Figure 97A:
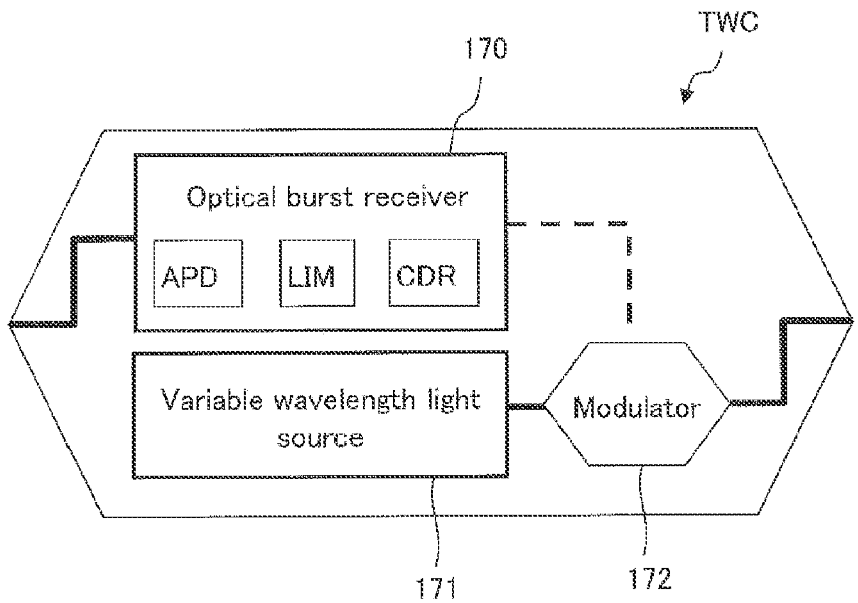
Figure 97B:
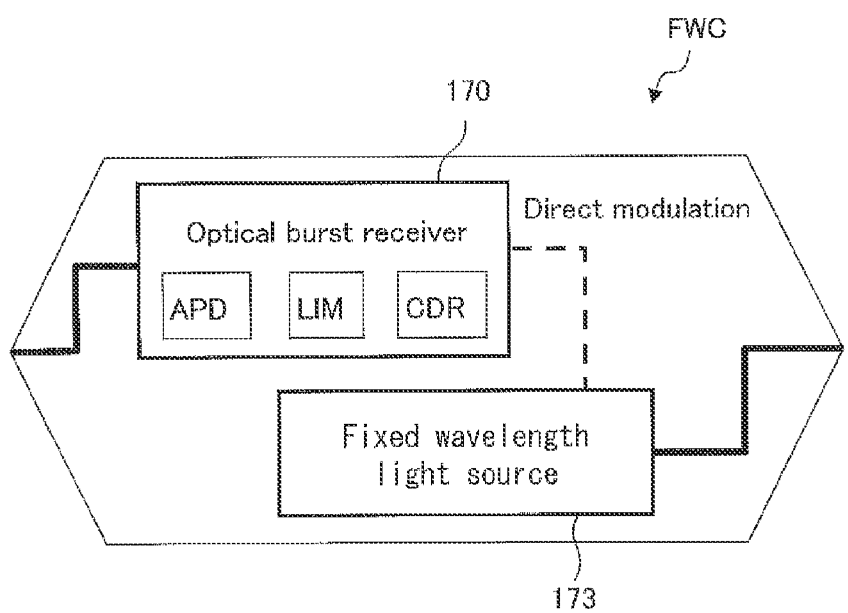

FIG. 97B is a block diagram illustrating a structure of a fixed wavelength converter (FWC).

FIG. 98 is a diagram illustrating various configurations of the optical TS-SW unit of wavelength switch type.

Figure 99:
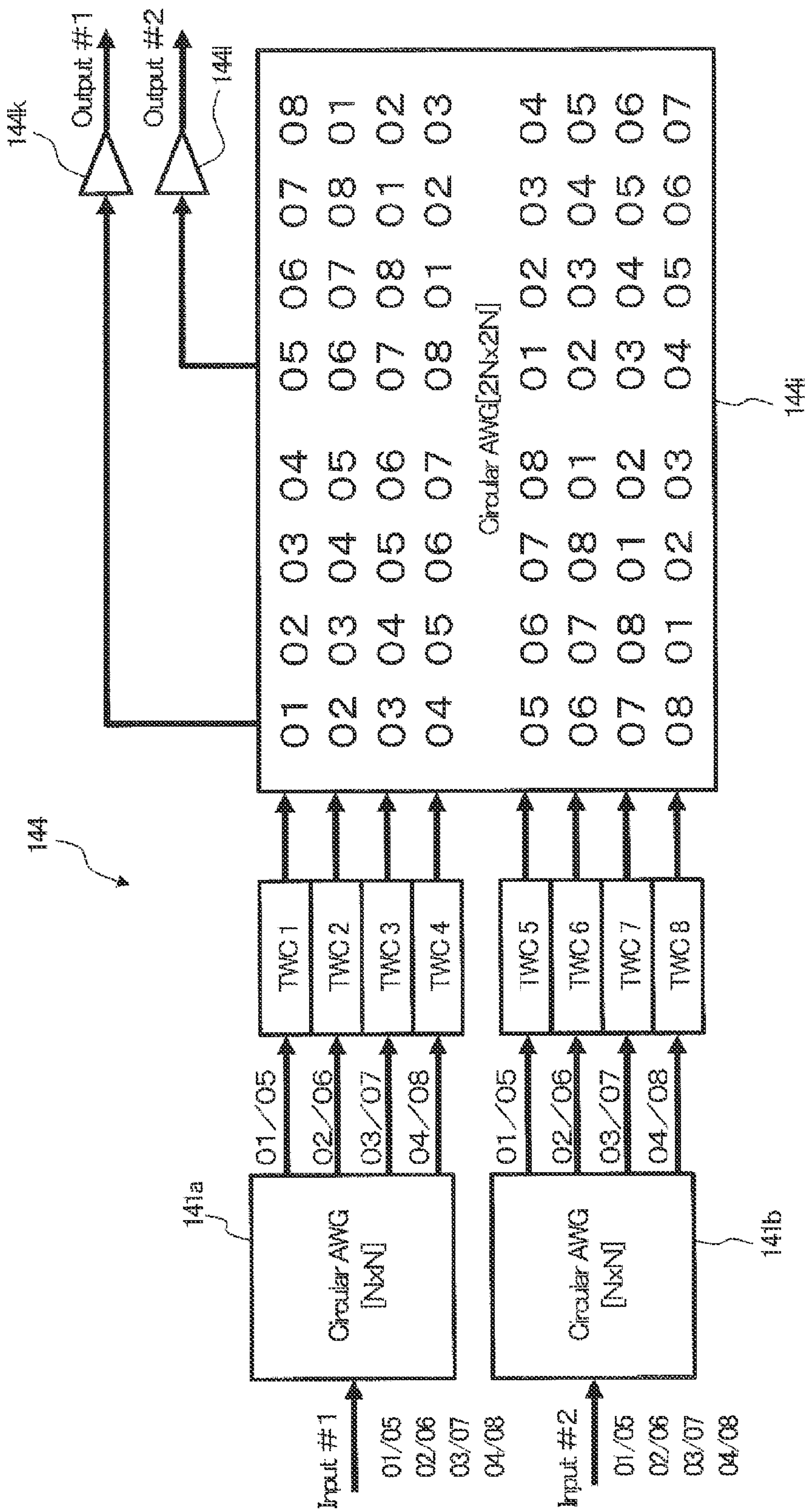

FIG. 99 is a block diagram illustrating a configuration example of the optical TS-SW unit using a k-fold ring.

Figure 100:
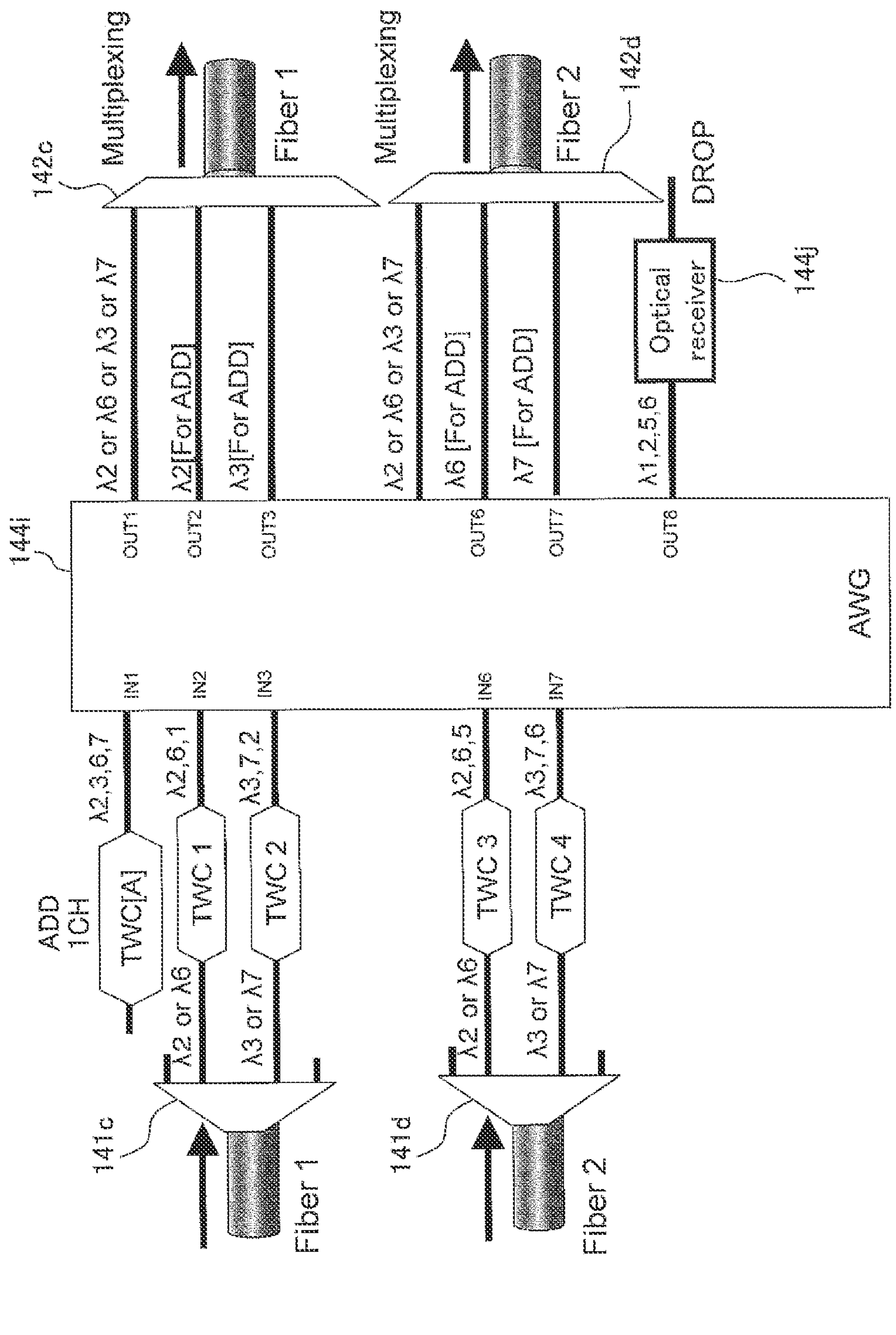

FIG. 100 is a block diagram illustrating a configuration example of the optical TS-SW unit in a case of a double ring, 1 ADD 1 DROP, and inter-fiber exchangeability.

Figure 101:
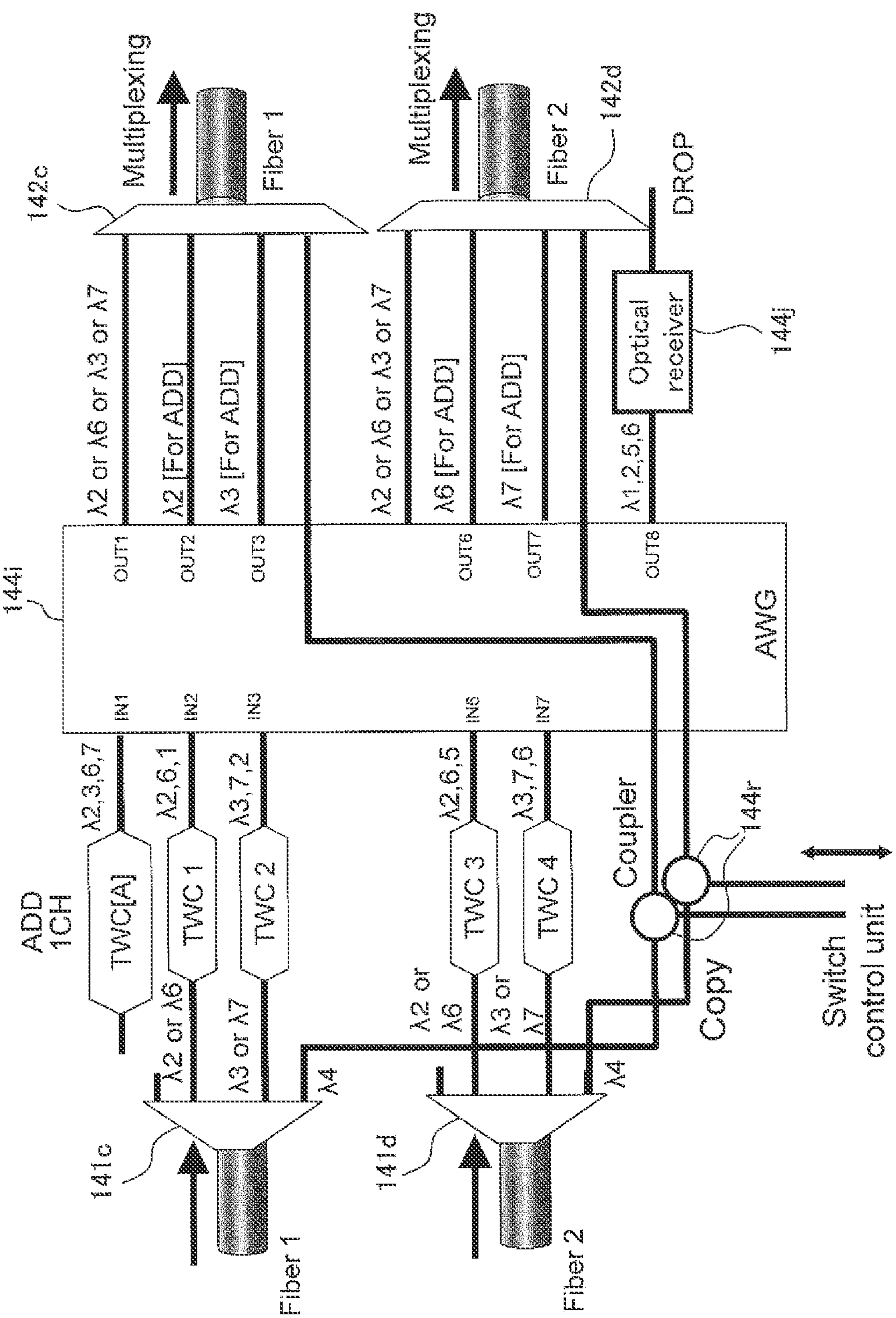

FIG. 101 is a block diagram illustrating a configuration example of the optical TS-SW unit in a case of a double ring, 1 ADD 1 DROP, and inter-fiber exchangeability, using a wavelength for control.

Figure 102:
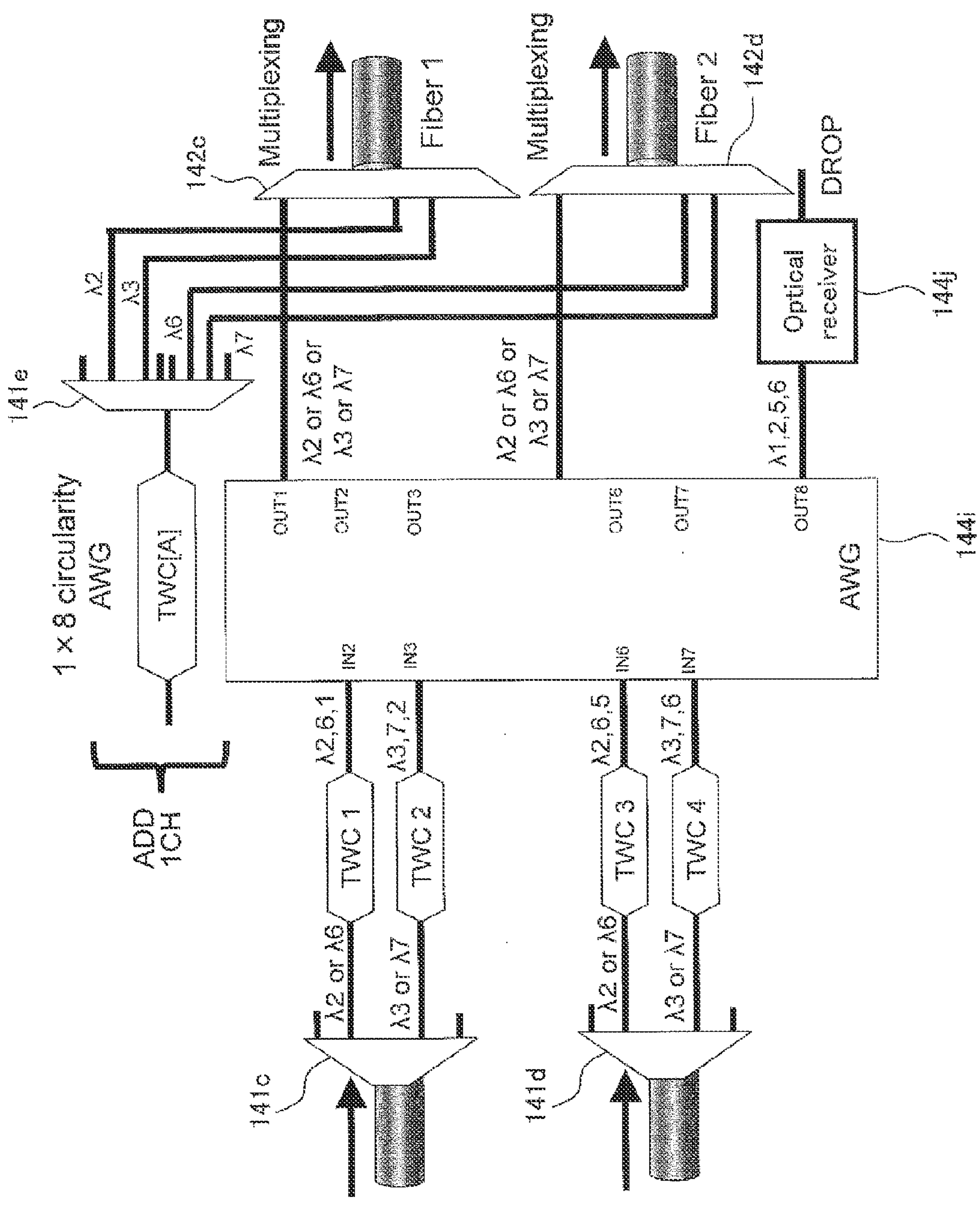

FIG. 102 is a block diagram illustrating another configuration example of the optical TS-SW unit in a case of a double ring, 1 ADD 1 DROP, and inter-fiber exchangeability.

Figure 103:
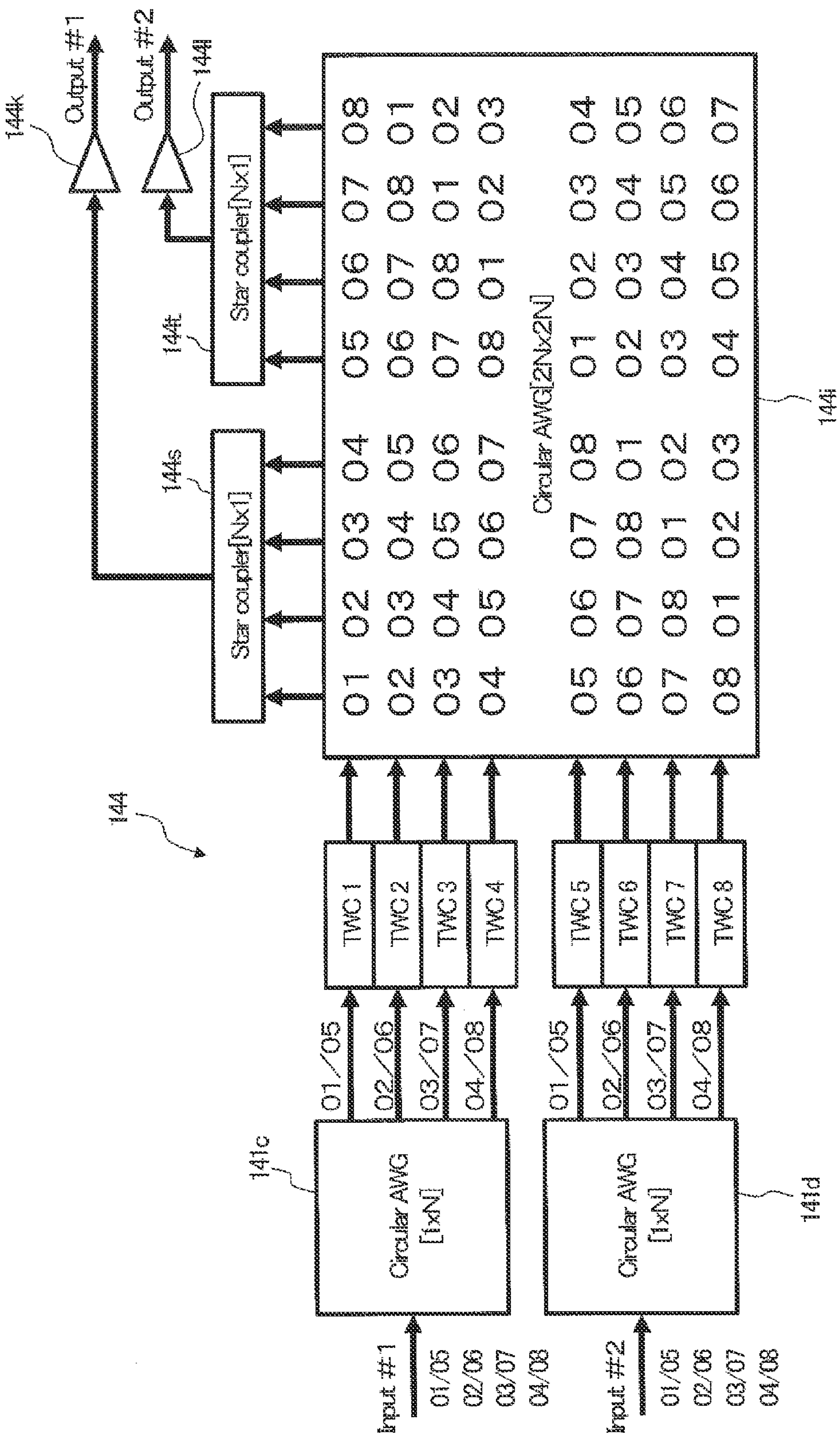

FIG. 103 is a block diagram illustrating a configuration example of the optical TS-SW unit in which inter-fiber wavelength exchange and in-fiber wavelength exchange is possible, without using the FWC.

Figure 104:
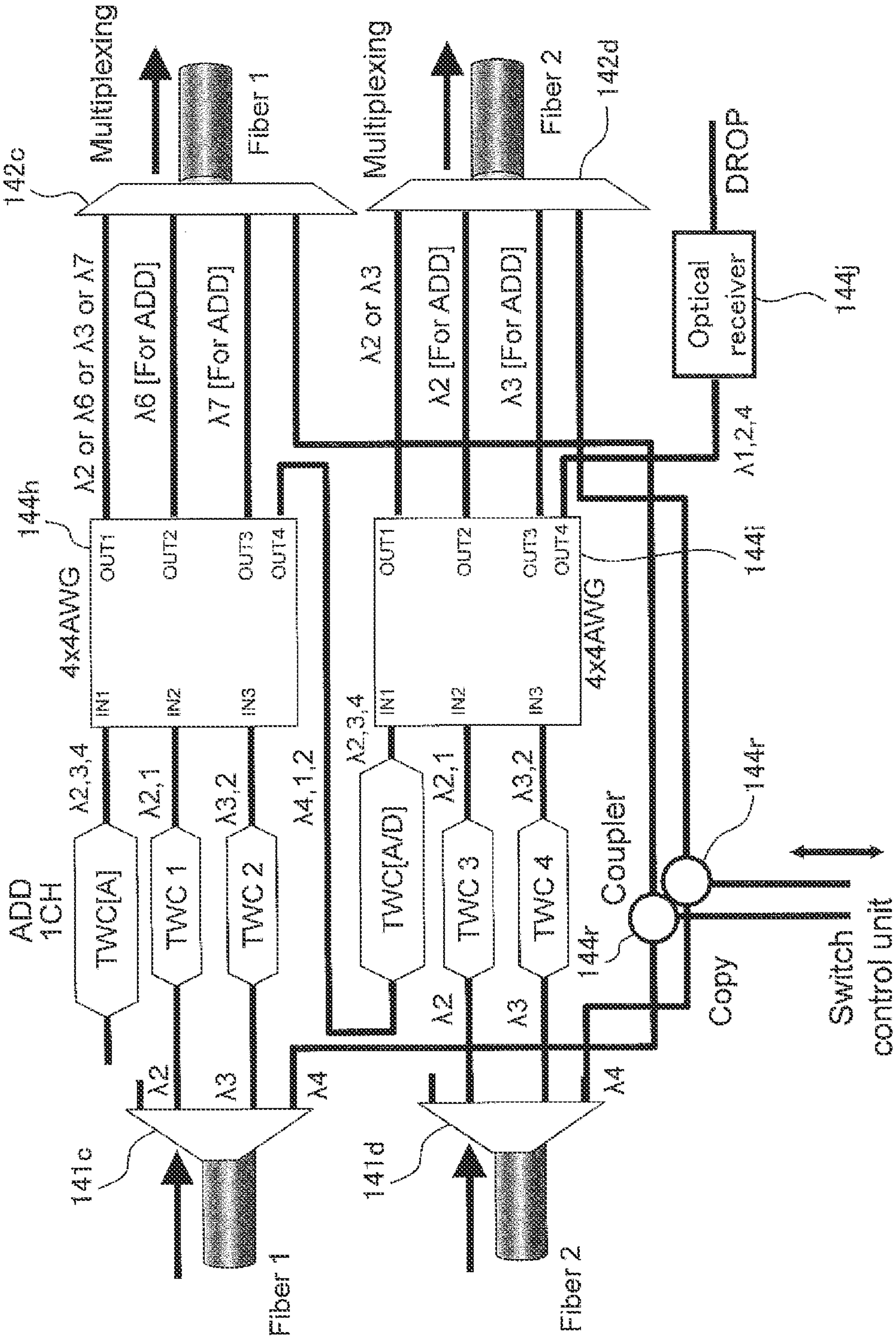

FIG. 104 is a block diagram illustrating a configuration example of the optical TS-SW unit in a case of a double ring, 1 ADD 1 DROP, and 1 AWG per 1 fiber, using a wavelength for control.

Figure 105A:
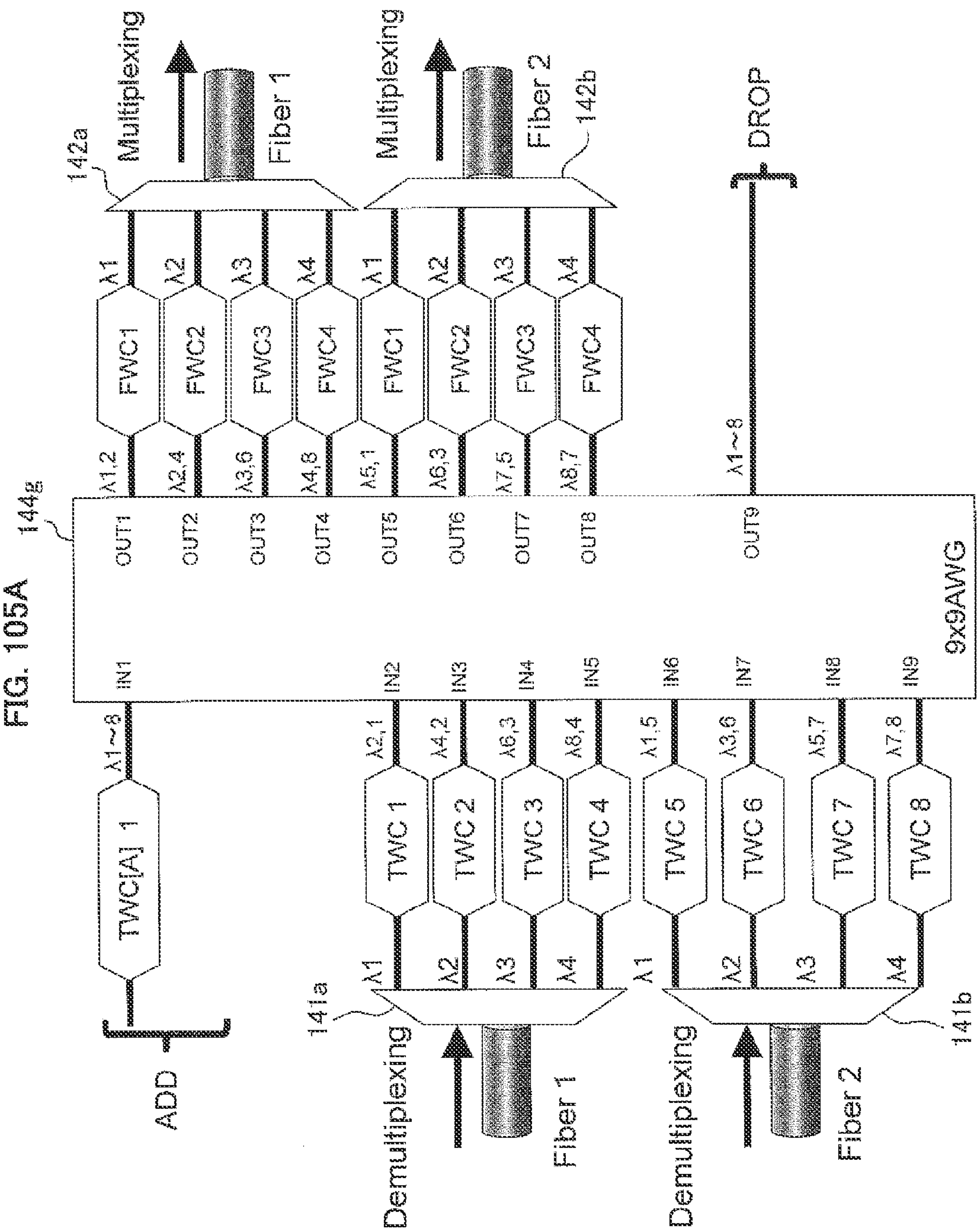

FIG. 105A is a block diagram illustrating a configuration example of the optical TS-SW unit in a case of a double ring and ADD/DROP 1 channel, using the FWC.

FIG. 105B is a diagram illustrating TWC wavelength requirements of the optical TS-SW unit.

Figure 106A:
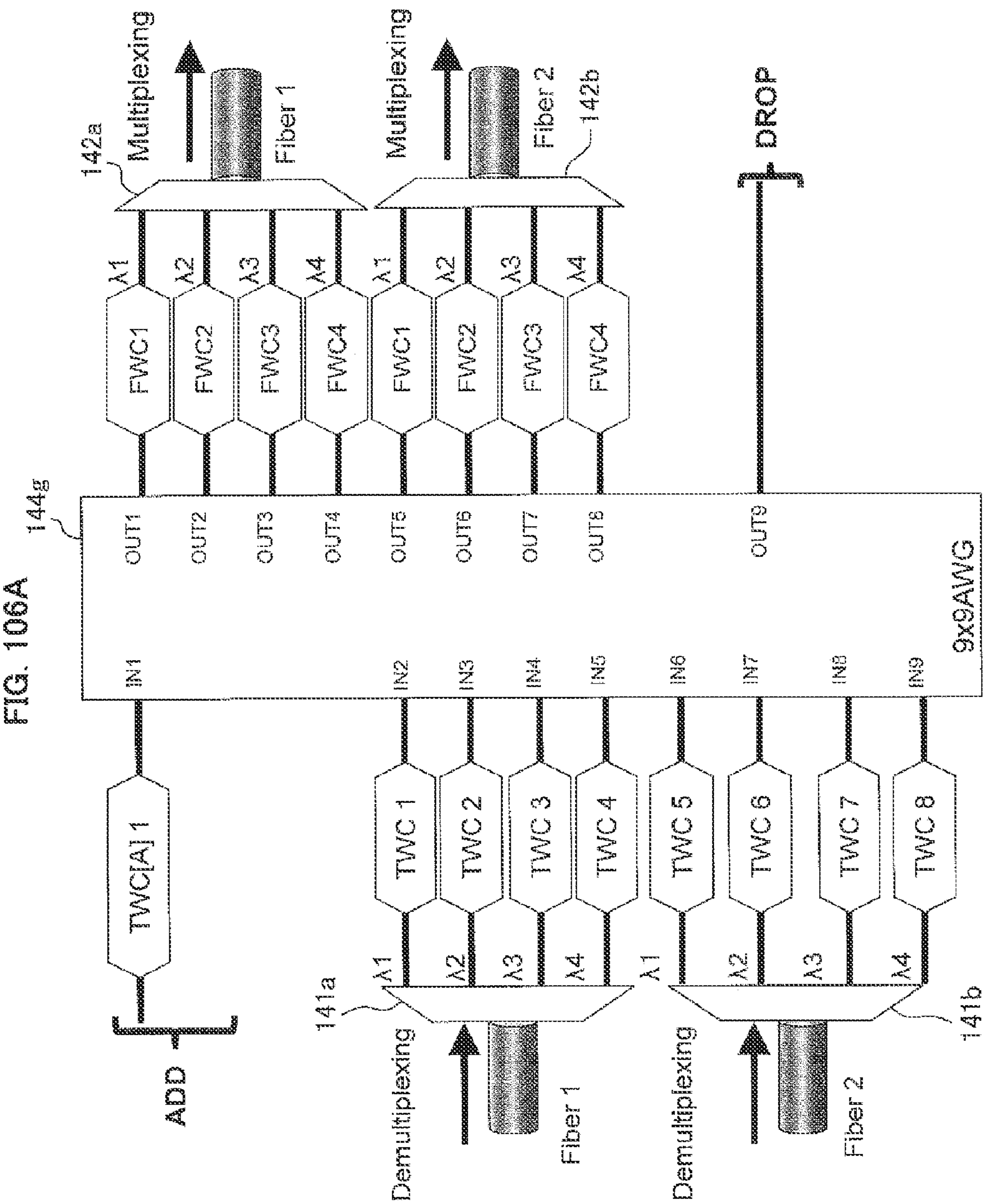

FIG. 106A is a block diagram illustrating a configuration example of the optical TS-SW unit in a case of a double ring and ADD/DROP 1 channel, using the FWC.

FIG. 106B is diagram illustrating TWC wavelength requirements of the optical TS-SW unit.

Figure 107A:
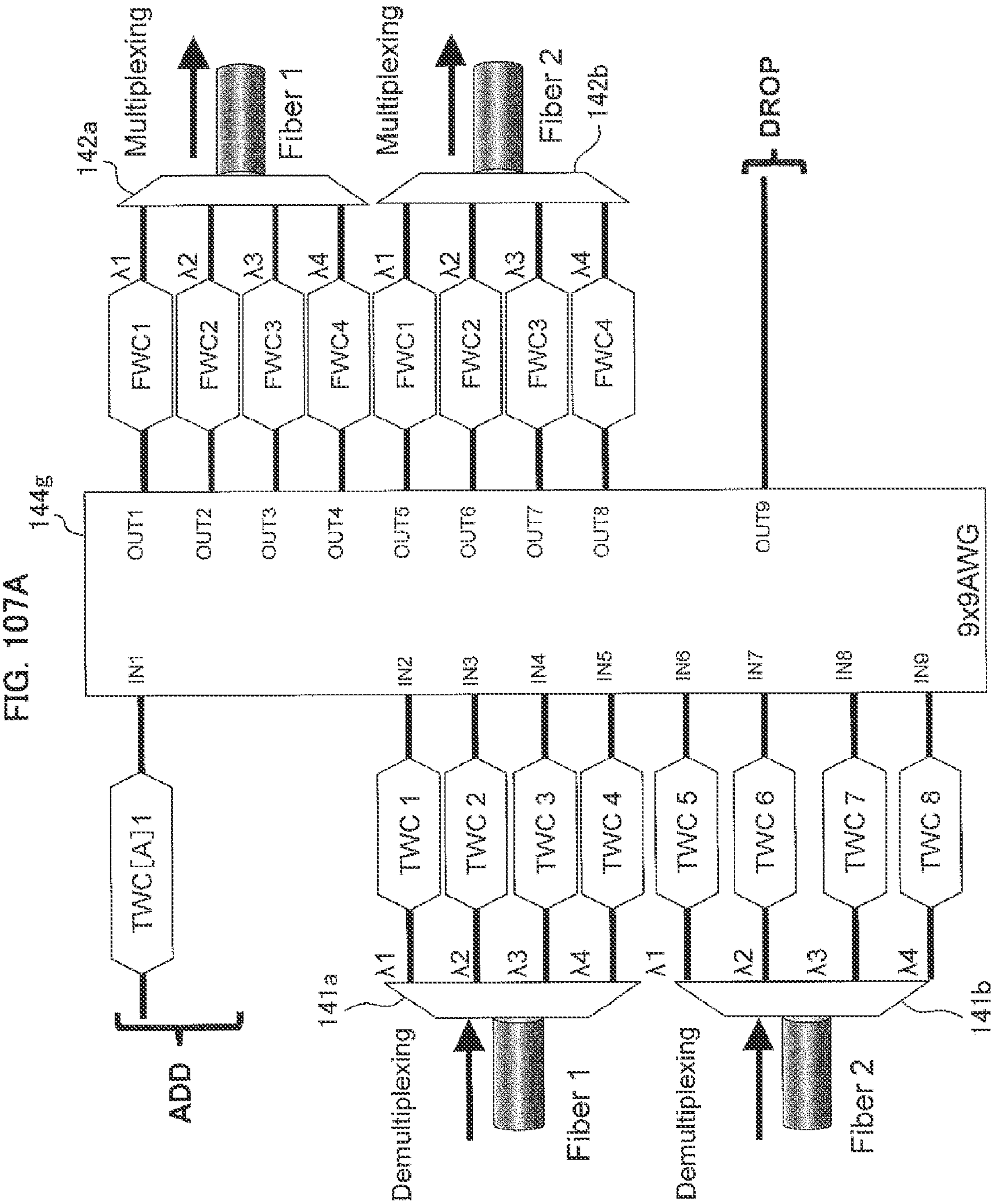

FIG. 107A is a block diagram illustrating a configuration example of the optical TS-SW unit in a case of a double ring and ADD/DROP 1 channel, and inter-fiber and in-fiber wavelength exchangeability, using the FWC.

FIG. 107B is a diagram illustrating TWC wavelength requirements of the optical TS-SW unit.

Figure 108:
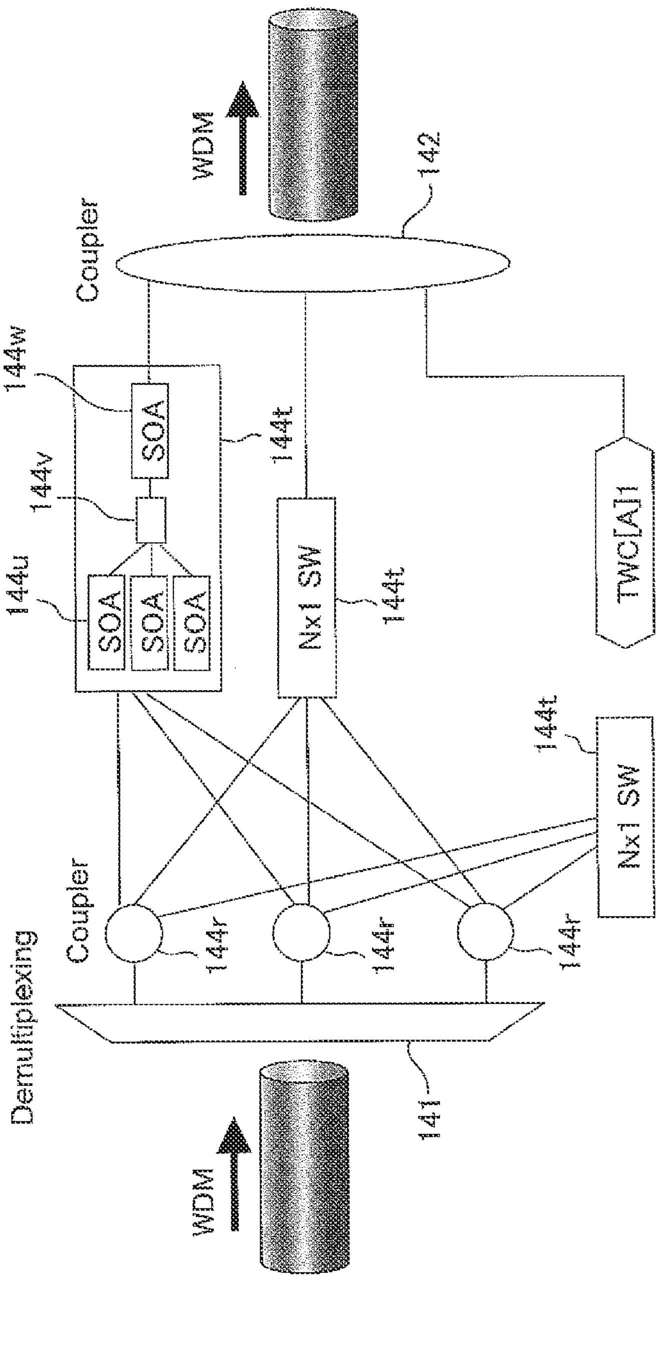

FIG. 108 is a diagram illustrating a basic configuration of the optical TS-SW unit of broadcast and select type.

Figure 109:
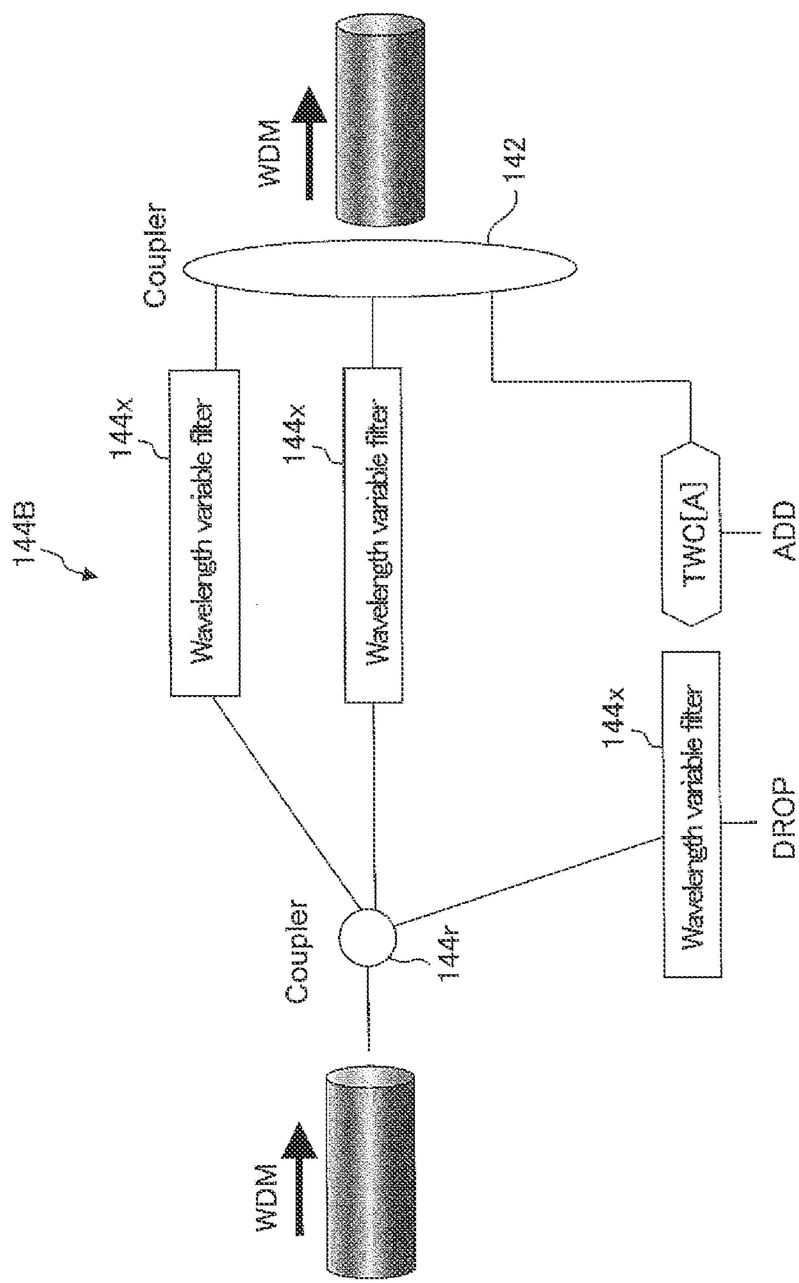

FIG. 109 is a diagram illustrating an example of another configuration of the optical TS-SW unit of broadcast and select type.

Figure 110:
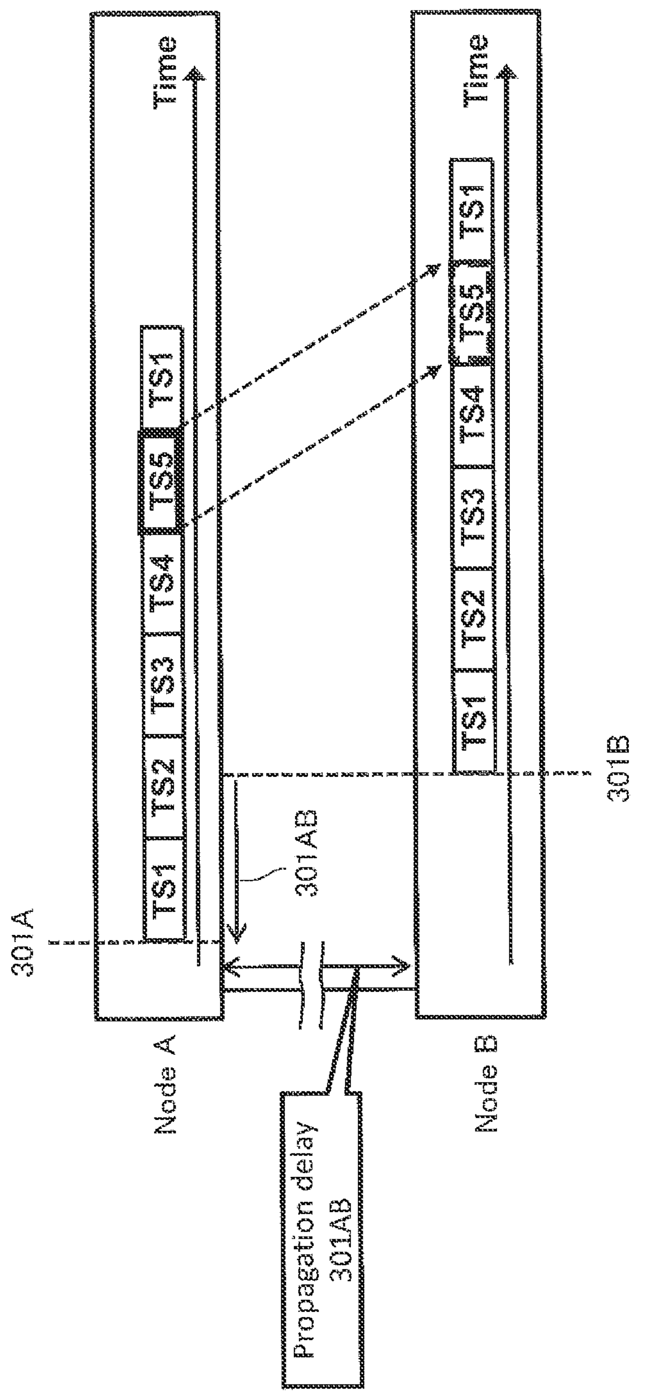

FIG. 110 is a diagram for explaining a definition of time slot synchronization.

Figure 111:
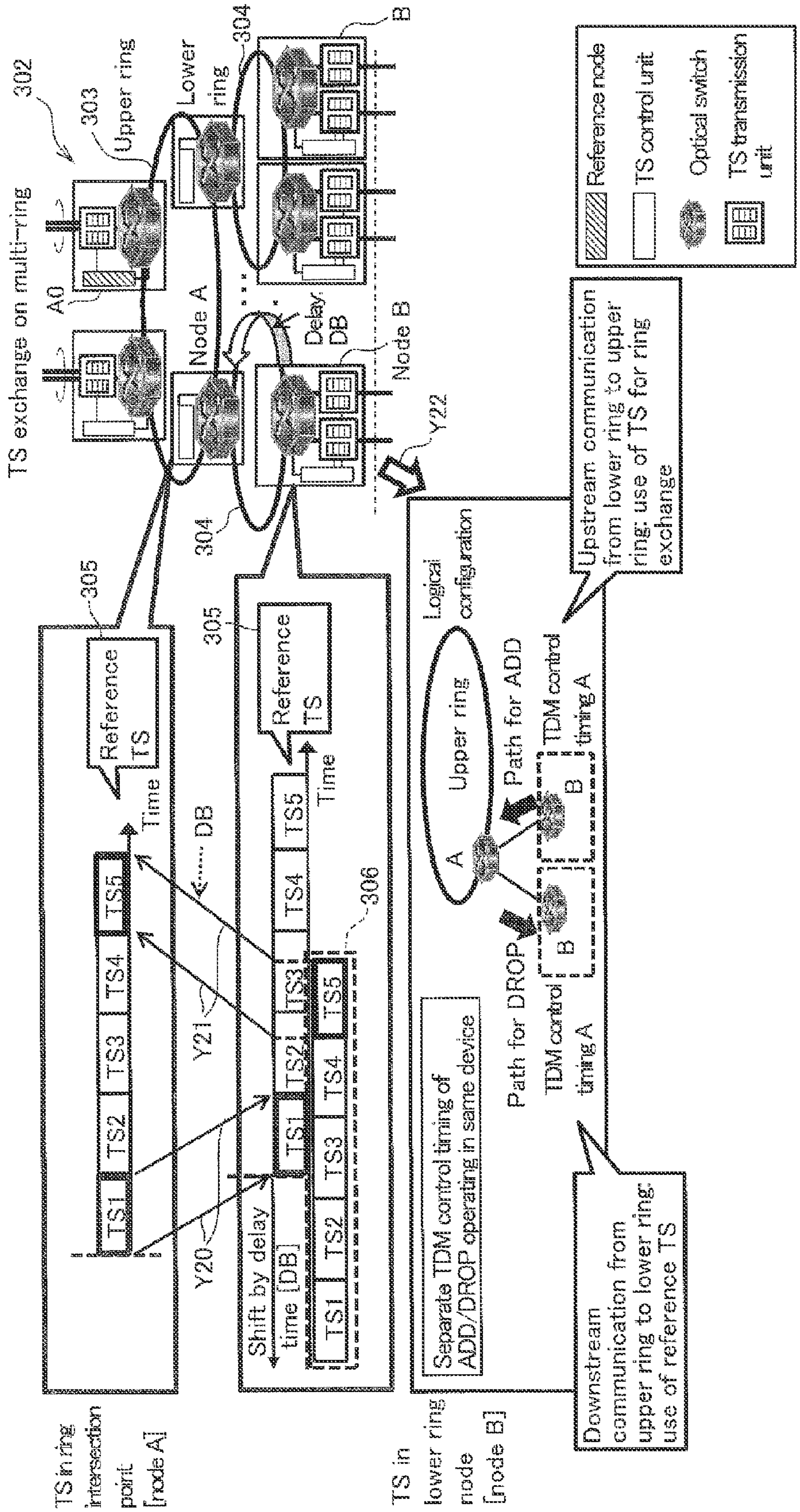

FIG. 111 is a diagram for explaining a basic idea of the present invention.

Figure 112:
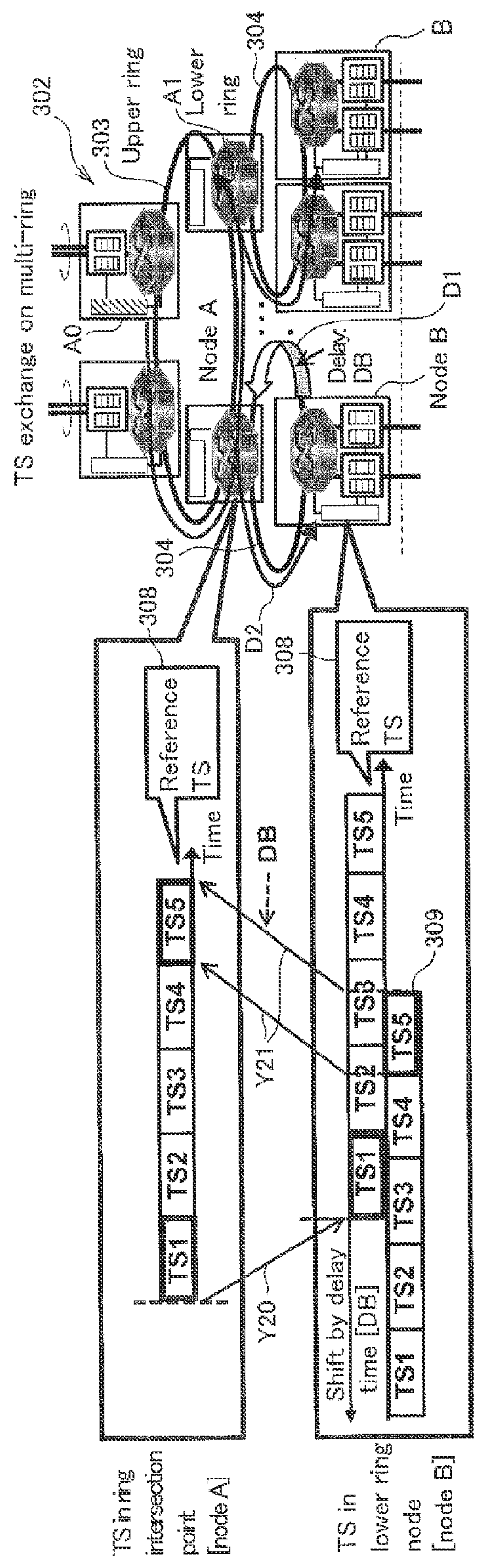

FIG. 112 is a diagram for explaining how to synchronize a time slot and a ring intersection point node on a lower ring.

Figure 113:
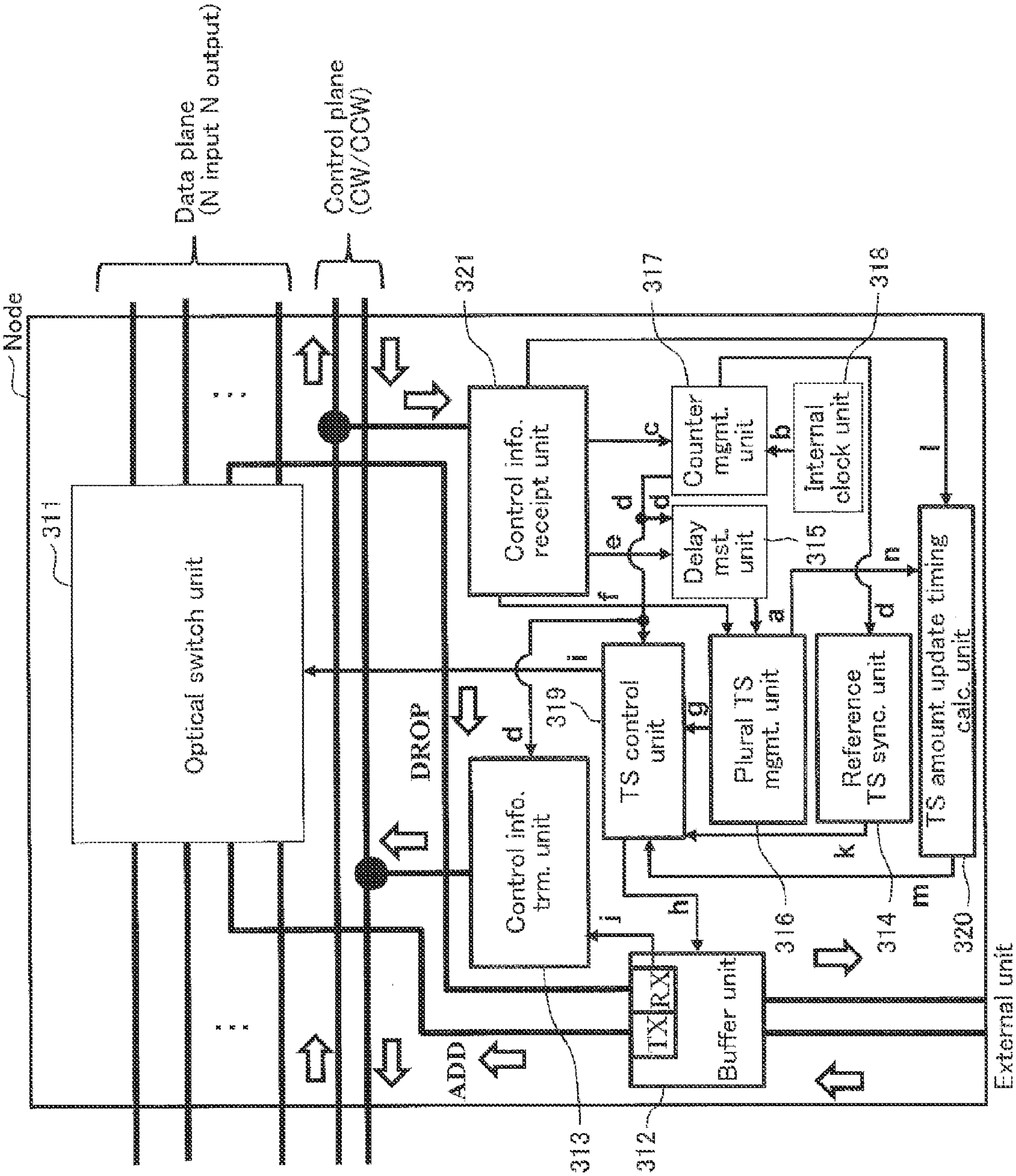

FIG. 113 is a diagram for explaining a functional block of each node.

Figure 114:
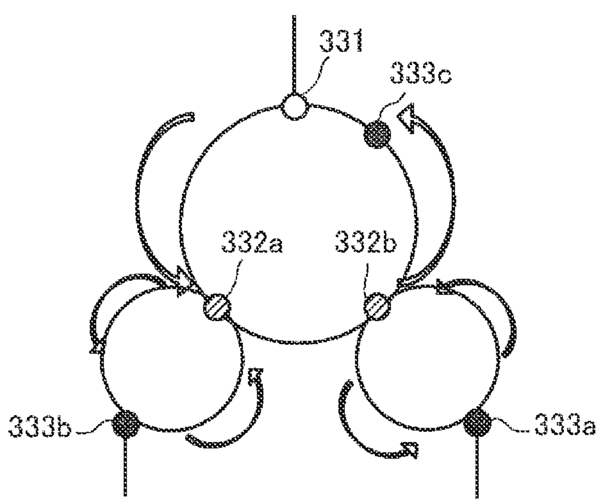

FIG. 114 is a diagram for explaining definitions of an M-C, a Sub M-C, and an S-C.

Figure 115A:
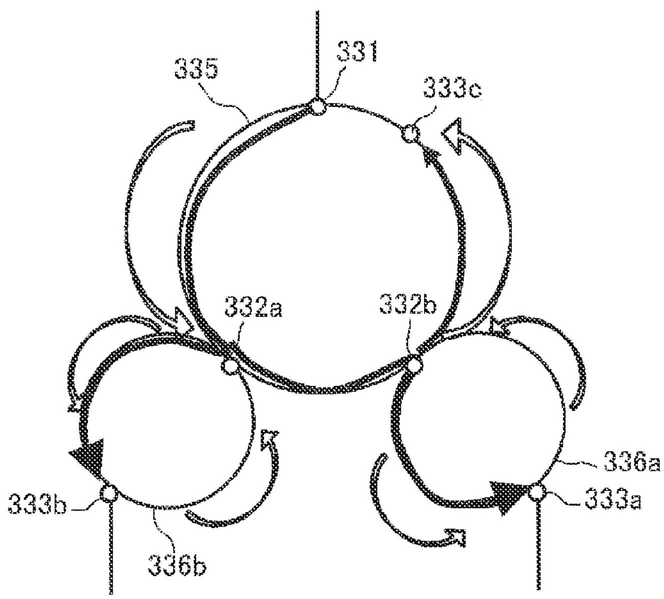

FIG. 115A is a system diagram for explaining how to set a time slot start timing from a source node.

Figure 115B:
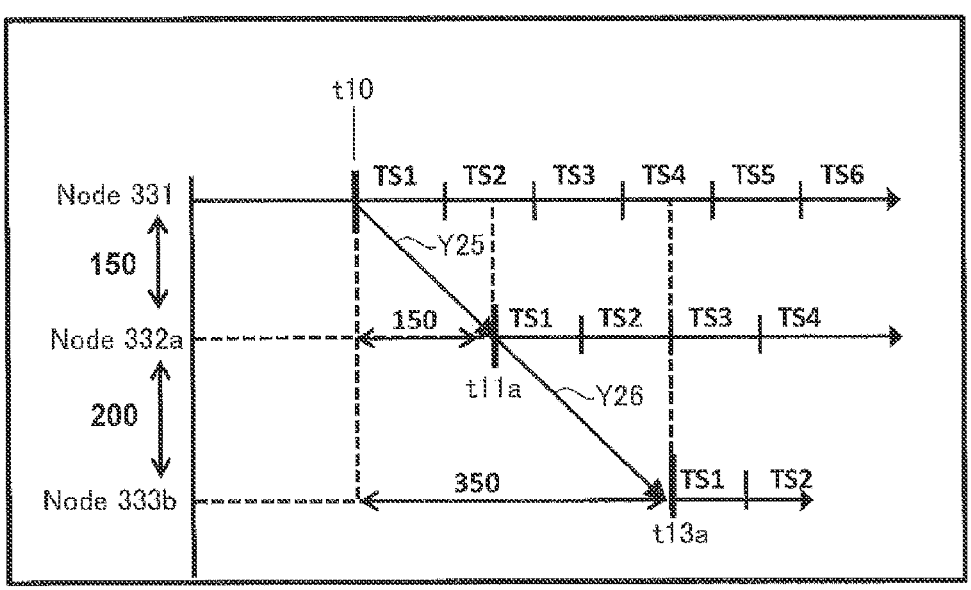

FIG. 115B is a time-series diagram for explaining how to set the time slot start timing from the source node.

Figure 116:
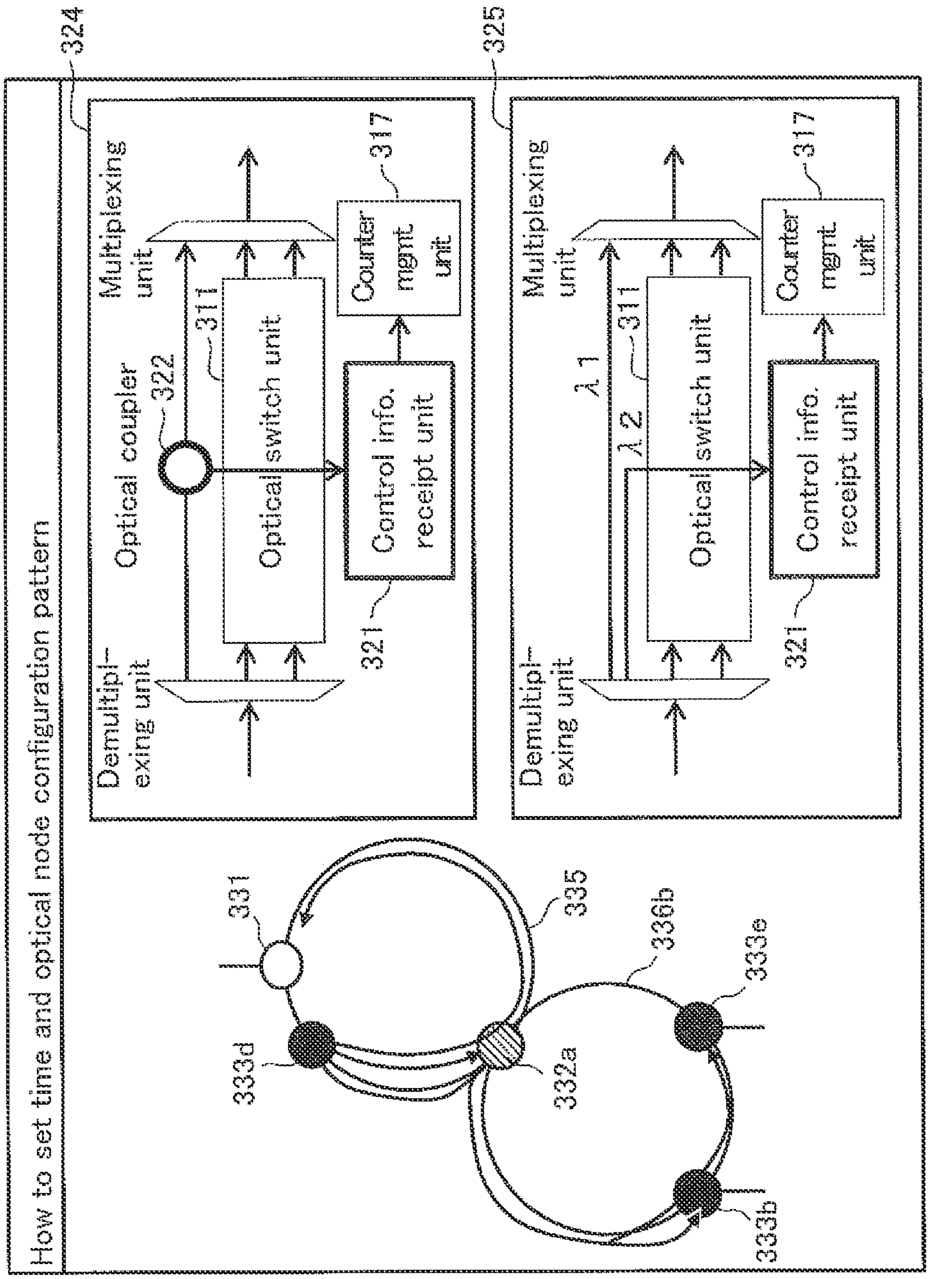

FIG. 116 is a system diagram for explaining how to set a time at each of nodes.

Figure 117A:
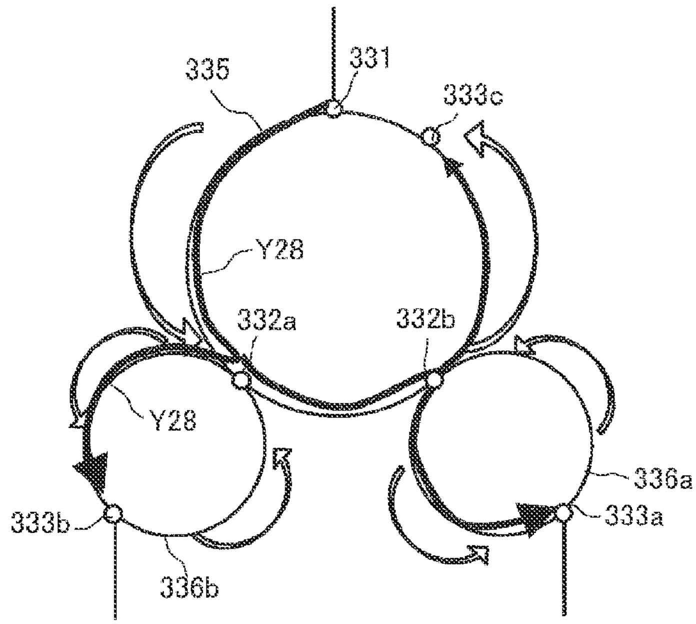

FIG. 117A is a system diagram for explaining an advantageous effect of the setting of a time slot start timing.

Figure 117B:
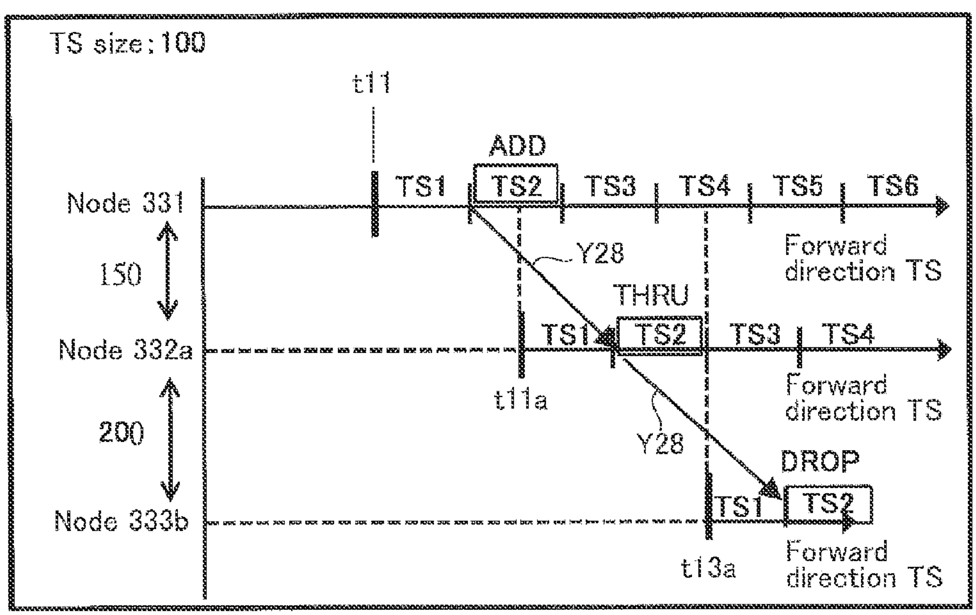

FIG. 117B is a time-series diagram for explaining the advantageous effect of the setting of the time slot start timing.

Figure 118:
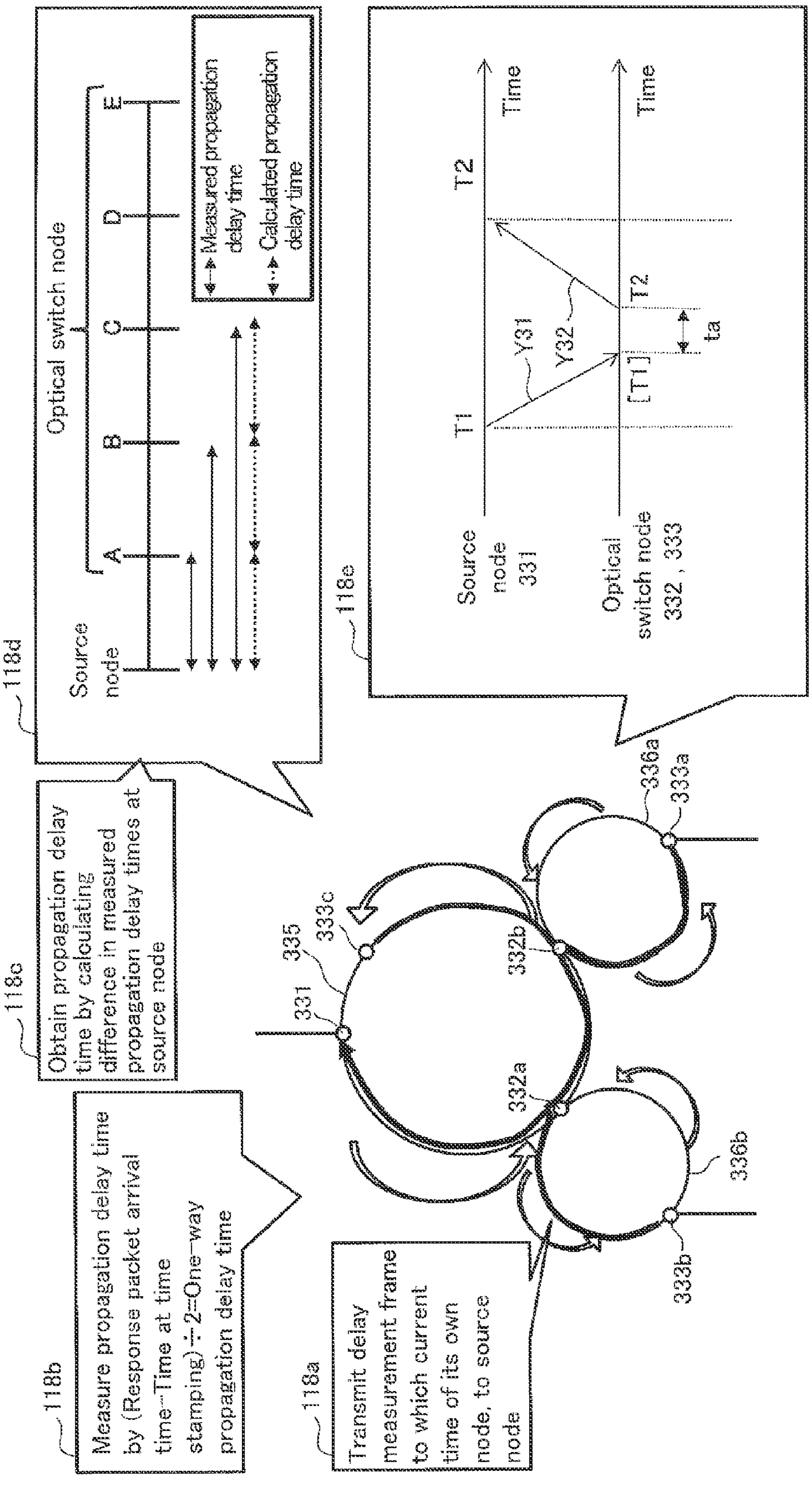

FIG. 118 is a diagram for explaining how to measure a propagation delay time between adjacent nodes.

Figure 119A:
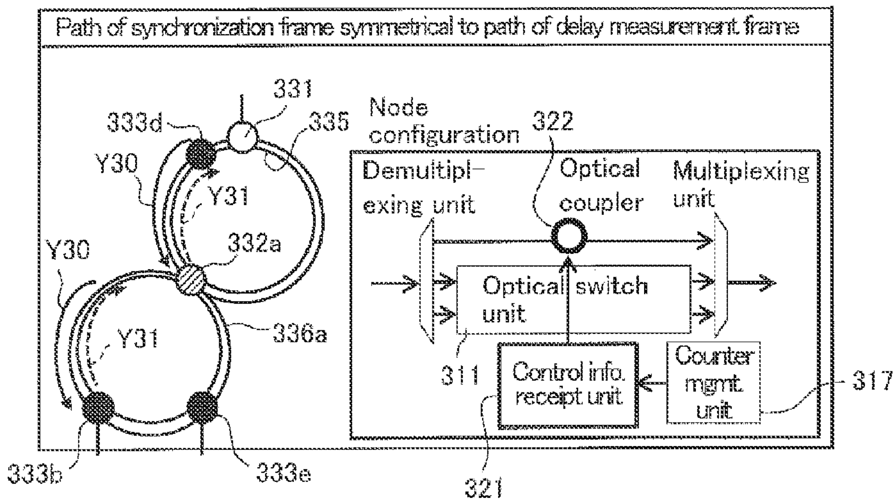

FIG. 119A is a diagram for explaining how to measure a propagation delay time.

Figure 119B:
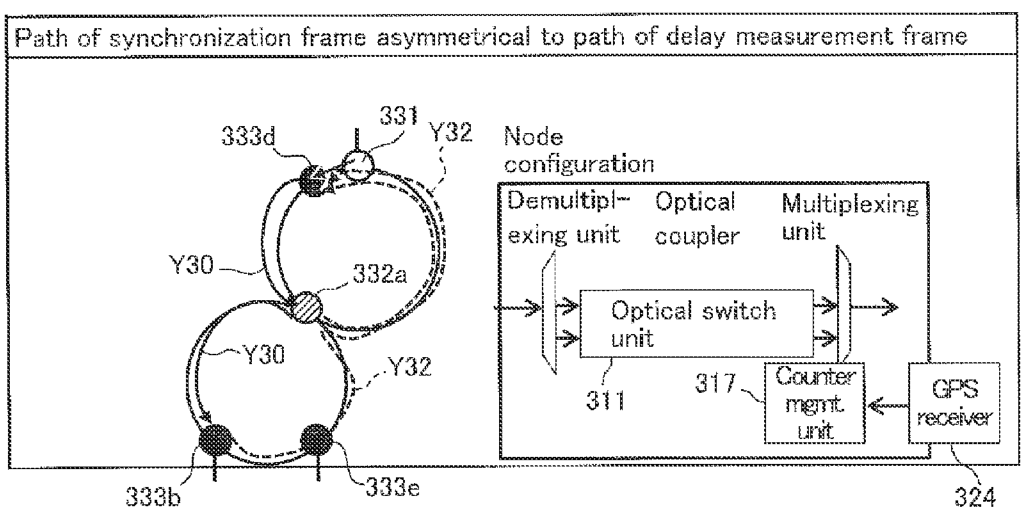

FIG. 119B is another diagram for explaining how to measure the propagation delay time.

Figure 120:
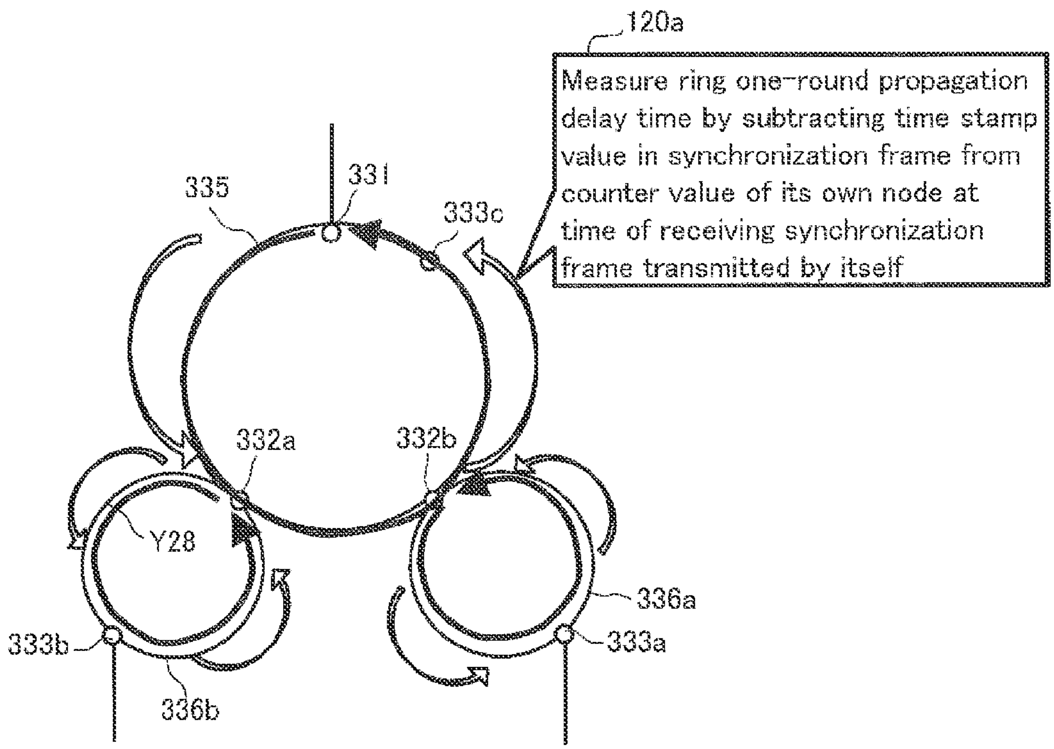

FIG. 120 is a diagram for explaining how to measure a propagation delay time for one round on a ring.

Figure 121:
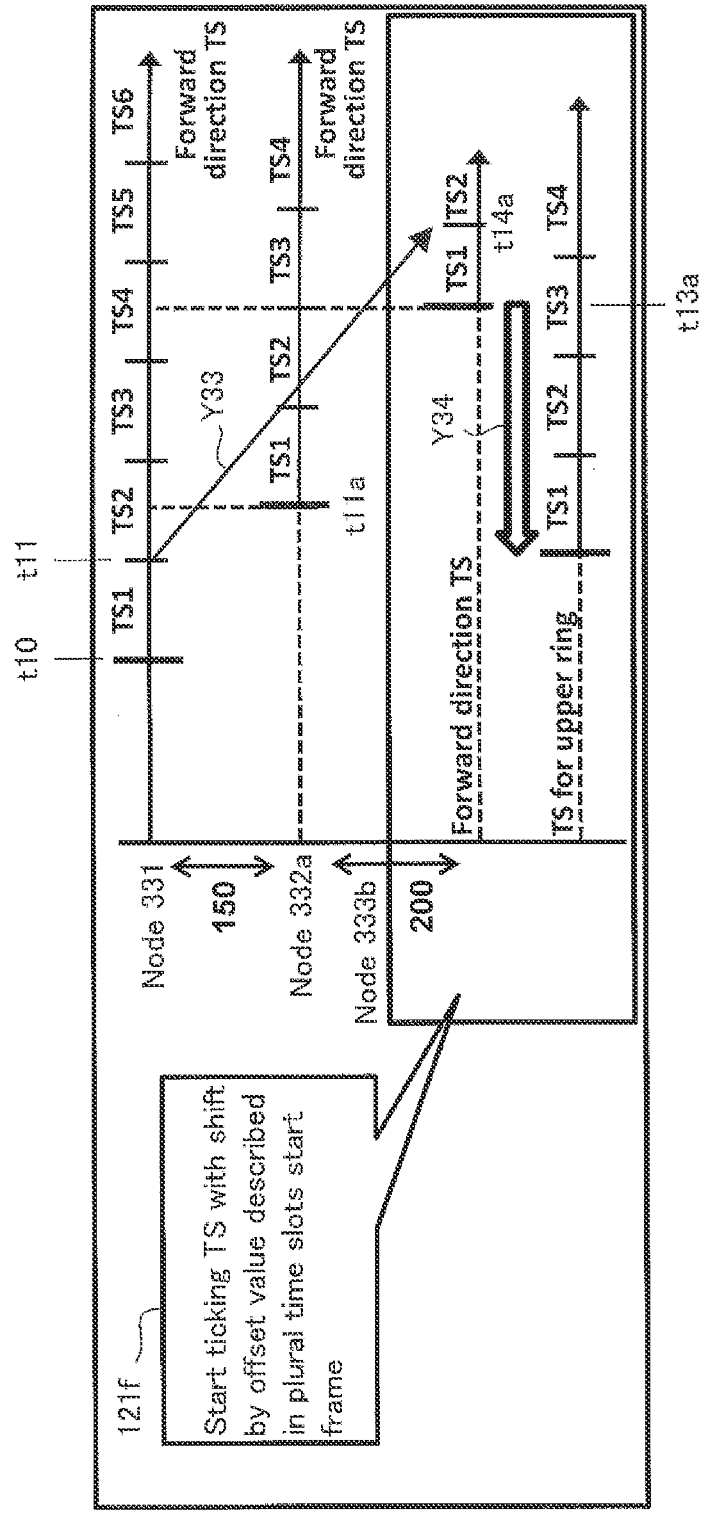

FIG. 121 is a diagram for explaining a timing separation between an ADD onto an upper ring and a DROP onto a lower ring, taking a propagation delay into account.

Figure 122A:
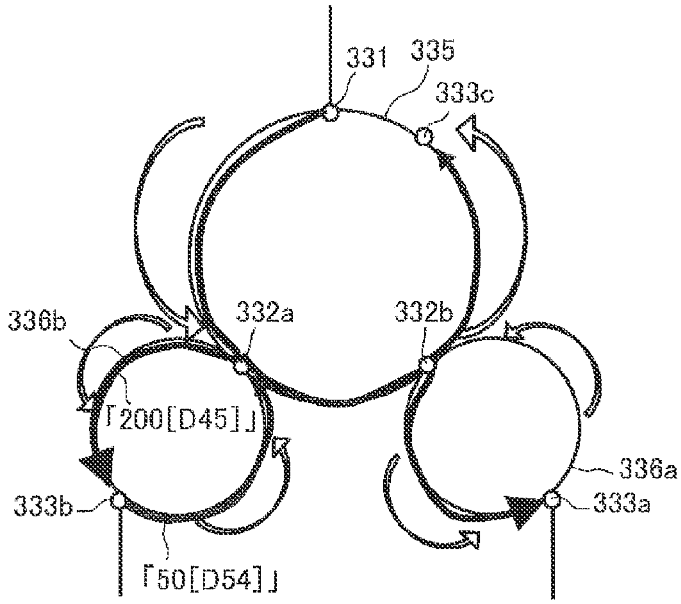

FIG. 122A is a system diagram for explaining a time slot from a lower ring to an upper ring.

Figure 122B:
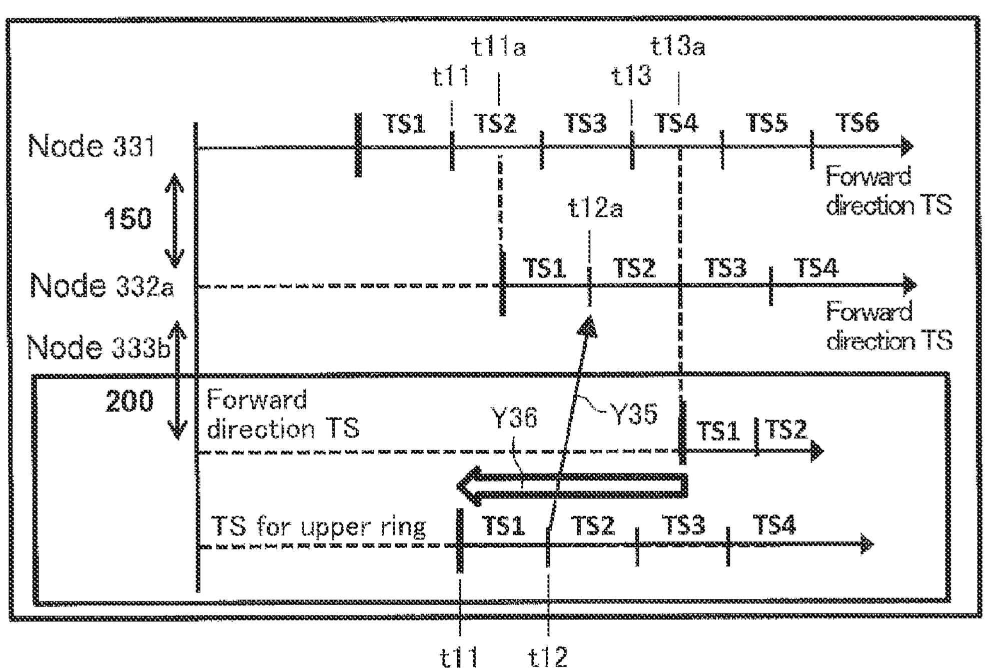

FIG. 122B is a time-series diagram for explaining the time slot from the lower ring to the upper ring.

Figure 123A:
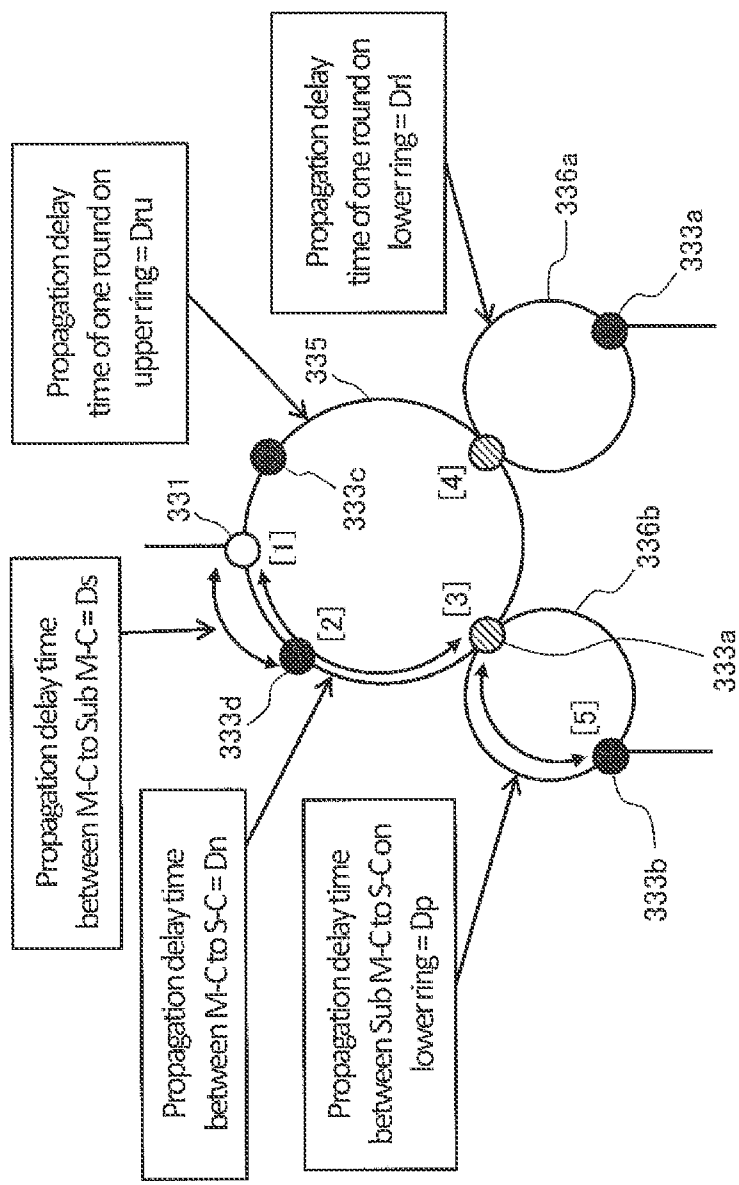

FIG. 123A is a system diagram for explaining various types of time slots required when a bidirectional communication is performed on a multi-ring.

FIG. 123B is a diagram for explaining the various types of the time slots required when the bidirectional communication is performed on the multi-ring.

Figure 124A:
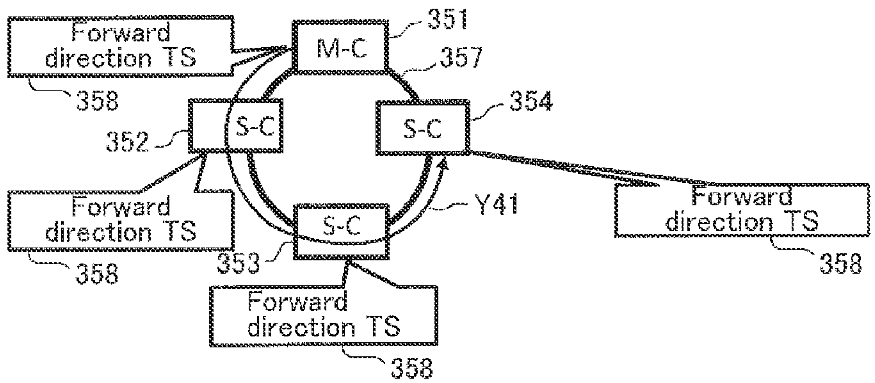

FIG. 124A is a diagram for explaining a time slot used in a single ring network (in a forward direction).

Figure 124B:
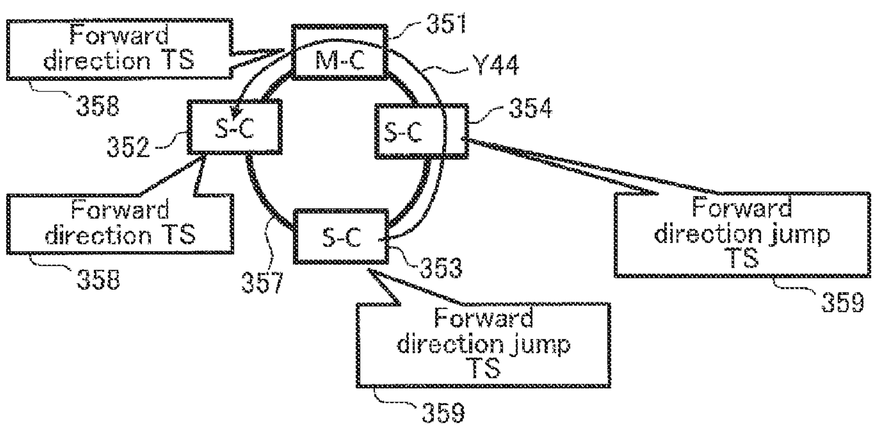

FIG. 124B is a diagram for explaining another time slot used in the single ring network (in the forward direction).

Figure 124C:
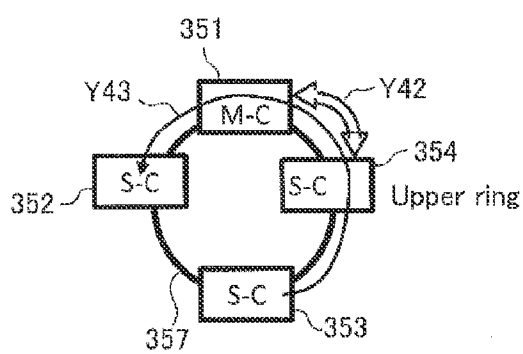

FIG. 124C is a still another diagram for explaining a time slot used in a single ring network (in the forward direction).

Figure 125A:
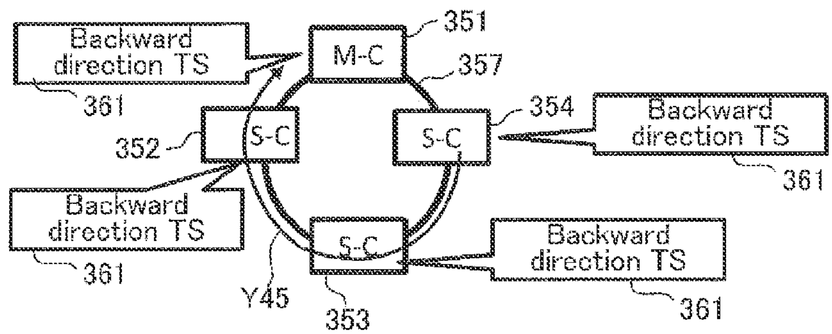

FIG. 125A is a diagram for explaining a time slot used in a single ring network (in a backward direction).

Figure 125B:
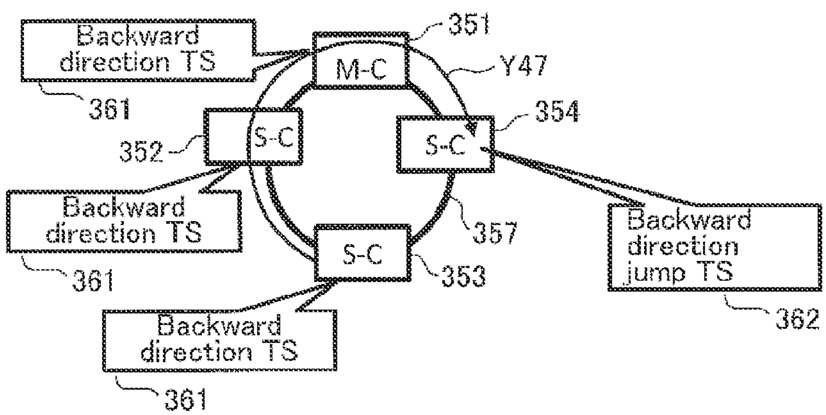

FIG. 125B is a diagram for explaining another time slot used in the single ring network (in the backward direction).

Figure 125C:
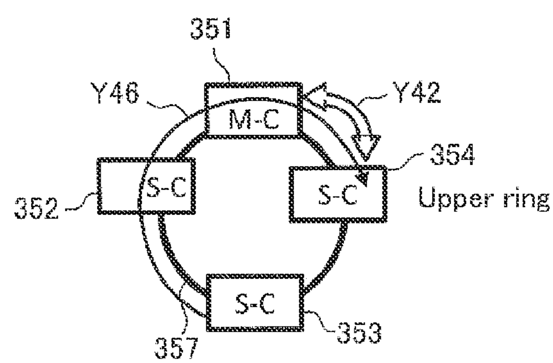

FIG. 125C is a diagram for explaining a still another time slot used in the single ring network (in the backward direction).

Figure 126A:
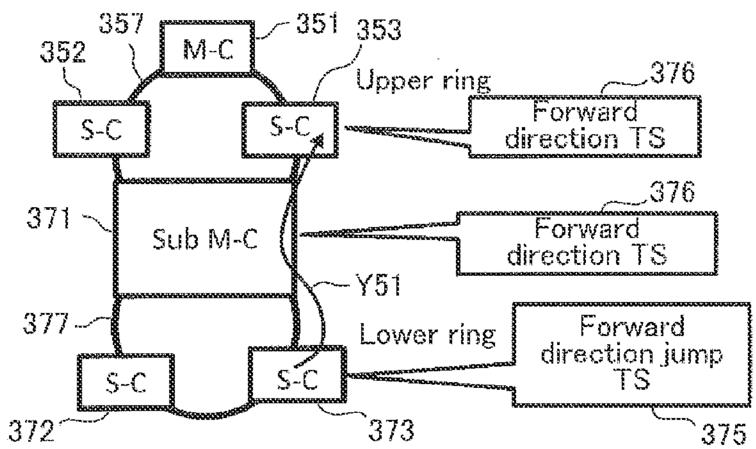

FIG. 126A is a diagram for explaining another example of a time slot used in a multi-ring network (in a forward direction).

Figure 126B:
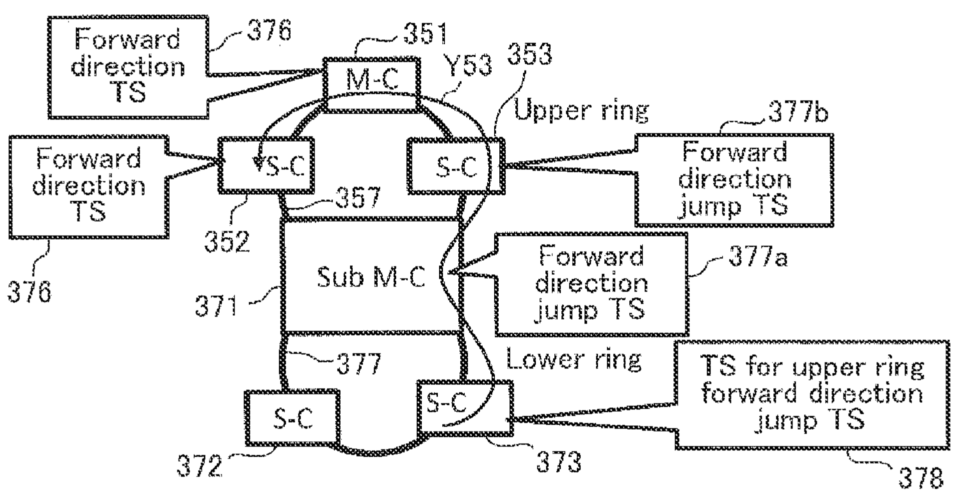

FIG. 126B is a diagram for explaining a still another example of the time slot used in the multi-ring network (in the forward direction).

Figure 126C:
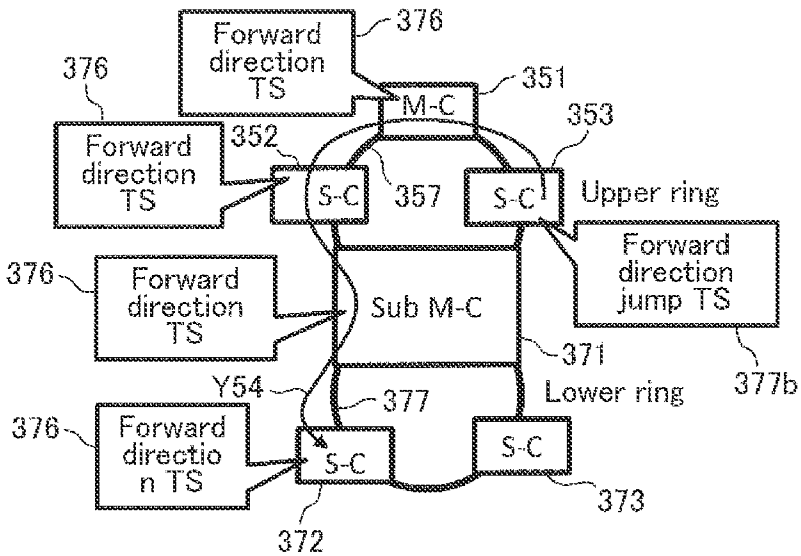

FIG. 126C is a diagram for explaining a yet another example of the time slot used in the multi-ring network (in the forward direction).

Figure 126D:
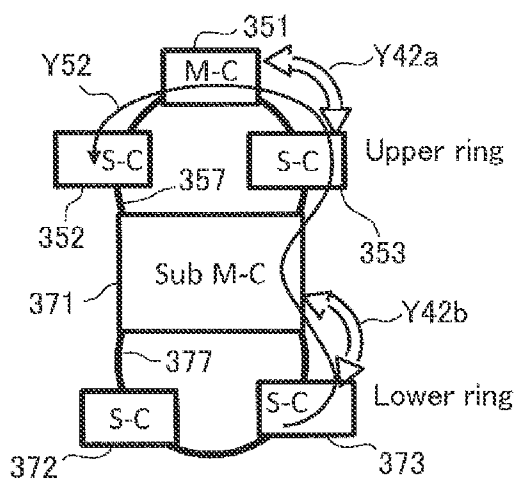

FIG. 126D is a diagram for explaining a further example of the time slot used in the multi-ring network (in the forward direction).

Figure 127A:
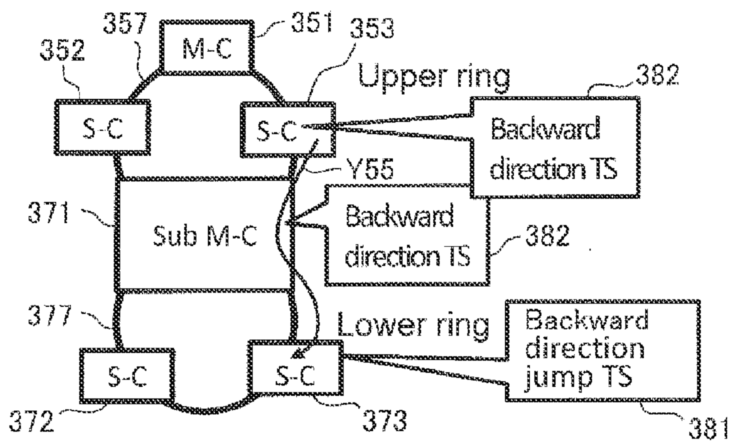

FIG. 127A is a diagram for explaining an example of a time slot used in a multi-ring network (in the backward direction).

Figure 127B:
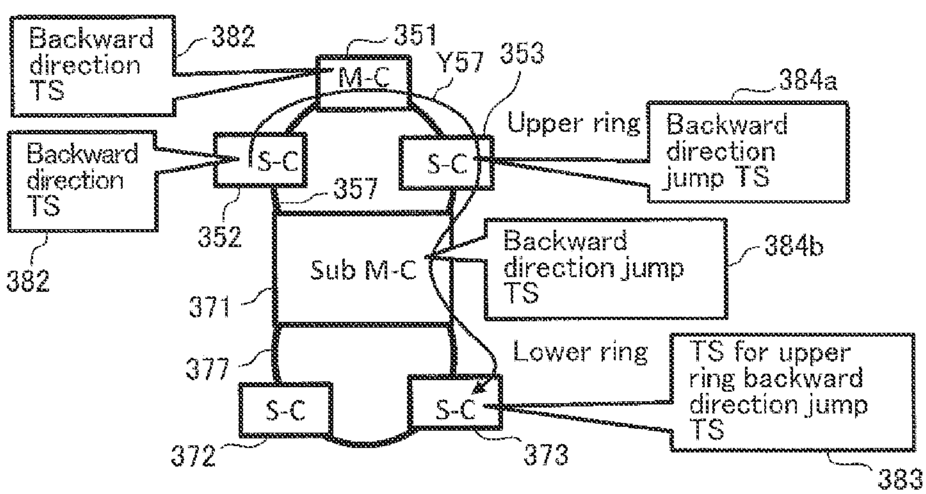

FIG. 127B is a diagram for explaining another example of the time slot used in the multi-ring network (in the backward direction).

Figure 127C:
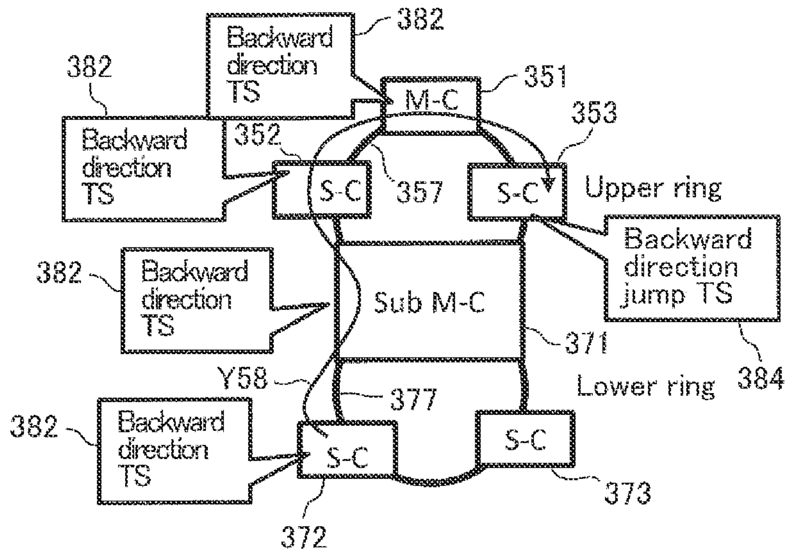

FIG. 127C is a diagram for explaining a still another example of the time slot used in the multi-ring network (in the backward direction).

Figure 127D:
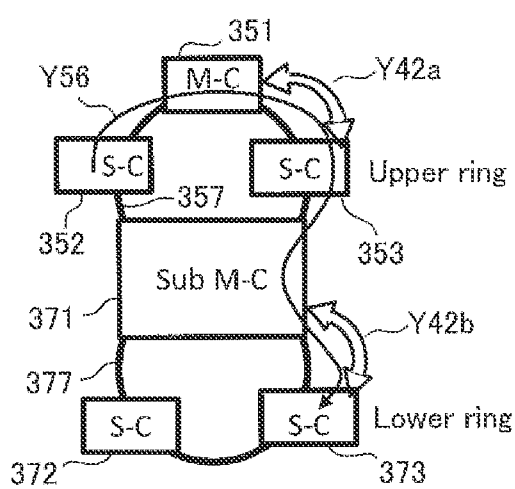

FIG. 127D is a diagram for explaining a yet another example of the time slot used in the multi-ring network (in the backward direction).

Figure 128:
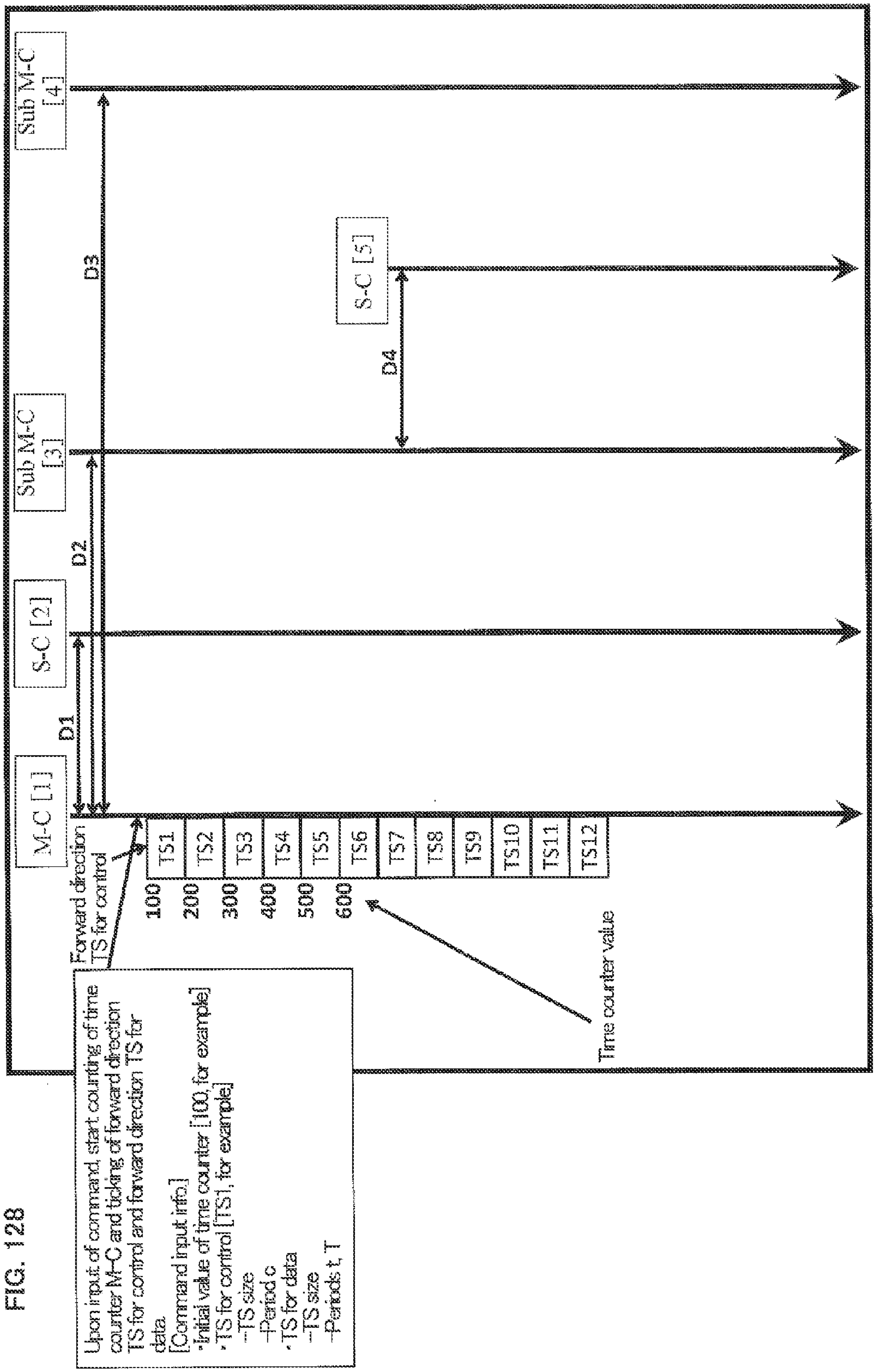

FIG. 128 is a diagram for explaining an operating sequence when an operation of delivering a time counter value at an M-C is started.

Figure 129:
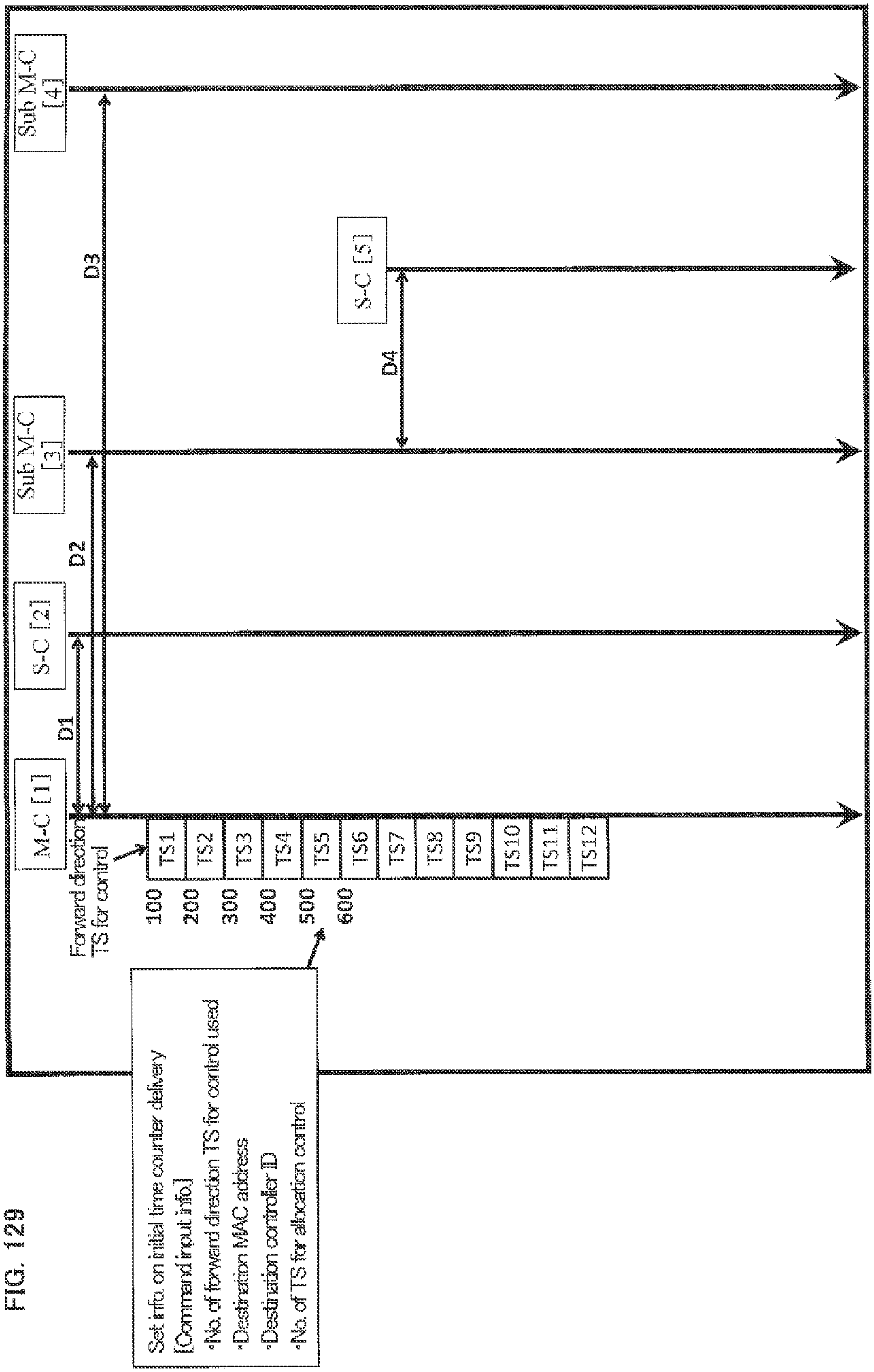

FIG. 129 is a diagram for explaining an operating sequence when information on delivery of the time counter value at the M-C is set.

Figure 130:
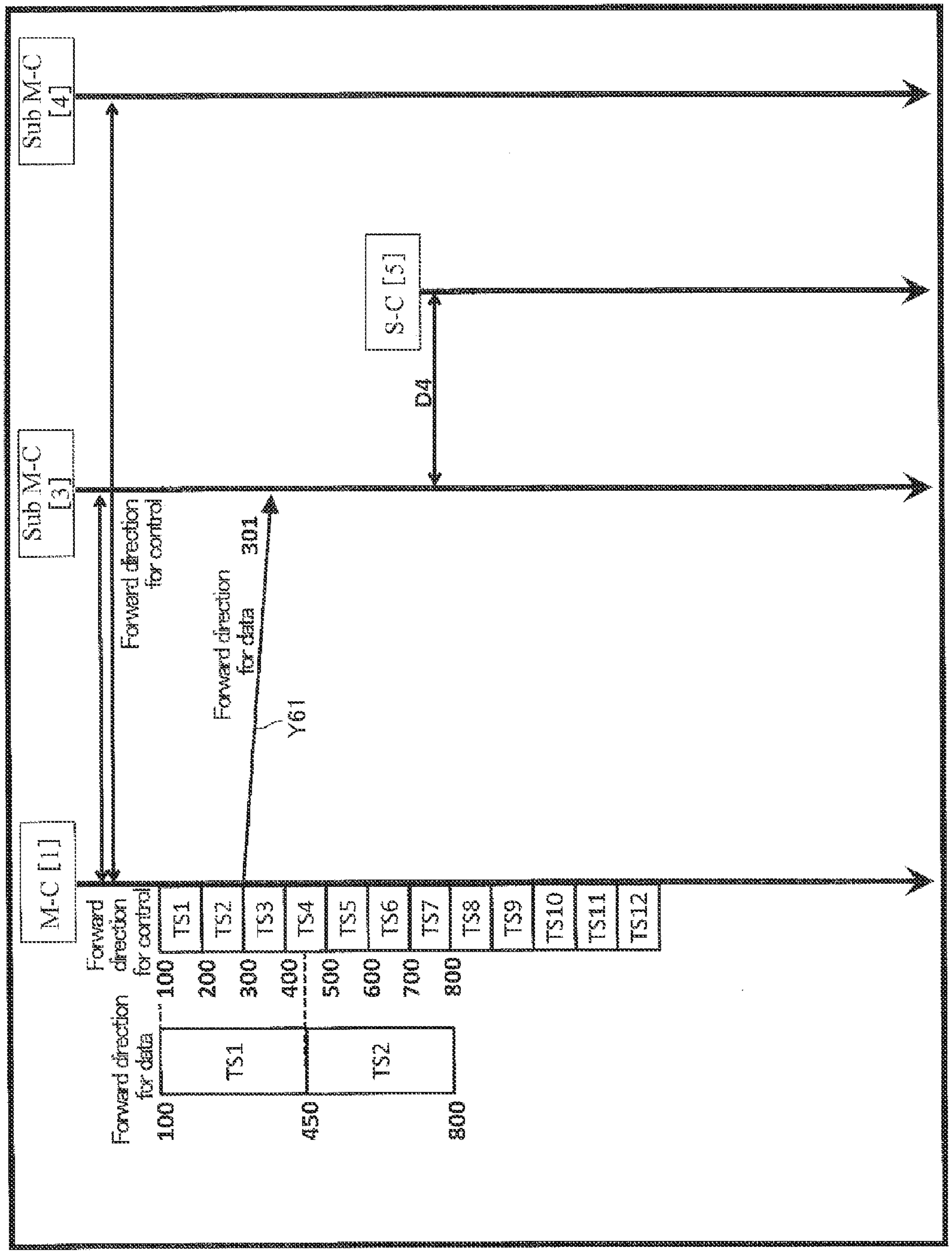

FIG. 130 is a diagram for explaining an operating sequence when an initial time counter value at the M-C is delivered to an upper ring.

Figure 131:
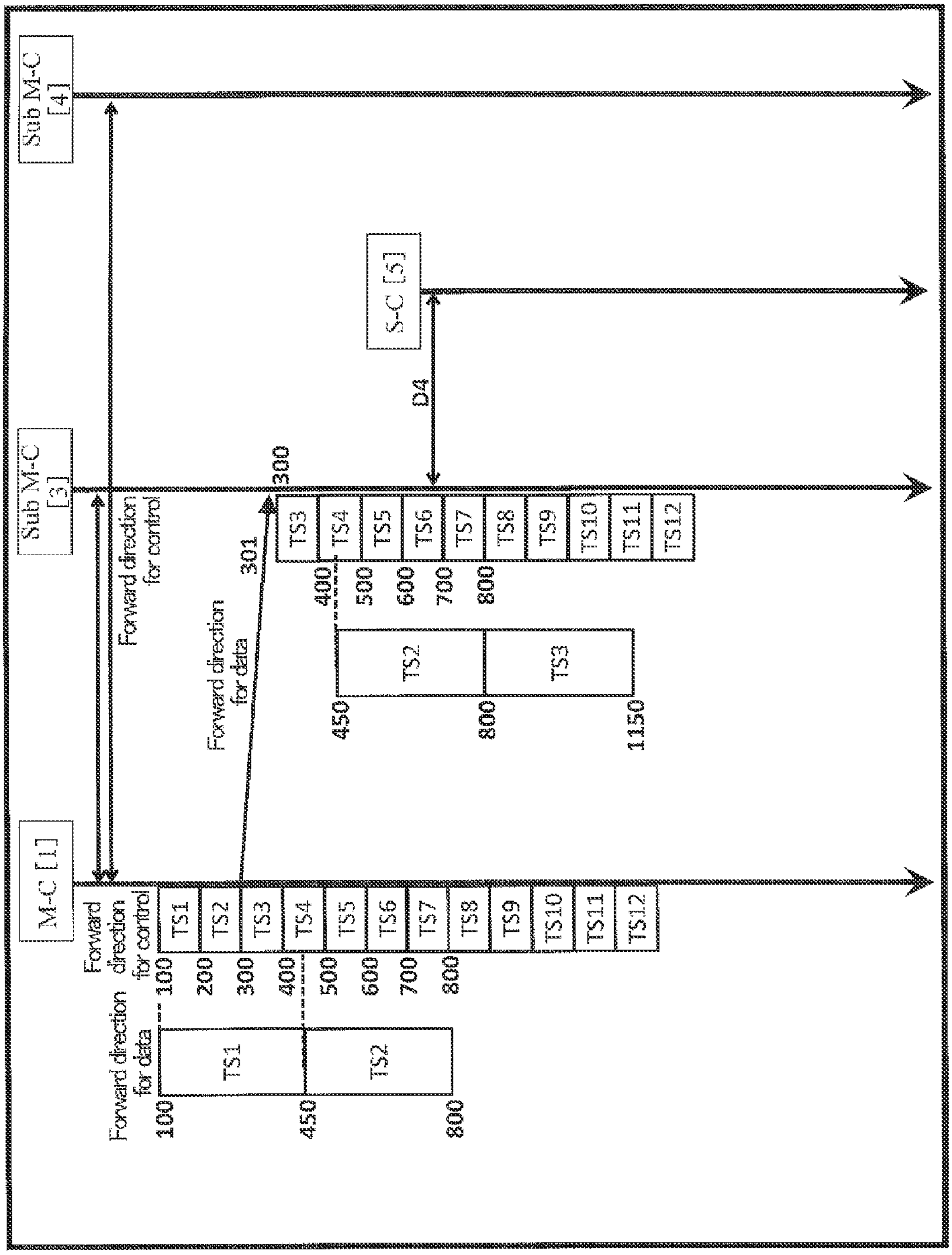

FIG. 131 is a diagram for explaining an operating sequence when the initial time counter value is received at a SubM-C on the upper ring.

Figure 132:
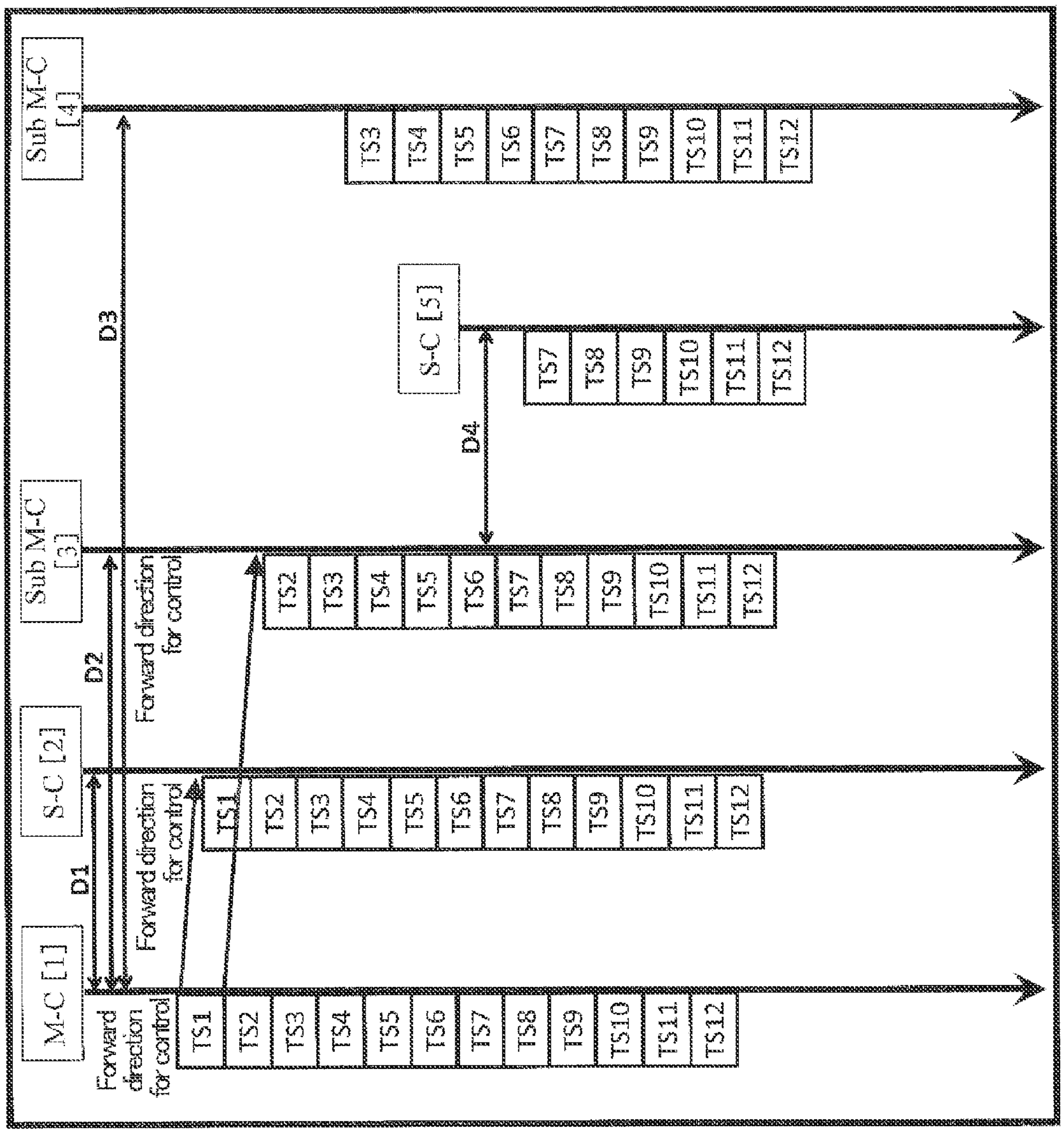

FIG. 132 is a diagram for explaining an operating sequence when information on delivery of the time counter value to a lower ring at the M-C is set.

Figure 133:
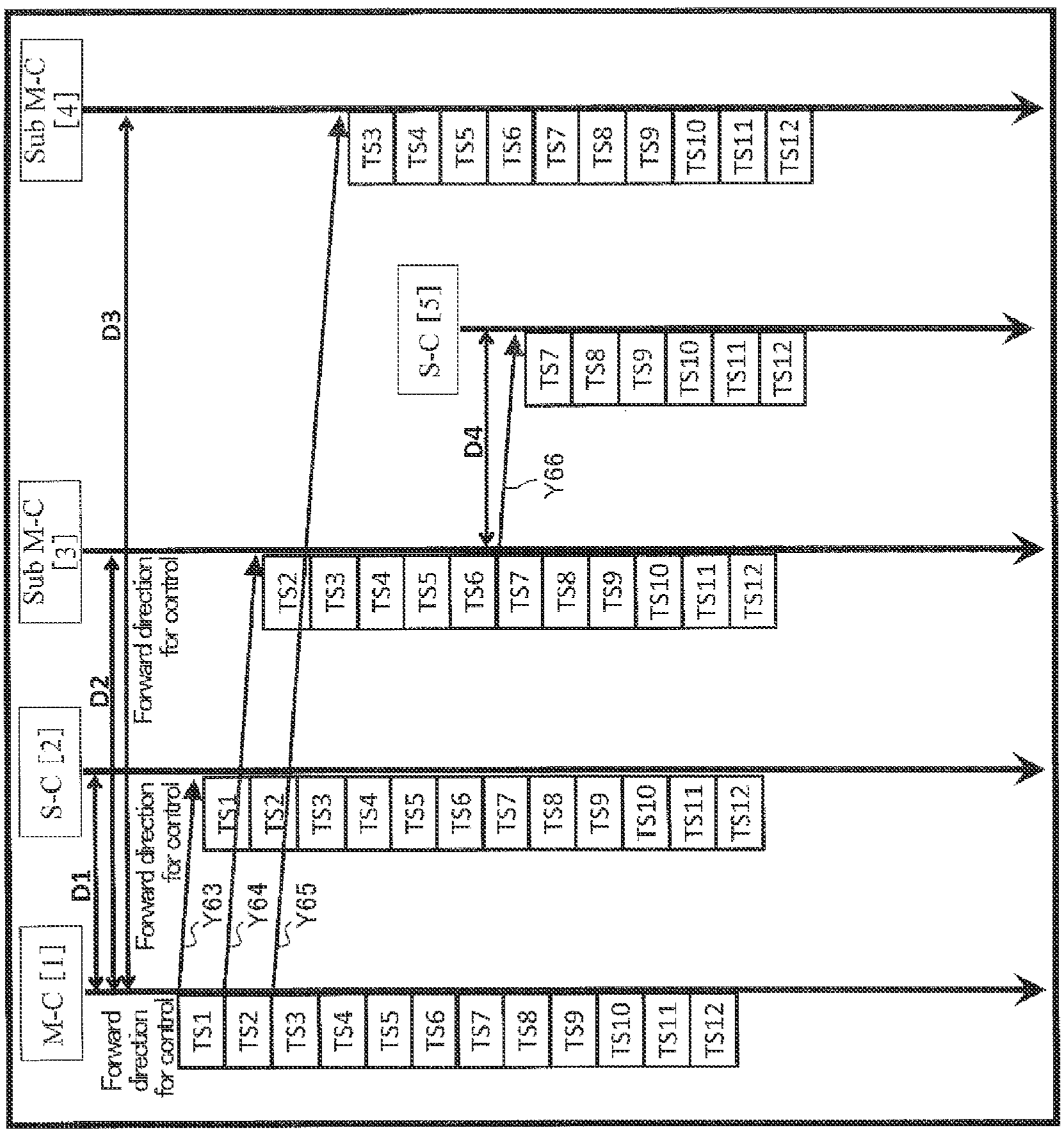

FIG. 133 is a diagram for explaining an operating sequence when an initial time counter value at the M-C is delivered to the lower ring.

Figure 134:
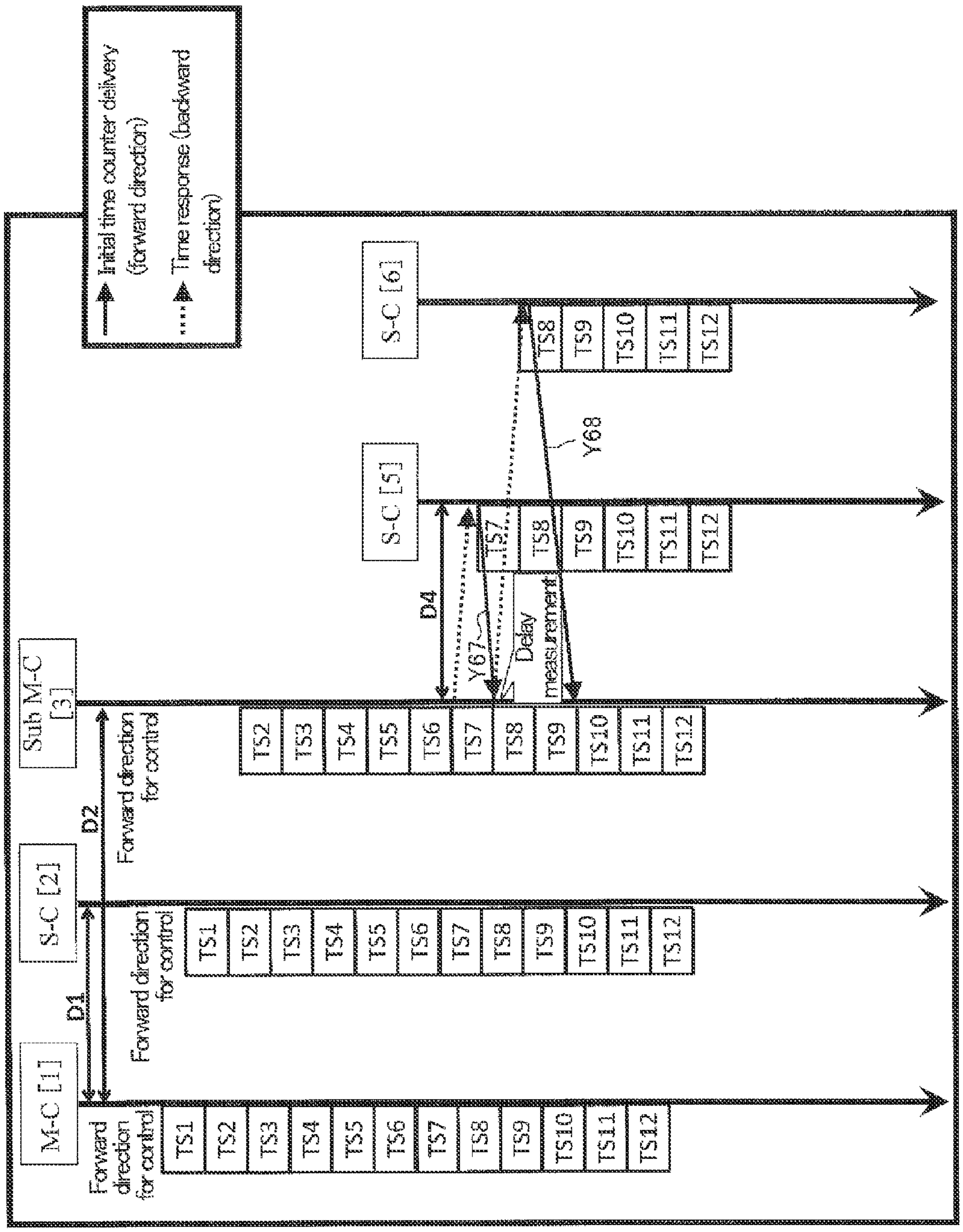

FIG. 134 is a diagram for explaining an operating sequence when a time is responded at the S-C on the lower ring.

Figure 135:
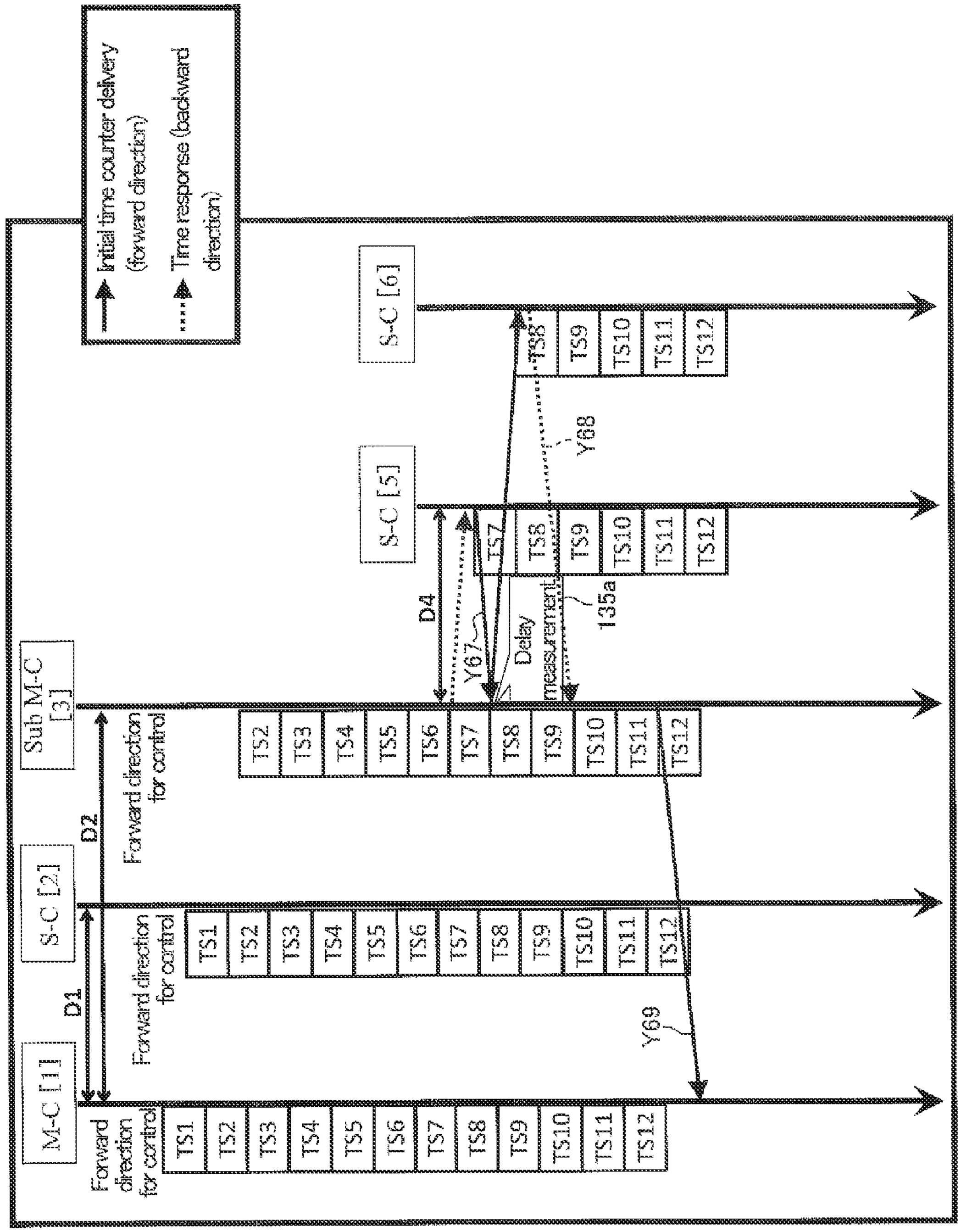

FIG. 135 is a diagram for explaining an operating sequence when a time response of the S-C is transferred at the Sub M-C.

Figure 136A:
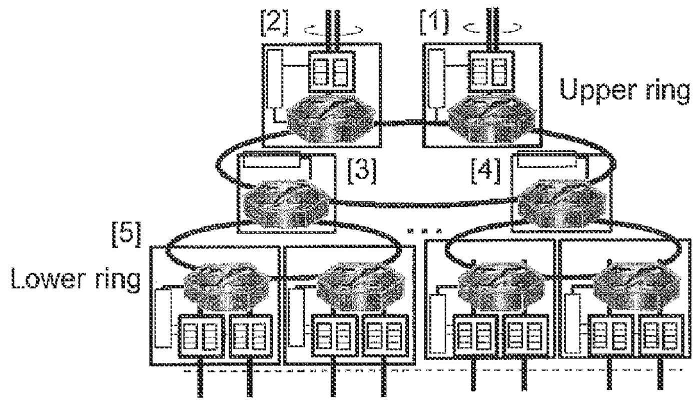

FIG. 136A is a system diagram for explaining an operating sequence when the time response of the S-C is transferred at the Sub M-C.

Figure 136B:
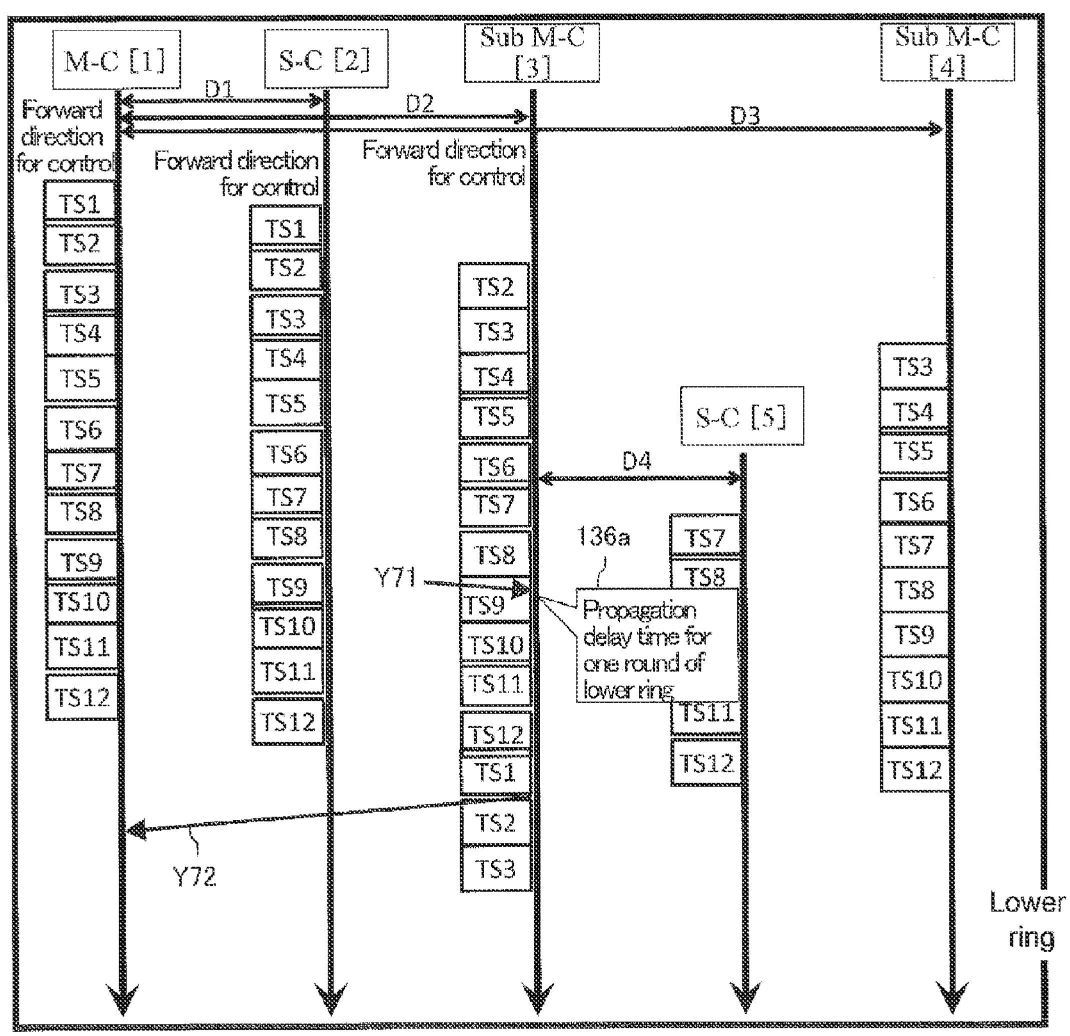

FIG. 136B is a diagram for explaining the operating sequence when the time response of the S-C is transferred at the Sub M-C.

Figure 137:
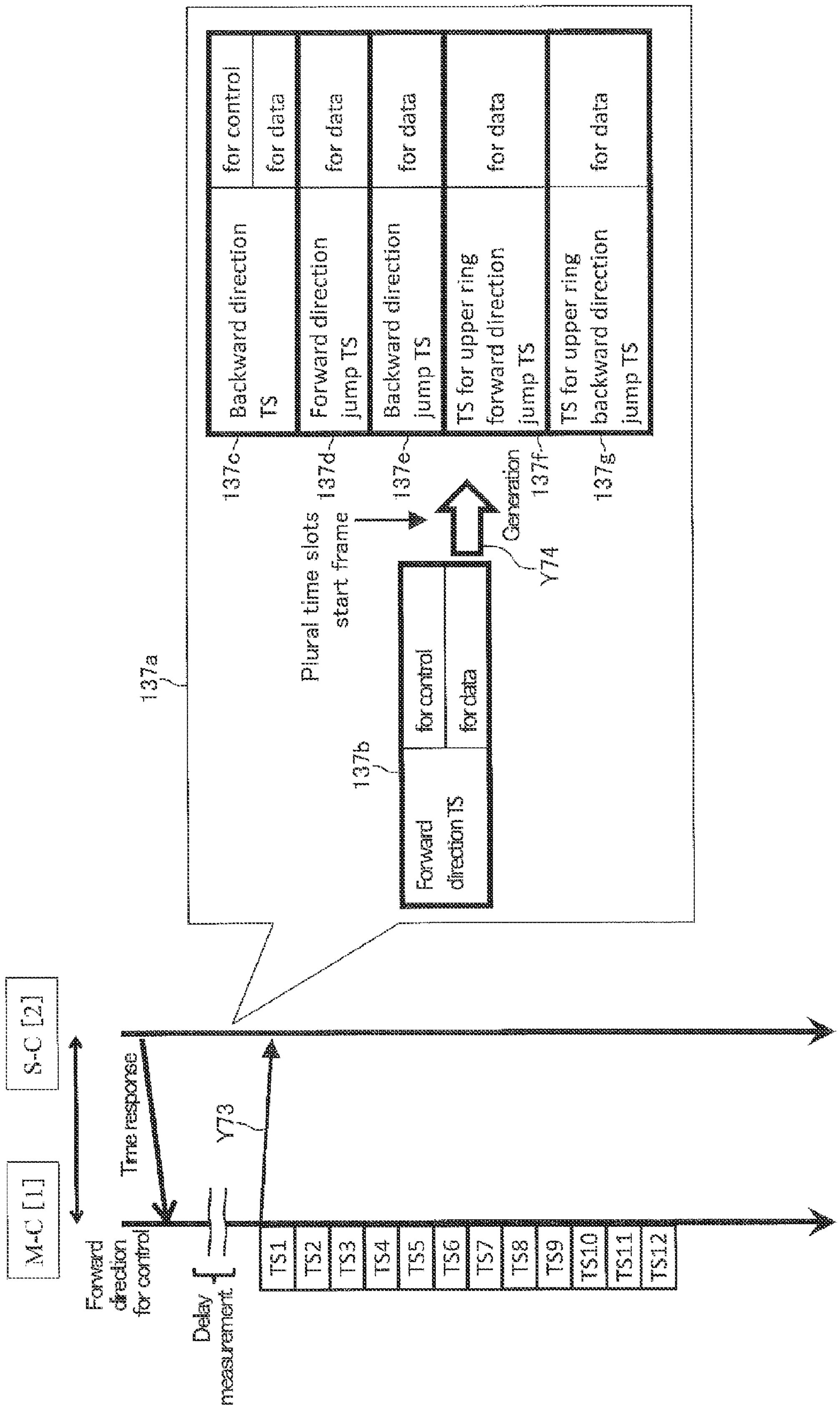

FIG. 137 is a diagram for explaining a timing of generating a time slot suited for a backward direction/M-C jump.

Figure 138:
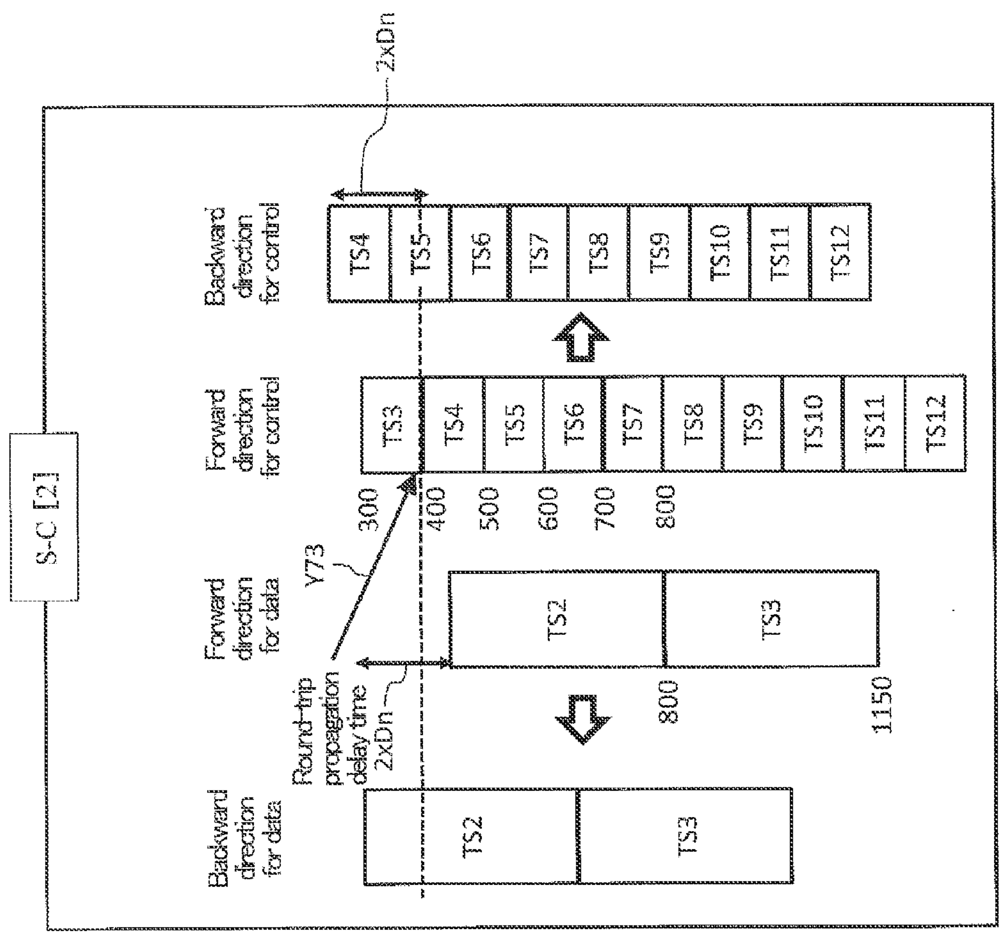

FIG. 138 is a diagram for explaining how to generate a backward direction time slot.

Figure 139:
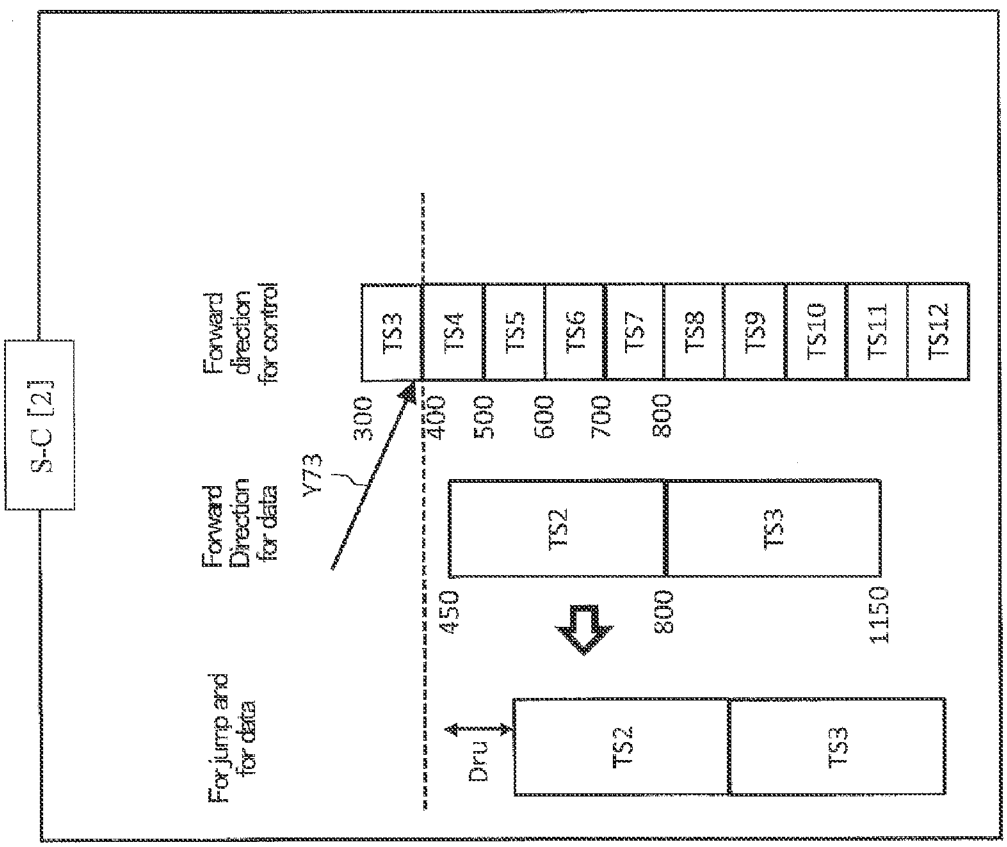

FIG. 139 is a diagram for explaining how to generate a forward direction jump time slot.

Figure 140:
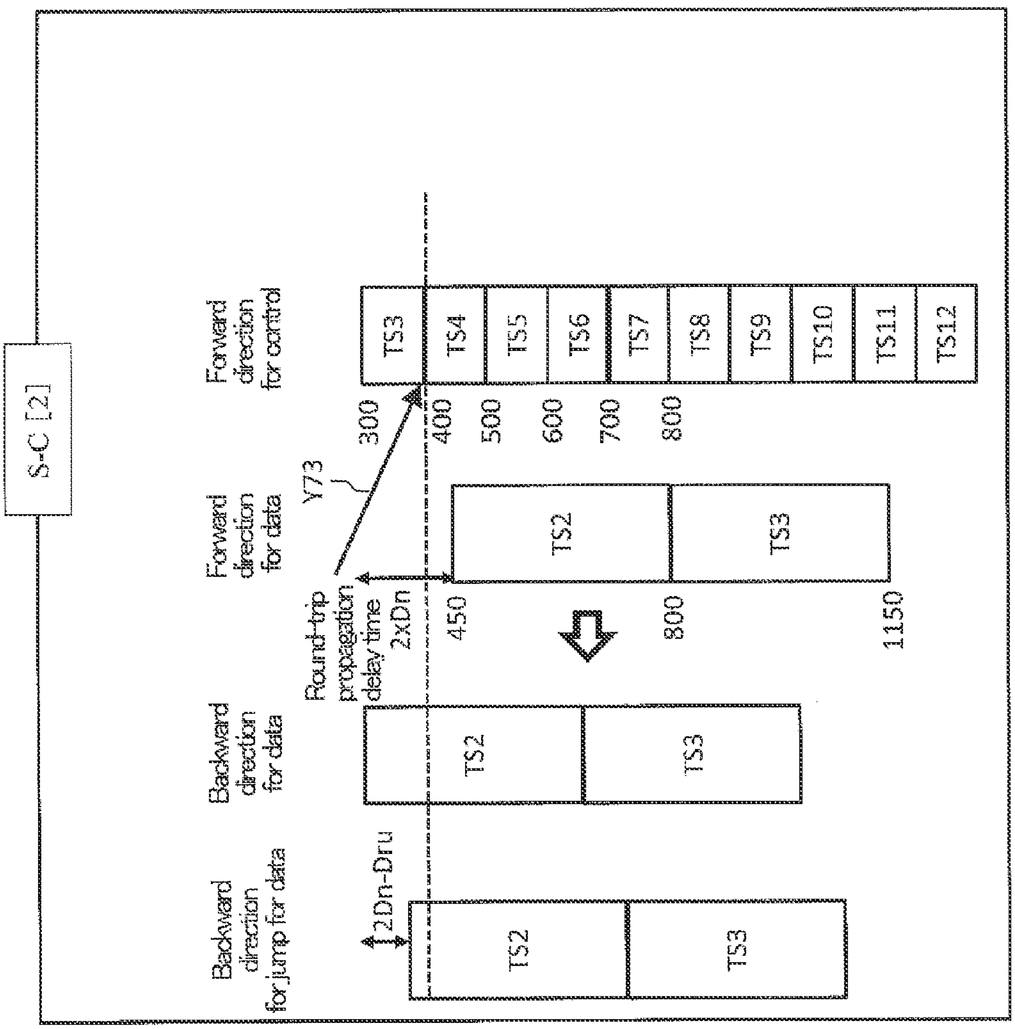

FIG. 140 is a diagram for explaining how to generate a backward direction jump time slot.

Figure 141:
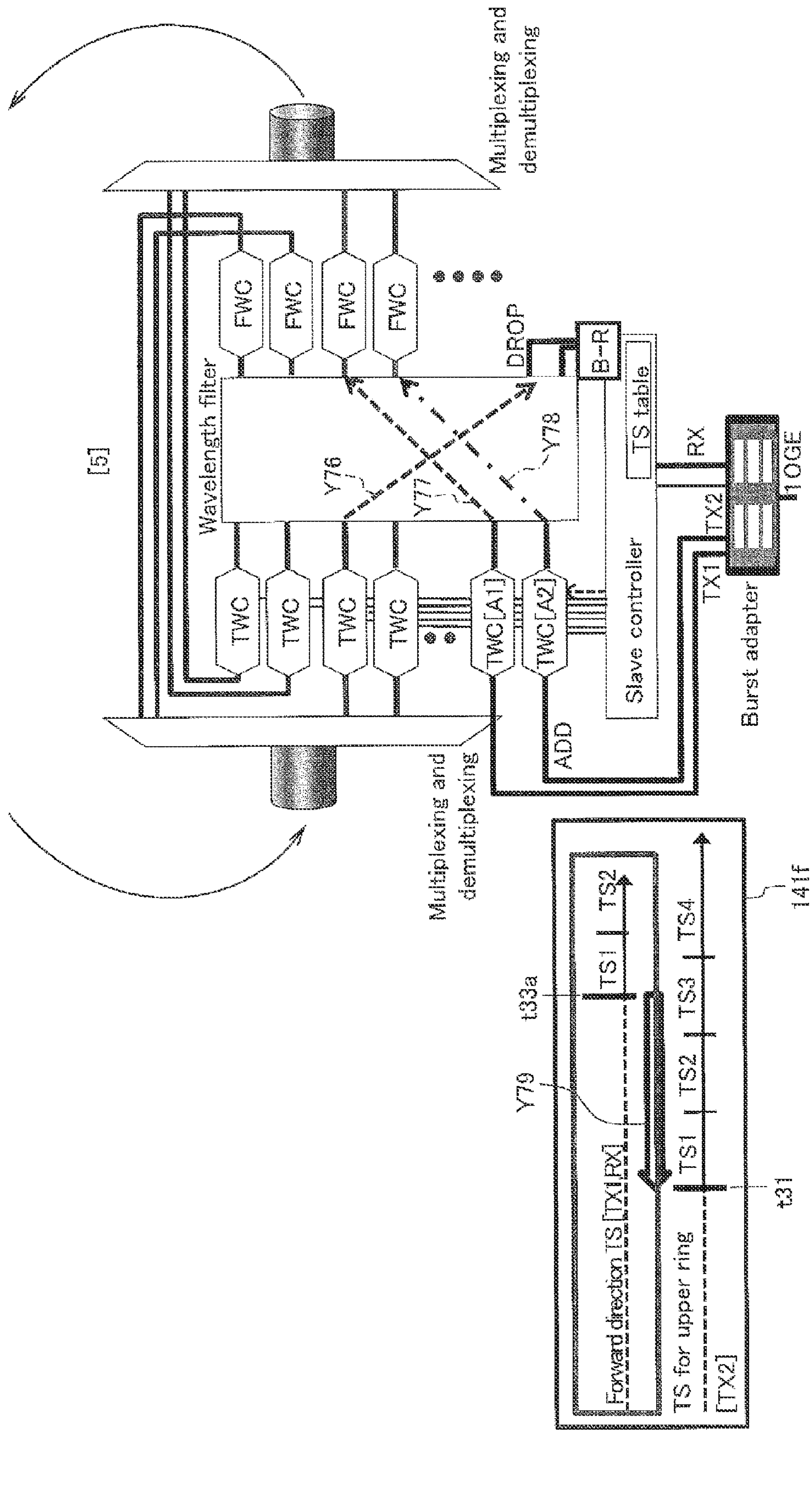

FIG. 141 is a diagram for explaining a first implementation example of a node on a lower ring.

Figure 142:
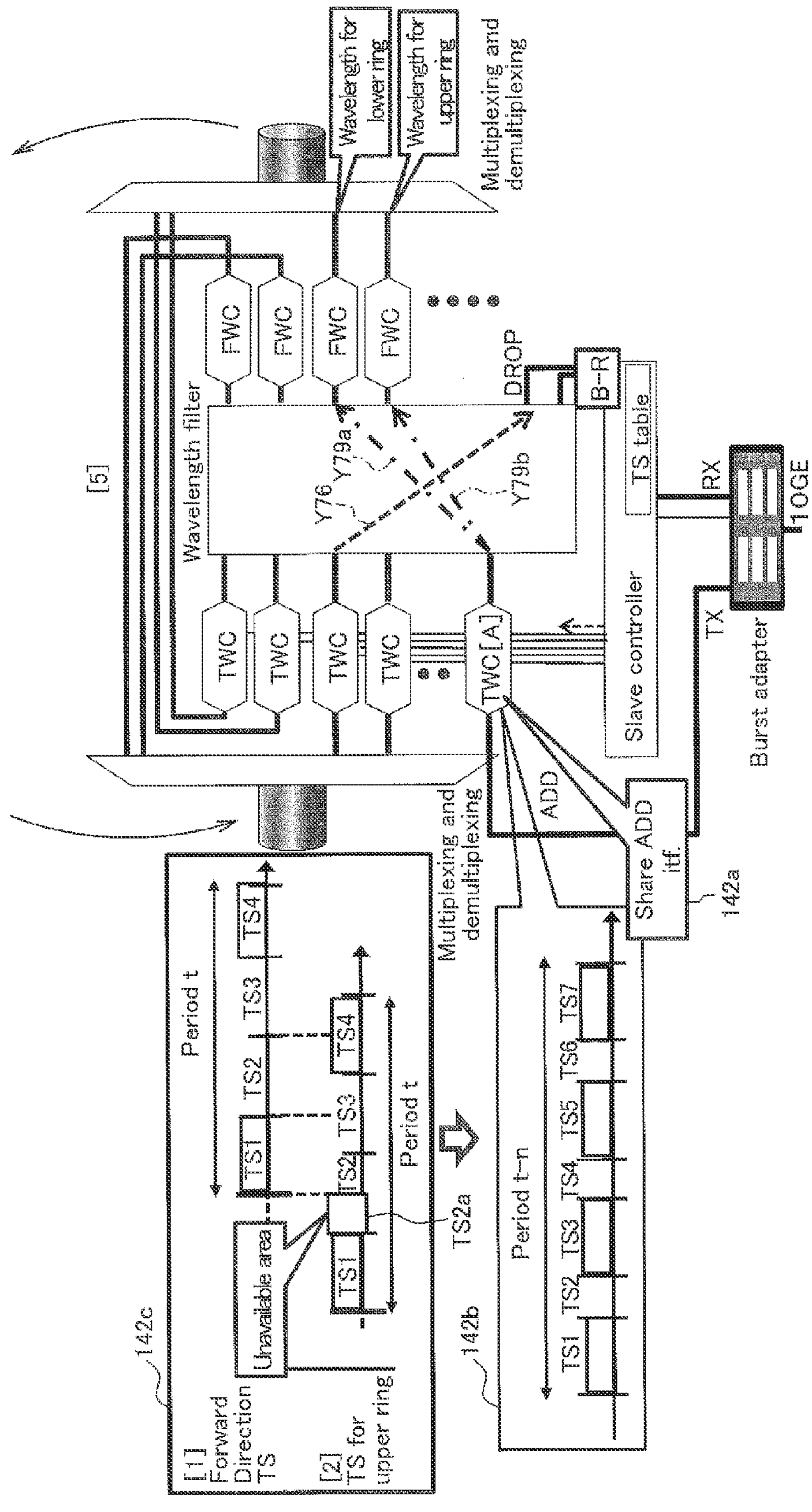

FIG. 142 is a diagram for explaining a second implementation example of a node on a lower ring.

FIG. 143 is a diagram for explaining a multi-ring network to which the present invention is directed.

FIG. 144 is a diagram for explaining a single ring network to which the present invention is directed.

FIG. 145 is a diagram for explaining problems in conventional technologies and specific means for solving the problems by the present invention.

Figure 146:
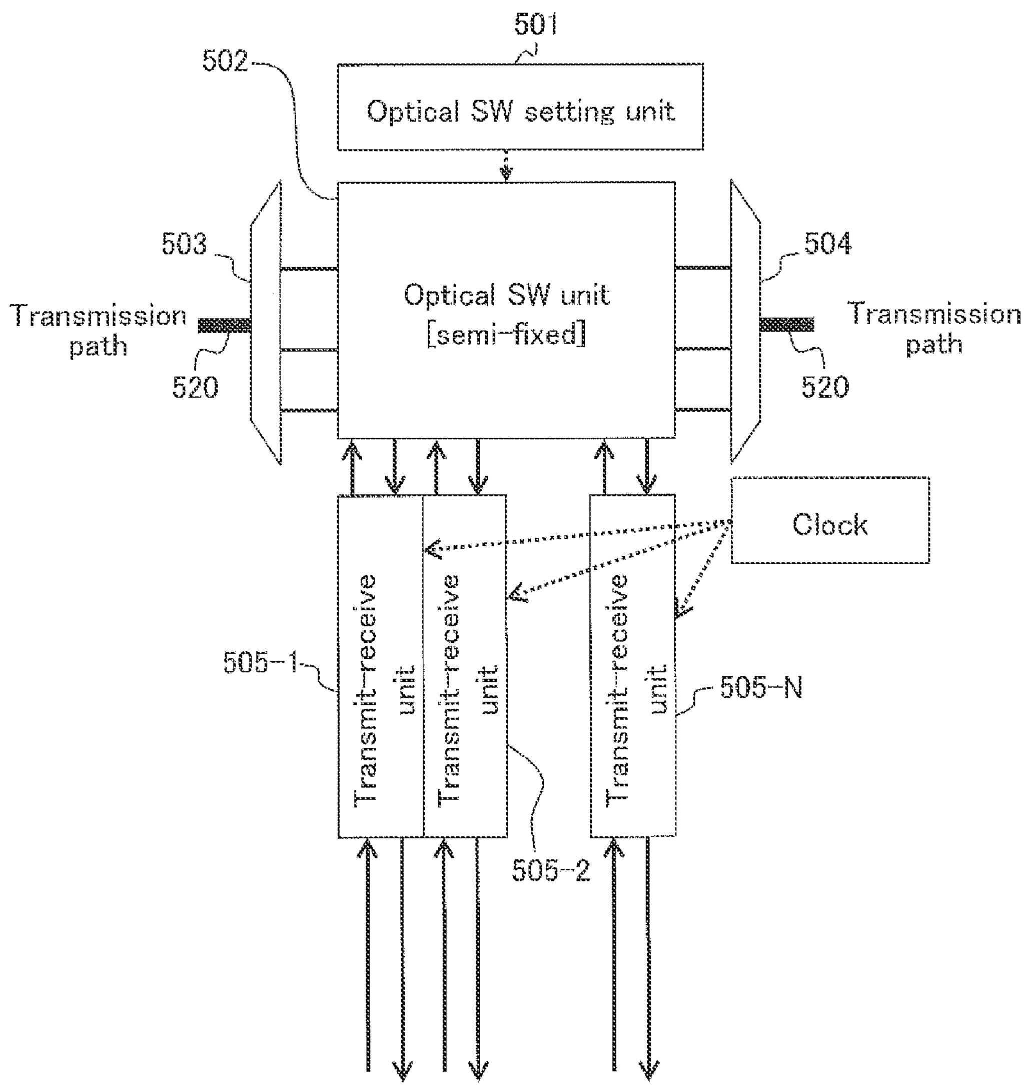

FIG. 146 is a block diagram illustrating an example of a configuration of a conventional OADM.

Figure 147:
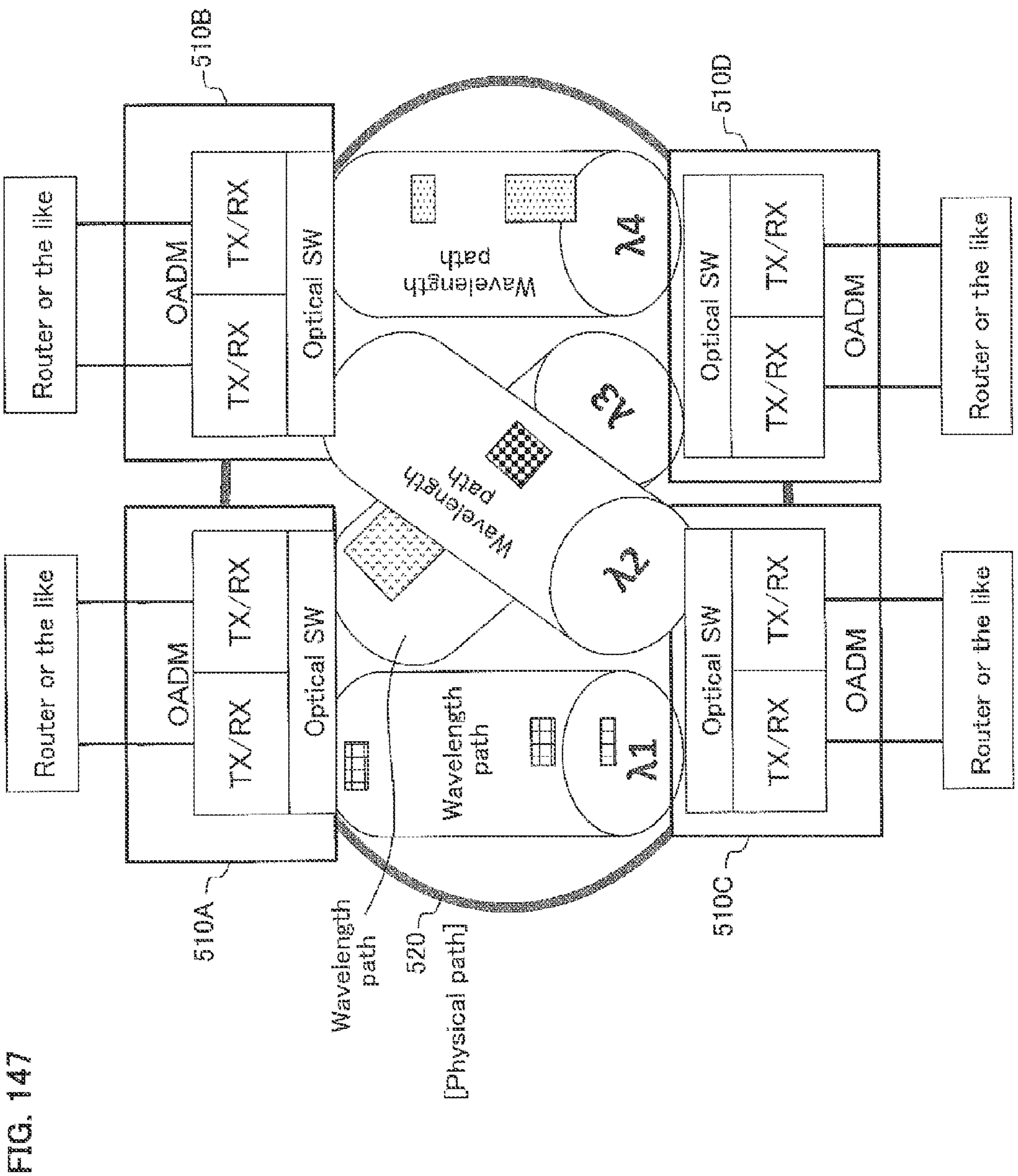

FIG. 147 is a diagram illustrating an example of a configuration of a ring optical network system in which the OADMs illustrated in FIG. 146 are connected in a ring shape via a transmission path.

Figure 148:
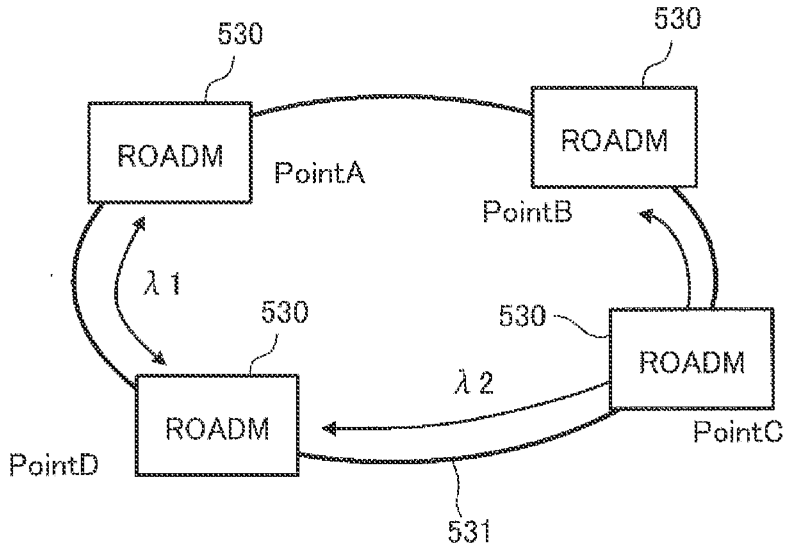

FIG. 148 is a diagram illustrating an example of a conventional metro network.

Figure 149A:
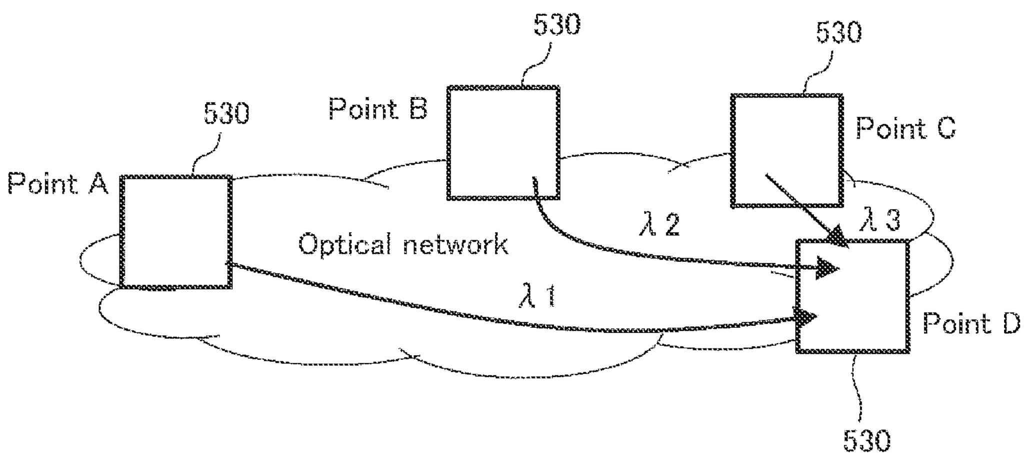

FIG. 149A is a diagram illustrating an example of a configuration of an optical network by wavelength division multiplexing using ROADMs.

Figure 149B:
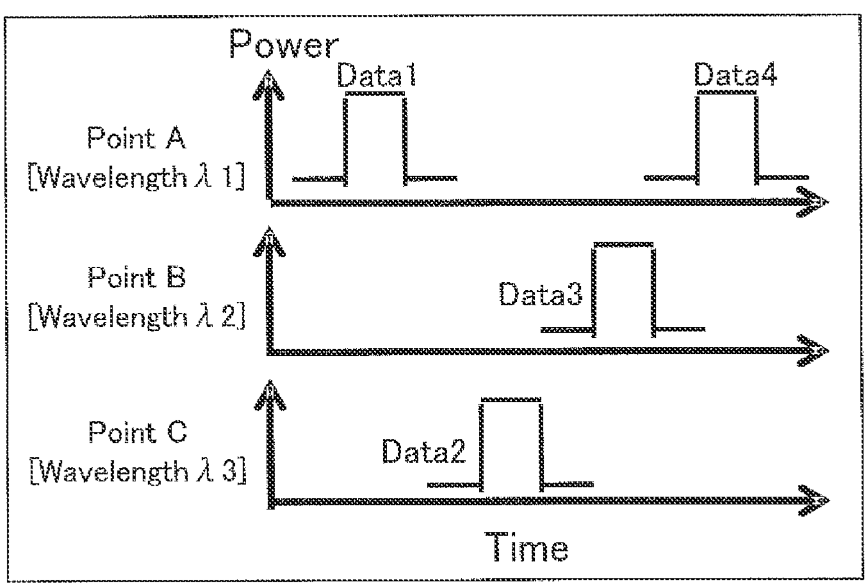

FIG. 149B is a diagram for explaining an operating principle of the optical network by wavelength division multiplexing using the ROADMs.

EMBODIMENTS FOR CARRYING OUT THE INVENTION

A configuration of an optical network system according to an embodiment of the present invention is described below.

Figure 1:
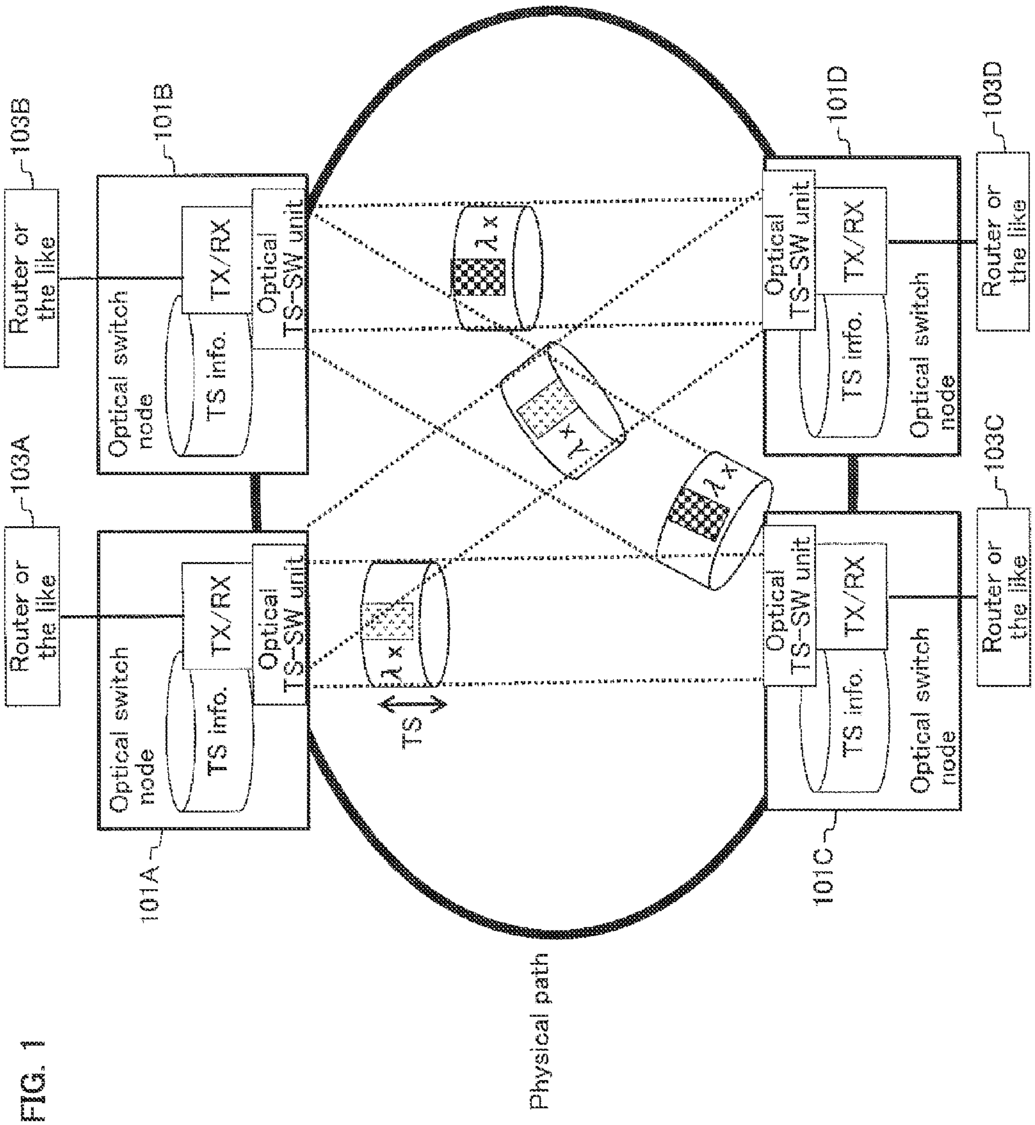
FIG. 1 is a diagram illustrating a configuration example of an optical network system according to an embodiment of the present invention.

FIG. 1 is an example of a configuration of an optical network system according to an embodiment of the present invention.

As illustrated in FIG. 1, the optical network system has a configuration in which optical switch nodes (each of which may be simply referred to as a "node" hereinafter) 101A to 101D are connected via a transmission path (a physical path). It is assumed herein that the optical switch node 101A is a master node (an optical master node). Note that FIG. 1 illustrates a case in which the number of the optical switch nodes 101A to 101D is four. The number of the optical switch nodes is not, however, limited to four, and may be any number more than one. The transmission path may also be referred to as a ring.

The optical switch node 101A divides a wavelength path having a given wavelength λx into time slots each having a predetermined time period and allocates the time slots to the optical switch nodes 101B to 101D. The optical switch nodes 101B to 101D each synchronize the time slot (which may also be referred to as a "TS" hereinafter) based on information delivered from the optical switch node 101A as the master node and transmits or receives data appropriately.

Figure 2:
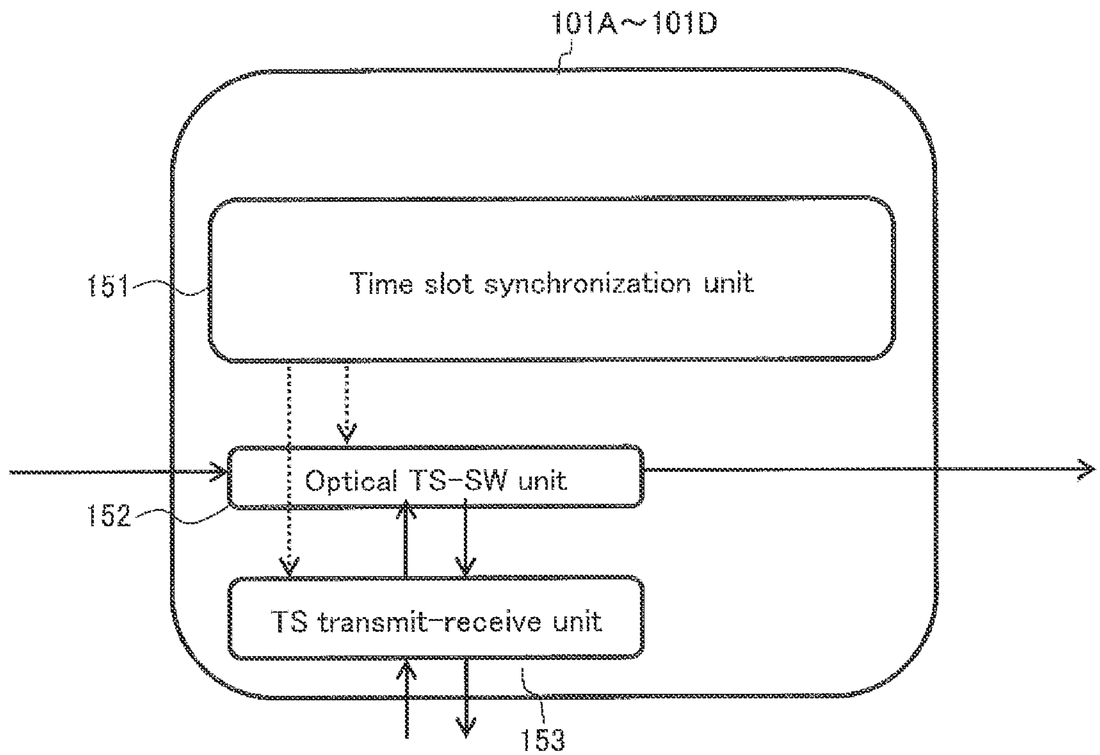
FIG. 2 is a functional block diagram for explaining a configuration of an optical switch node of the optical network system illustrated in FIG. 1.

FIG. 2 is a functional block diagram for explaining a configuration of the optical switch nodes in the optical network system illustrated in FIG. 1.

Each of the optical switch nodes 101A to 101D includes: a time slot synchronization unit 151; an optical TS-SW unit (an optical time slot switching unit) 152 as a wavelength switch; and a TS transmit-receive unit 153 that transmits or receives data between the routers or the like 103A to 103D illustrated in FIG. 1 and the optical TS-SW unit 152. Note that the TS-SW used herein is an abbreviation for a time slot switch and may also be used hereinafter.

In the optical switch node 101A (which may also be referred to as the master node 101A) which serves as the master node, the time slot synchronization unit 151 divides a wavelength path having an arbitrary wavelength into time slots each having a predetermined time period and allocates the time slots to the optical switch nodes 101B to 101D. The optical TS-SW unit 152 of the master node 101A synchronizes the time slots allocated by the synchronization unit 151 to the optical switch nodes 101B to 101D and delivers information for executing data transmission and receipt to the optical switch nodes 101B to 101D.

In each of the optical switch nodes 101B to 101D, the time slot synchronization unit 151 synchronizes the time slots each having a predetermined time and allocated by the master node 101A, based on the information delivered from the optical switch node 101A, and instructs the optical TS-SW unit 152 to transmit or receive data. The optical TS-SW unit 152 of each of the optical switch nodes 101B to 101D transmits or receives the data following the instruction from the time slot synchronization unit 151.

Note that FIG. 1 illustrates a state in which the optical switch nodes 101A to 101D hold time slot information showing contents of instructions on data processing. The time slot information herein may be previously stored in each of the nodes or may be delivered from the master node 101A to the optical switch nodes 101B to 101D.

In the above-described optical network system, a wavelength path is divided into time slots each having a predetermined time period; the time slots are allocated to respective nodes; and, based on the allocated time slots, the nodes each transmit or receive data or perform route switching. The TS synchronization unit 151 controls the TS transmit-receive unit 153 and the optical TS-SW unit 152 illustrated in FIG. 2 such that the nodes synchronize the data transmission and the route switching so as to prevent data from colliding in the same wavelength path and to enable data transmission or ADD (insertion)/DROP (branch) by the allocated time slot of its own. One of methods of establishing the synchronization is a method based on a trigger from the master node 101A and another is a method based on a time.

The present invention makes it possible to realize an optical TDM ring system which does not depend on the number of wavelength paths. Also, reduction in the numbers of wavelengths and receivers required for the nodes 101A to 101D becomes possible.

Next is described the optical network system according to this embodiment more specifically.

First Embodiment

In the optical network system according to the first embodiment, when the master node transmits a trigger to each of nodes, time slots (TSs) of the nodes are synchronized. The master node then sets a TS length or a TS period at one over the integers. This makes it possible to match a timing at which the trigger is terminated at the master node after one round of a ring, and a timing at which another trigger is outputted, thus allowing periodic data transmission and receipt to be realized in the ring network.

Next is described a configuration of the optical switch node according to this embodiment.

Figure 3:
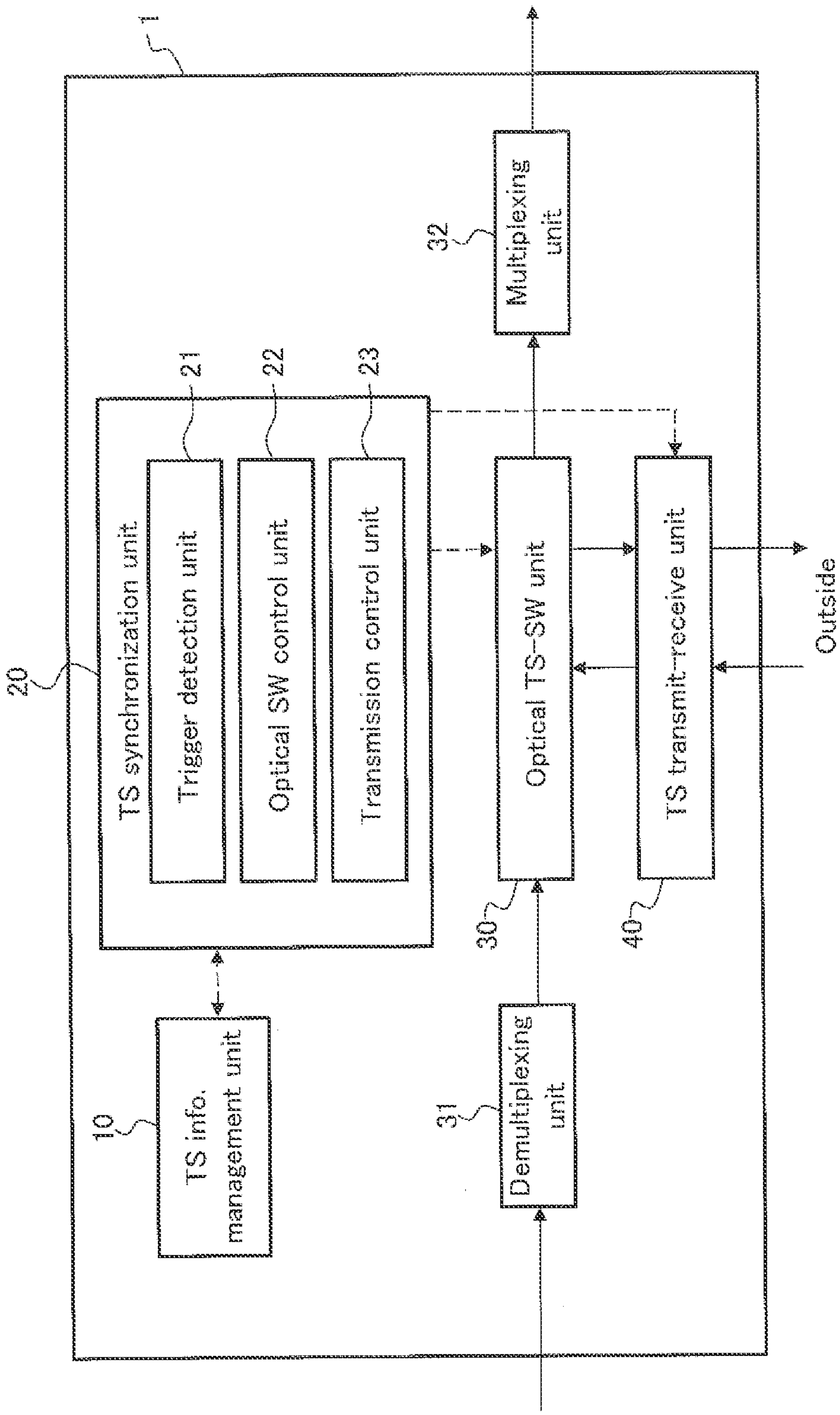
FIG. 3 is a block diagram illustrating a configuration example of the optical switch node according to a first embodiment.
Figure 4:
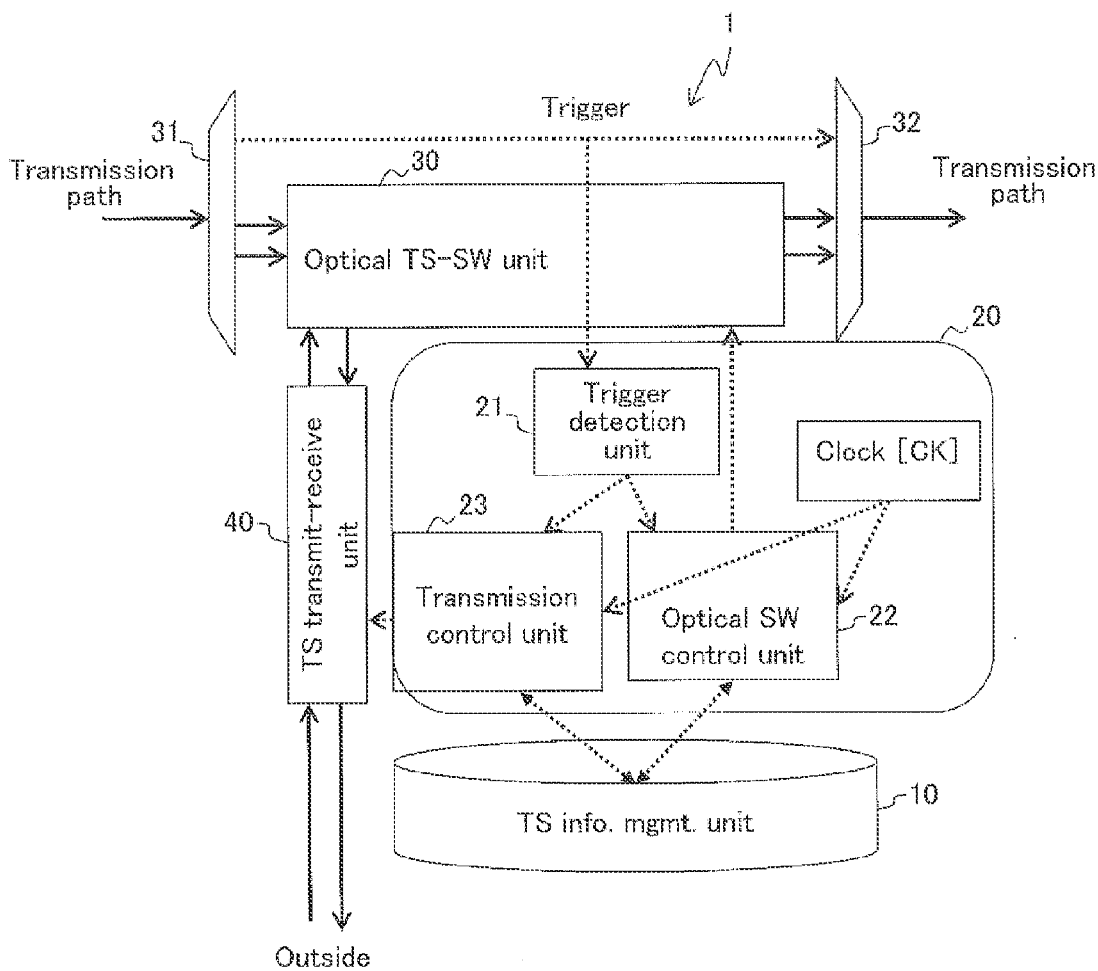
FIG. 4 is a diagram schematically illustrating transmission routes of a control signal and an optical signal in the optical switch node illustrating in FIG. 3.

FIG. 3 is a block diagram illustrating an example of a configuration of an optical switch node 1 according to this embodiment. FIG. 4 is a diagram schematically illustrating transmission routes of a control signal and an optical signal in the optical switch node 1 illustrated in FIG. 3. Broken arrows show directions in which the control signal is transmitted, and solid arrows show directions in which the optical signal is transmitted. The same is applied to other block diagrams to be described hereinafter.

As illustrated in FIG. 3, the optical switch node 1 includes: a TS information management unit 10 that sets TS information; a TS synchronization unit (time slot synchronization unit) 20; an optical TS-SW unit 30; and a TS transmit-receive unit 40. The TS synchronization unit 20 includes: a trigger detection unit 21; an optical SW control unit 22; and a transmission control unit 23. The optical TS-SW unit 30 is connected to a demultiplexing unit 31 on an input side of an optical signal and a multiplexing unit 32 on an outputs side of the optical signal.

Next description is made with reference to FIG. 4. The TS information management unit 10 includes a storage unit (not shown) for storing therein TS information. In this embodiment, though described later, the TS information contains a TS length or a TS period which is set at one over the integers of a length of a ring. The TS information also contains details of an instruction on a data processing such as information on a destination node of data and an operation to data. The operation used herein is DROP, ADD, and the like.

The trigger detection unit 21 detects a trigger for synchronizing a start timing of a time slot set to each node and notifies the optical SW control unit 22 and the transmission control unit 23 of the detected result.

The optical SW control unit 22: counts an elapsed time from receipt of the trigger detection notification; references the TS information management unit 10; and instructs the optical TS-SW unit 30 to switch a route with a time slot allocated thereto.

The optical TS-SW unit 30 switches the route in accordance with the instruction from the optical SW control unit 22.

The transmission control unit 23: counts an elapsed time from the receipt of the trigger detection notification; references the TS information management unit 10; and instructs the TS transmit-receive unit 40 to transmit the data with a time slot allocated to itself.

The TS transmit-receive unit 40: stores the data inputted from outside in a buffer (not shown), transmits data read out from the buffer in accordance with an instruction from the transmission control unit 23, to the optical TS-SW unit 30; and transmits a data received from the optical TS-SW unit 30 to the outside. The outside used herein refers to, for example, a communication device such as the routers or the like 103A to 103D illustrated in FIG. 1.

The demultiplexing unit 31 wavelength-demultiplexes an optical signal inputted from the outside via the transmission path and outputs the optical signal to the optical TS-SW unit 30. The multiplexing unit 32 wavelength-multiplexes the optical signal inputted from the optical TS-SW unit 30 and outputs the optical signal to the outside via the transmission path. Note that the demultiplexing unit 31 and the multiplexing unit 32 are not necessarily provided. Instead of providing the demultiplexing unit 31 and the multiplexing unit 32, the number of fibers of the transmission path may be increased.

Next is described a configuration of a master optical switch node (which may also be referred to as a master node) in this embodiment.

Figure 5:
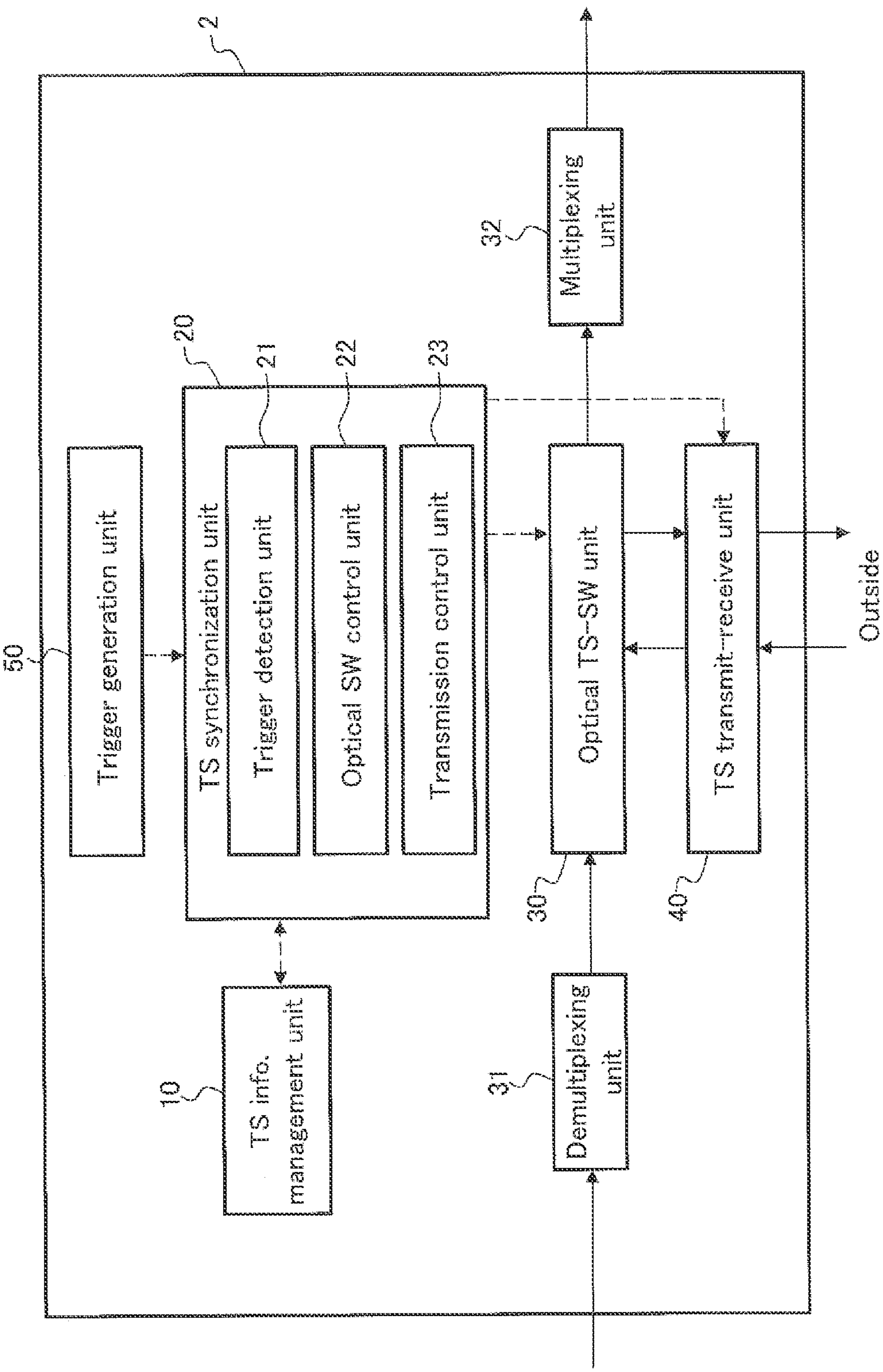
FIG. 5 is a block diagram illustrating a configuration example of a master optical switch node according to the first embodiment.
Figure 6:
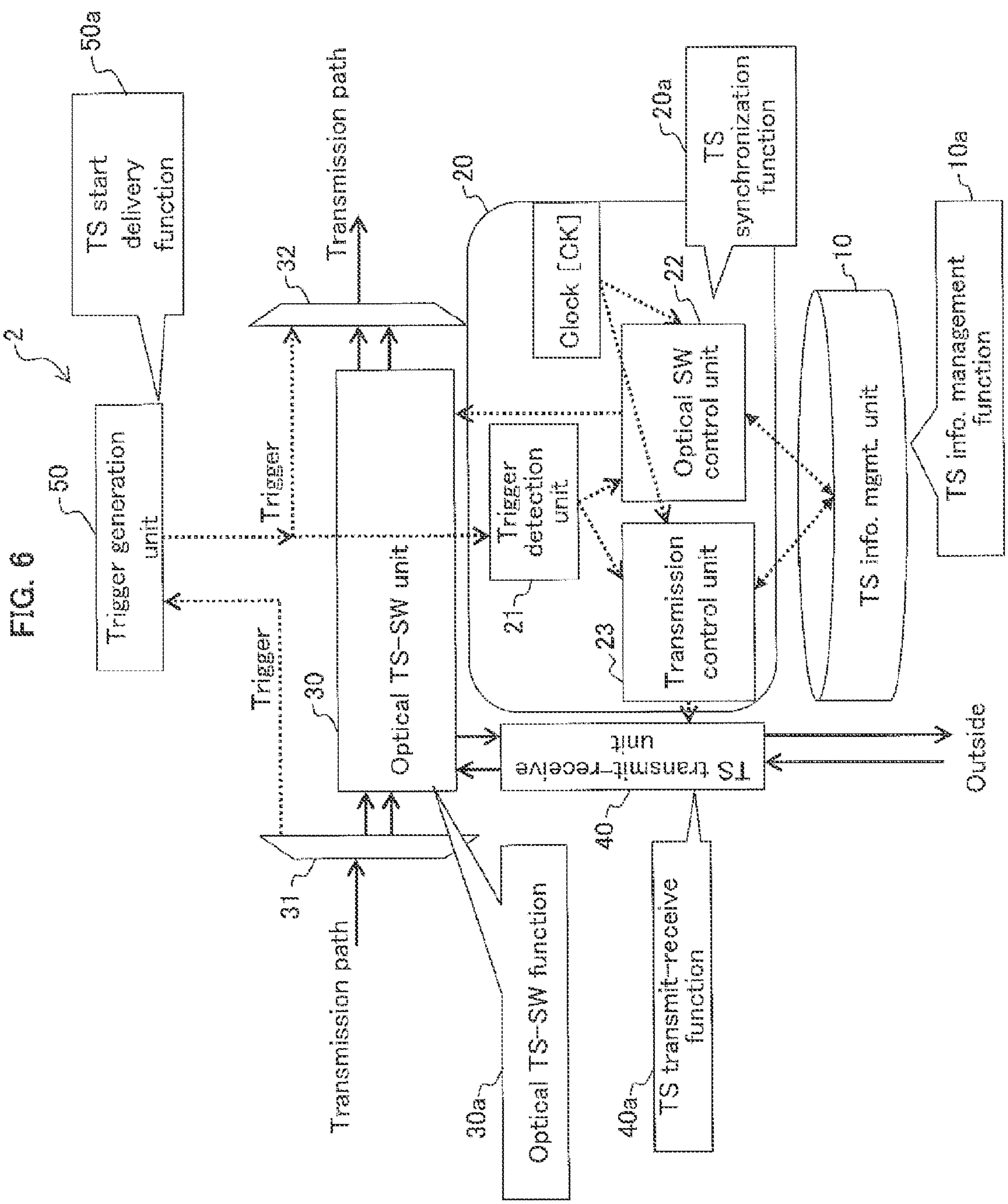
FIG. 6 is a diagram schematically illustrating transmission routes of a control signal and an optical signal in the master optical switch node illustrated in FIG. 5.

FIG. 5 is a block diagram illustrating a configuration example of a master node 2 in this embodiment. FIG. 6 is a diagram schematically illustrating the master node 2 in this embodiment. FIG. 6 is a diagram schematically illustrating transmission routes of a control signal and an optical signal in the master node 2 illustrated in FIG. 5.

As illustrated in FIG. 5, the master node 2 has a configuration similar to that explained with reference to FIG. 3, except that the master node 2 further includes a trigger generation unit 50 that generates a trigger for synchronizing time slots and transmits the trigger to the node, The trigger generation unit 50 sets a transmission period at any one of a "TS length", a "TS period", and a "TS period×N".

Next is described a variation in a case where a trigger is used with a TS start delivery function **50*a* of the trigger generation unit 50 and a TS synchronization function 20*a* of the TS synchronization unit 20**.

FIG. 7 is a diagram illustrating a variation in a case where a trigger is utilized with the TS start delivery function **50*a* and the TS synchronization function 20*a*. As illustrated in FIG. 7**, a trigger output interval can be selected from the "TS length", the "TS period", and the "TS period×N".

Figure 8A:
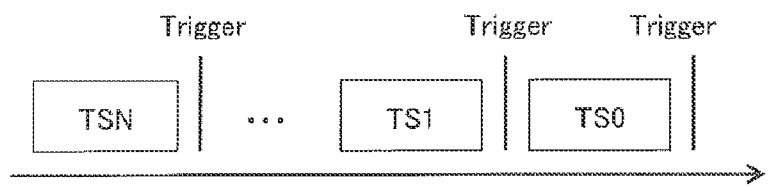
FIG. 8A is a schematic diagram when a trigger output interval of FIG. 7 is a "TS length".
Figure 8B:
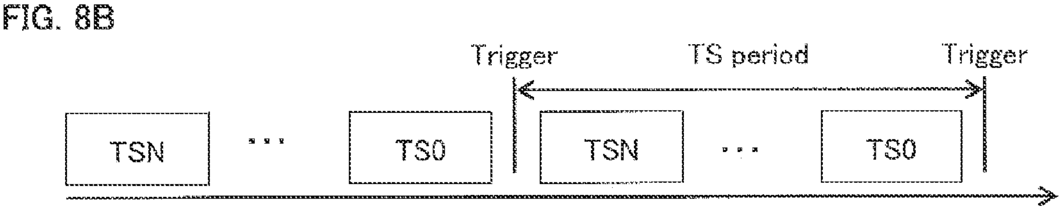
FIG. 8B is a schematic diagram when the trigger output interval of FIG. 7 is a "TS period".
Figure 8C:
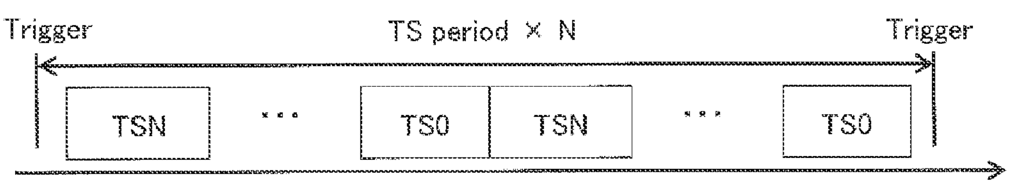
FIG. 8C is a schematic diagram when the trigger output interval of FIG. 7 is a "TS period×N".

FIGS. 8A to 8C are diagrams schematically illustrating TS output units in cases of the "TS length" (which may also be referred to as ※1 hereinafter), the "TS period" (※2), and the "TS period×N" (※3) illustrated in FIG. 7, respectively. FIG. 8A is a schematic diagram when the trigger output interval is the "TS length". FIG. 8B is a schematic diagram when the trigger output interval is the "TS period". FIG. 8C is a schematic diagram when the trigger output interval is the "TS period×N".

Next are described operations of the optical network system in this embodiment. Firstly, operations when the trigger output interval is the "TS length" are described.

Figure 9:
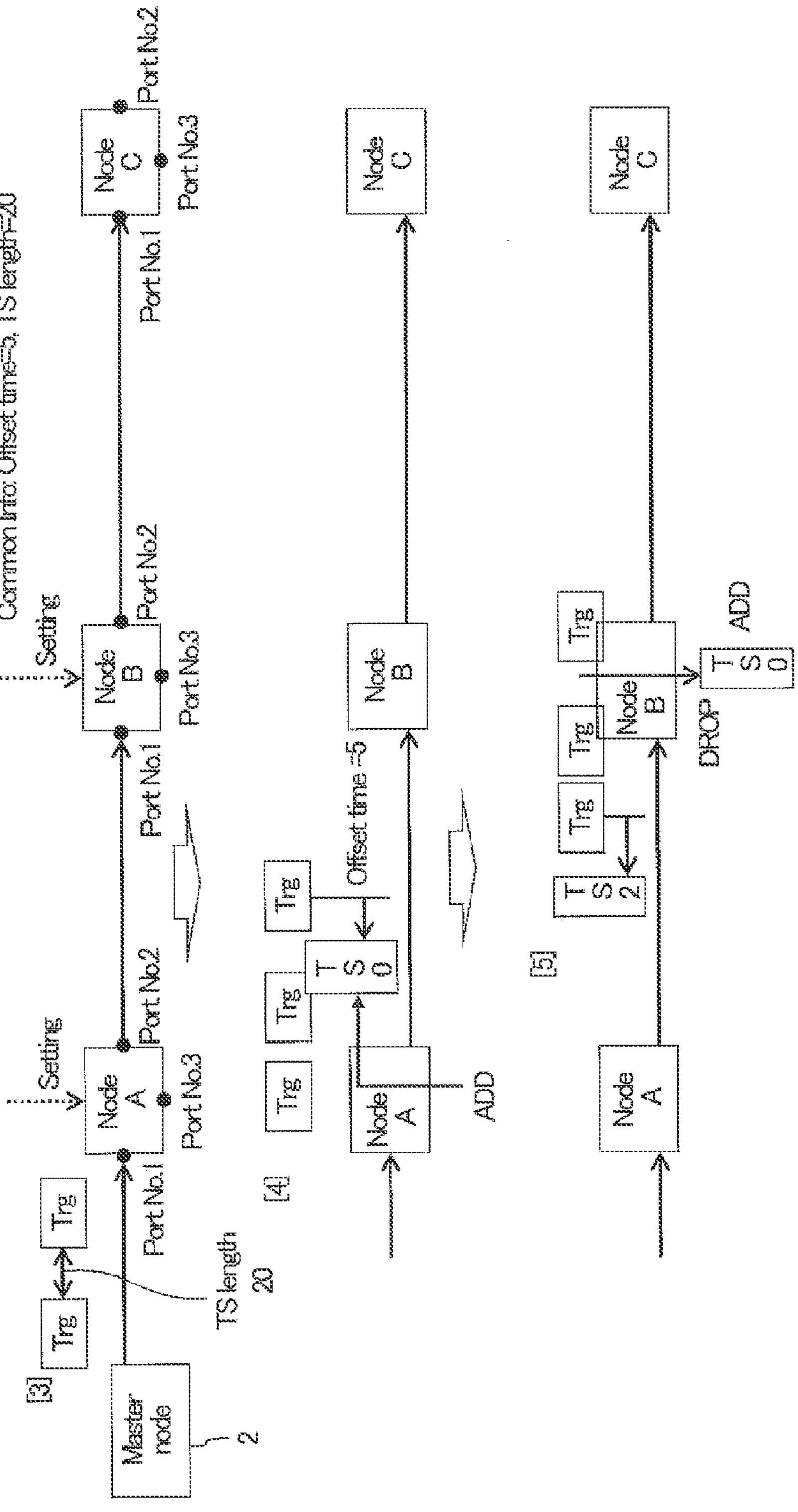
FIG. 9 is a diagram for explaining operations of No. 1001 of FIG. 7.

FIG. 9 is a diagram for explaining operations of No. 1001 illustrated in FIG. 7. Referring to FIG. 9, operations are described when a data is transmitted using an optical signal, from node A to node B, from node A to node C, and from node B to node C, in which all of the nodes are other than the master node 2.

TS information is previously set to each of nodes A to C. The TS information having been set to node A and node B is exemplified in [1] and [2] of FIG. 9, respectively. TS numbers "0" to "2" allocated as an ADD to any one of wavelengths correspond one-to-one with nodes A to C. The TS length is set at one over the integers of a length of a ring.

As illustrated in [3], the master node 2 transmits the trigger at intervals of the TS length (20 μsec) to node A. The trigger makes one round of the ring and is then terminated. The unit of the TS length is assumed to be μsec hereinafter.

Upon receipt of the trigger, node A performs the first operation of the TS information after an offset time (5 μsec) as illustrated in [4]. Herein, the unit of the offset time is μsec. In some cases depending on a time counting operation of a system, 5 μsec is represented as 5 counts, for example. Thus, the unit of the offset time may also be referred to as a count.

That is, node A performs an ADD of a data of node B to TS0 as illustrated in line 1 of [1]. At this time, an optical SW connection port is connected from port No. 3 to port No. 2. Upon receipt of a subsequent trigger, node A similarly performs the second operation of the TS information. Upon receipt of another subsequent trigger, node A similarly performs the third operation of the TS information. That is, node A performs an ADD of a data of node C as a destination to TS2, as illustrated in line 3 of [1]. At this time, the optical SW connection port is connected from port No. 3 to port No. 2.

Upon receipt of the trigger, node B performs the first operation of the TS information after an offset time (5 μsec), as illustrated in [5]. That is, node B performs a DROP of the data at TS0, as illustrated in [2]. At this time, an optical SW connection port is connected from port No. 1 to port No. 3. Upon receipt of a subsequent trigger, node B similarly performs the second operation of the TS information. That is, node B performs an ADD of the data of node C as the destination to TS1, as illustrated in [2]. At this time, an optical SW connection port is connected from port No. 3 to port No. 2.

Next are described operations when the trigger output interval is the "TS period".

Figure 10:
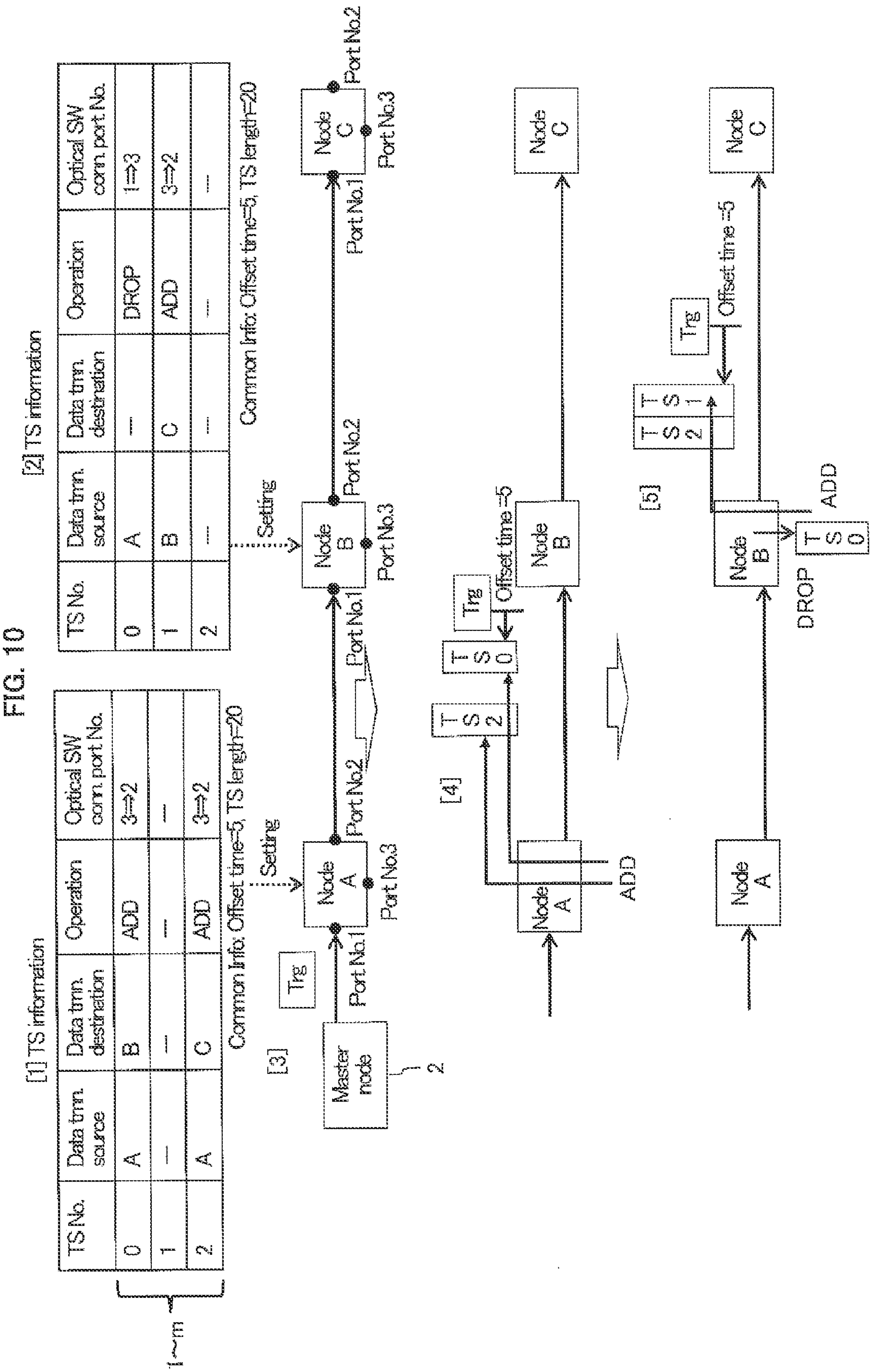
FIG. 10 is a diagram for explaining operations of No. 1002 of FIG. 7.

FIG. 10 is a diagram for explaining operations in a case of No. 1002 illustrated in FIG. 7. Referring to FIG. 10, the operations are described when a data is transmitted from node A to node B, from node A to node C, and from node B to node C, using an optical signal.

TS information is previously set to each of nodes A to C. The TS information having been set to node A and node B is exemplified in [1] and [2] of FIG. 10, respectively. TS numbers "0" to "2" allocated as an ADD to any one of wavelengths correspond one-to-one to nodes A to C. The TS length is set such that the TS period (TS length×m) be one over the integers of a length of a ring.

As illustrated in [3], the master node 2 transmits a trigger to node A at intervals of the TS period. After making one round of a ring, the trigger is terminated.

Upon receipt of the trigger, after an offset time elapses (for example, 5 counts herein) as illustrated in [4], node A performs the first to m-th operations of the TS information. That is, as illustrated in [1], after the offset time, node A performs: an ADD of a data of node B as a destination, to TS0, and; after 45 counts (Offset time+TS number×TS length=5+2×20), also performs an ADD of a data of node C as a destination to TS2. At this time, an optical SW connection port is connected from port No. 3 to port No. 2.

Upon receipt of the trigger, node B sequentially performs the first to m-th operations of the TS information after the offset time (5 counts) as illustrated in [5]. That is, also as illustrated in [2], after an offset time, node B performs a DROP of TS0, and, after 25 counts (Offset time+TS number×TS length=5+1×20), performs an ADD of a data of node C as a destination to TS1. At the DROP, the optical SW connection port is connected from port No. 1 to No. 3, and, at the ADD, from port No. 3 to port No. 2.

Next are described operations when the trigger output interval is the "TS period×N".

Figure 11:
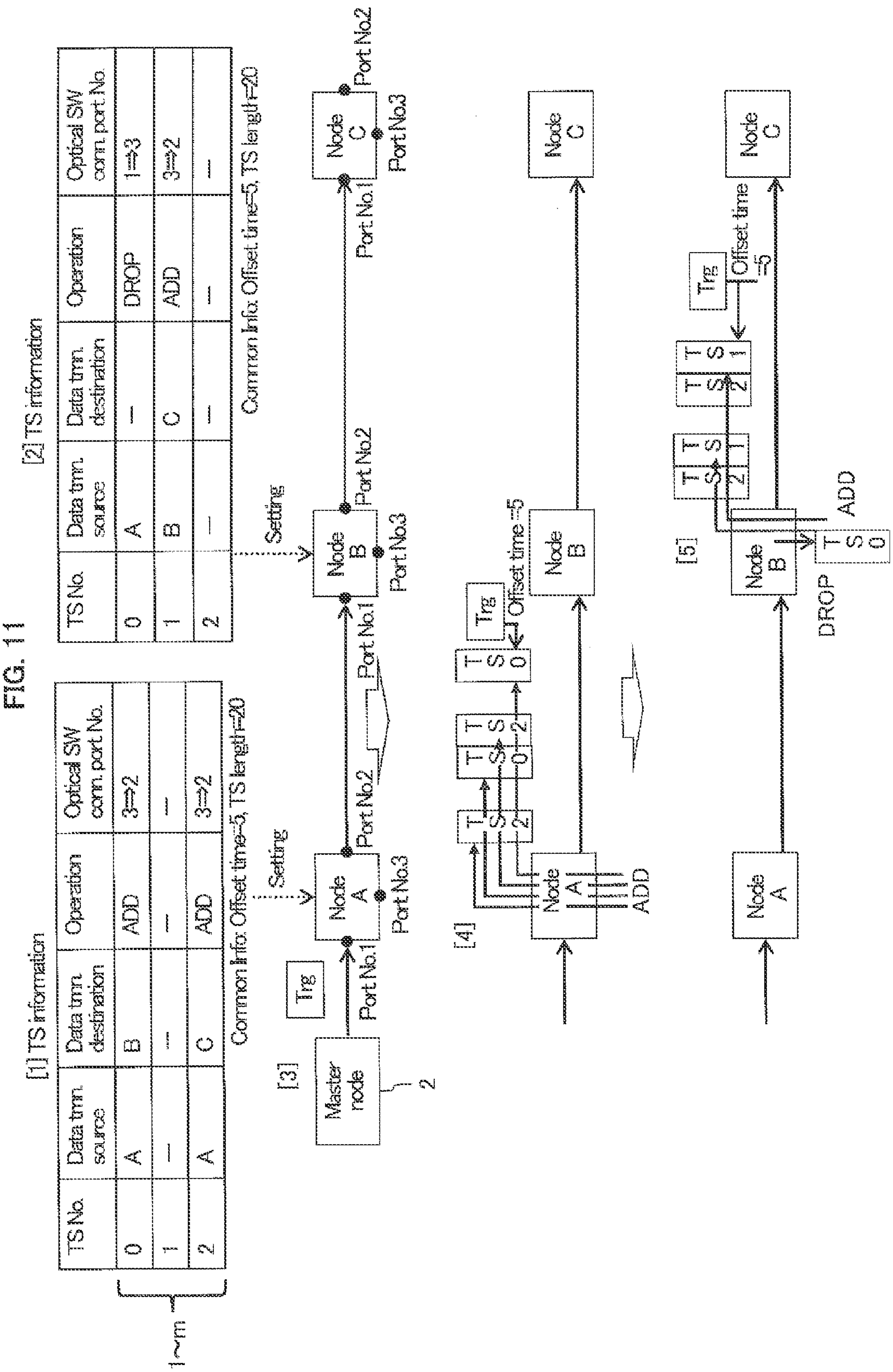
FIG. 11 is a diagram for explaining operations of No. 1004 of FIG. 7.

FIG. 11 is a diagram for explaining operations in a case of No. 1004 illustrated in FIG. 7. Referring to FIG. 11, operations are described when a data is transmitted from node A to node B, from node A to node C, and from node B to node C, using an optical signal.

TS information is previously set to each of nodes A to C. The TS information having been set to node A and node B is exemplified in [1] and [2] of FIG. 11, respectively. TS numbers "0" to "2" allocated as an ADD to any one of wavelengths correspond one-to-one to nodes A to C. The TS length is set such that the TS period (TS length×m) is one over the integers of the length of the ring.

As illustrated in [3], the master node 2 transmits the trigger to node A at intervals of the TS period×N. After making one round of a ring, the trigger is terminated.

Upon receipt of the trigger, node A performs the first to m-th operations of the TS information after an offset time (5 counts herein) as illustrated in [4]. Upon receipt of a subsequent trigger, similarly to the first trigger, node A repeats the first to m-th operations of the TS information. That is, as illustrated in line 1 of [1], after the offset time, node A performs an ADD of a data of node B as a destination to TS0, and then, as illustrated in line 3 of [1], performs an ADD of a data of node C as a destination to TS2. At this time, the optical SW connection port is connected from port No. 3 to port No. 2.

Upon receipt of the trigger, node B sequentially performs the first to m-th operations of the TS information after the offset time (5 counts) as illustrated in [5]. After performing the m-th operation, node B repeats the first to m-th operations until node B receives a subsequent trigger. Upon receipt of the subsequent trigger, similarly to the first trigger, node B repeats the first to m-th operations of the TS information. That is, as illustrated in [2], node B performs a DROP of a data of TS0, and then, performs an ADD of a data of node C as a destination to TS1. At the DROP, the optical SW connection port is connected from port No. 1 to No. 3, and, at the ADD, from port No. 3 to port No. 2.

Next is described how to set a TS length and a TS period with respect to a ring length.

Figure 12A:
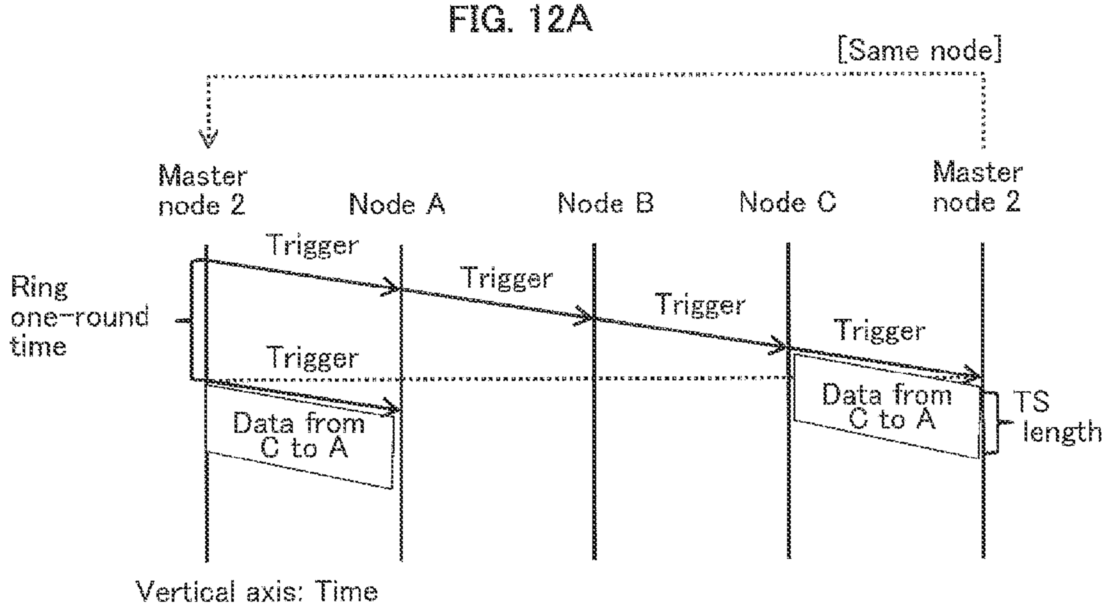
FIG. 12A is a time-series diagram for explaining how to set the TS length and a TS period with respect to a ring length.
Figure 12B:
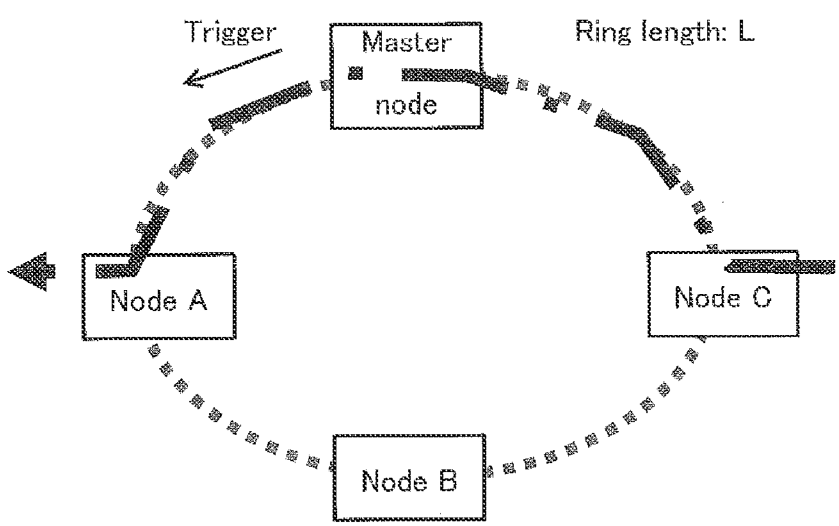
FIG. 12B is a system diagram for explaining how to set the TS length and the TS period with respect to the ring length.

FIG. 12A and FIG. 12B are diagrams each for explaining how to set a TS length and a TS period with respect to a ring length.

In an optical ring system, nodes A to C transmit or receive data each other in a transmission path shown with a broken line in a ring-like shape. Thus, in order to receive a data across the master node 2, such as "from node C to node A" (see FIG. 12A), the TS length or the TS period is set to be one over the integers of a ring length L. More specifically, when the trigger output interval is the TS length, the TS length is set at one over the integers of the ring length L. When the trigger output interval is the TS period or the TS period×N, the TS period is set at one over the integers of the ring length L. This makes it possible for node A to receive a data transmitted from node C, using a trigger newly transmitted from the master node 2.

Next is described how to deal with deviation of timing of a time slot.

Figure 13:
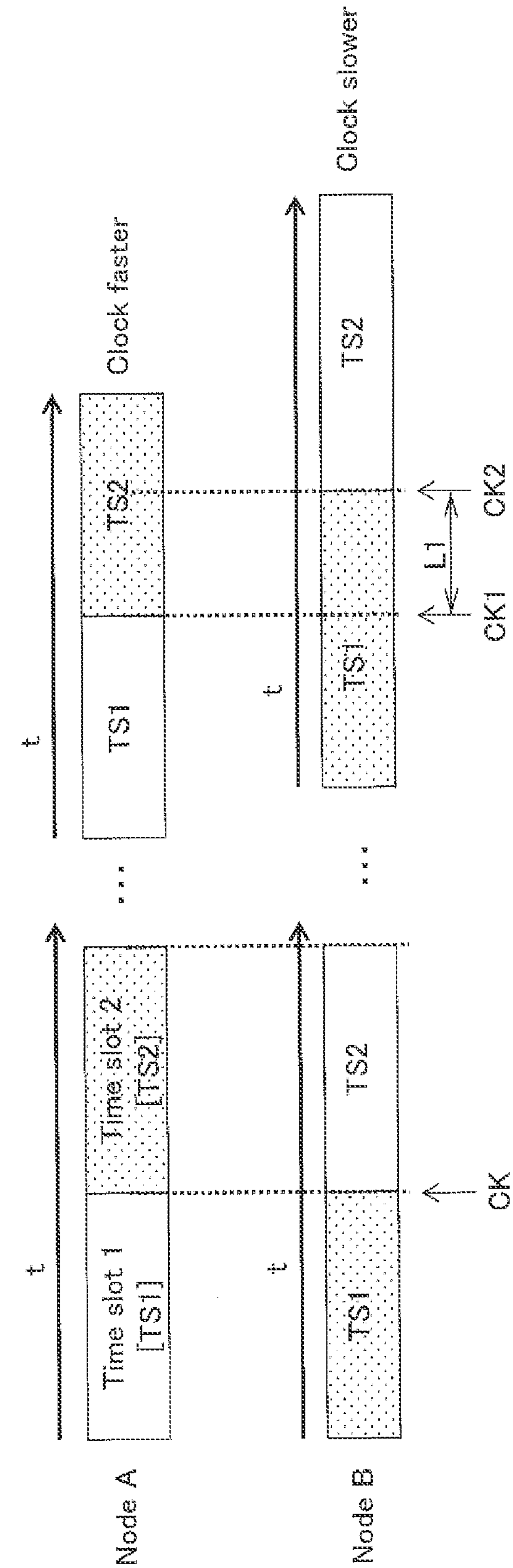
FIG. 13 is a diagram illustrating deviation of timing of a time slot due to fluctuation.
Figure 14:
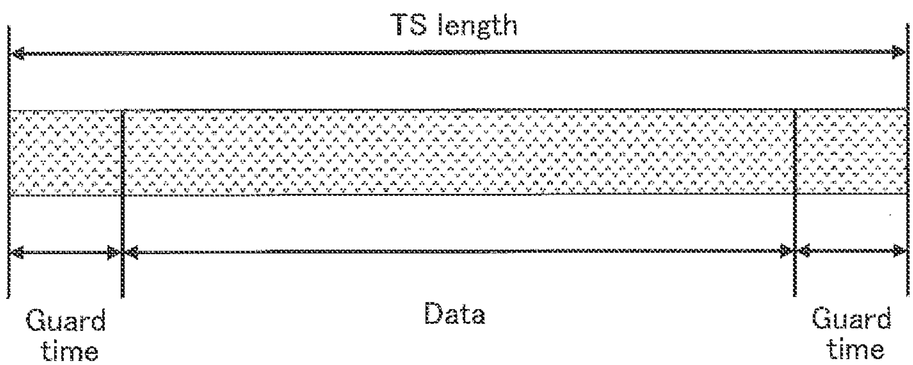
FIG. 14 is a diagram illustrating a data and guard times in a time slot.

FIG. 13 is a diagram illustrating deviation of timing of a time slot due to fluctuation. FIG. 14 is a diagram illustrating a data and guard times in a time slot.

Transmission and reception timing of time slots of nodes A to C are deviated in some cases as illustrated with clocks CK1 and CK2 in FIG. 13, because of fluctuation of a trigger output interval of the master node 2 (see FIG. 5) or clock fluctuation when a time slot is periodically transmitted as shown in No. 1004 and No. 1005 of FIG. 7.

As illustrated with a CK in a left part of FIG. 13, if clocks are matched, timing of the time slots TS1 and TS2 transmitted and received by the nodes A to C are matched to each other. However, as illustrated in a right part of FIG. 13 with CK1 and CK2, if timing of a time slot is deviated because of clock fluctuation, the time slot TS1 is overlapped with the time slot TS2 as indicated by a two-way arrow L1.

Guard times are therefore given before and after a data as illustrated in FIG. 14, taking into account a possible overlap of time slots because of clock fluctuation. A guard time for a certain period of time in a time slot (TS length) can prevent the time slots from overlapping.

Next is described physical topology.

Figure 15:
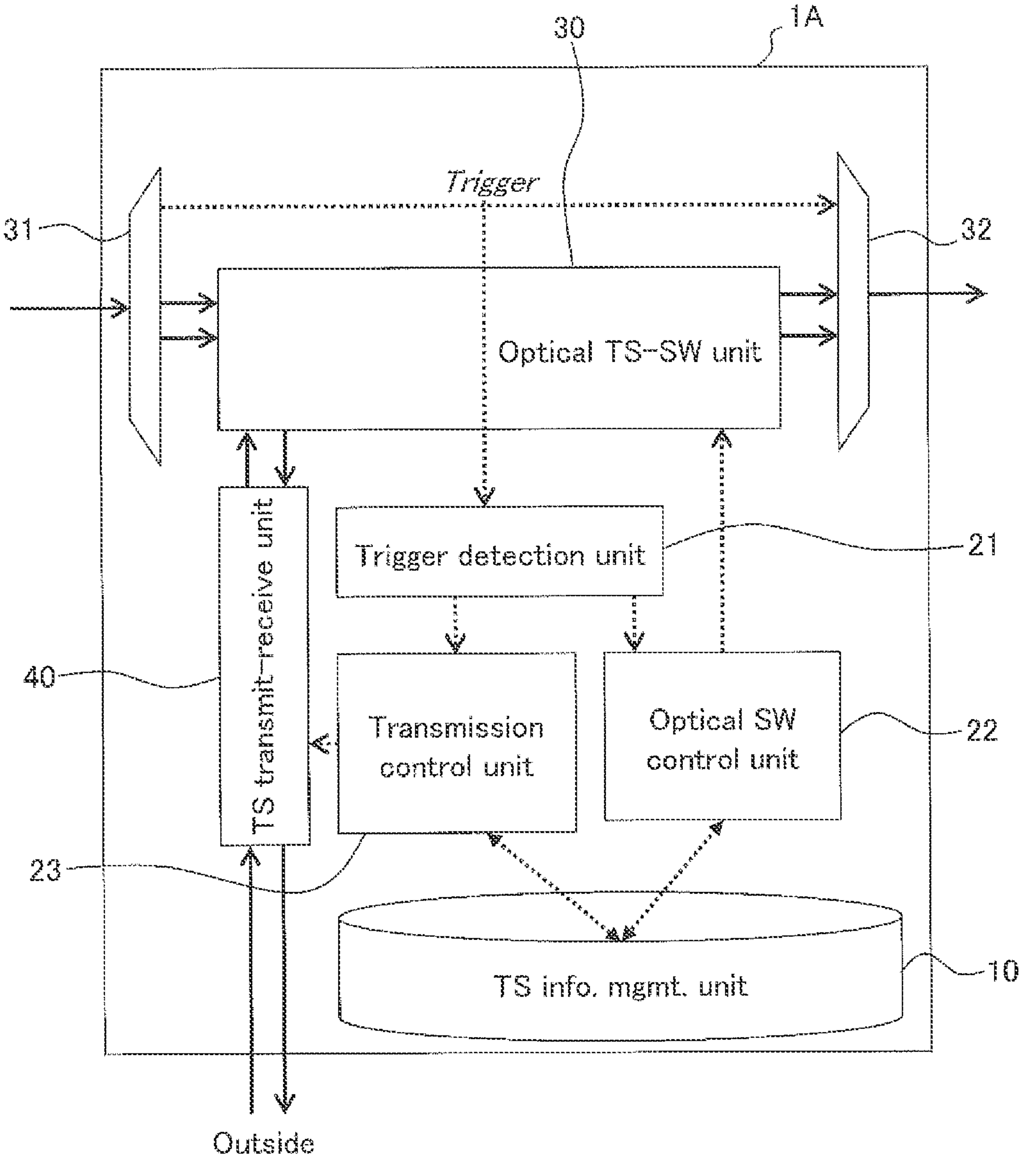
FIG. 15 is a block diagram illustrating an example of a configuration in a case where a physical topology is a unidirectional ring.

FIG. 15 is a block diagram illustrating an example of a configuration of an optical switch node 1A in a unidirectional ring. The configuration in the unidirectional ring is similar to that explained with reference to FIG. 3 and FIG. 4, detailed description of which is thus omitted herefrom.

Figure 16:
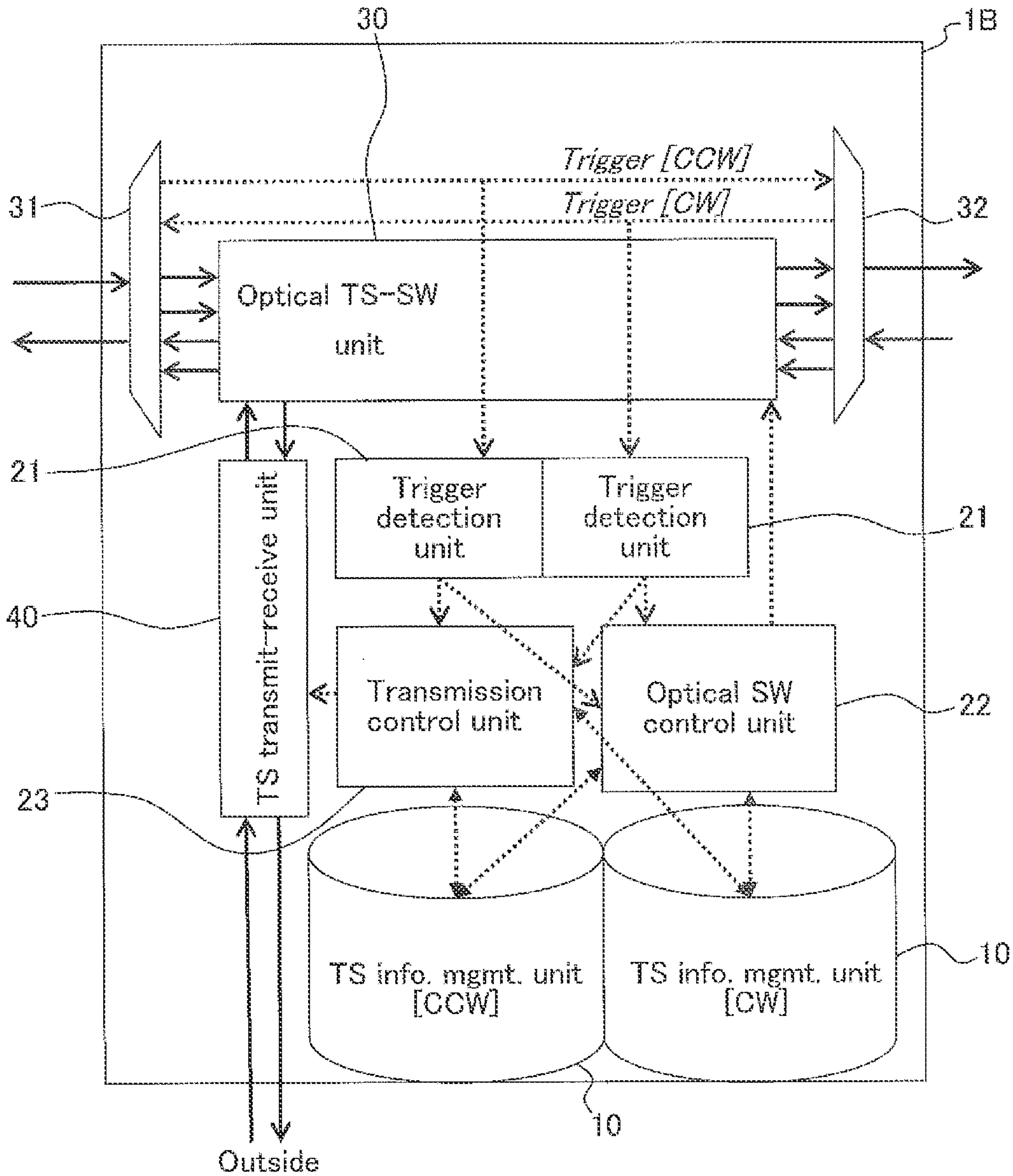
FIG. 16 is a block diagram illustrating an example of a configuration in a case where the physical topology is a bidirectional ring.

FIG. 16 is a block diagram illustrating an example of an optical switch node 1B on a bidirectional ring.

If the physical topology is bidirectional (a bidirectional ring), two trigger detection units 21 and two TS information management units 10 are provided, each one of which is used for clockwise, and the other, counterclockwise. Time slots can be allocated in such a transmission direction that communications between nodes avoid passing through a master node, which makes it possible to set the TS length or the TS period without depending on the ring length. The master node transmits a trigger clockwise or counterclockwise with respect to the ring. Based on TS information in the information management unit 10 corresponding to transmission and receipt directions of the trigger, each of the nodes transmits or receives data and changes over a switch in a direction same as the transmission and receipt directions of the trigger. If the node receives a clockwise trigger, the node uses the clockwise time slot information management unit 10 and appropriately transmits or receives data and changes over a switch, and so does the counterclockwise time slot information management unit 10.

Next are described variations of a configuration of a trigger transmission. FIG. 17A and FIG. 17B, and FIG. 18A and FIG. 18B are diagrams each illustrating a variation of the configuration example of the trigger transmission.

Figure 17A:
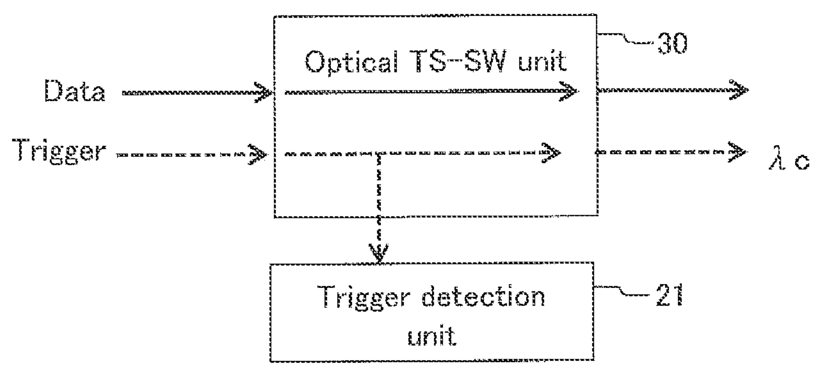
FIG. 17A is a diagram illustrating a variation example of a configuration of trigger transmission.
Figure 17B:
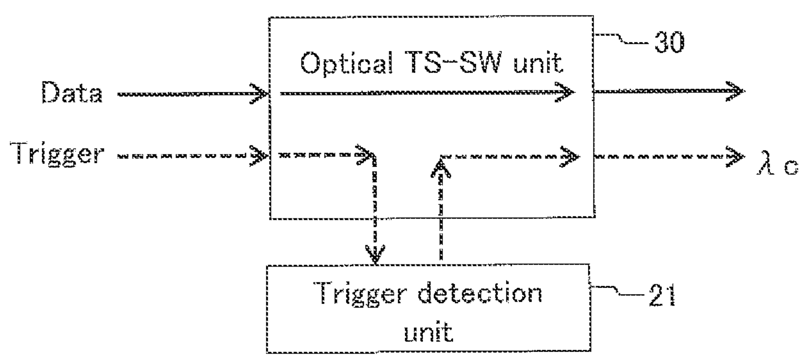
FIG. 17B is a diagram illustrating another variation example of the configuration of trigger transmission.
Figure 18A:
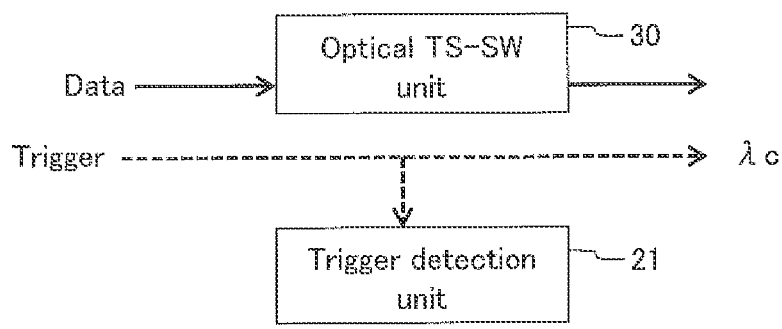
FIG. 18A is a diagram illustrating a still another variation example of the configuration of trigger transmission.
Figure 18B:
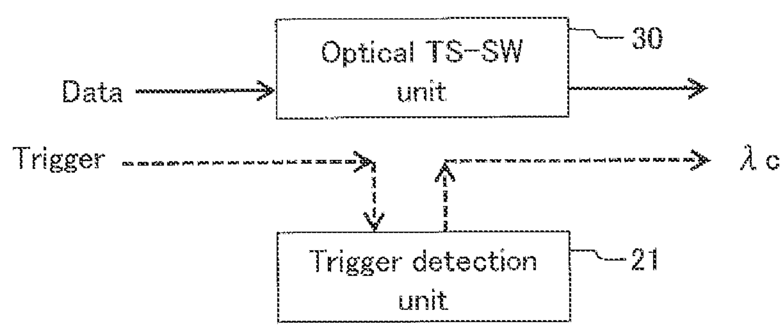
FIG. 18B is a diagram illustrating a yet another variation example of the configuration of trigger transmission.

FIG. 17A and FIG. 17B each illustrate a configuration example in a case where a trigger is made to pass through the optical TS-SW unit 30. FIG. 18A and FIG. 18B each illustrate a configuration example in a case where a trigger is not made to pass through the optical TS-SW unit 30.

In the configuration example illustrated in FIG. 17A, the optical TS-SW unit 30 is set at broadcast. The optical TS-SW unit 30 demultiplexes the trigger. In the configuration example illustrated in FIG. 17B, the optical TS-SW unit 30 is set at DROP/ADD. The trigger detection unit 21 demultiplexes the trigger.

In the configuration example illustrated in FIG. 18A, an electrical signal generated by OE-EO (optical-electrical) conversion, or an optical coupler demultiplexes the trigger. In the configuration example illustrated in FIG. 18B, the trigger detection unit 21 demultiplexes the trigger.

Next are described variations of a configuration of connection between the TS transmit-receive unit 40 and the optical TS-SW unit 30.

Figure 19A:
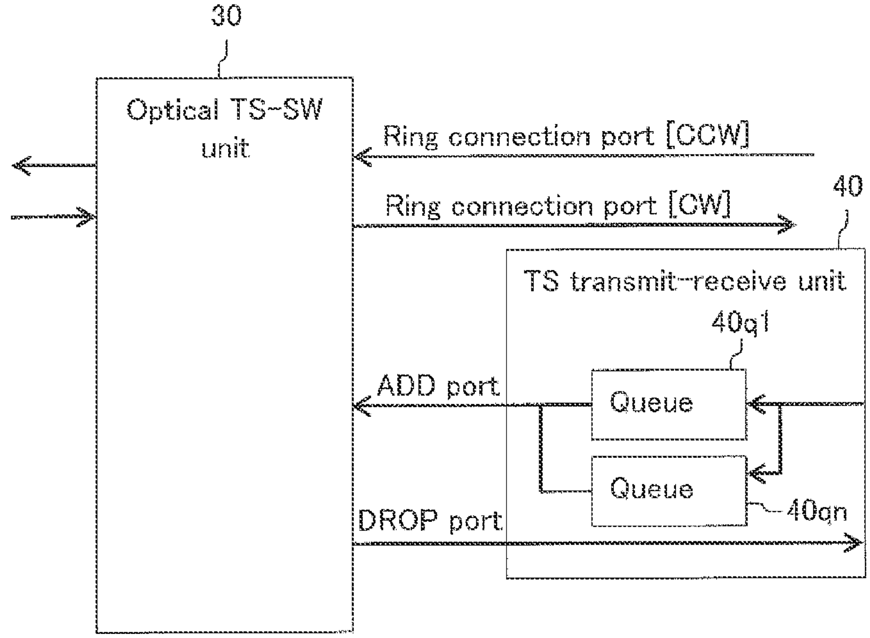
FIG. 19A is a diagram illustrating a configuration example in a case where connection between a TS transmit-receive unit and an optical TS-SW unit is configured as one input and one output.
Figure 19B:
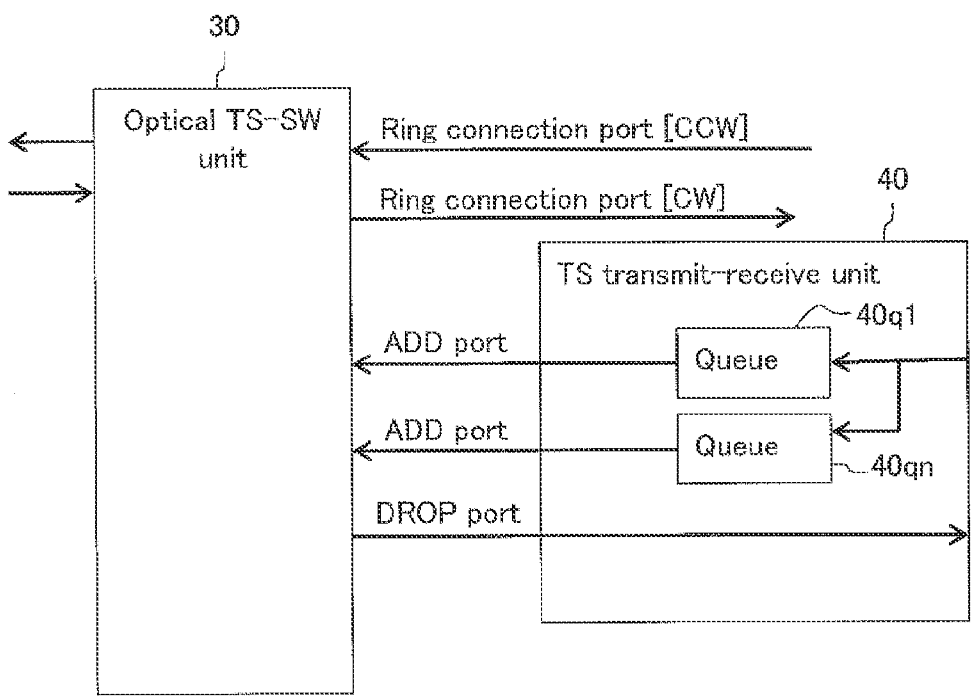
FIG. 19B is a diagram illustrating a configuration example in a case where connection between the TS transmit-receive unit and the optical TS-SW unit is configured as one input and an output for each queue.
Figure 19C:
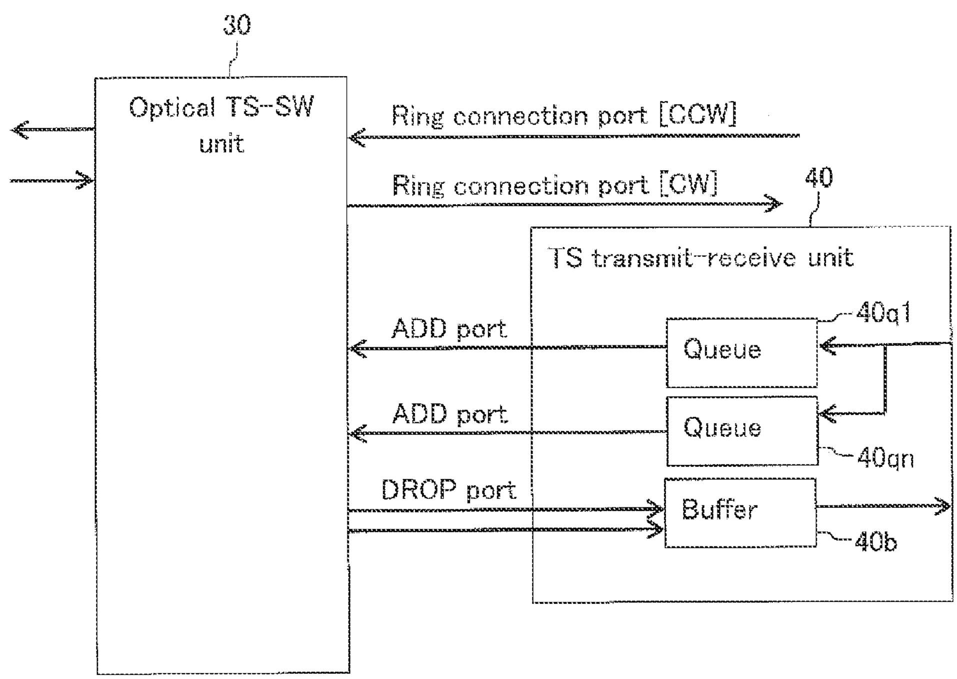
FIG. 19C is a diagram illustrating a configuration example in a case where connection between a TS transmit-receive unit and the optical TS-SW unit is configured as two inputs and an output for each queue.

FIG. 19A to FIG. 19C are diagrams each illustrating a variation of a configuration of connection between the TS transmit-receive unit 40 and the optical TS-SW unit 30.

FIG. 19A illustrates a configuration example in a case of one input and one output. FIG. 19B illustrates a configuration example in a case of one input and an output for each queue. FIG. 19C illustrates a configuration example in a case of two inputs and an output for each queue.

In the configuration illustrated in FIG. 19A, the TS transmit-receive unit 40 has a plurality of queues 40*q*1, 40*qn*. Transmitted data is stored in either of the queues according to a destination thereof. The TS transmit-receive unit 40 is connected to the optical TS-SW unit 30 with one port for each of ADD/DROP.

In the configuration illustrated in FIG. 19B, the TS transmit-receive unit 40 has a plurality of queues 40*q*1, 40*qn*. The TS transmit-receive unit 40 is connected to the optical TS-SW unit 30 with one ADD port for each queue. Data having different destinations can be thus outputted simultaneously if ring transmission directions of the data are different.

In the configuration illustrated in FIG. 19C, the TS transmit-receive unit 40 has a plurality of queues 40*q*1, 40*qn* and a buffer 40*b*. The TS transmit-receive unit 40 is connected to the optical TS-SW unit 30 also with two DROP ports. Data even simultaneously transmitted from both sides can be thus received.

Next is described a variation of how to supply a clock used for counting an elapsed time in the optical SW control unit 22 and the transmission control unit 23.

Figure 20A:
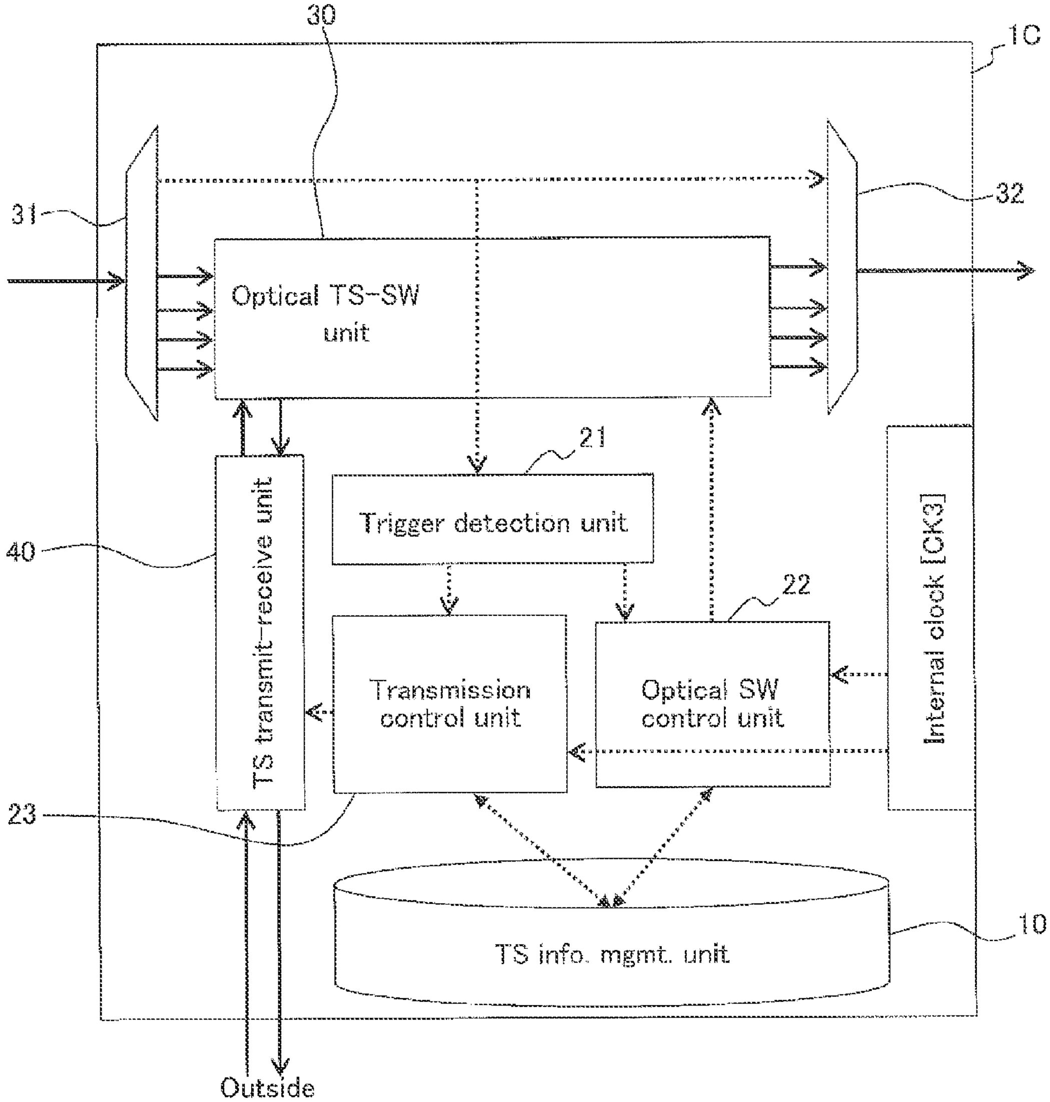
FIG. 20A is a diagram for explaining a variation of how to supply a clock.
Figure 20B:
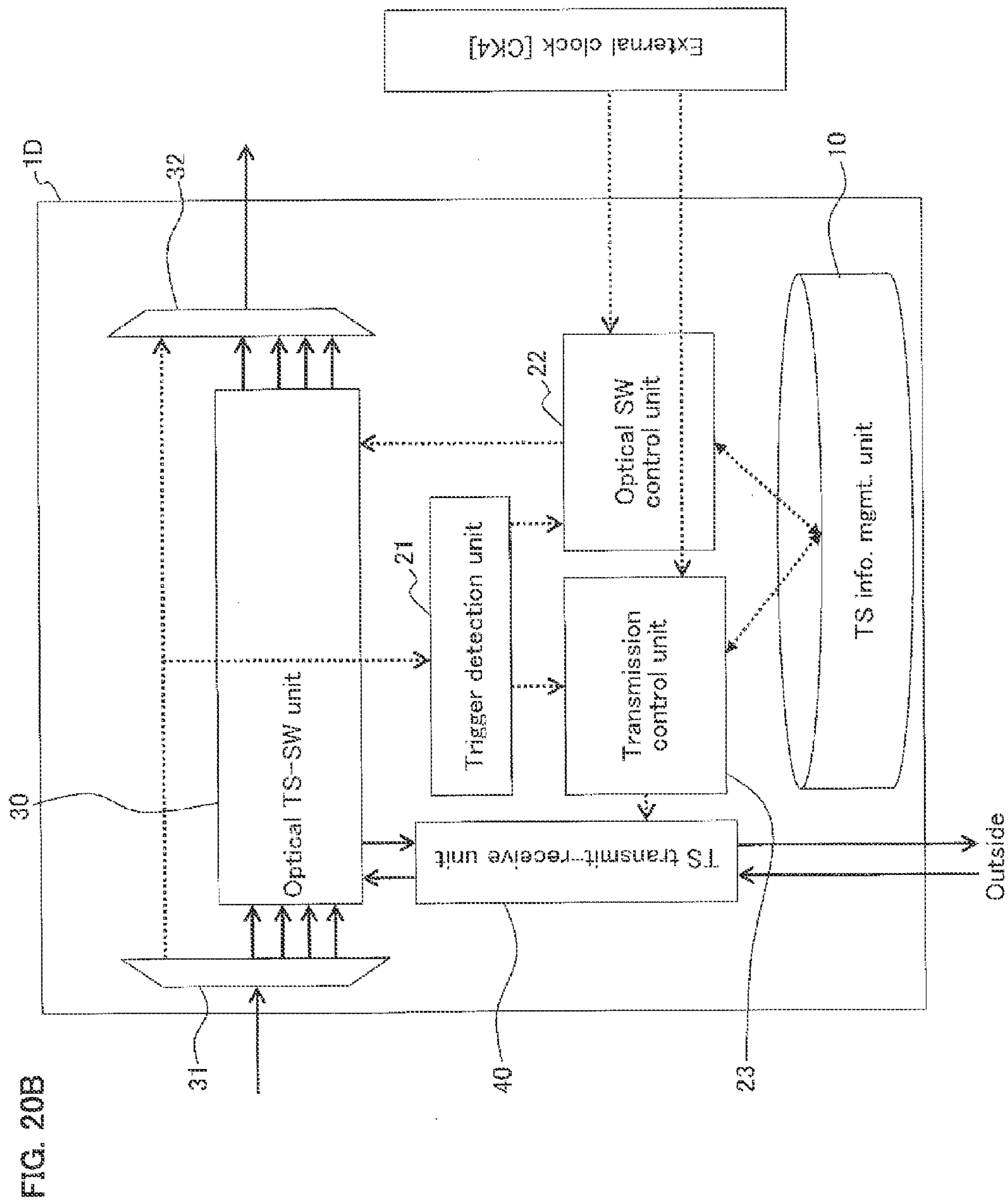
FIG. 20B is a diagram for explaining another variation of how to supply a clock.

FIG. 20A and FIG. 20B are diagrams for explaining variations of how to supply a clock.

FIG. 20A is a block diagram illustrating a configuration of an optical switch node 1C in which an internal clock (CK3) is used for counting an elapsed time. The internal clock (CK3) used herein may be a cesium oscillator, a rubidium oscillator, a crystal oscillator or the like. FIG. 20B is a block diagram illustrating a configuration of an optical switch node 1D in which an external clock (CK4) is used for counting an elapsed time. The external clock (CK4) used herein may be a GPS (Global Positioning System) clock and a JJY clock (a Japan standard radio wave clock) or the like.

In the first embodiment, a wavelength path having a single wavelength is divided into time slots, and the time slots are allocated to a plurality of nodes such that the time slots are not overlapped one another. This makes it possible to transmit or receive data or switch a route for each node. Thus, the number of nodes can be increased without depending on the number of wavelength paths.

Second Embodiment

A second embodiment is configured such that time slot information is embedded in a trigger and is delivered to a node with the trigger embedded therein.

Figure 21:
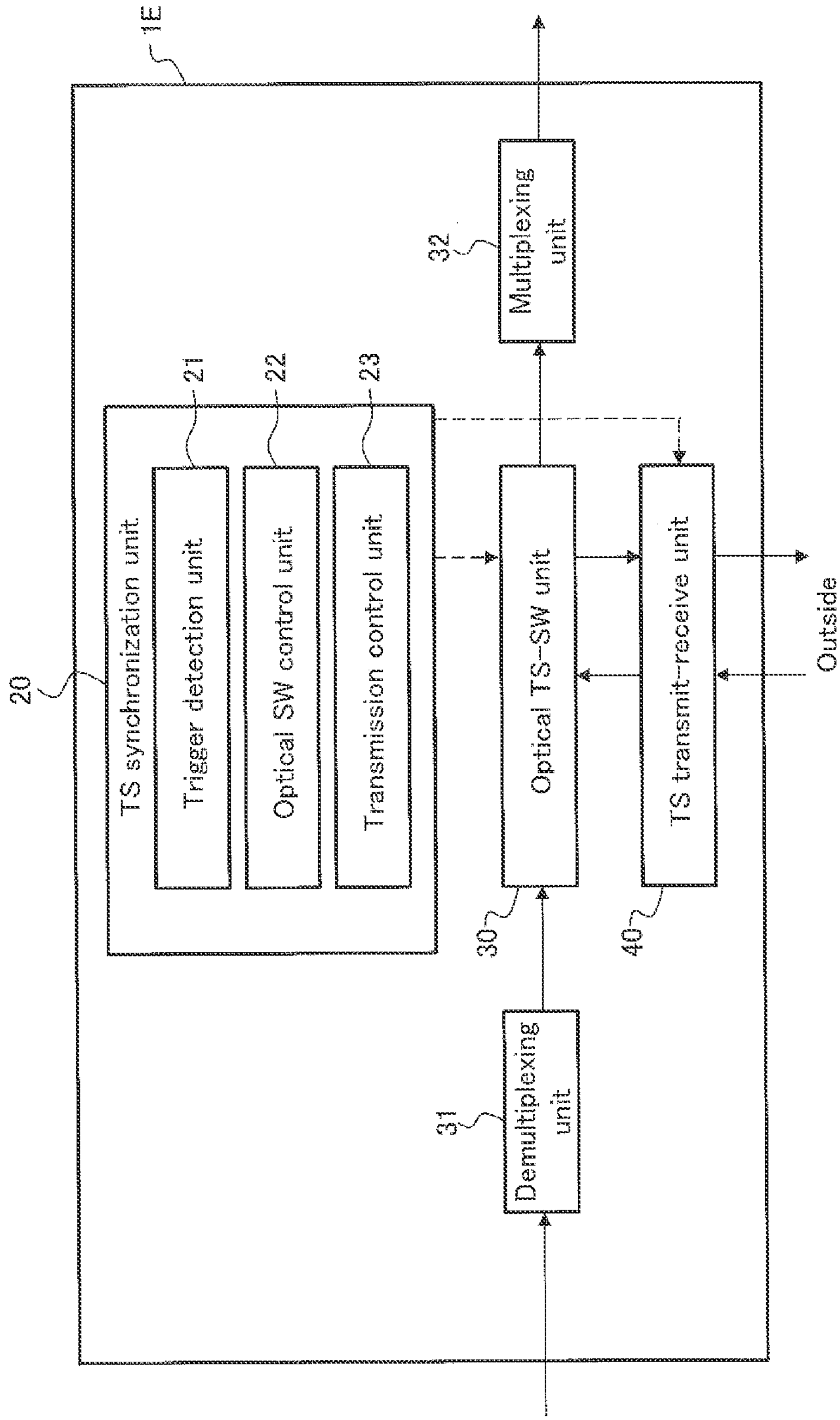
FIG. 21 is a block diagram illustrating a configuration example of an optical switch node according to a second embodiment.
Figure 22:
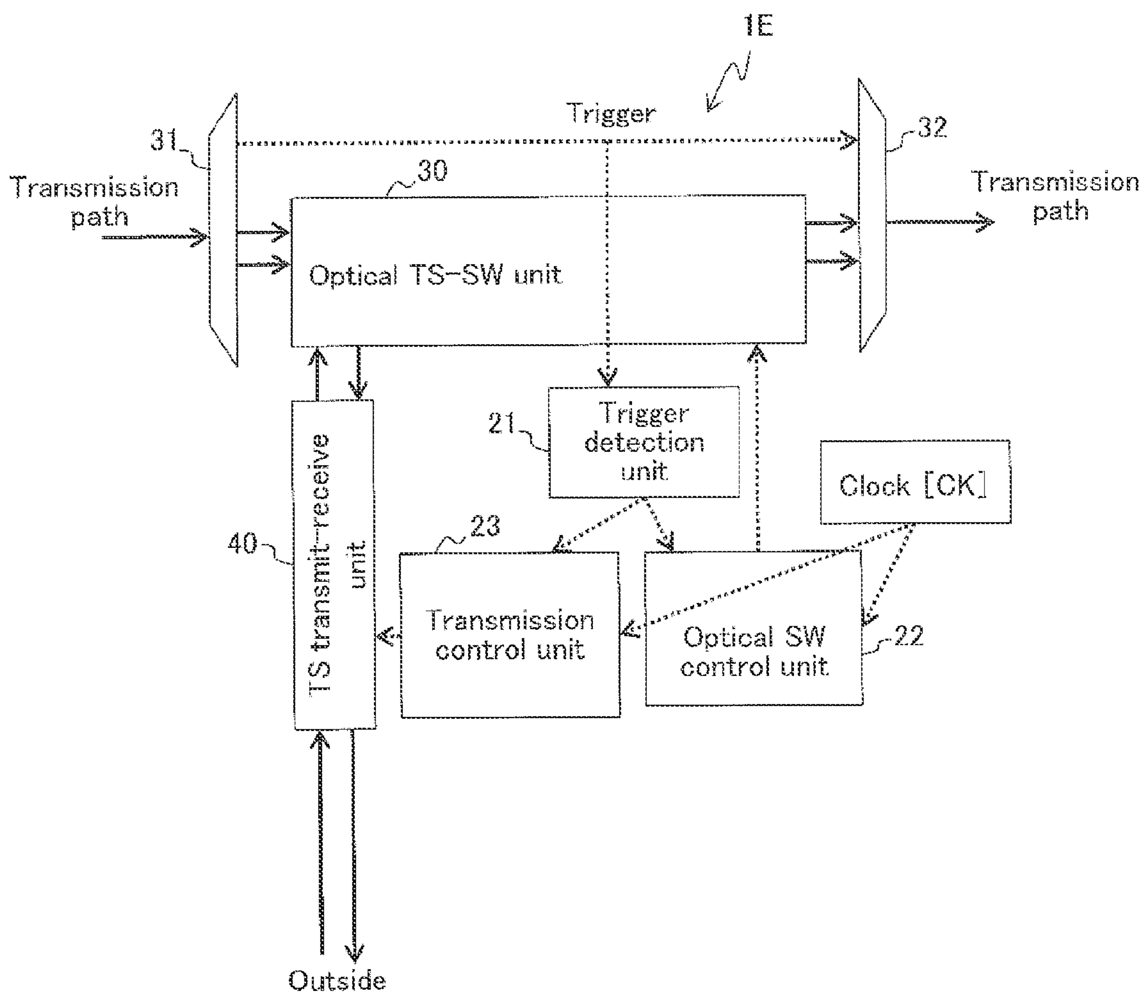
FIG. 22 is a diagram schematically illustrating transmission routes of a control signal and an optical signal in the optical switch node illustrated in FIG. 21.

FIG. 21 is a block diagram illustrating a configuration example of an optical switch node 1E according to a second embodiment. FIG. 22 is a diagram schematically illustrating transmission routes of a control signal and an optical signal in the optical switch node 1E illustrated in FIG. 21.

As illustrated in FIG. 21, the optical switch node 1E according to the second embodiment does not include the TS information management unit 10 illustrated in FIG. 3. Meanwhile, in the second embodiment, as illustrated in FIG. 22, the trigger detection unit 21 transfers, upon receipt of a trigger, the TS information embedded in the trigger, to the transmission control unit 23 and the optical SW control unit 22.

Figure 23:
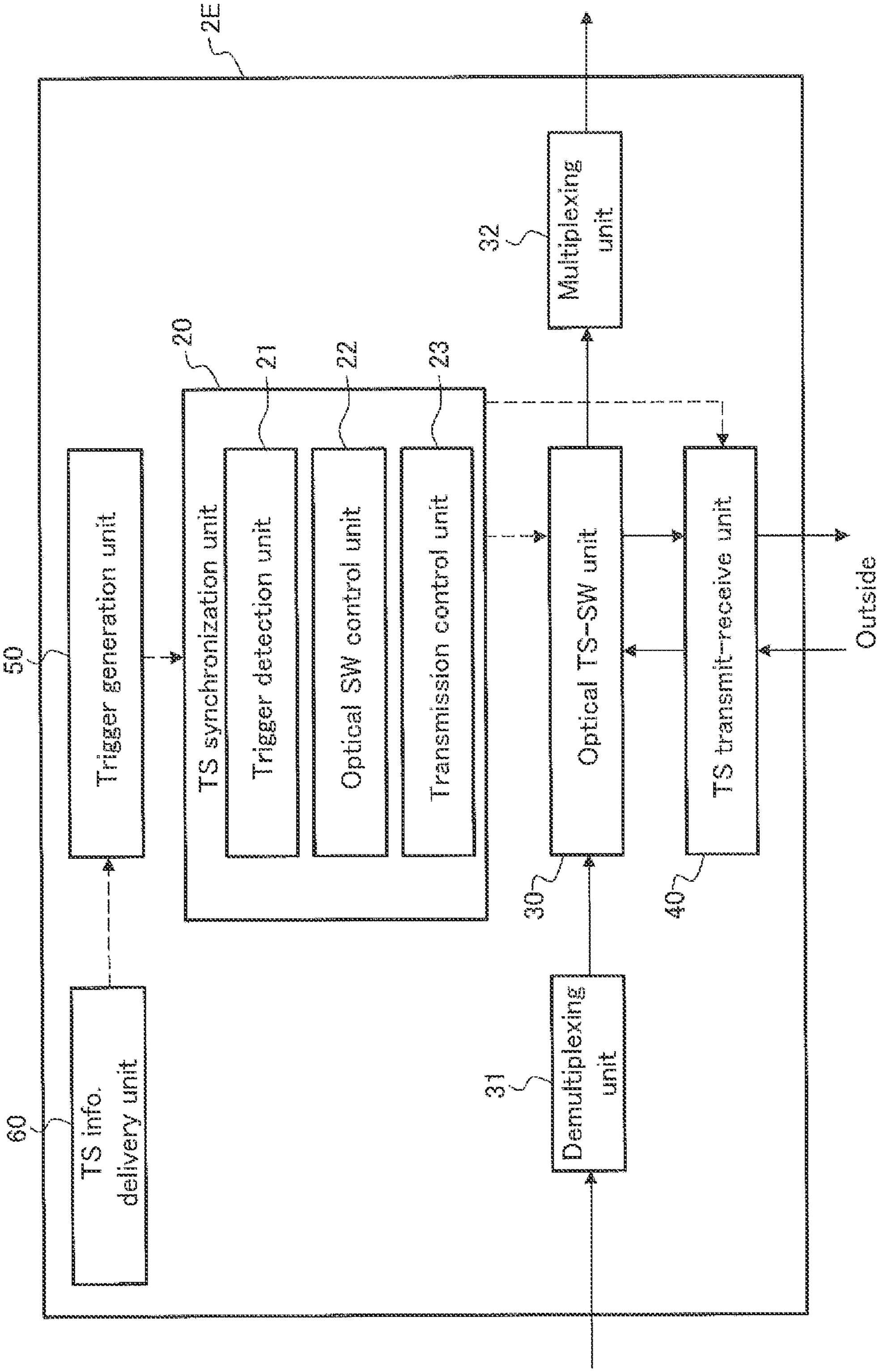
FIG. 23 is a block diagram illustrating a configuration example of a master optical switch node according to the second embodiment.
Figure 24:
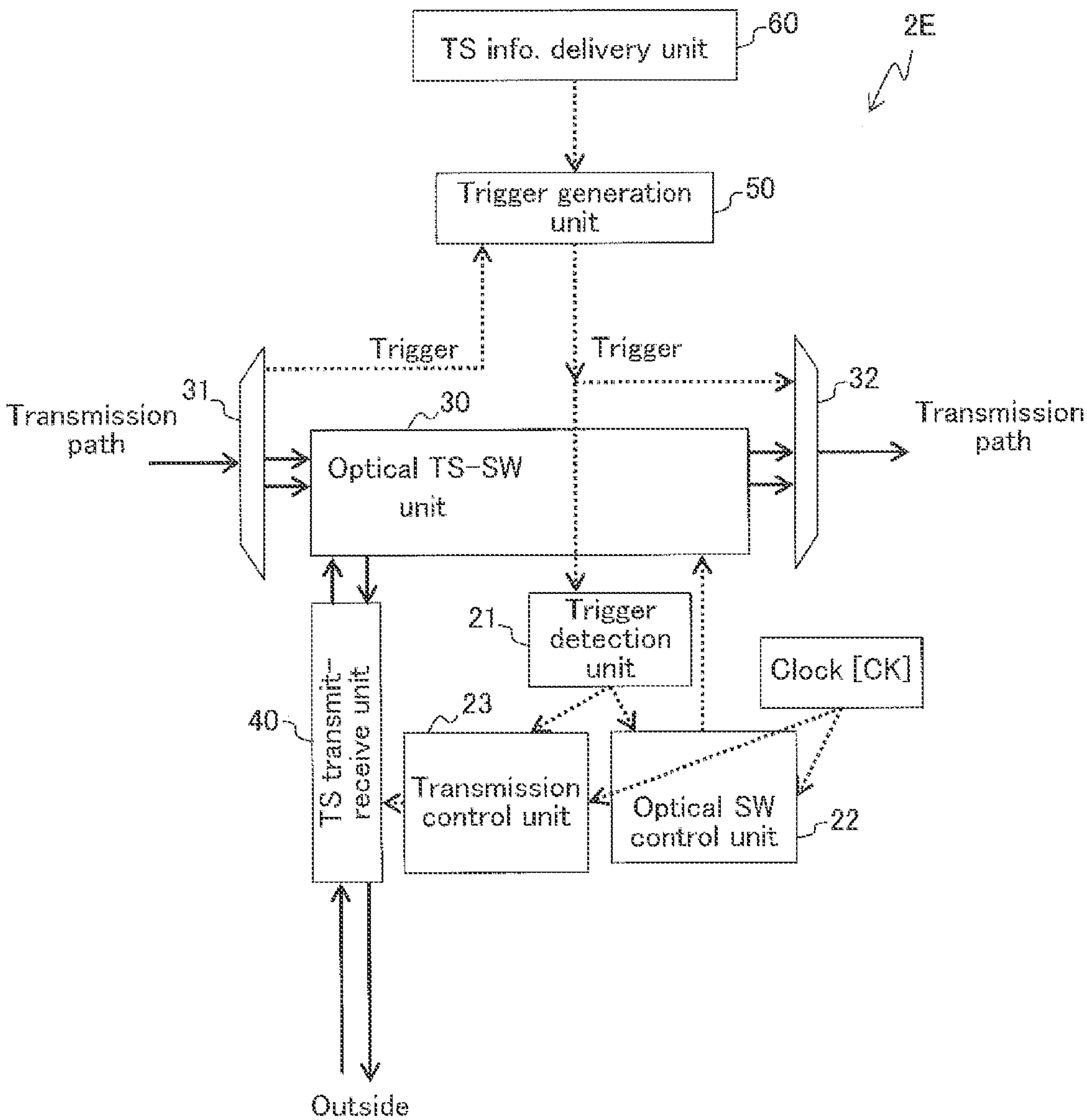
FIG. 24 is a diagram schematically illustrating transmission routes of a control signal and an optical signal in the master optical switch node illustrated in FIG. 23.

FIG. 23 is a block diagram illustrating a configuration example of a master optical switch node (a master node) 2E according to the second embodiment. FIG. 24 is a diagram schematically illustrating transmission routes of a control signal and an optical signal in the master node 2E illustrated in FIG. 23.

The master node 2E according to the second embodiment has a configuration similar to that of the master node 2 illustrated in FIG. 5 except that, as illustrated in FIG. 23 and FIG. 24, the master node 2E further includes a TS information delivery unit 60 that embeds the TS information in the trigger and delivers the trigger with the TS information embedded therein.

Next are described operations of the optical network system according to the second embodiment when the trigger output interval is the "TS length".

Figure 25:
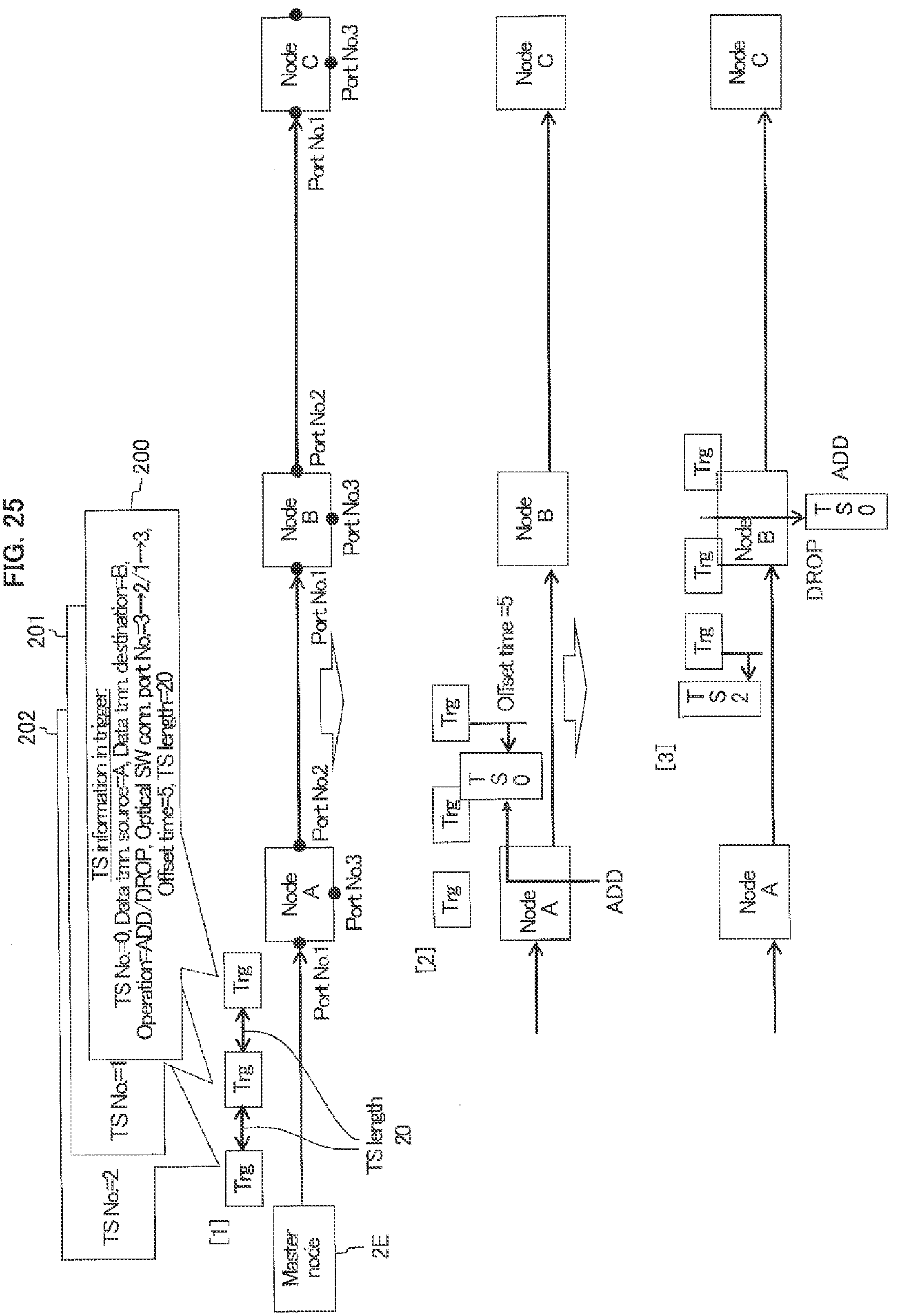
FIG. 25 is a schematic diagram when a trigger output interval is a "TS length" in an optical network system according to the second embodiment.

FIG. 25 is a diagram for explaining operations in the optical network system according to the second embodiment, when the trigger output interval is the "TS length". Referring to FIG. 25, the operations are described in a case where a data is transmitted from node A to node B using an optical signal.

As illustrated in [1], the master node 2E writes TS information 200, 201, and 202 into a trigger and transmits the trigger at intervals of the TS length. Information herein is assumed to be of 1 trigger 1 TS. FIG. 25 illustrates how the master node 2E transmits three pieces of TS information having TS numbers=0 to 2, as exemplified in the TS information 200, 201, and 202.

As illustrated in [2], upon receipt of the trigger, node A reads the TS information in the trigger, and, if a data transmission source or a data transmission destination is node A itself, performs an appropriate operation corresponding to that in the TS information after an offset time (herein, 5 counts). If the TS information has the TS number=0, a node as a data transmission source is the node itself. Thus, node A performs an ADD of the data after the offset time. Upon receipt of a subsequent trigger, node A performs an operation similarly to the described above.

As illustrated in [3], upon receipt of the trigger, node B: reads the TS information in the trigger, and, if a data transmission source or a data transmission destination is node B itself, performs an appropriate operation corresponding to that in the TS information after the offset time. That is, if the TS information has the TS number=0, a node as a data transmission source is the node itself. Thus node B performs DROP of the data after the offset time. Upon receipt of a subsequent trigger, node B performs an operation similarly to the described above.

In the second embodiment, advantageous effects similar to those in the first embodiment can be obtained. Further, it is not necessary to provide each of the master node 2E and the optical switch node 1E with the TS information management unit 10.

Next is described a variation in which TS synchronization is performed not by a trigger delivered from the master node but by a time.

How to perform the TS synchronization to be described herein is characterized in that a TS start is specified by a time. The synchronization by the above-described trigger requires that a trigger and a data pass the same route. However, the TS synchronization specified by a time allows a preliminary setting of a TS start time, and does not require that the TS start time and a data pass the same route even in a case of delivering the TS start time.

When a time is set at a node, two cases can be contemplated. One is that a time to which a delay time is added corresponding to a data transmission path relative to a time of a master node (to be detailed hereinafter in a third embodiment and a fourth embodiment) is set. The other is that a time common to all nodes is set (to be detailed hereinafter in a fifth embodiment).

When the time to which the delay time is added is set, a TS start time can be advantageously made to be common to all nodes. When the common time is set, the time can be set using the GPS or the like.

Third Embodiment

An optical network system according to a third embodiment is configured such that a time at a node is set at a time shifted by a transmission delay time, by transmitting a time stamp from a master node. Thus, time slots are synchronized at a time common to all nodes, at which data transmission and receipt can be realized.

Next is described a configuration of an optical switch node according to this embodiment.

Figure 26:
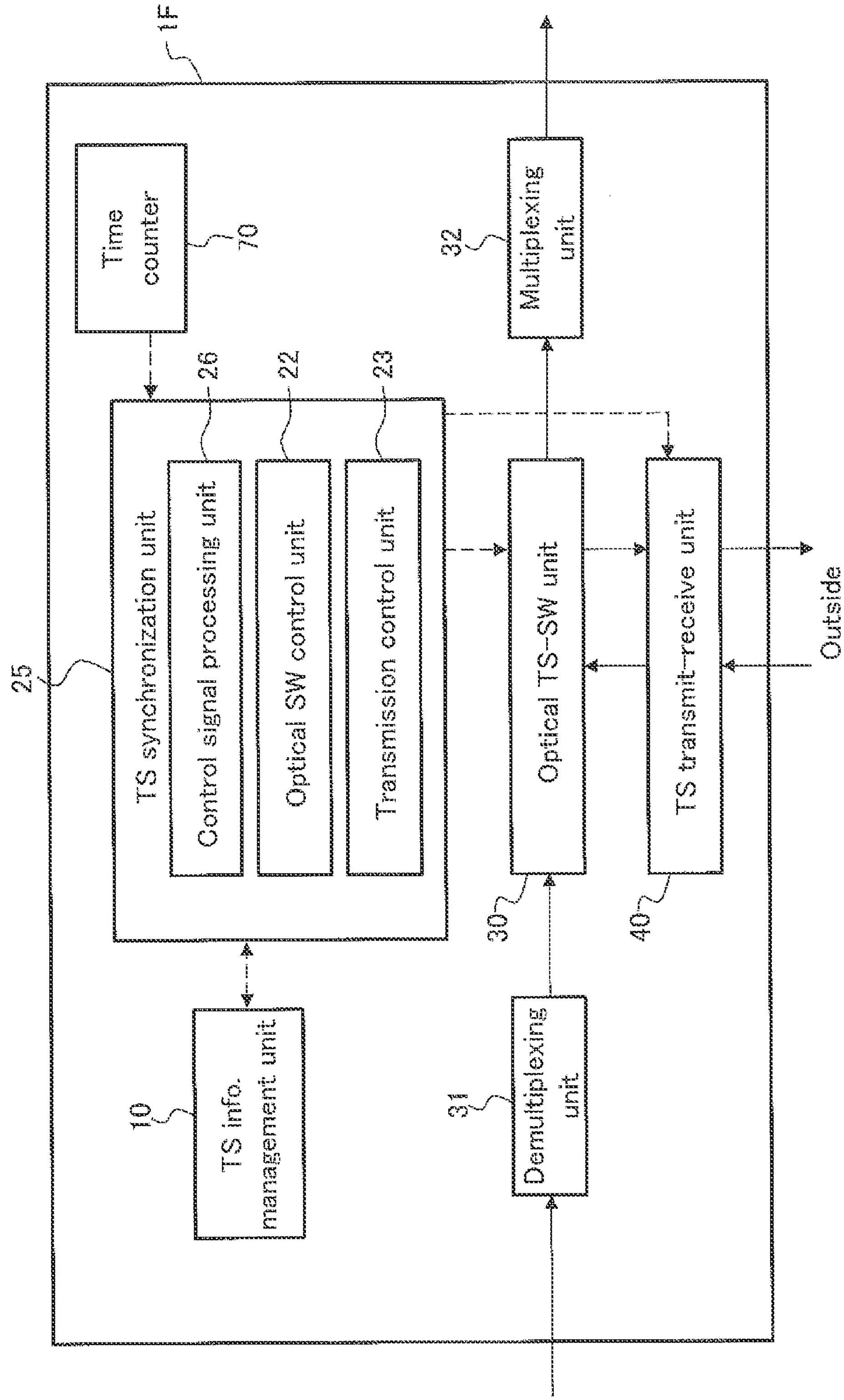
FIG. 26 is a block diagram illustrating a configuration example of an optical switch node according to a third embodiment.
Figure 27:
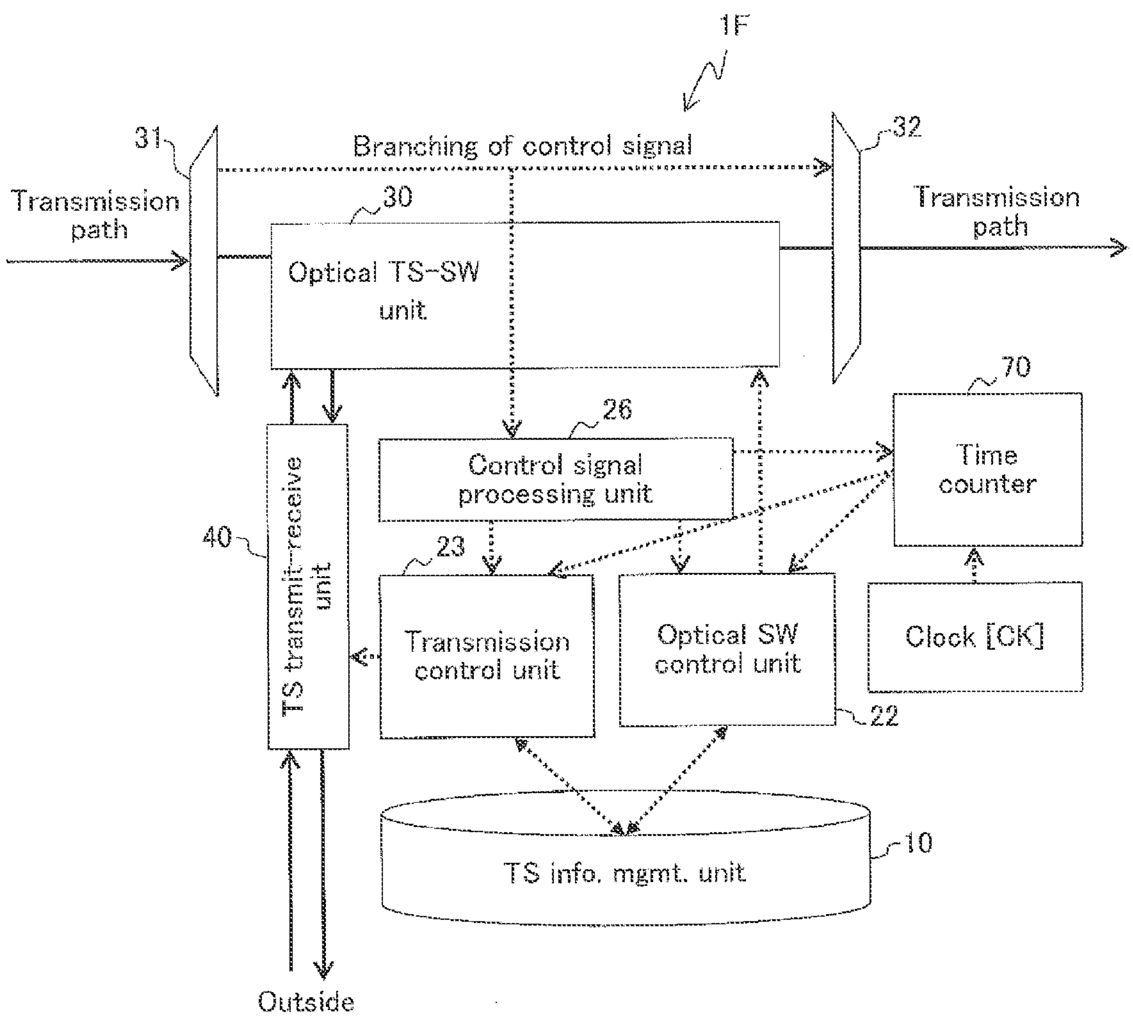
FIG. 27 is a diagram schematically illustrating transmission routes of a control signal and an optical signal in the optical switch node illustrated in FIG. 26.

FIG. 26 is a block diagram illustrating a configuration example of an optical switch node 1F according to the third embodiment. FIG. 27 is a diagram schematically illustrating transmission routes of a control signal and an optical signal in the optical switch node 1F illustrated in FIG. 26.

As illustrated in FIG. 26, the optical switch node 1F includes a TS information management unit 10 that sets TS information; a TS synchronization unit 25; a time counter 70; an optical TS-SW unit 30; and a TS transmit-receive unit 40. The TS synchronization unit 25 includes; a control signal processing unit 26; a transmission control unit 23; and an optical SW control unit 22. The optical TS-SW unit 30 is connected to a demultiplexing unit 31 on an input side of an optical signal and is connected to a multiplexing unit 32 on an output side of the optical signal.

Next description is made with reference to FIG. 27. The control signal processing unit 26: detects a control signal for synchronizing timings of time slots of nodes; notifies the time counter 70 of a time stamp value of the signal; and also notifies the transmission control unit 23 and the optical SW control unit 22 of a time slot start time (which may also be referred to as a TS start time hereinafter) in the signal.

The time counter 70: sets a counter value at the time stamp value notified by the control signal processing unit 26; and supplies the transmission control unit 23 and the optical SW control unit 22 with the counter value.

Upon receipt of the TS start time notified by the control signal processing unit 26, the transmission control unit 23: references the TS information management unit 10; and, when a counter value supplied from the time counter 70 reaches the TS start time, gives a start instruction to the TS transmit-receive unit 40 using a time slot allocated to the transmission control unit 23 itself.

The TS transmit-receive unit 40: stores data inputted from outside in a buffer (not shown); transmits the data read from the buffer in accordance with an instruction from the transmission control unit 23, to the optical TS-SW unit 30; and transmits the data received from the optical TS-SW unit 30, to outside.

Upon receipt of the TS start time notified by the control signal processing unit 26, the optical SW control unit 22: references the TS information management unit 10; and instructs the optical TS-SW unit 30 to switch routes at a time slot allocated to the optical SW control unit 22 itself, when the counter value supplied from the time counter 70 indicates the TS start time.

The optical TS-SW unit 30 switches routes under the switching instruction from the optical SW control unit 22.

Next is described a configuration of a master optical switch node according to the third embodiment.

Figure 28:
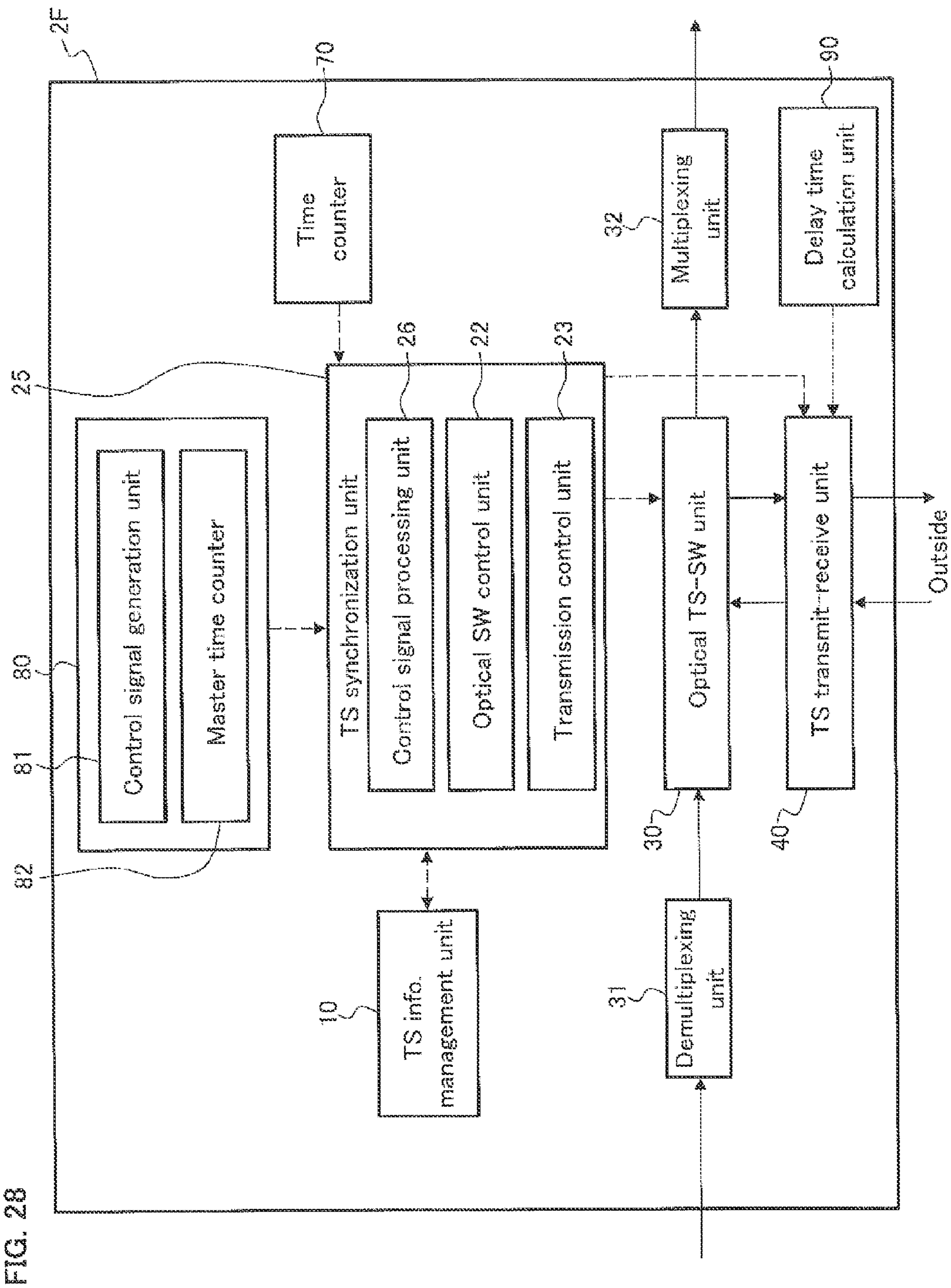
FIG. 28 is a block diagram illustrating a configuration example of a master optical switch node according to the third embodiment.
Figure 29:
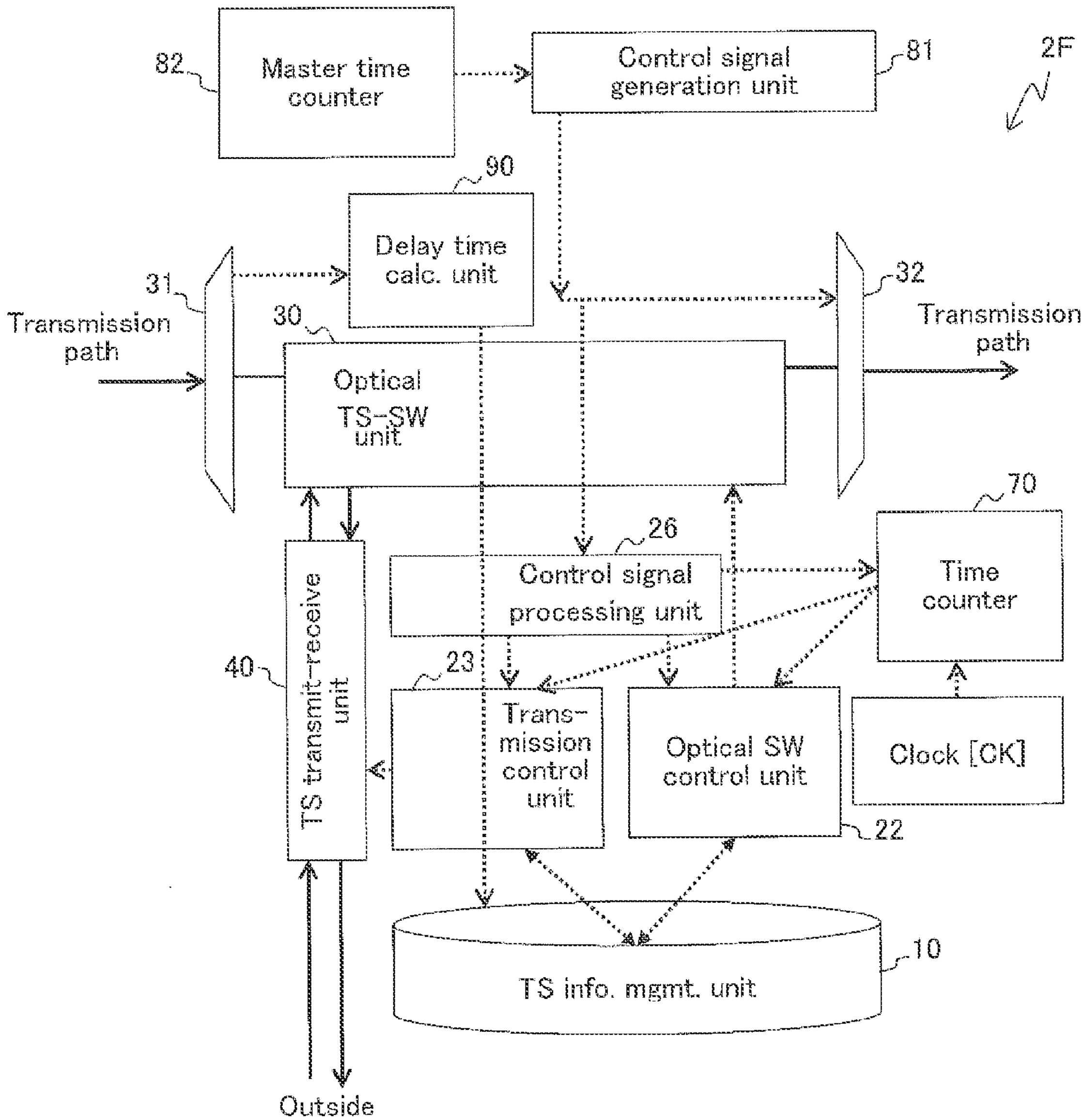
FIG. 29 is a diagram schematically illustrating transmission routes a control signal and an optical signal in the master optical switch node illustrated in FIG. 28.

FIG. 28 is a block diagram illustrating a configuration example of a master optical switch node (a master node) 2F according to the third embodiment. FIG. 29 is a diagram schematically illustrating transmission routes of a control signal and an optical signal in the master node 2F illustrated in FIG. 28.

As illustrated in FIG. 28, the master node 2F includes: a TS start delivery unit 80; and a delay time calculation unit 90, in addition to the configuration described with reference to FIG. 26. The TS start delivery unit 80 includes: a control signal generation unit 81; and a master time counter 82.

Next description is made with reference to FIG. 29. The master time counter 82 supplies the control signal generation unit 81 with a counter value.

The control signal generation unit 81: generates a control signal containing a TS start time; adds the counter value supplied from the master time counter 82 as a time stamp, to the control signal; and transmits the control signal to the node 1F.

The delay time calculation unit 90 subtracts the time stamp value from a time when the control signal after making one round of a ring is received; calculates a time required for one round of the ring; and writes a result of the calculation to the TS information management unit 10.

Operations of the optical network system according to the third embodiment are similar to those according to a fourth embodiment to be described hereinafter, detailed description of which is thus omitted herefrom.

In the third embodiment, a time at each of the nodes 1F is set at a time shifted by a transmission delay time, by transmitting a time stamp from the master node 2F. Thus, time slots are synchronized at a time common to all the nodes 1F, at which data transmission and receipt can be realized.

Fourth Embodiment

A fourth embodiment is configured such that, in the optical network system according to the third embodiment, a master node delivers TS information to each of nodes.

Figure 30:
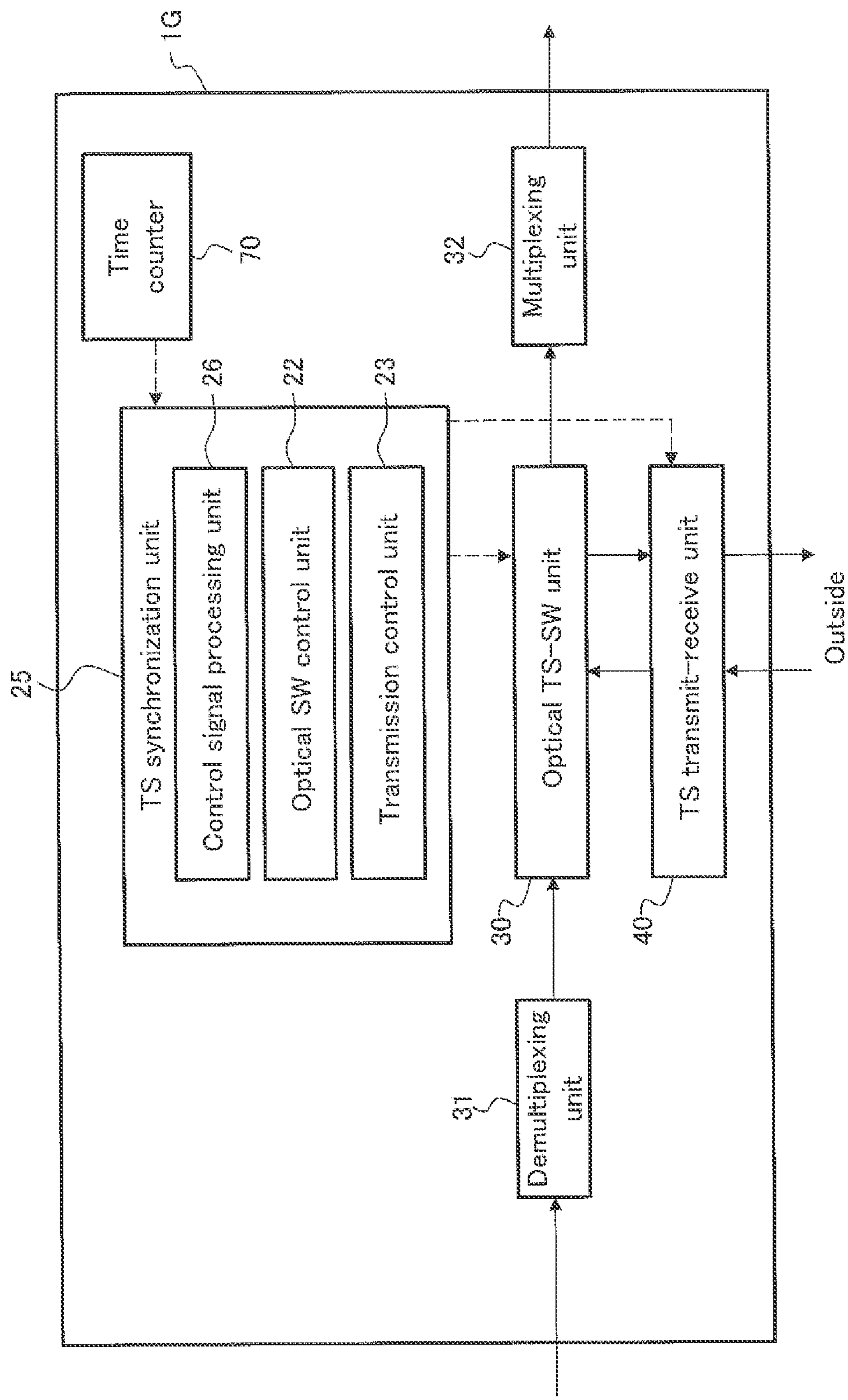
FIG. 30 is a block diagram illustrating a configuration example of an optical switch node according to a fourth embodiment.
Figure 31:
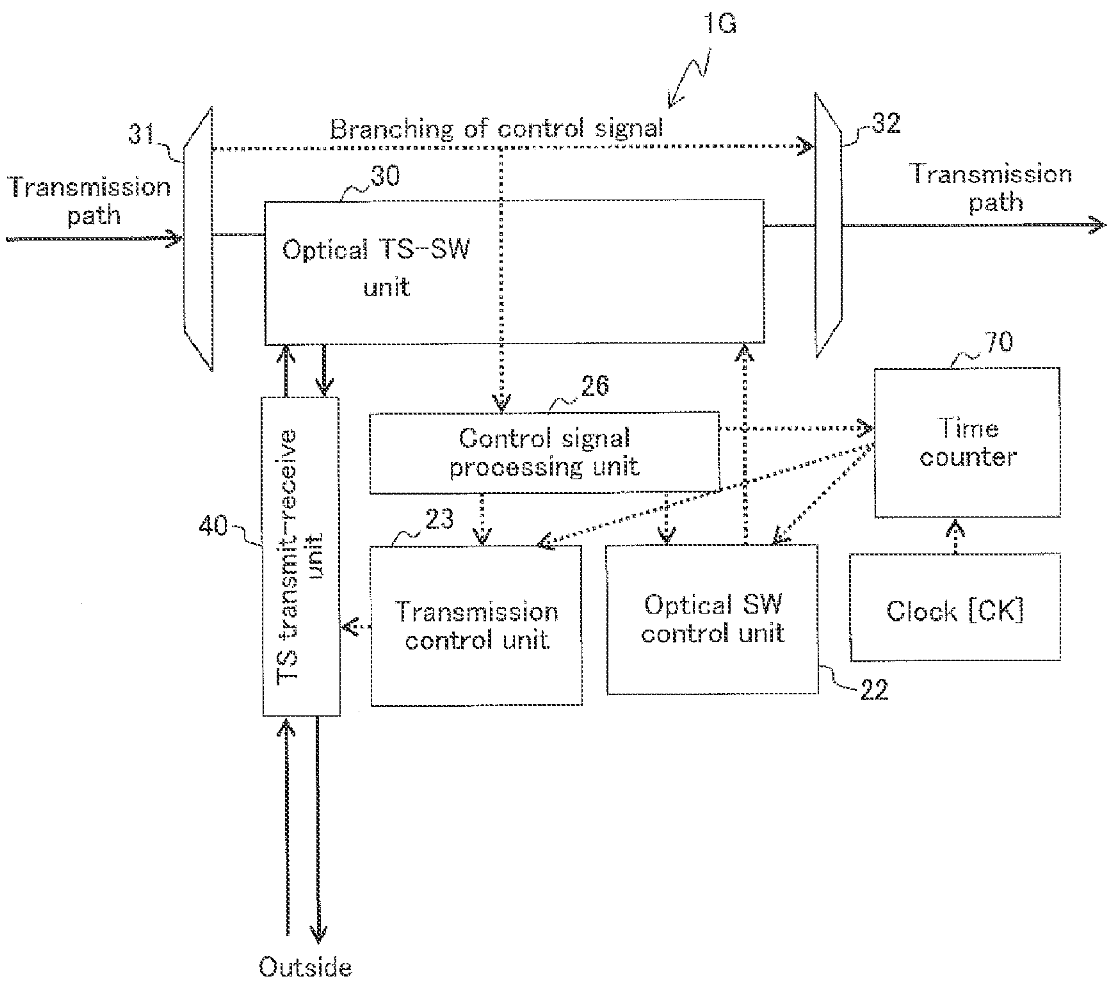
FIG. 31 is a diagram schematically illustrating transmission routes of a control signal and an optical signal in the optical switch node illustrated in FIG. 30.

FIG. 30 is a block diagram illustrating a configuration example of an optical switch node 1G according to the fourth embodiment. FIG. 31 is a diagram schematically illustrating transmission routes of a control signal and an optical signal in the optical switch node 1G illustrated in FIG. 30. As illustrated in FIG. 30, the optical switch node 1G in this embodiment is similar to the optical switch node 1F illustrated in FIG. 26, except that the optical switch node 1G does not include the TS information management unit 10.

Figure 32:
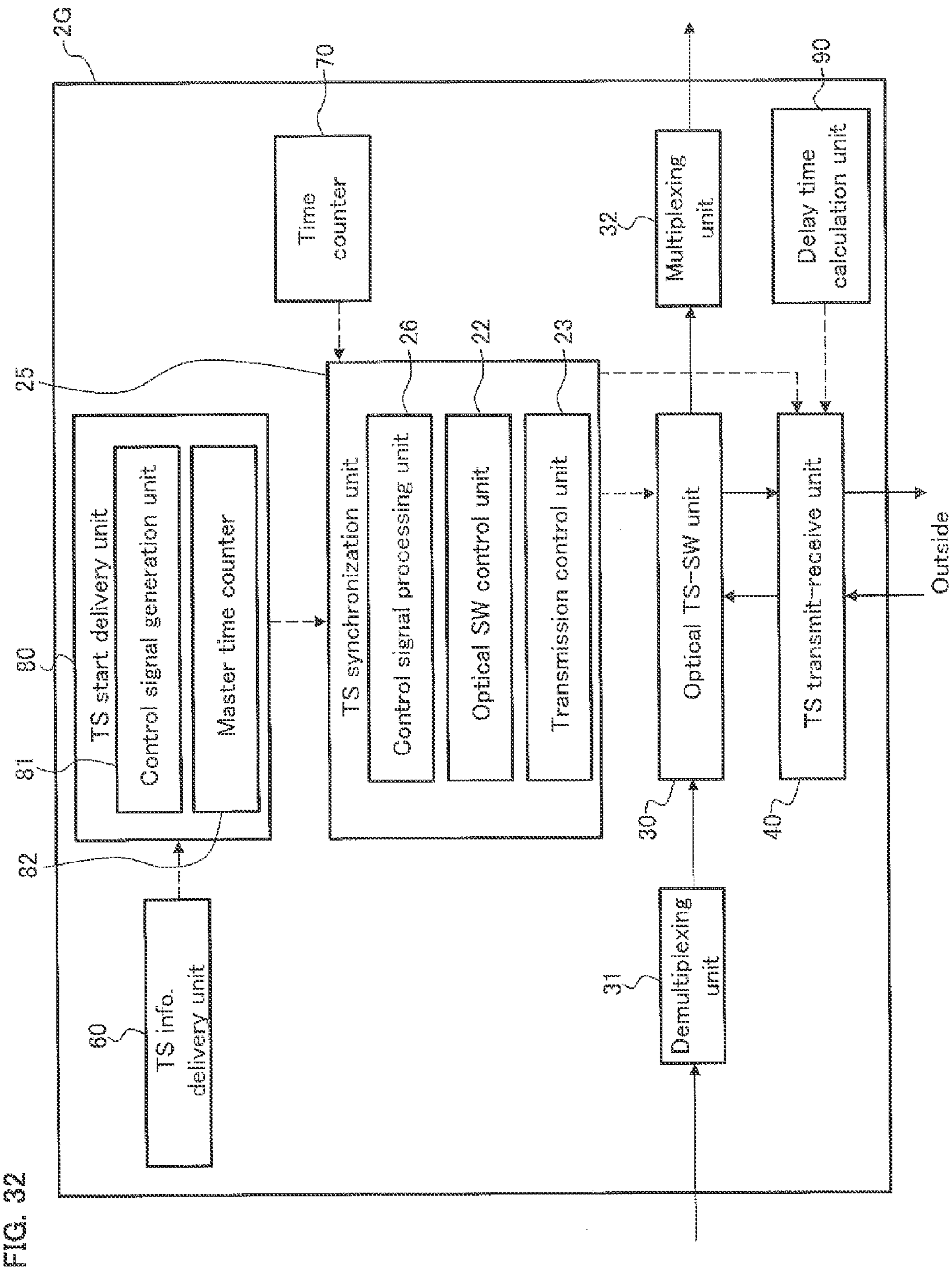
FIG. 32 is a block diagram illustrating a configuration example of a master optical switch node according to the fourth embodiment.
Figure 33:
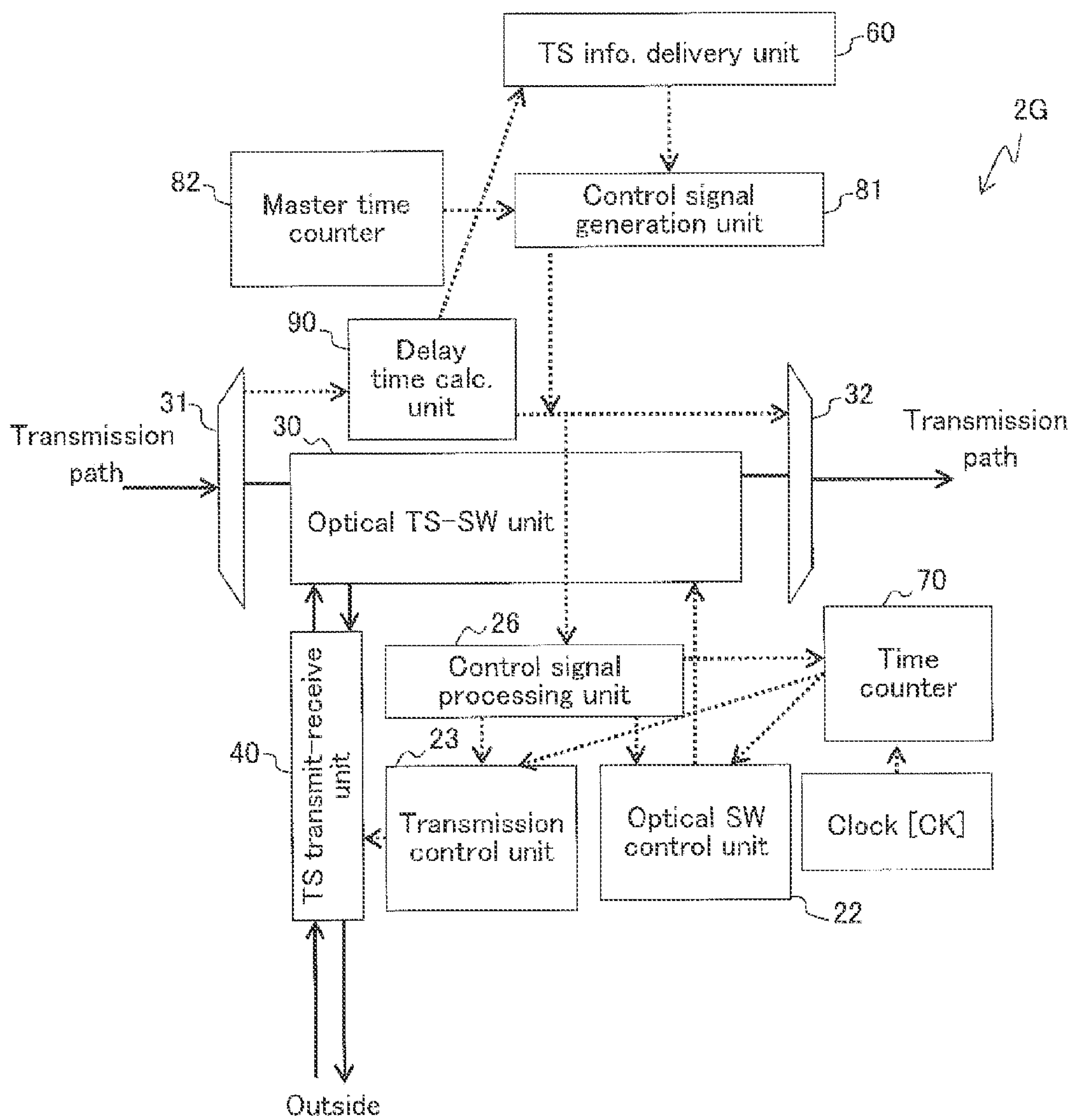
FIG. 33 is a diagram schematically illustrating transmission routes of a control signal and an optical signal in the master optical switch node illustrated in FIG. 32.

FIG. 32 is a block diagram illustrating a configuration example of a master optical switch node (a master node) 2G according to the fourth embodiment. FIG. 33 is a diagram schematically illustrating transmission routes of a control signal and an optical signal in the master node 2G illustrated in FIG. 32.

Compared to the configuration illustrated in FIG. 28, as illustrated in FIG. 32, the master node 2G includes the TS information delivery unit 60 that supplies the control signal generation unit 81 with the TS information, though not including the TS information management unit 10.

In the optical network system configured as described above, a variation is described in a case where a time is utilized with a TS start delivery function and a TS synchronization function, and a time counter is set at a time with a delay difference added thereto.

FIG. 34 is a diagram illustrating a variation in the case where a time is utilized with a TS start delivery function and a TS synchronization function, and a time counter is set at a time with a delay difference added thereto. As illustrated in a lower part of FIG. 34, as a control signal for use in setting the TS information, a plurality of pieces of information may be put together and contained into a control signal SS, and then transmitted. Alternatively, a plurality of pieces of the information may be separated and contained into control signals SS1, SS2, SS3, and then transmitted. That is, the control signal SS contains a TS start time, a time stamp, and the TS information all together. Meanwhile, the control signal SS1 contains the TS start time, the control signal SS2 contains the time stamp, and the control signal SS3 contains the TS information.

Next are described operations of the optical network system according to the fourth embodiment.

Figure 35:
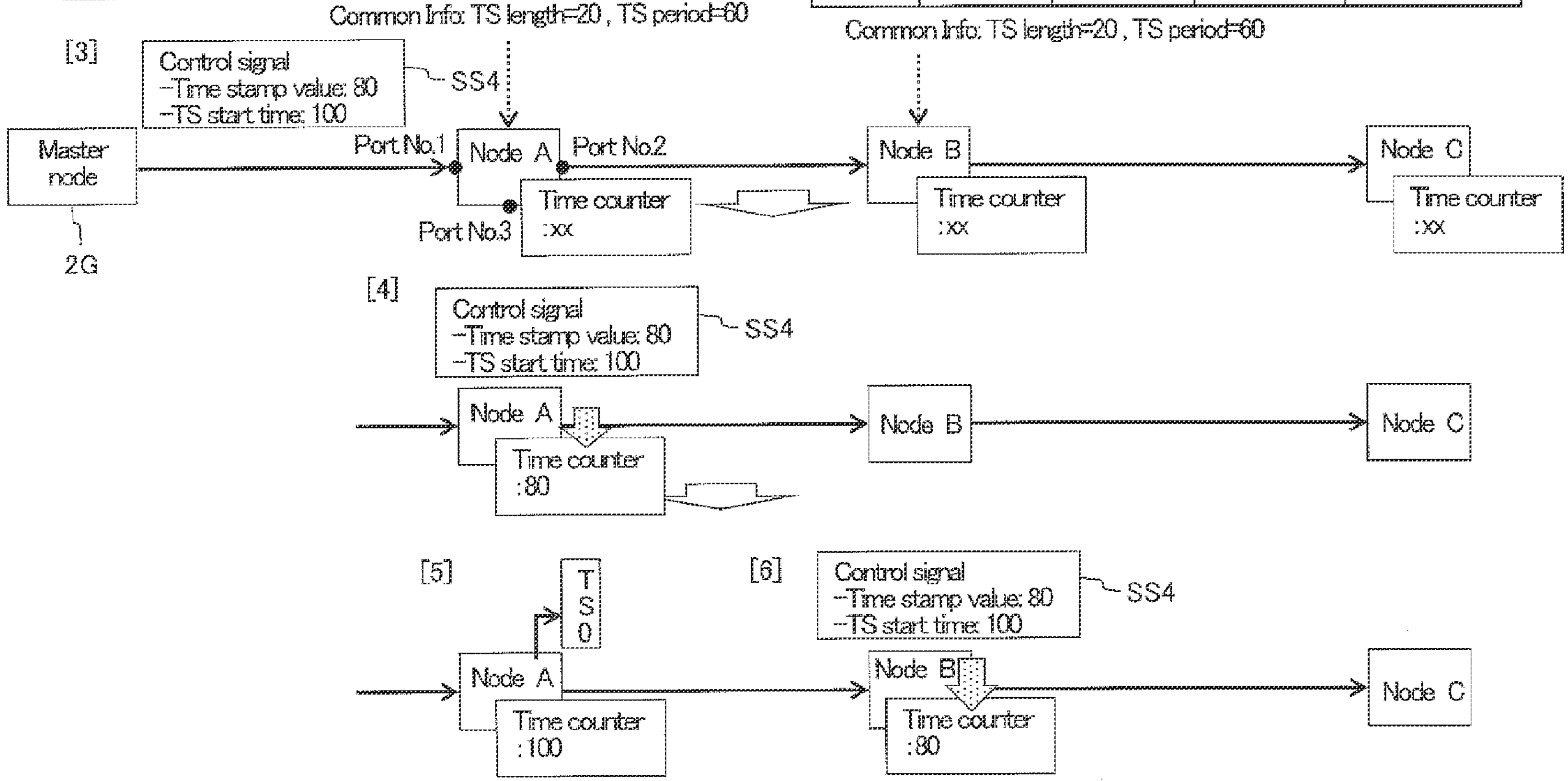
FIG. 35 is a diagram for explaining operations of No. 2002 of FIG. 34.

FIG. 35 is a diagram for explaining operations of No. 2002 illustrated in FIG. 34. Referring to FIG. 35, next is described a case where a local time and a TS start time are delivered, and setting to all TSs is previously performed.

As illustrated in [1] and [2], the master node 2G sets time slot information to nodes A, B. Then, as illustrated in [3], the master node 2G transmits a control signal SS4 containing the TS start time and a time stamp value (for example, 80) for each TS period.

As illustrated in [4], upon receipt of the control signal SS4 from the master node 2G, node A sets the time stamp value (80) at a time counter (80). As illustrated in [5], when the time counter reaches the TS start time (100), node A sequentially performs operations starting from TS0. That is, node A performs operations of the TS information, when a time of "TS start time+TS number×TS length" is reached. Herein, as illustrated in line 1 of [1], node A performs an ADD of a data to TS0 at 100 to 120 of the time counter, and performs an ADD of the data to TS2 at 140 to 160 of the time counter.

As illustrated in [6], upon receipt of the control signal SS4, node B sets a time stamp value at the time counter (80). When the time counter reaches the TS start time (100), node B sequentially performs appropriate operations starting from TS0. That is, as illustrated in line 1 of [2], node B: performs a DROP of a data of TS0 at 100 to 120 of the time counter (=TS start time+TS number×TS length); and, as illustrated in the second line of [2], performs an ADD of the data to TS2 at of the time counter 120 to 140.

Next is described how to set a time to which a transmission path delay time is added.

Figure 36A:
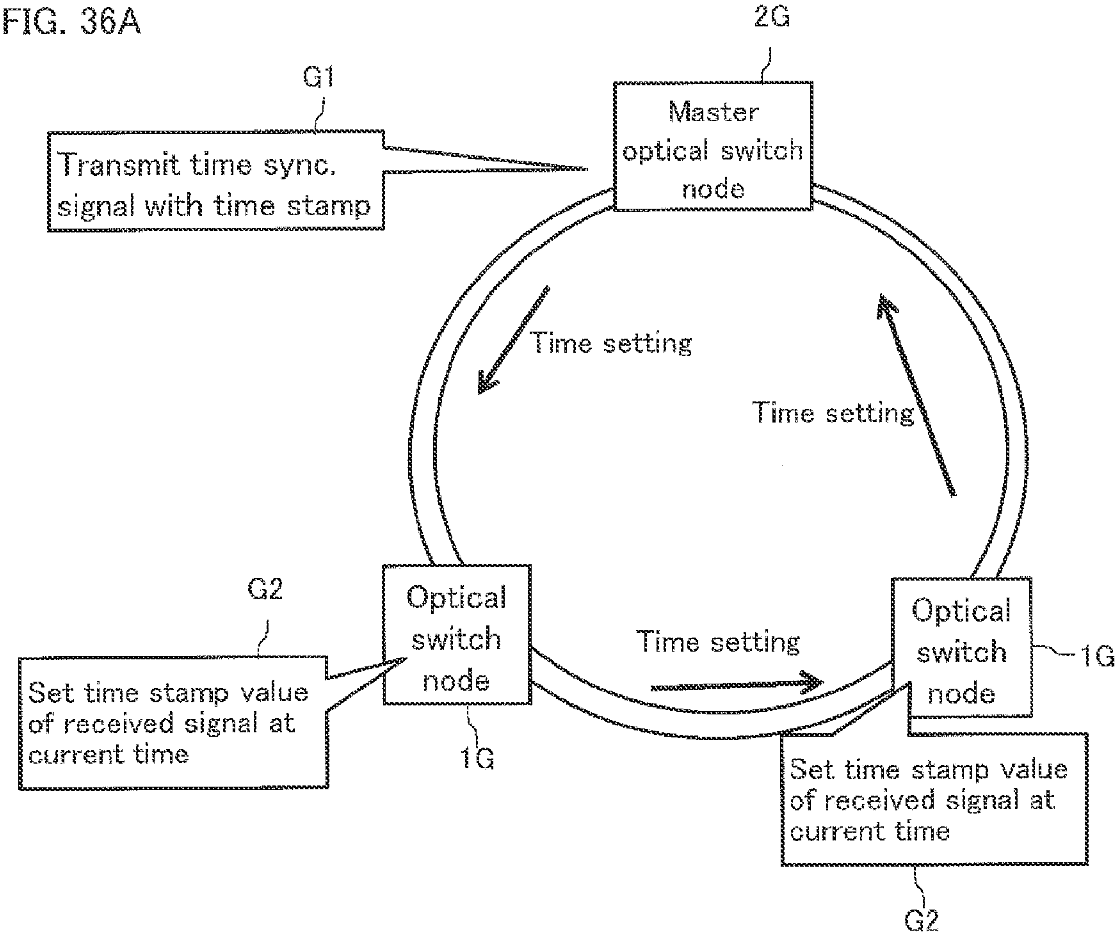
FIG. 36A is a system diagram for explaining how to set a time to which a transmission path delay time is added.
Figure 36B:
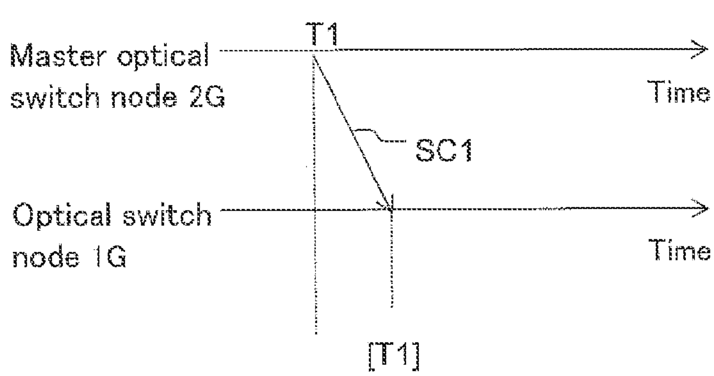
FIG. 36B is a time-series diagram for explaining how to set the time to which the transmission path delay time is added.

FIG. 36A and FIG. 36B are diagrams each for explaining how to set the time to which the transmission path delay time is added.

As illustrated in FIG. 36A, the master node 2G transmits a time synchronization signal with a time stamp, as illustrated in a box G1. Each of the optical switch nodes 1G sets a time stamp value of the received time synchronization signal at a current time as illustrated in a box G2.

As illustrated in FIG. 36B, in the master node 2G, a time (T1) when the time synchronization signal is transmitted is given as a time stamp. A time synchronization signal SC1 to which the time stamp value T1 is given is transmitted to each of the optical switch nodes 1G. In each of the optical switch nodes 1G, the value (T1) of the time stamp is set as a current time of each of the optical switch node 1G itself.

As described above, the master node 2G transmits the time synchronization signal SC1 with the time stamp to the optical switch node 1G, based on which the time to which a transmission path delay time is added is set. Periodic transmissions of the time synchronization signal SC1 make it possible to absorb a change in a transmission path length owing to temperature fluctuation.

Next is described a variation of how to set a time with delay.

Figure 37A:
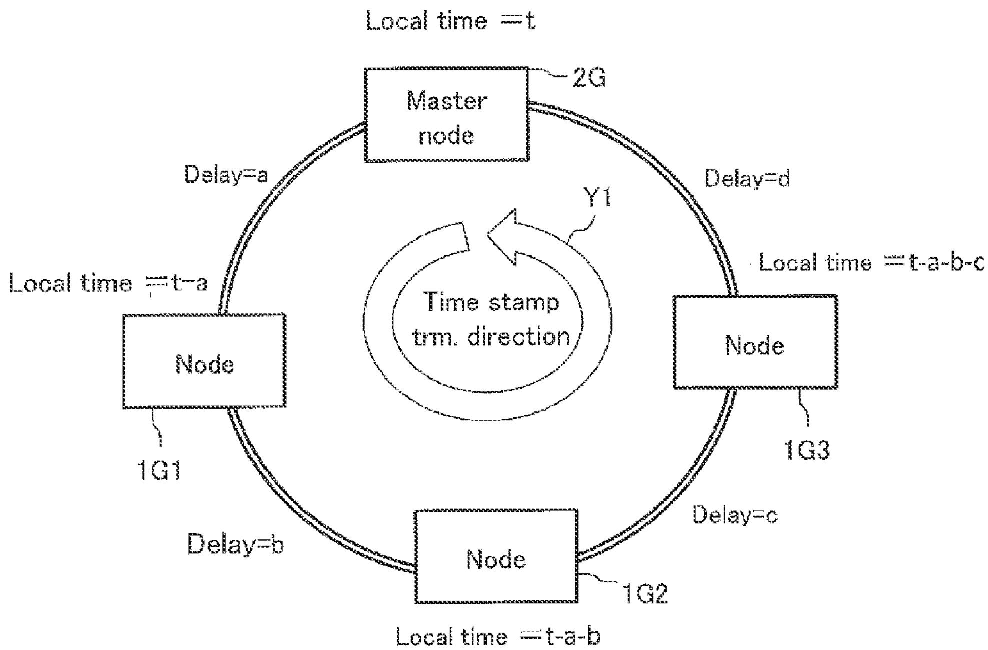
FIG. 37A is a diagram for explaining a variation of how to set a time with delay.
Figure 37B:
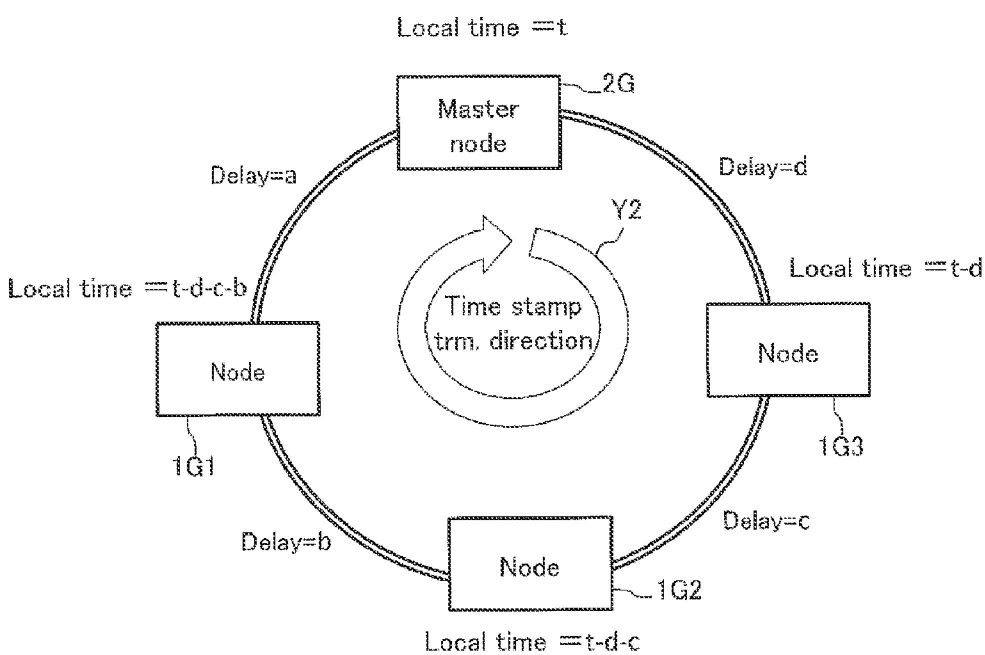
FIG. 37B is a diagram for explaining another variation of how to set the time with delay.

FIG. 37A and FIG. 37B are diagrams each for explaining a variation of how to set a time with delay. FIG. 37A illustrates a case where a time stamp transmission direction is counterclockwise as indicated by an arrow Y1. FIG. 37B illustrates a case where the time stamp transmission direction is clockwise as indicated by an arrow Y2.

In a case of a unidirectional setting, the master node 2G: transmits a control signal with a time stamp either counterclockwise illustrated in FIG. 37A or clockwise illustrated in FIG. 37B; and sets an appropriate time with delay to each of nodes 1G1, 1G2, 1G3.

Description herein is made by exemplifying a counterclockwise case, as illustrated in FIG. 37A. Assume that the master node 2G makes a local time t as a time stamp value and transmits the time stamp by containing in a control signal, which is received by node 1G1. In this case, let "a" be a transmission delay between the master node 2G and the node 1G1. The node 1G1 sets the time stamp value "t" of the control signal as a local time in the time counter of its own node 1G1. At this time, a local time of the master node 2G advances by a delay time "a". The local time of the node 1G1 is thus set at a time (t−a) which is a time shifted from the local time of the master node 2G by the delay time a.

Similarly, a local time of a subsequent node 1G2 is set at "t". The local time of the node 1G2 is thus set at a time (t−a−b) which is a time shifted from the local time of the master node 2G by a delay time (a+b). The local time of a node 1G3 is set at "t". The local time of the node 1G3 is thus set at a time (t−a−b−c) shifted from the local time of the master node 2G by a delay time (a+b+c).

In a case of a bidirectional setting, the master node 2G transmits a control signal with a time stamp to each of the nodes 1G1 to 1G3, both counterclockwise illustrated in FIG. 37A and clockwise illustrated in FIG. 37B. As illustrated in FIG. 37A and FIG. 37B, different local times are set when the time stamp value is transmitted clockwise and counterclockwise. Each of the nodes 1G1 to 1G3 may thus have a pair of time counters, one used for clockwise and the other used for counterclockwise.

Next is described a variation of physical topology.

Figure 38:
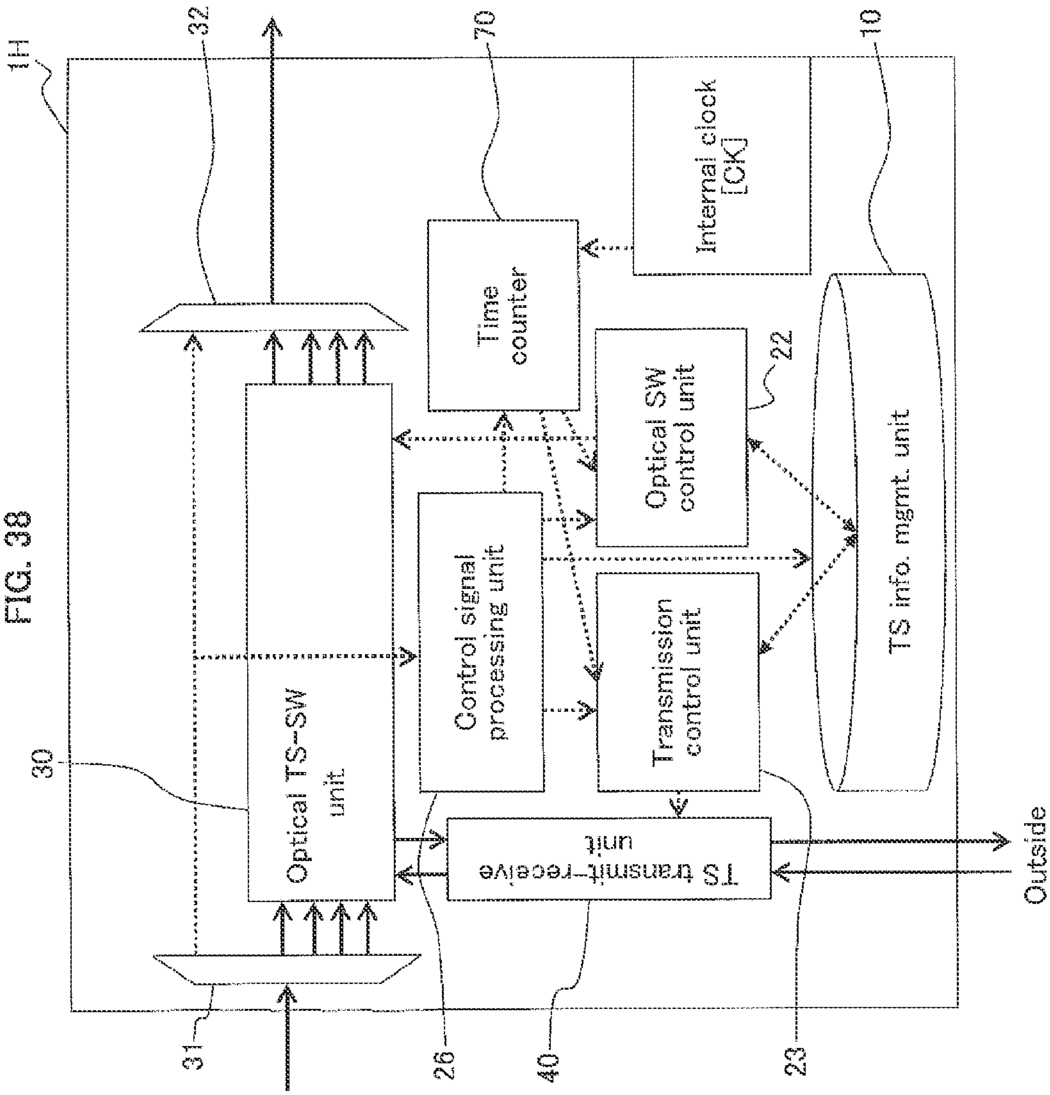
FIG. 38 is a block diagram illustrating a configuration example in which a physical topology is a unidirectional ring.

FIG. 38 is a block diagram illustrating a configuration example of an optical switch node 1H in a case of a unidirectional ring. The configuration in the case of the unidirectional ring is similar to that described with reference to FIG. 26 and FIG. 27, detailed description of which is thus omitted herefrom.

Figure 39A:
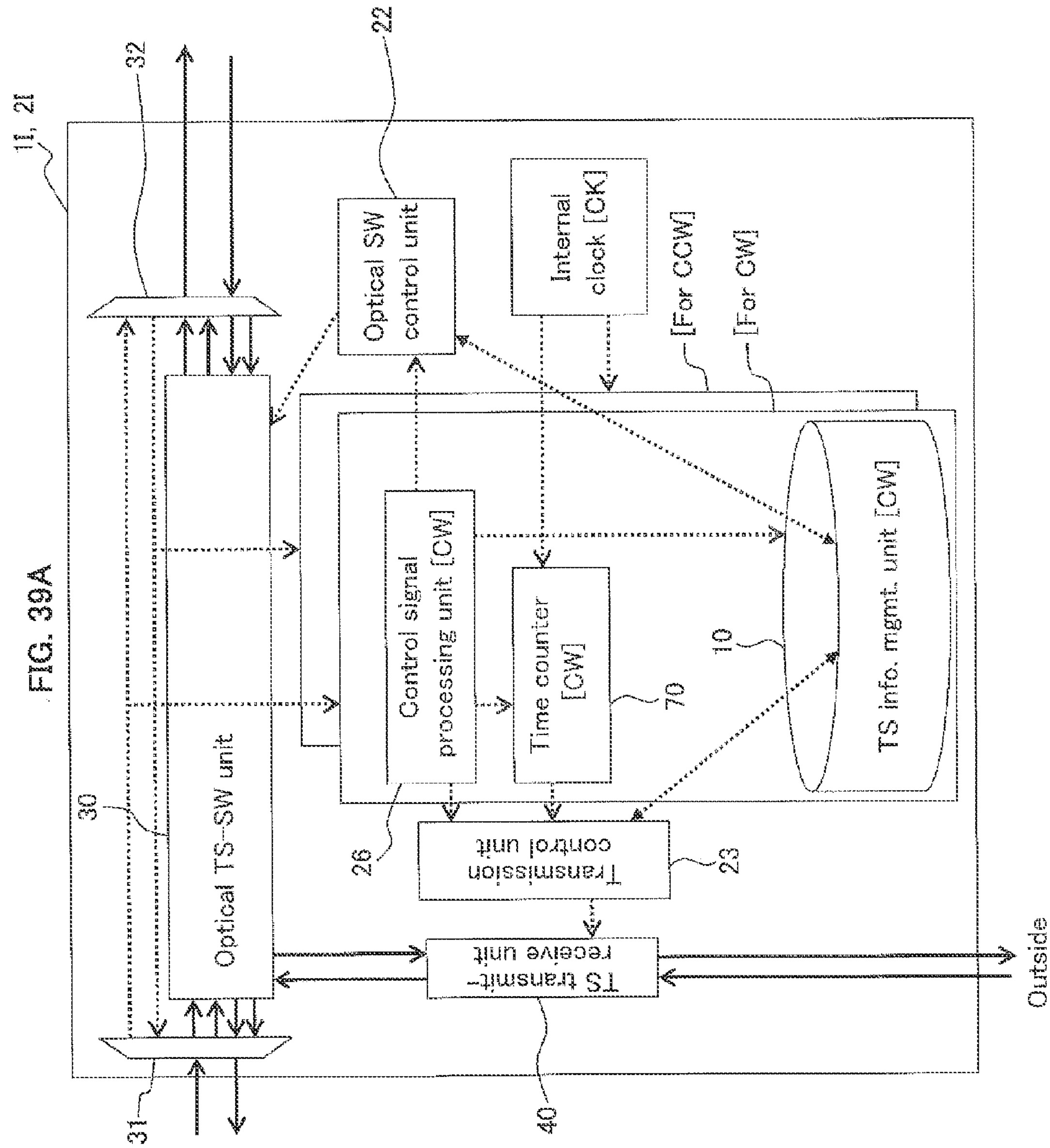
FIG. 39A is a block diagram illustrating a configuration example in which the physical topology is a bidirectional ring.
Figure 39B:
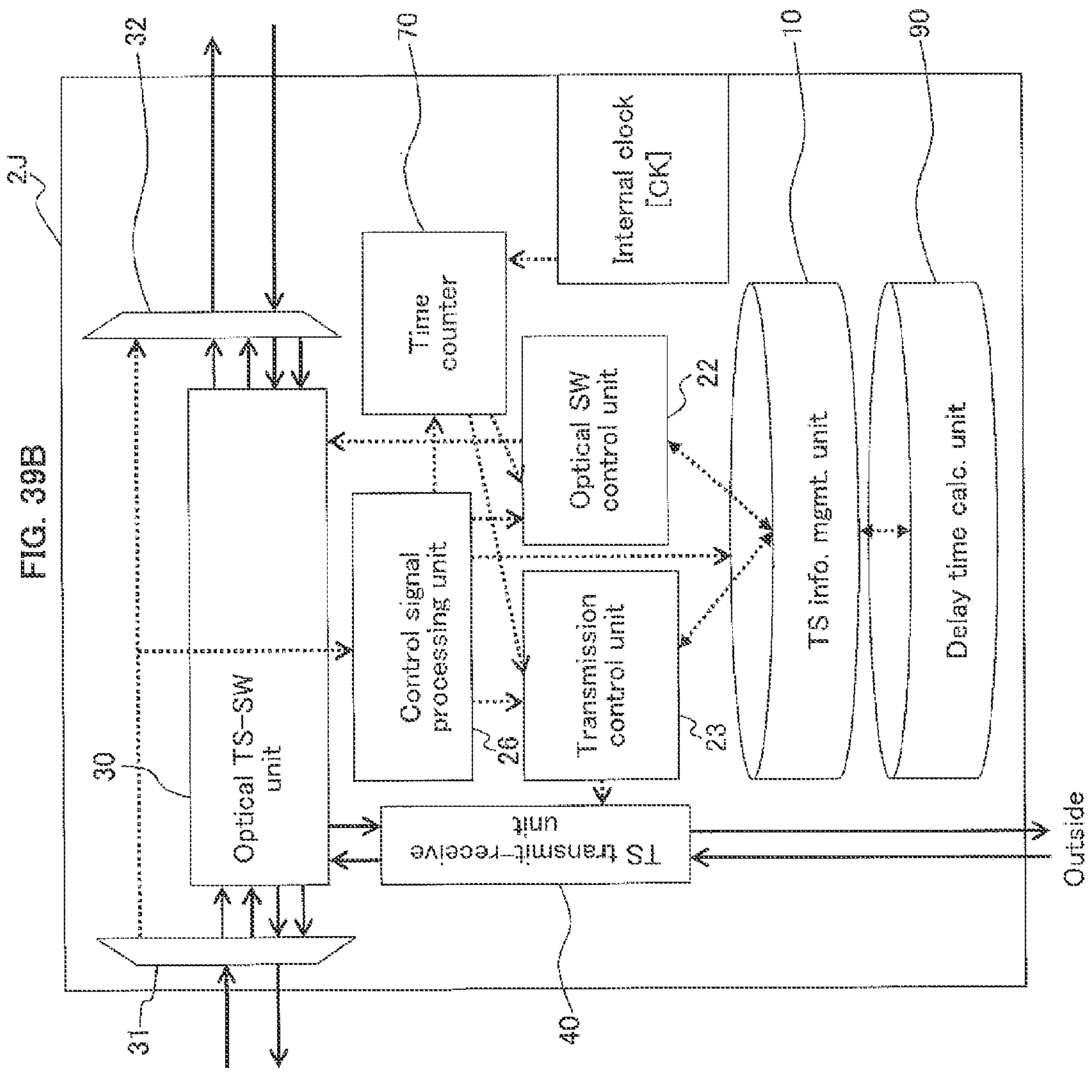
FIG. 39B is a block diagram illustrating another configuration example in which the physical topology is a bidirectional ring.

FIG. 39A and FIG. 39B are block diagrams illustrating examples of configurations of optical switch nodes 1I, 2J on bidirectional rings, respectively. Note that the optical switch node 1I illustrated in FIG. 39A is applied also as a master node 2I to be described hereinafter.

In a case where the physical topology is bidirectional illustrated in FIG. 39A, two control signal processing units 26, two TS information management units 10, and two time counters 70 are provided, each one of which is used for clockwise, and the other, for counterclockwise. The master node 2I transmits a control signal onto a ring both clockwise and counterclockwise. Each of the nodes 1I operates using TS information in the TS information in one of the management units 10 and one of the time counters 70, which correspond to a transmission and receipt direction of the control signal. Upon receipt of a clockwise control signal, each of the nodes 1I uses the clockwise TS information management unit 10 and the clockwise time counter 70.

In a case where physical topology is bidirectional as illustrated in FIG. 39B, the control signal processing units 26, the TS information management units 10, and the time counters 70 together perform a bidirectional communication as a set. Note that FIG. 39B illustrates a configuration of the master node 2J. The master node 2J transmits a control signal on a ring clockwise or counterclockwise. If the master node 2J transmits data in a direction opposite to the transmission and receipt direction of the control signal, the master node 2J operates with a time obtained by subtracting a delay time from the TS start time by the delay time calculation unit 90. When the master node 2J transmits a data in a direction same as a receipt direction of the control signal, a method same as that of the unidirectional ring is performed.

Next is described a DROP switching time of a master node.

Figure 40:
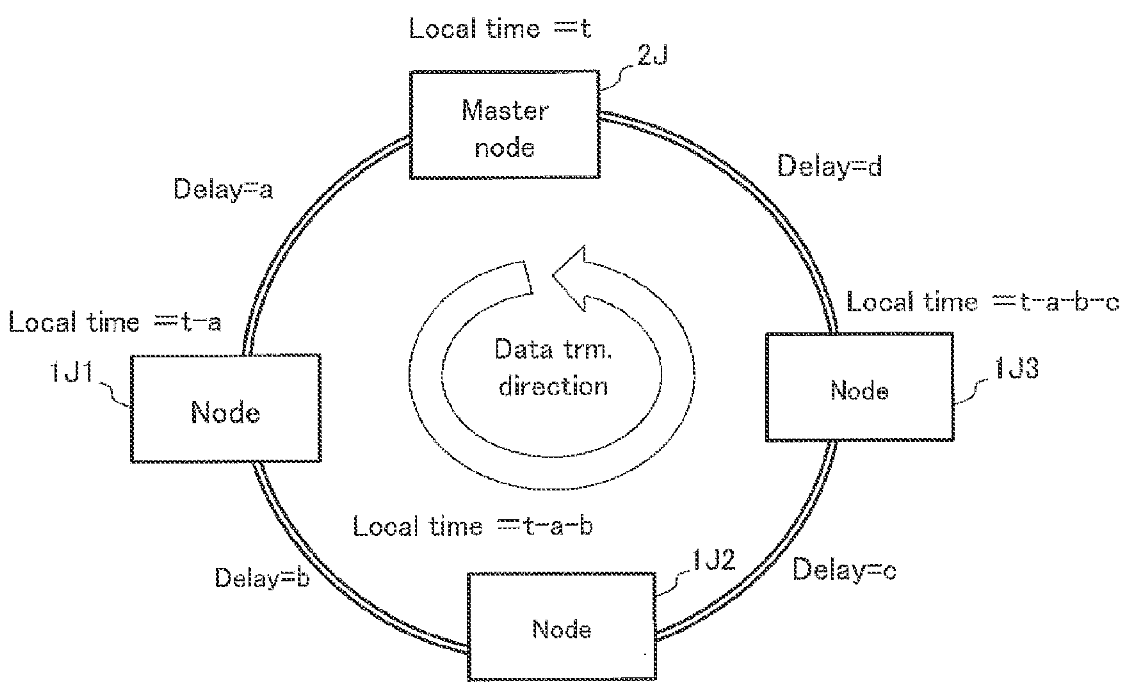
FIG. 40 is a diagram for explaining a DROP switching time of a master node.

FIG. 40 is a diagram for explaining a DROP switching time of the master node 2J.

As described above with reference to FIG. 37A and FIG. 37B, the local times with respective differences from that of the master node 2J by delays are set to the nodes 1J1 to 1J3. Therefore, if a data is transmitted in a direction same as that of transmitting a time stamp, "Reception time of receiving node at local time"="Transmission time of transmitting node at local time". For example, if the master node 2J transmits a data at the local time=t1, the data arrives at the nodes 1J1 to 1J3 at respective local times=t1.

On the other hand, when the nodes 1J1 to 1J3 transmit data to the master node 2J or transmit or receive data between the nodes 1J1 to 1J3 jumping over the master node 2J, "Reception time of receiving node at local time"="Transmission time of transmitting node at local time"+"Ring one-round time (a+b+c+d)".

The data transmission and reception jumping over the master node 2J (which may also be referred to as a jump communication) used herein means that, in a forward direction of transmission, a signal transmitted from the node 1J3 connected upstream of the master node 2J skips (jumps over) the master node 2J is received by the node 1J1 connected downstream of the master node 2J or a further downstream node. In a backward direction of the transmission, a signal transmitted from the node 1J1 connected downstream of the master node 2J skips (jumps over) the master node 2J is received by the node 1J3 connected upstream of the master node 2J or a further upstream node.

For example, when the node 1J1 transmits a data at a local time=t2, the data arrives at the master node 2J at a local time=t2+a+b+c+d of the master node 2J. Therefore, a DROP switching time of the master node 2J is calculated by "TS start time+TS number×TS length+Ring one-round time". Similarly, the DROP switching time of transmitting or receiving data jumping over the master node 2J, as in a case of transmitting or receiving a data from the node 1J3 to the node 1J1, is calculated by "TS start time+TS number×TS length+Ring one round time".

FIG. 41 is a diagram illustrating an example of setting TS information of a master node.

As illustrated in FIG. 41, in order to handle a case in which "Reception time=Transmission time" is not satisfied, a ring one-round time (a+b+c+d) is taken into account. A time when the master node 2J performs a DROP is calculated by "TS start time+TS number×TS length+Ring one-round time".

Next is described how to calculate and set a ring one-round time. Two methods are explained herein.

Method 1 is that a delay time is previously measured using a measuring instrument such as an OTDR, and a result of the measurement is set to the TS information management unit 10. The setting to the TS information management unit 10 may be performed manually or the like.

Method 2 is that the ring one-round time is calculated from a control signal having been made one round of a ring.

Figure 42:
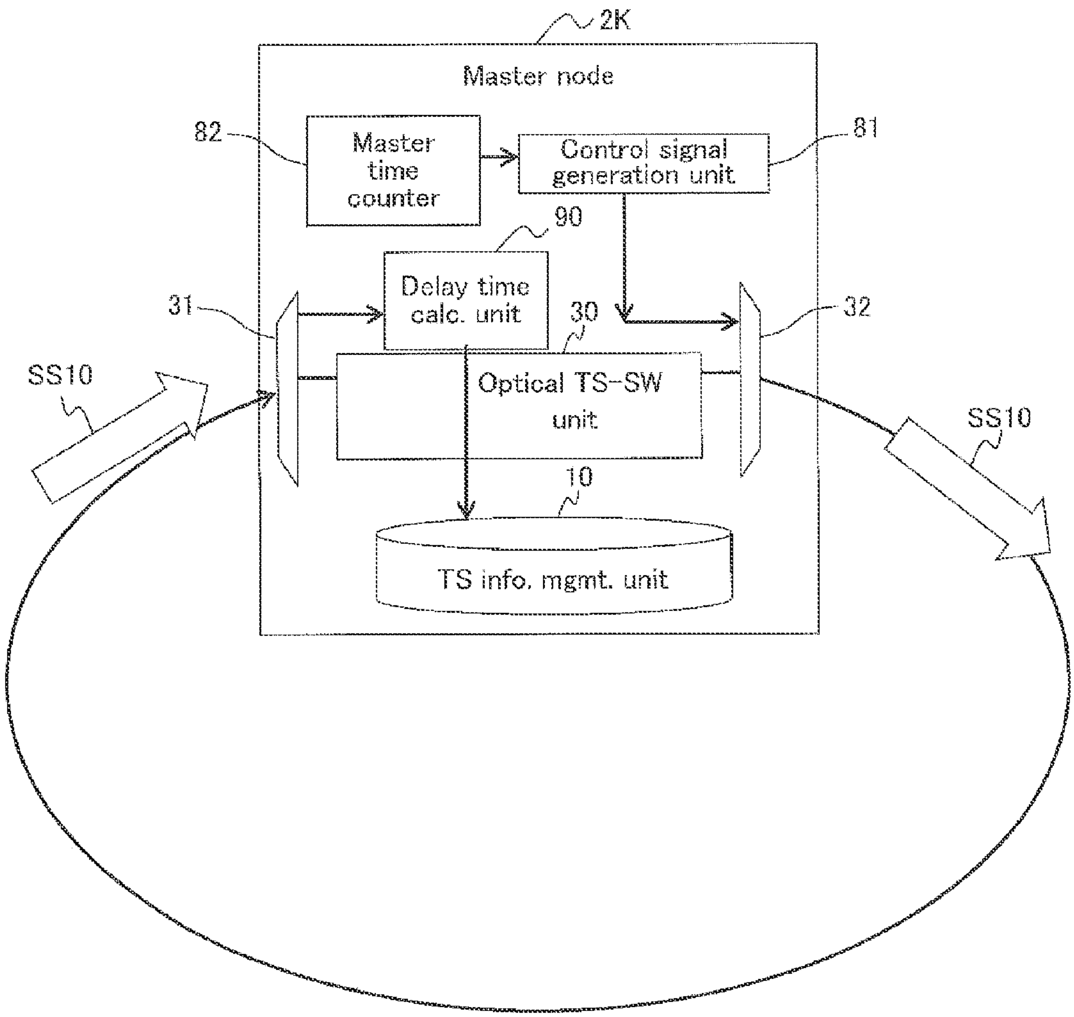
FIG. 42 is a diagram for explaining how to calculate and set a ring one-round time.

Method 2 is described with reference to FIG. 42. FIG. 42 is a diagram for explaining how to calculate and set the ring one-round time.

As illustrated in FIG. 42, the control signal generation unit 81 of a master node 2K generates a control signal SS10 with a time stamp and transmits the generated control signal SS10. The delay time calculation unit 90 of the master node 2K: receives the control signal SS10 with the time stamp which has been returned after making one round of the ring; calculates a ring one-round time by subtracting a time stamp value from a receipt time; and writes the calculated ring one-round time to the TS information management unit 10.

FIG. 43 is a diagram illustrating variations each in a case where a time counter is set at a common time. In this embodiment, because the common time is set, it is not necessary to deliver a signal for setting a local time of each node.

Fifth Embodiment

A fifth embodiment is configured such that each of nodes shares information on a common time, measures a delay time, and performs a TS synchronization by subtracting a delay time from a TS start time.

Next is described a configuration of an optical switch node according to the fifth embodiment.

Figure 44:
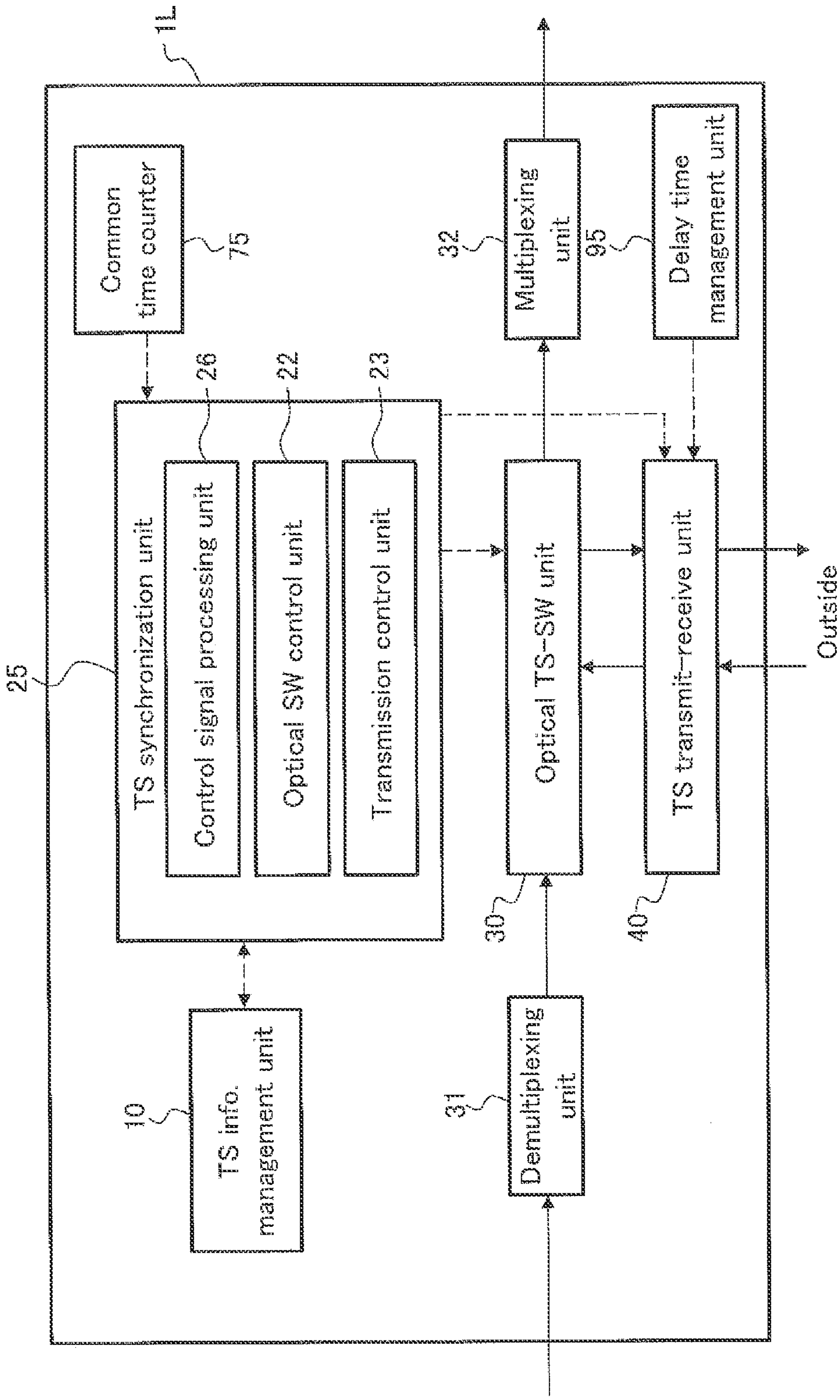
FIG. 44 is a block diagram illustrating a configuration example of an optical switch node according to a fifth embodiment.
Figure 45:
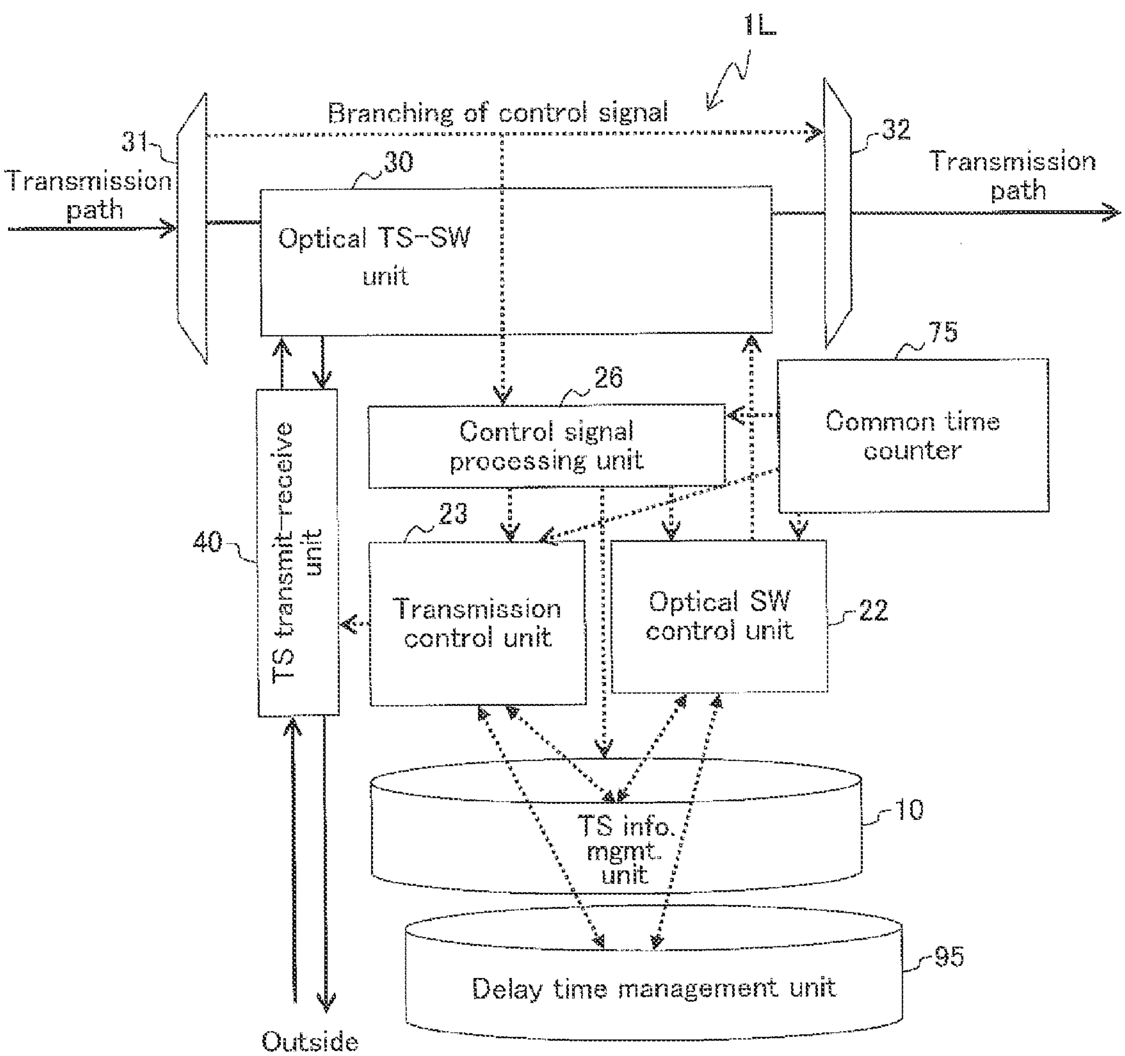
FIG. 45 is a diagram schematically illustrating transmission routes of a control signal and an optical signal in the optical switch node illustrated in FIG. 44.

FIG. 44 is a block diagram illustrating a configuration example of an optical switch node 1L according to the fifth embodiment. FIG. 45 is a diagram schematically illustrating transmission routes of a control signal and an optical signal in the optical switch node 1L illustrated in FIG. 44.

As illustrated in FIG. 44, the optical switch node 1L includes: a TS information management unit 10 that sets TS information; a TS synchronization unit 25; a common time counter 75; a delay time management unit 95; an optical TS-SW unit 30; and a TS transmit-receive unit 40. The TS synchronization unit 25 includes: a control signal processing unit 26; a transmission control unit 23; and an optical SW control unit 22. The optical TS-SW unit 30 is connected to the demultiplexing unit 31 on an input side of an optical signal and is connected to the multiplexing unit 32 on an output side of the optical signal.

Next description is made with reference to FIG. 45. Upon receipt of a control signal, the control signal processing unit 26 notifies the transmission control unit 23 and the optical SW control unit 22 of a TS start time. If the control signal contains TS information, the control signal processing unit 26 writes the TS information to the TS information management unit 10.

The TS information management unit 10: manages the TS information; and makes the transmission control unit 23 and the optical SW control unit 22 reference the TS information. The TS information includes information on a TS number, a data transmission destination, an operation, an optical SW connection port number, a TS length, and a TS period.

Upon receipt of the notification of the TS start time from the control signal processing unit 26, the transmission control unit 23: references the TS information management unit 10 and the delay time management unit 95; and performs an operation having a corresponding TS number. If the operation is an ADD, the transmission control unit 23 instructs the TS transmit-receive unit 40 to transmit a data to an appropriate data transmission destination. The common time counter 75 supplies the transmission control unit 23 with a time.

The TS transmit-receive unit 40 transmits or receives data between an external unit (not shown) and the optical TS-SW unit 30. The external unit is, for example, a communication device such as the routers or the like illustrated in FIG. 1. When the TS transmit-receive unit 40 transmits data to another optical switch node via the optical TS-SW unit 30, the TS transmit-receive unit 40: reads, under a transmission instruction from the transmission control unit 23, an appropriate data from a queue in the buffer (not shown) such that the another optical switch node becomes a destination; and transfers the data to the optical TS-SW unit 30. Upon receipt of the data from the external unit, the TS transmit-receive unit 40 holds the data in the queue in the buffer until the transmission control unit 23 instructs the transmission.

Upon receipt of the notification of the TS start time from the control signal processing unit 26, the optical SW control unit 22: references the TS information management unit 10 and the delay time management unit 95; and performs an operation having corresponding TS number. If the corresponding operation is an ADD or a DROP, the optical SW control unit 22 instructs the optical TS-SW unit 30 to perform a switching. After a time corresponding to the TS length elapses from the instruction of the switching, the optical SW control unit 22 instructs the optical TS-SW unit 30 to perform a switching back. The common time counter 75 supplies the optical SW control unit 22 with a time.

The optical TS-SW unit 30 switches a connection in the optical SW under the switching instruction from the optical SW control unit 22.

The common time counter 75: is supplied with a clock (not shown); and counts a time. The time is shared by all the nodes.

The delay time management unit 95 manages delay times of the master node and of its own.

Next is described a configuration of a master optical switch node (a master node) according to this embodiment.

Figure 46:
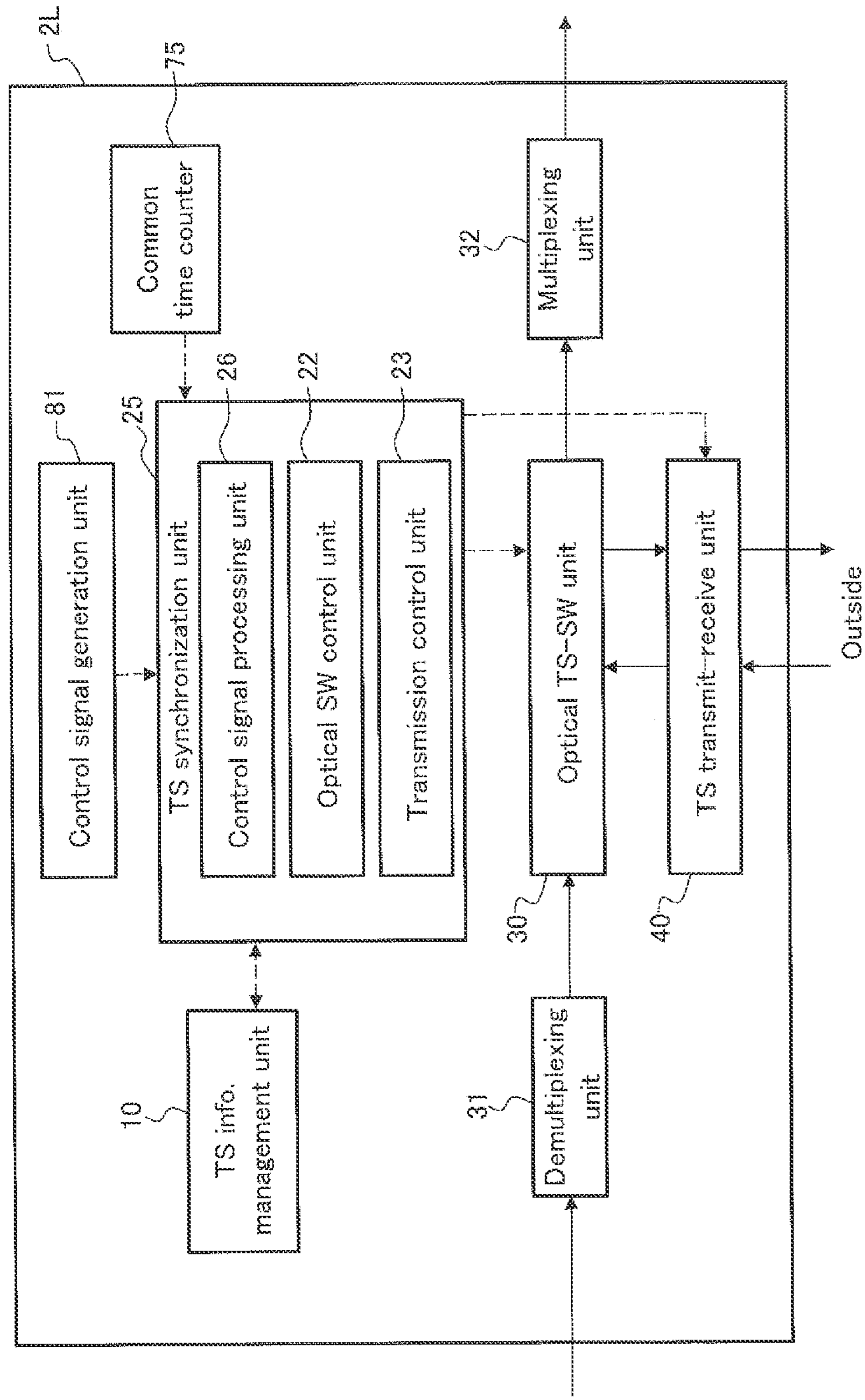
FIG. 46 is a block diagram illustrating a configuration example of a master optical switch node according to a fifth embodiment.
Figure 47:
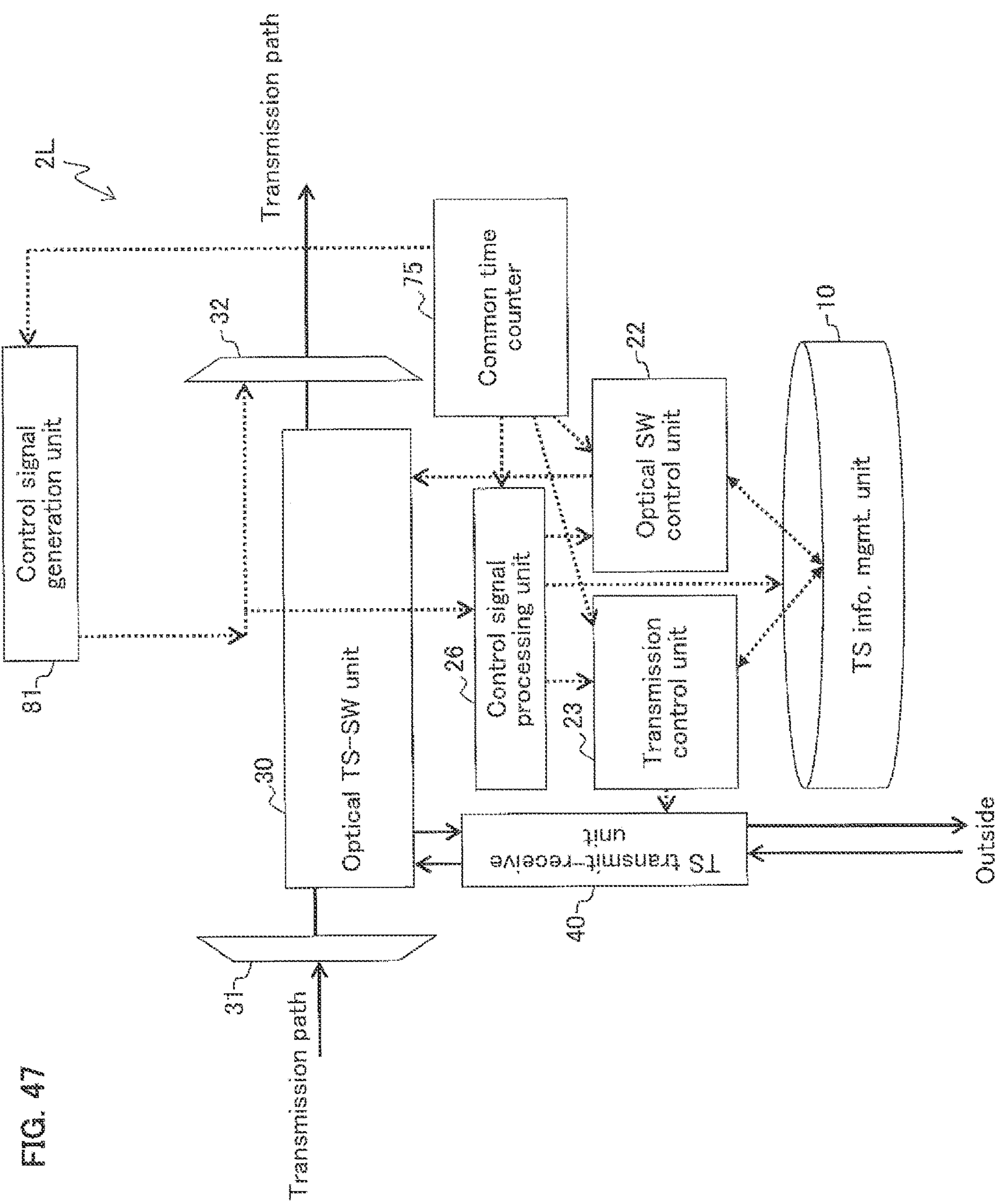
FIG. 47 is a diagram schematically illustrating transmission routes of a control signal and an optical signal in the master optical switch node illustrated in FIG. 46.

FIG. 46 is a block diagram illustrating a configuration example of a master node 2L according to this embodiment. FIG. 47 is a diagram schematically illustrating transmission routes of a control signal and an optical signal in the master node 2L illustrated in FIG. 46.

As illustrated in FIG. 46 and FIG. 47, a configuration of the master node 2L is similar to that explained with reference to FIG. 44 except that the master node 2L includes the control signal generation unit 81, instead of including the delay time management unit 95. The control signal generation unit 81: generates a control signal containing a TS start time and a time stamp; and transmits the generated control signal to each of the nodes.

Figure 48:
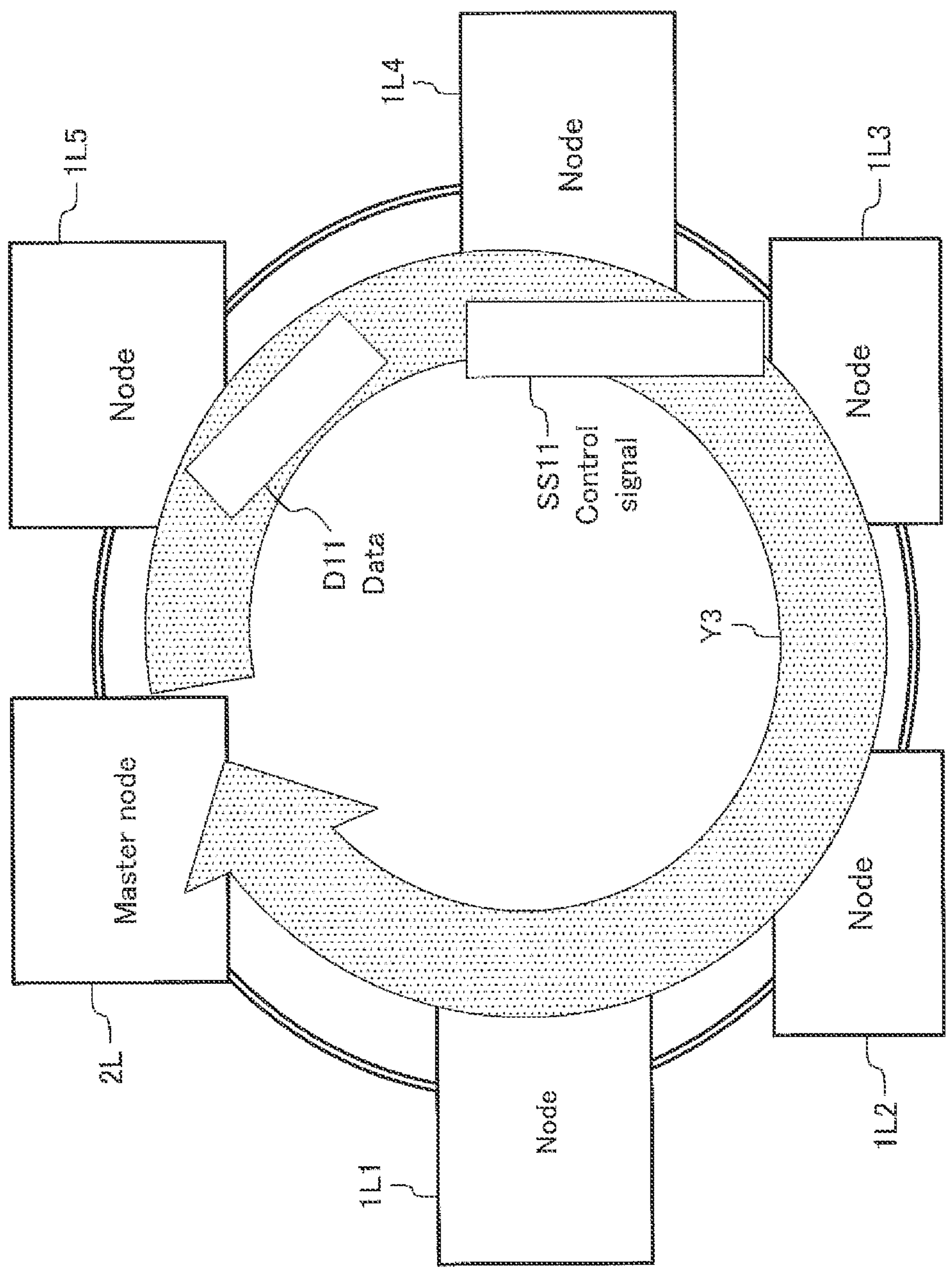
FIG. 48 is a diagram illustrating a configuration example of an optical network system according to the fifth embodiment.

FIG. 48 is a diagram illustrating a configuration example of an optical network system according to the fifth embodiment. The master node 2L illustrated in FIG. 48 corresponds to the master node 2L illustrated in FIG. 46. Nodes 1L1 to 1L5 correspond to the optical switch node 1L illustrated in FIG. 46. In this configuration, the master node 2L transmits a control signal SS11 and a data D11 in a counterclockwise direction indicated by an arrow Y3.

Next is described a TS start time in a case where a common time is set.

Figure 49A:
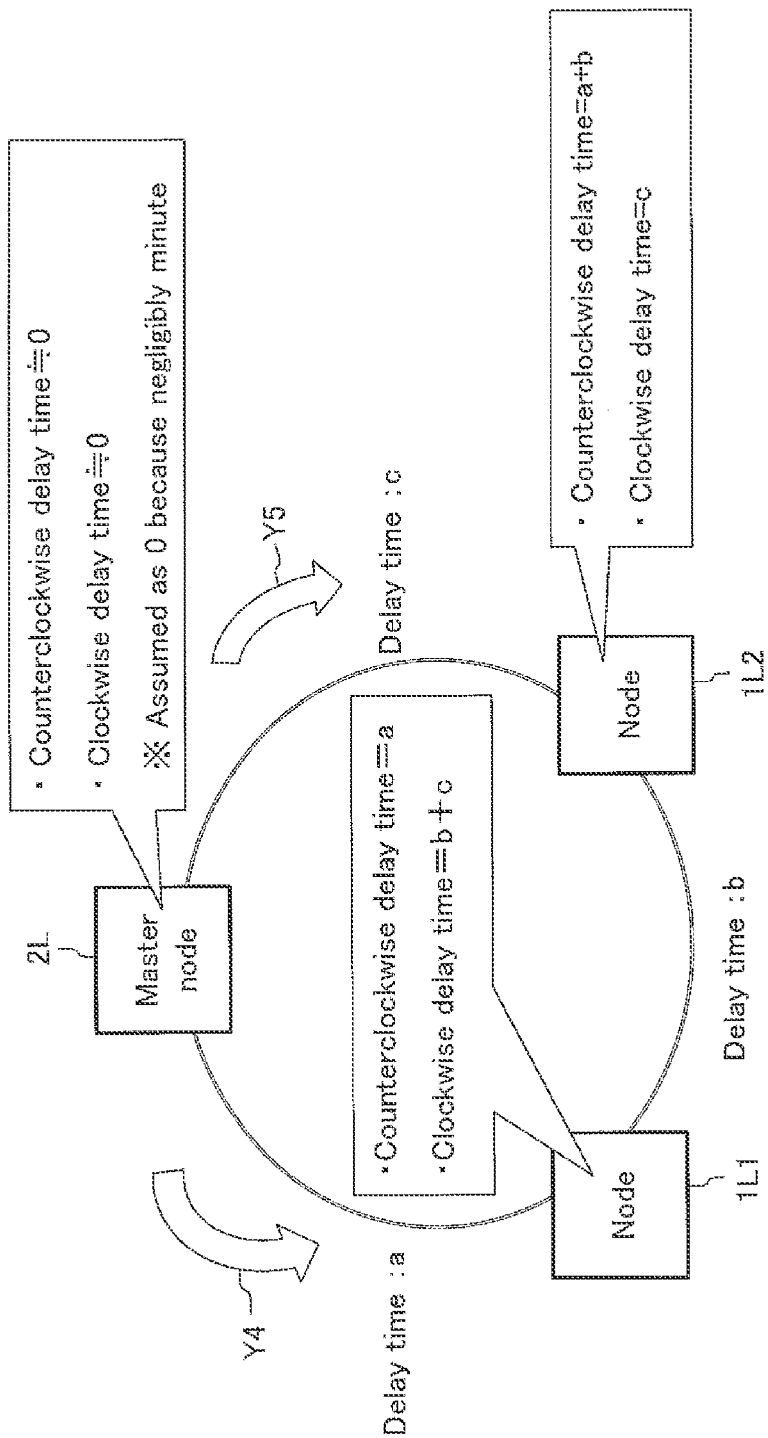
FIG. 49A is a system diagram for explaining a TS start time in a case where a common time is set.
Figure 49B:
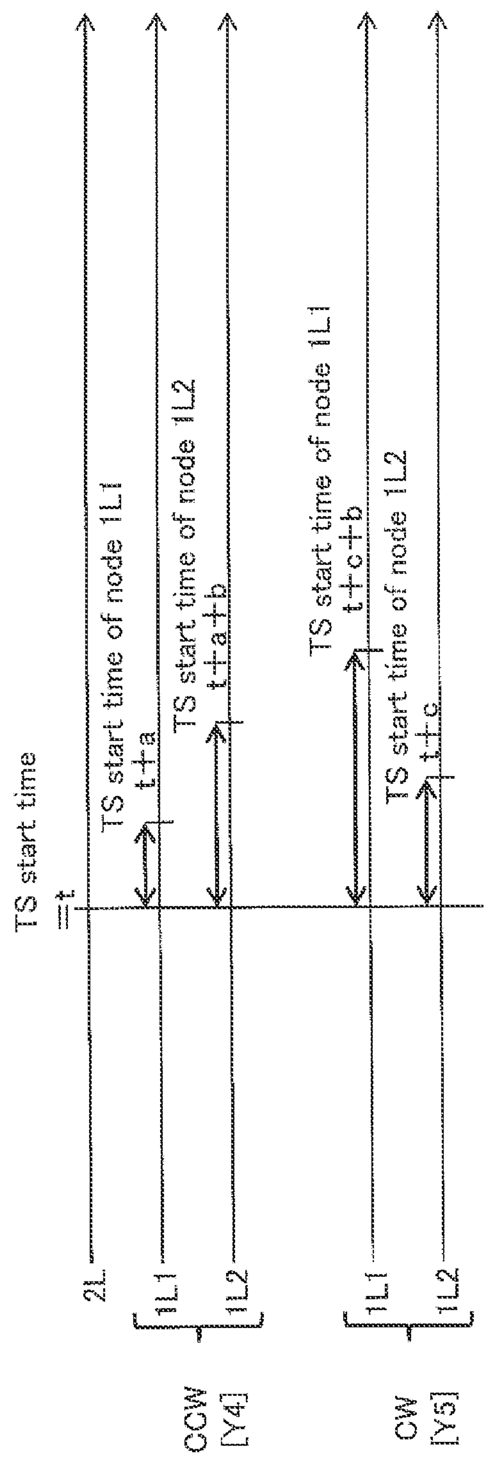
FIG. 49B is a time-series diagram for explaining the TS start time in a case where a common time is set.

FIG. 49A is a configuration of an optical network system in which the master node 2L and two nodes 1L1, 1L2 are ring-connected. FIG. 49B is a diagram for explaining a TS start time in a case where a common time is set in the optical network system.

As illustrated in FIG. 49B, let "t" be a TS start time at which the master node 2L transmits. Then, the nodes 1L1, 1L2 add delay times "a" and "a+b" from the master node 2L, to the transmitted TS start time t, respectively, to thereby update the respective TS start times.

Further description is made with reference to FIG. 49A. At the master node 2L, a counterclockwise delay time indicated by an arrow Y4≈0, and a clockwise delay time indicated by an arrow Y5≈0 (the delay times are extremely small and are thus regarded as 0). Meanwhile, at the node 1L1, a counterclockwise delay time from the master node 2L=a, and a clockwise delay time therefrom=b+c. At the node 1L2, a counterclockwise delay time from the master node 2L=a+b, and a clockwise delay time=c.

Next is described how to measure a delay time.

Figure 50:
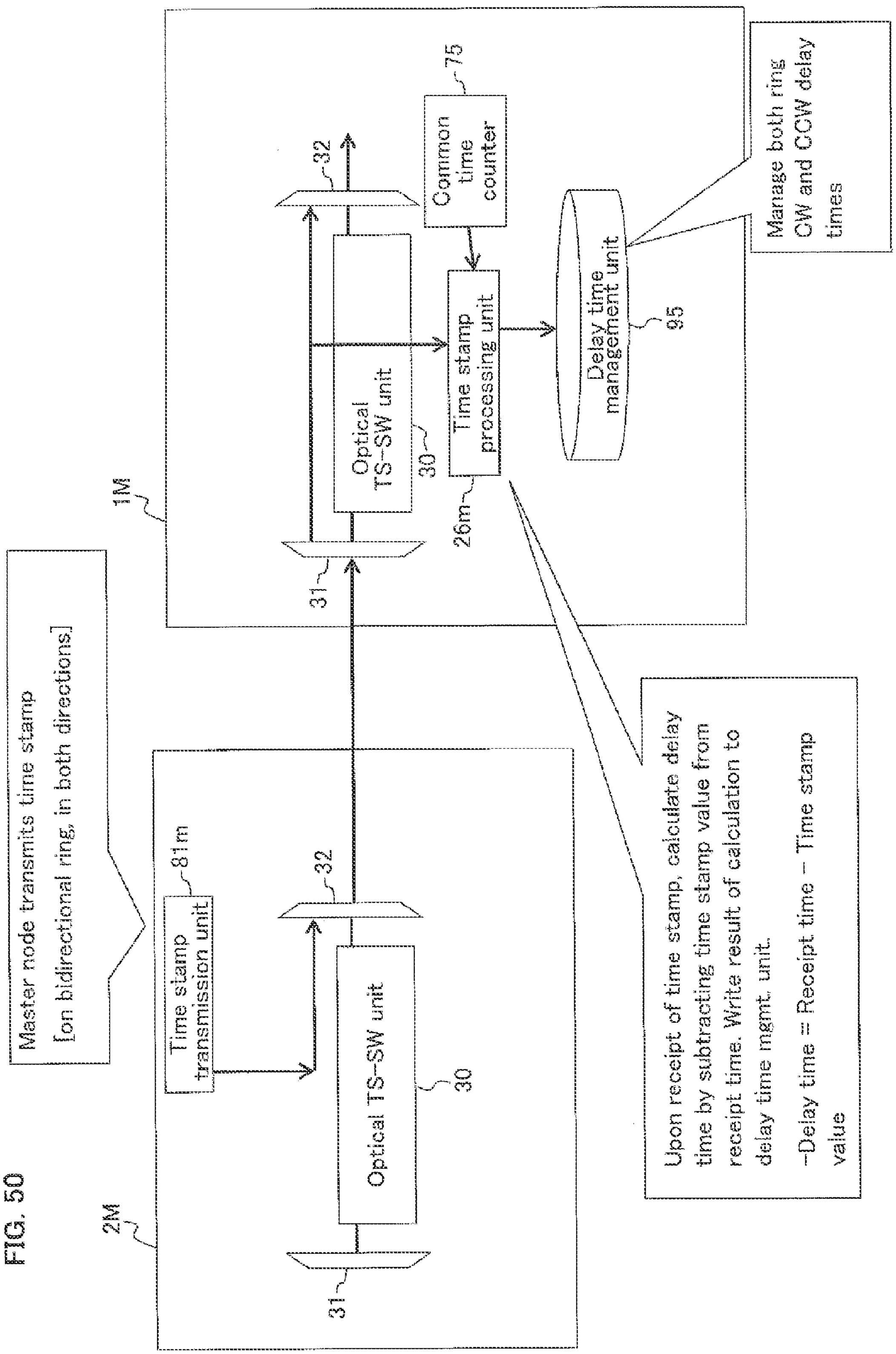
FIG. 50 is a diagram for explaining how to measure a delay time.

FIG. 50 is a diagram for explaining how to measure a delay time. FIG. 50 illustrates a configuration of only a functional block relevant to how to measure a delay time of each of the master node 2M and the optical switch node 1M, configurations of the other functional blocks of which are omitted herefrom.

A delay time is measured by transmitting and receiving a time stamp as described below.

Firstly, the time stamp transmission unit 81*m* of the master node 2M transmits a time stamp. In a case of a bidirectional ring, the time stamp is transmitted in both directions. Upon receipt of the time stamp, the time stamp processing unit 26*m* of the optical switch node 1M calculates a delay time by subtracting a time stamp value from a receipt time. The time stamp processing unit 26*m* writes a result of the calculation to the delay time management unit 95. The delay time can be calculated by "Delay time=Receipt time−Time stamp value". The delay time management unit 95 manages both ring clockwise and counterclockwise delay times.

Next is described a specific example of configurations of optical TS-SW units of the master node 2M and the optical switch node 1M in the above-described embodiment.

Figure 51:
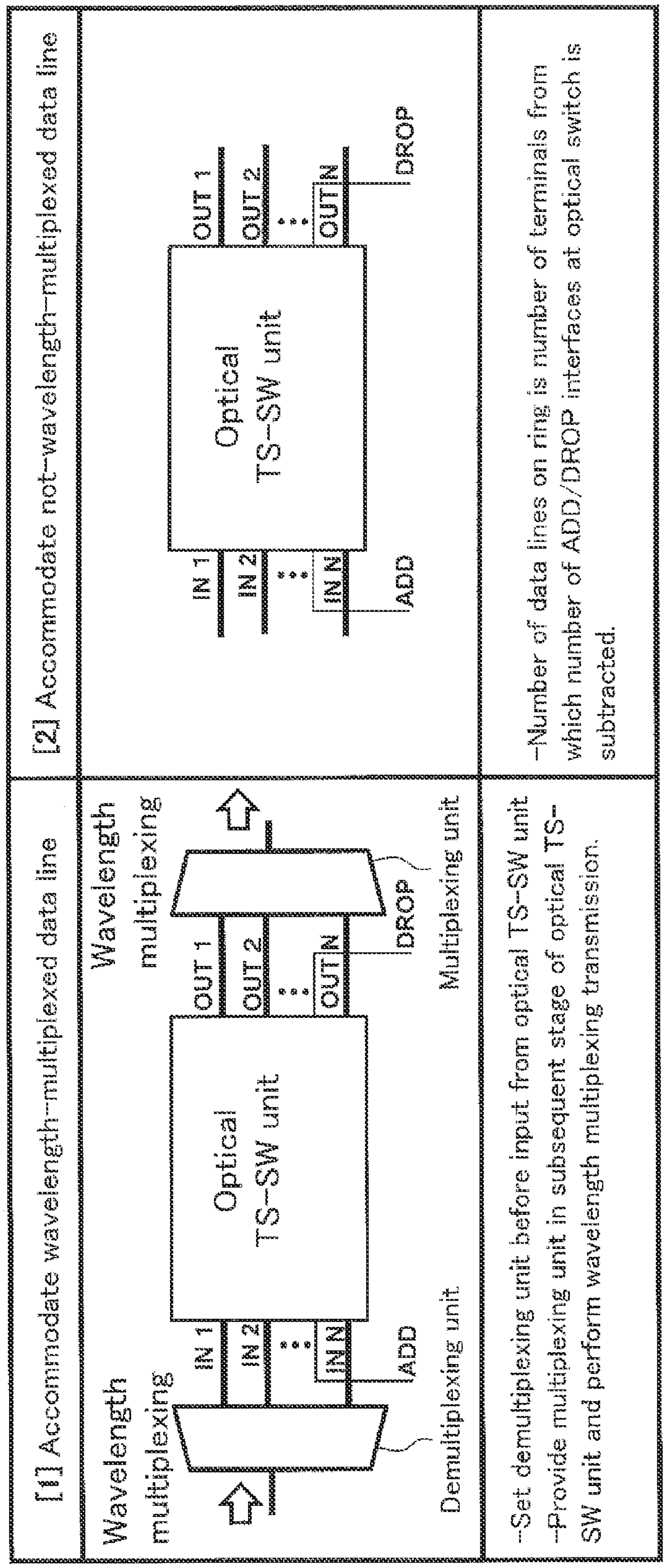
FIG. 51 is a diagram classifying optical TS-SW units applicable to the first to fifth embodiments.

FIG. 51 is a diagram classifying optical TS-SW units applicable to the above-described embodiment.

The optical TS-SW unit: accommodates a data line in a ring network; and changes a connection relation between an input port and an output port under an instruction from a scheduler. The data line accommodated is grouped into two cases: [1] a wavelength-multiplexed data line; and [2] a non-wavelength-multiplexed data line. The optical TS-SW unit used herein is assumed to be a switch of wavelength routing type using wavelength conversion, a spatial switch of broadcast and select type, or the like.

More specifically, in accommodating a wavelength multiplexed data line, as illustrated in [1], a demultiplexing unit: is provided before the optical TS-SW unit inputs a data; demultiplexes the data inputted through wavelength multiplexing into, for example, n wavelengths; and gives the demultiplexed wavelengths to each of input ports IN 1 to IN N. Then, a multiplexing unit: is provided in a subsequent stage of the optical TS-SW unit; multiplexes N optical signals from each of the N output ports OUT 1 to OUT N of the optical TS-SW unit; and transmits the multiplexed optical signal to a subsequent node in the ring network (a node in a subsequent stage). The optical TS-SW unit: also has functions of inserting an optical signal (ADD) and branching an optical signal (DROP); and is thus equipped with a port for ADD as an input port thereof, and a port for DROP as an output port thereof.

In accommodating a data line not wavelength multiplexed, as illustrated in [2], neither a demultiplexing unit nor a multiplexing unit is provided. In this case, the number of data lines on a ring is the same as that of terminals (ports) from which the number of interfaces is subtracted.

Next are described Examples 1 to 8 of the wavelength routing switch.

Note that Examples 1 to 5 each describe a configuration example of an optical TS-SW unit which does not include a FWC (fixed wavelength converter). While on the other hand, Examples 6 to 8 each describe a configuration example of an optical TS-SW unit which includes a FWC. In each of figures of Examples 1 to 8, in order to distinguish an operation (DROP and the like) corresponding to a signal at wavelength λ, an alphabetical suffix is added to a numeric character of the wavelength λ.

Example 1

Next is described a configuration of an optical TS-SW unit according to Example 1. A case of a double ring, 1 ADD/1 DROP, and inter-fiber exchangeability is assumed herein.

Figure 52:
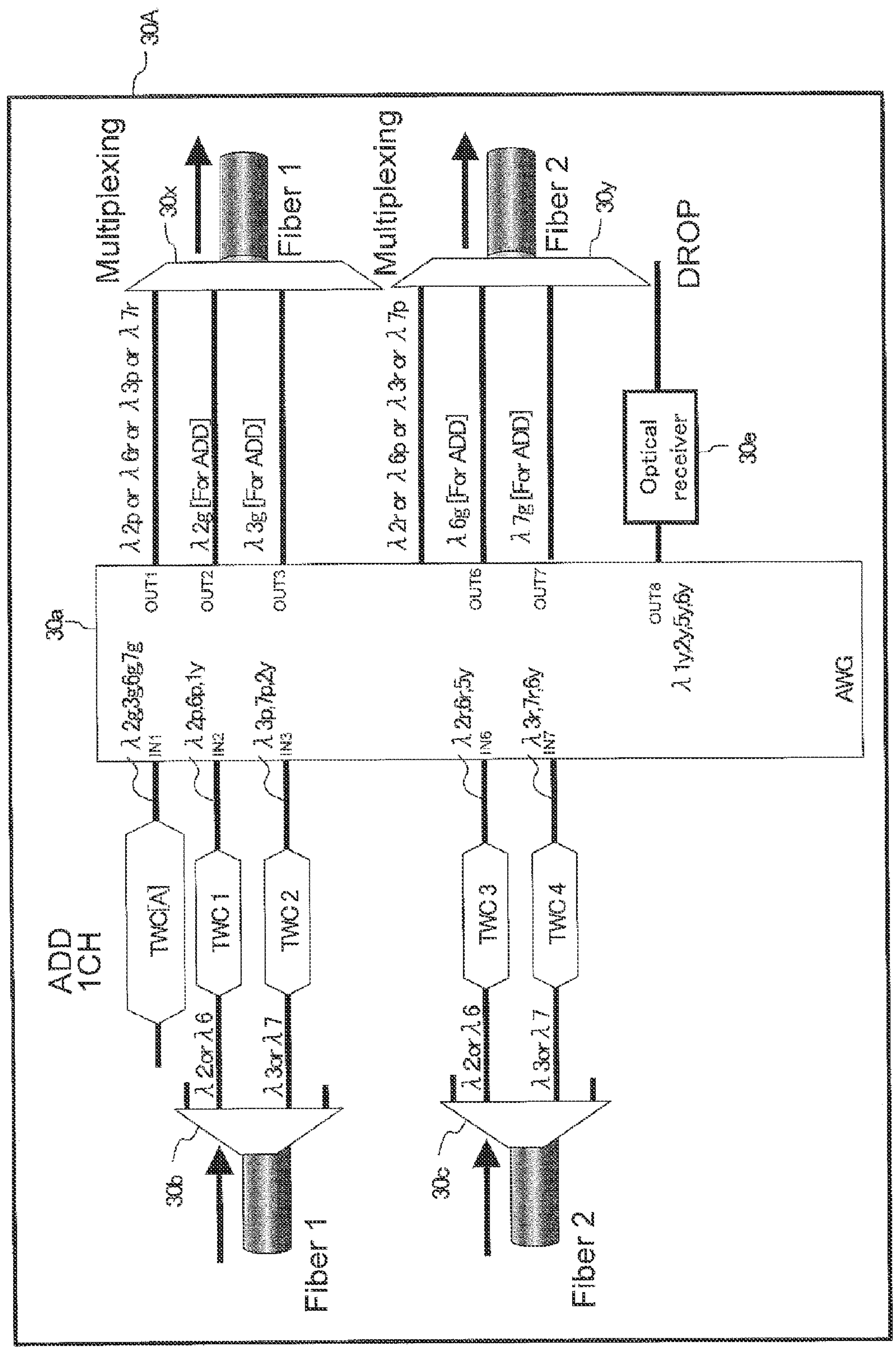
FIG. 52 is a diagram for explaining a configuration of an optical TS-SW unit according to Example 1.

FIG. 52 is a diagram for explaining a configuration of an optical TS-SW unit 30A according to Example 1.

The optical TS-SW unit 30A includes: a kN×kN circular AWG (Arrayed Waveguide Grating) 30*a* in which, with respect to kN wavelengths of λi (i=0 to kN−1), a plurality of wavelengths whose "i MOD N" take the same value are deemed as the same wavelengths; k units of circular 1×N AWGs 30*b*, 30*c*; k(N−2) units of THRU (passing through)/DROP TWC 1 to TWC 4 that are disposed at a prior stage of the AWG 30*a* and serve as a wavelength conversion unit and a demultiplexing unit, respectively; one unit of ADD TWC [A]; one optical receiver 30*e* as a DROP interface; and k units of (N−1)×1 multiplexing units 30*x*, 30*y*. FIG. 52 illustrates a case wherein k=2 and N=4.

Herein, the TWC is a variable wavelength converter. The circular AWG (which may also be simply referred to as an AWG) 30*a* distributes an optical signal inputted in an input port into an appropriate output port according to a wavelength thereof. That is, the optical TS-SW unit 30A exemplifies a case in which a double ring and 4 wavelengths for each ring are used, and also in which inter-fiber wavelength exchange is performed with a configuration of 1 ADD/1 DROP without using FWCs.

Example 2

Next is described a configuration of an optical TS-SW unit according to Example 2. A case of a double ring, 1 ADD/1 DROP, inter-fiber exchangeability, and a wavelength for switch control is assumed herein.

Figure 53:
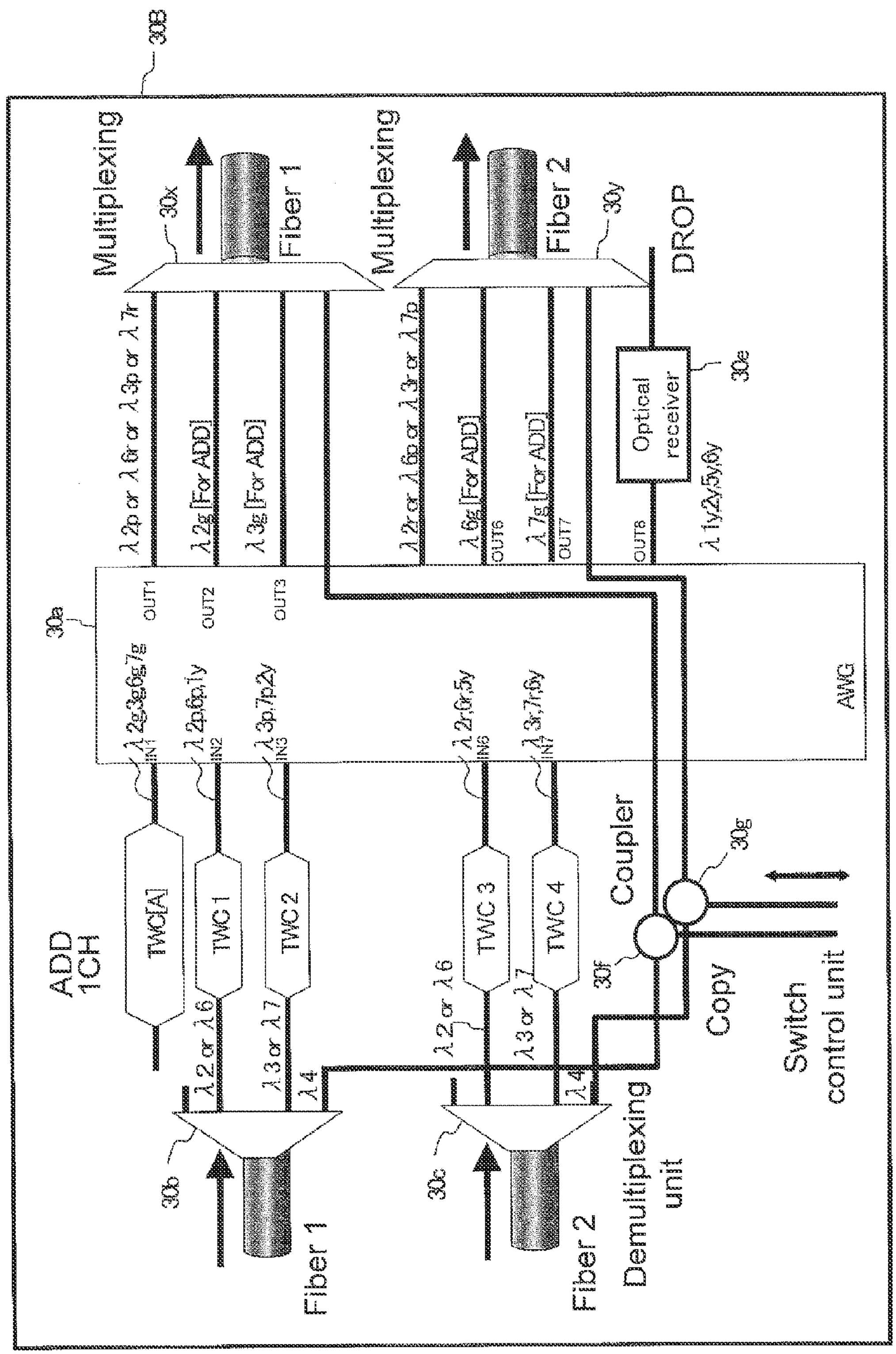
FIG. 53 is a diagram for explaining a configuration of an optical TS-SW unit according to Example 2.

FIG. 53 is a diagram for explaining a configuration of an optical TS-SW unit 30B according to Example 2.

The optical TS-SW unit 30B includes: the kN×kN circular AWG 30*a* in which, with respect to kN wavelengths of λi (i=0 to kN−1), a plurality of wavelengths whose "i MOD N" take the same value are deemed as the same wavelengths; k units of the circular 1×N AWGs 30*b*, 30*c* that are disposed at the prior stage of the AWG 30*a* and serve as a wavelength conversion unit and a demultiplexing unit; k(N−2) units of the THRU (passing through)/DROP TWC 1 to TWC 4; one unit of ADD TWC [A]; the optical receiver 30*e* as a DROP interface; and k units of the (N−1)×1 multiplexing units 30*x*, 30*y*. Further, a wavelength for control is prepared for performing a switch control. The demultiplexing units 30*b*, 30*c* are connected to the couplers 30*f*, 30*g*, respectively, so as to ensure reachability of the wavelength for control. Each of switches performs a copy operation. FIG. 53 illustrates a case where k=2 and N=4.

That is, the optical TS-SW unit 30B exemplifies a case: in which a double ring and 4 wavelengths for each ring are used; in which inter-fiber wavelength exchange is performed with a configuration of 1 ADD/1 DROP without using FWCs; and in which a wavelength for control is further used.

Example 3

Next is described a configuration of an optical TS-SW unit according to Example 3. A case of a double ring, 1 ADD/1 DROP, and inter-fiber exchangeability is assumed herein.

Figure 54:
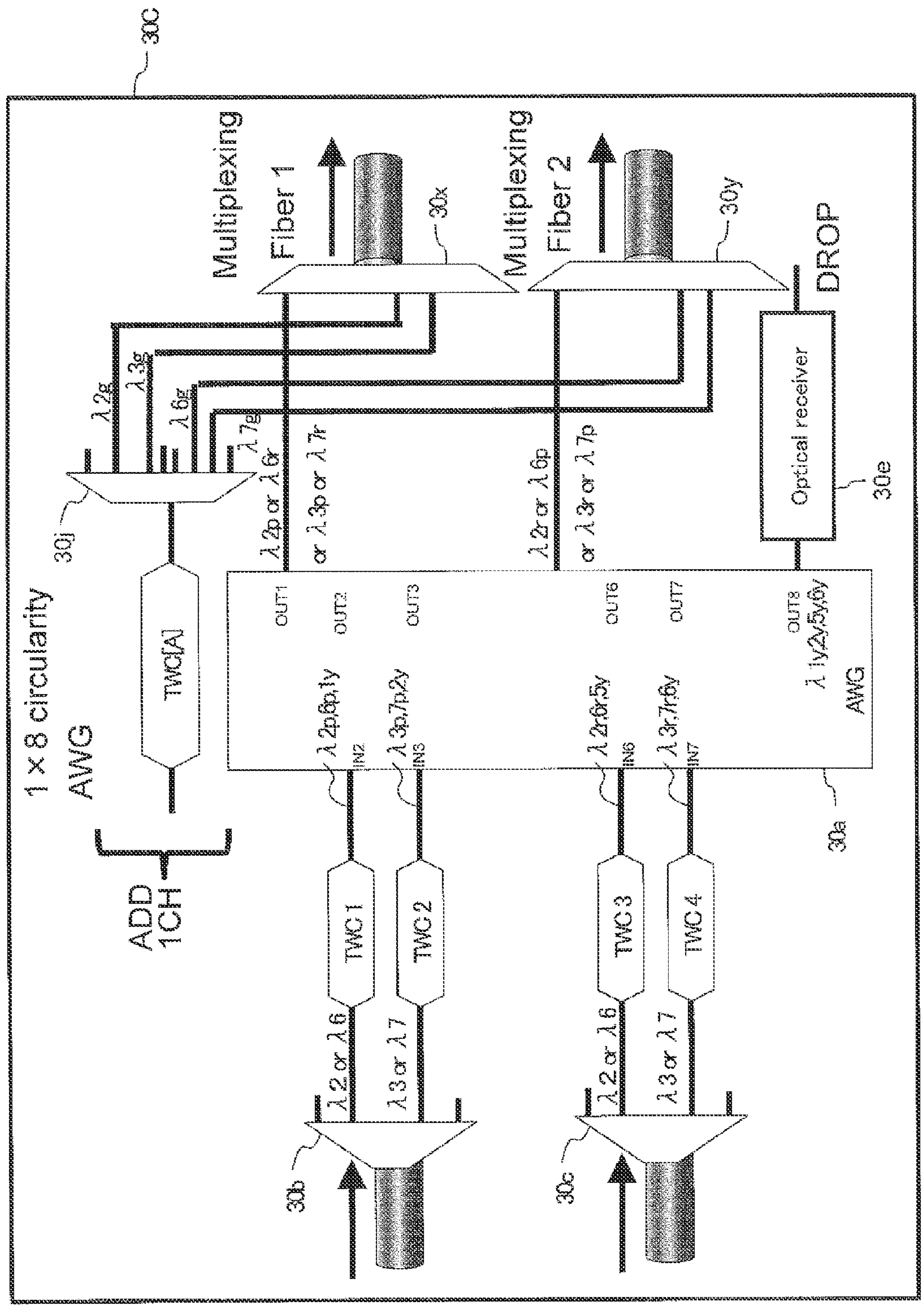
FIG. 54 is a diagram for explaining a configuration of an optical TS-SW unit according to Example 3.

FIG. 54 is a diagram for explaining an optical TS-SW unit 30C according to Example 3.

The optical TS-SW unit 30C includes: the kN×kN circular AWG 30*a* in which, with respect to kN wavelengths of λi (i=0 to kN−1), a plurality of wavelengths whose "i MOD N" take the same value are deemed as the same wavelengths; k units of the circular 1 ∴N AWGs 30*b*, 30*c* that are disposed at the prior stage of the AWG 30*a* and serve as a wavelength conversion unit and a demultiplexing unit; k(N−2) units of the THRU (passing through)/DROP TWC 1 to TWC 4; one unit of ADD TWC [A] and a demultiplexing unit 30*j* that are disposed at a subsequent stage of the AWG 30*a*; the optical receiver 30*e* as a DROP interface; and k units of the (N−1)×1 multiplexing units 30*x*, 30*y*. FIG. 54 illustrates a case where k=2 and N=4.

That is, the optical TS-SW unit 30C exemplifies a case: in which a double ring and 4 wavelengths for each ring are used; and in which inter-fiber wavelength exchange is performed with a configuration of 1 ADD/1 DROP without using FWCs.

Example 4

Next is described a configuration of an optical TS-SW unit according to Example 4. A case where both inter-fiber exchange and in-fiber exchange are possible is assumed herein.

Figure 55:
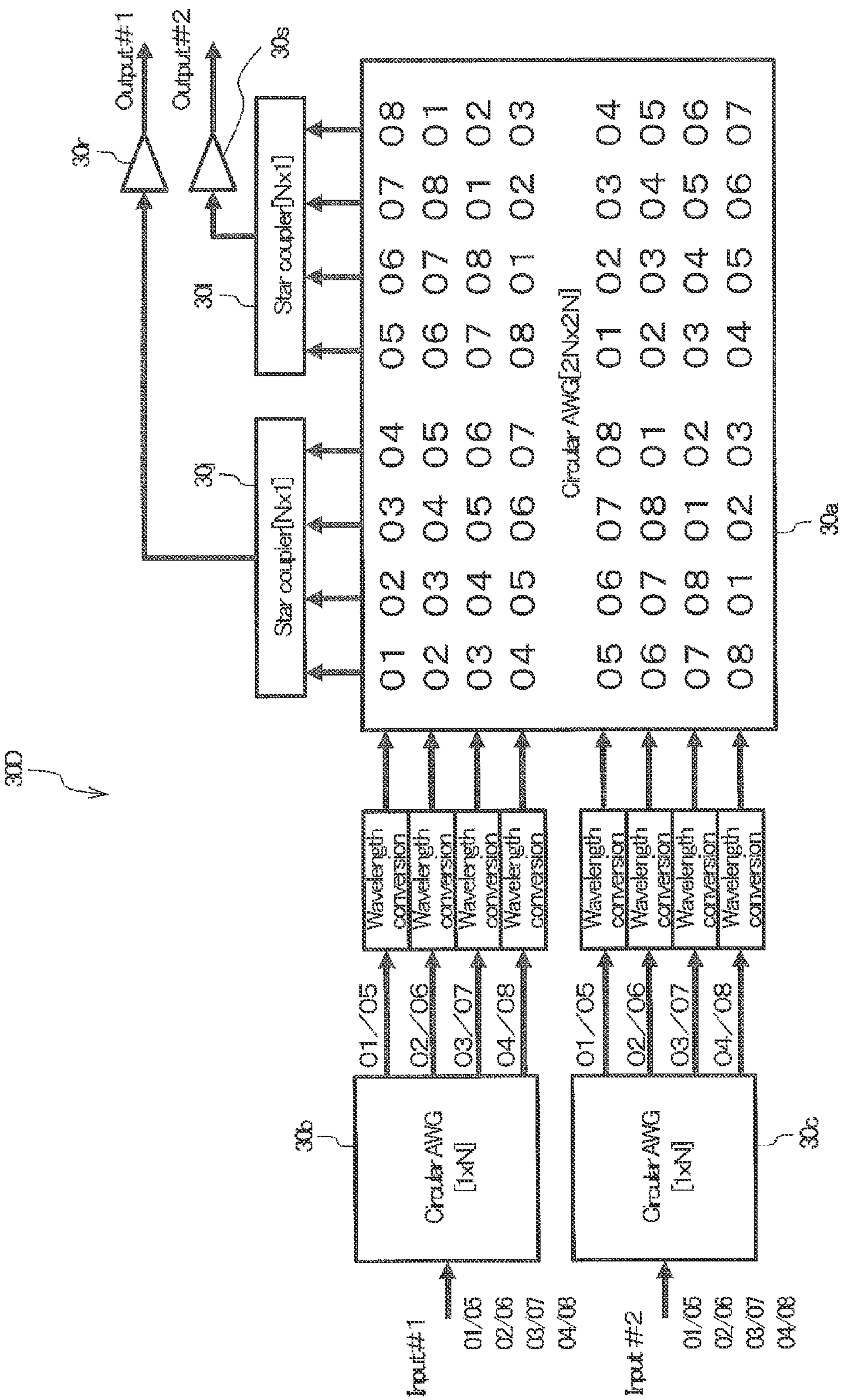
FIG. 55 is a diagram for explaining a configuration of an optical TS-SW unit according to Example 4.

FIG. 55 is a diagram for explaining an optical TS-SW unit 30D according to Example 4.

The optical TS-SW unit 30D includes: the kN×kN circular AWG 30*a* in which, with respect to kN wavelengths of λi (i=0 to kN−1), a plurality of wavelengths whose "i MOD N" take the same value are deemed as the same wavelengths; k units of the circular 1×N AWGs 30*b*, 30*c* that are disposed at the prior stage of the AWG 30*a* and serve as a wavelength conversion unit and a demultiplexing unit; 1×N couplers (multiplexing units) 30*j*, 30*l* that are disposed at the subsequent stage of the circular AWG 30*a*; and k output ports 30*r*, 30*s*.

The optical TS-SW unit 30D exemplifies a case: in which a double ring and 4 wavelengths for each ring are used; and in which inter-fiber wavelength exchange and in-fiber wavelength exchange can be performed without using FWCs.

Example 5

Next is described a configuration of an optical TS-SW unit according to Example 5. A case of a double ring, 1 ADD/1 DROP, 1 AWG/1 fiber, and a wavelength for switch control is assumed herein.

Figure 56:
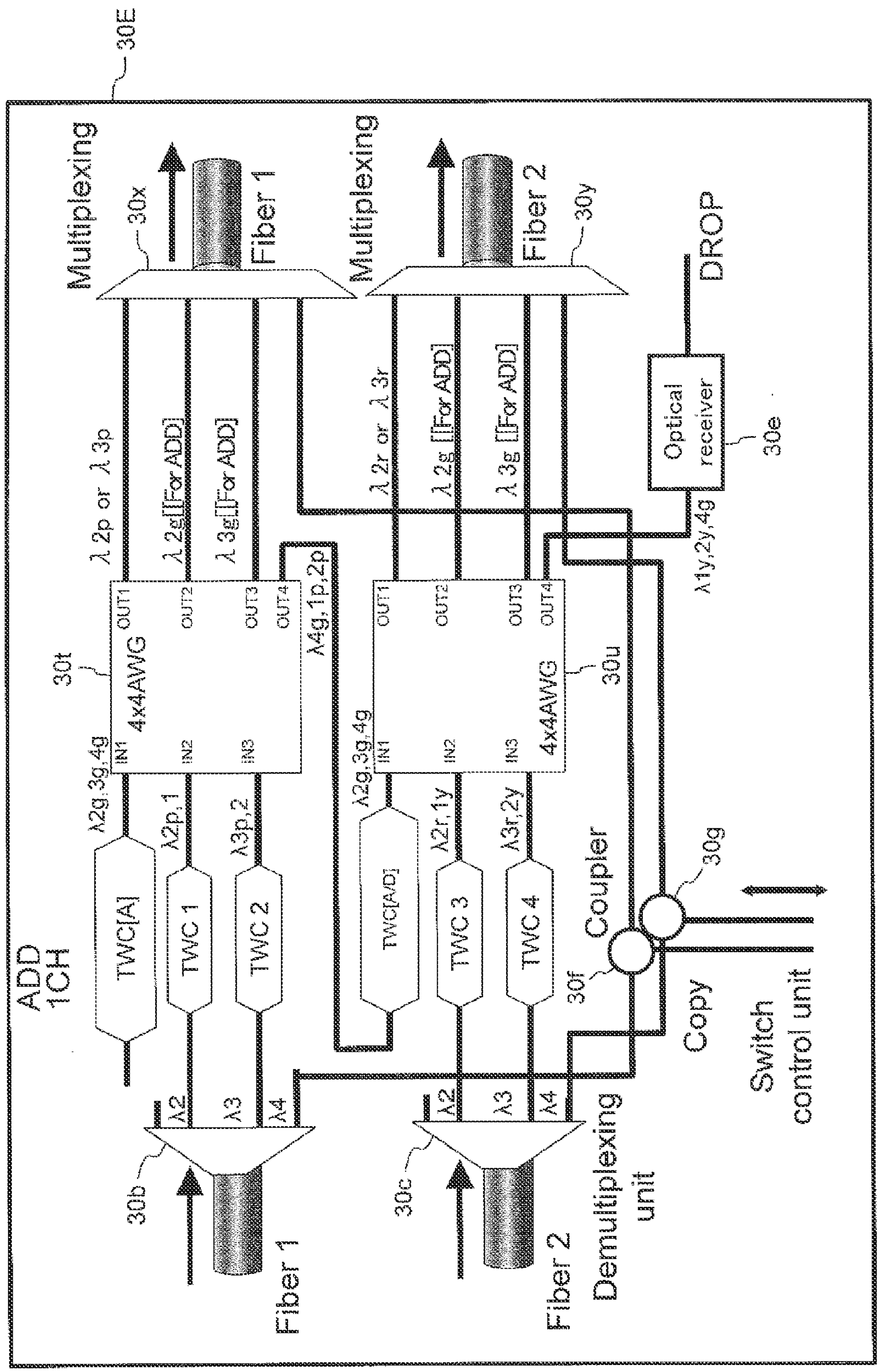
FIG. 56 is a diagram for explaining a configuration of an optical TS-SW unit according to Example 5.

FIG. 56 is a diagram for explaining a configuration of an optical TS-SW unit 30E according to Example 5.

The optical TS-SW unit 30E includes: kN×kN circular AWGs 30*t*, 30*u* in which, with respect to kN wavelengths of λi (i=0 to kN−1), a plurality of wavelengths whose "i MOD N" take the same value are deemed as the same wavelengths; k units of the circular 1×N AWGs 30*b*, 30*c* that are disposed at a prior stage of the AWG 30*a* and serve as a wavelength conversion unit and a demultiplexing unit; k(N−2) units of the THRU/DROP TWC 1 to TWC 4; one unit of the ADD TWC [A]; the optical receiver 30*e* as a DROP interface; a TWC [A/D] for inter-fiber ADD/DROP; and k units of the (N−1)×1 multiplexing units 30*x*, 30*y*. Further, a wavelength for control is prepared for performing a switch control. The demultiplexing units 30*b*, 30*c* are connected to the couplers 30*f*, 30*g*, respectively, so as to ensure reachability of the wavelength for control. Each of switches performs a copy operation.

FIG. 56 illustrates a case where k=2 and N=4. A wavelength for data is 2 wavelength/fiber and a wavelength for control is 1 wavelength/fiber. That is, the optical TS-SW unit 30E exemplifies a case: in which a double ring and 4 wavelengths for each ring are used with 1 fiber for each of the AWGs 30*t*, 30*u*; and in which a wavelength for control is used with a configuration of 1 ADD/1 DROP without using FWCs.

Example 6

Next is described an optical TS-SW unit according to Example 6. A case of a double ring (1 ring 4 wavelengths) and ADD/DROP 1 CH (channel) is assumed herein.

Figure 57A:
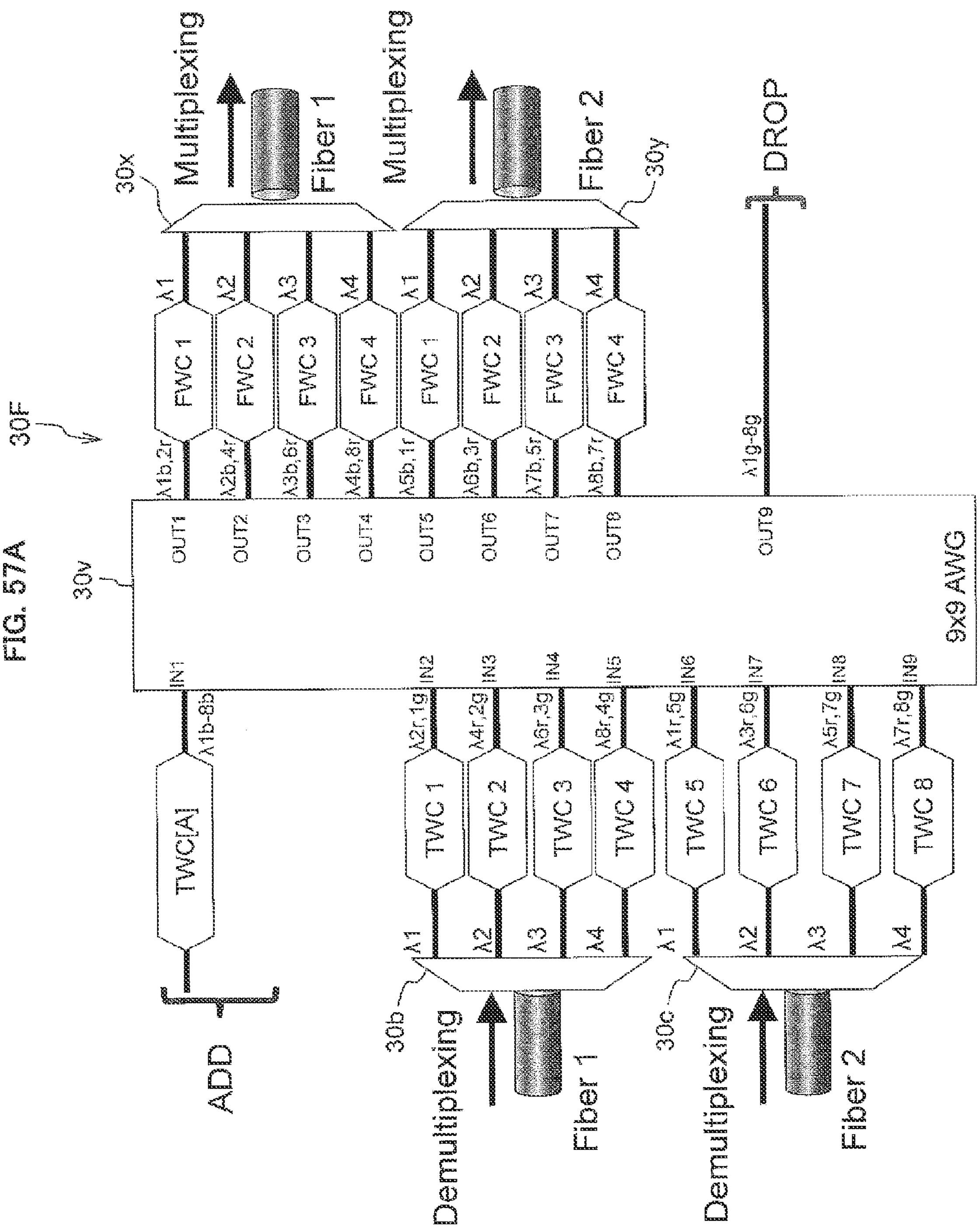
FIG. 57A is a diagram for explaining a configuration of an optical TS-SW unit according to Example 6.

FIG. 57A is a diagram for explaining a configuration of an optical TS-SW unit 30F according to Example 6. FIG. 57B is a diagram illustrating TWC wavelength requirements between eight TWCs, namely, TWC 1 to TWC 8, and a TWC [A] for ADD in the optical TS-SW unit 30F.

As illustrated in FIG. 57A, the optical TS-SW unit 30F includes: a 9×9 AWG 30*v*; eight TWCs disposed at a prior stage of the 9×9 AWG 30*v*, namely, TWC 1 to TWC 8; eight FWCs disposed at a subsequent stage of 9×9 AWG 30*v*, namely, FWC 1 to FWC 4+FWC 1 to FWC 4; and a TWC [A] for ADD. In FIG. 57A and FIG. 57B: let "r" be a suffix of a wavelength for THRU; "g", for DROP; and "b", for ADD, so as to distinguish one wavelength from another.

The ADD used herein means that a signal inputted in IN1 of the AWG 30*v* is outputted to any one of OUT1 to OUT9. The DROP used herein means that a signal inputted in any one of IN2 to IN9 of the AWG 30*v* is outputted to OUT9. The THRU used herein means that a signal inputted in any one of IN2 to IN9 of the AWG 30*v* is outputted to OUT having a number obtained by subtracting 1 from the number of IN in which the signal is inputted.

Next are described detailed operations with reference to FIG. 57A. In a case of ADD, according to which one of OUT1 to OUT8 a signal is outputted, TWC [A] converts a wavelength of the signal to one of λ1b to 8b and then inputs the signal into IN1. Each wavelength inputted into IN1 corresponds to an output destination, such as λ1b to OUT1, λ2b to OUT2, λ3b to OUT3, λ4b to OUT4, λ5b to OUT5, λ6b to OUT6, λ7b to OUT7, and λ8b to OUT8. Incoming signals from Fiber 1 and Fiber 2 are demultiplexed at the AWG 30*b*, 30*c*, respectively, and are wavelength-converted appropriately by the TWCs 1 to 8 depending on being subjected to THRU or DROP. Correspondence between the wavelength and the output destination is, by taking the TWC 1 as an example, in a case of a THRU, λ1 g, and λ2r corresponds to OUT1.

Example 7

Next is described a configuration of an optical TS-SW unit according to Example 7. A case of a double ring (1 ring 4 wavelengths), ADD/DROP 1CH, and in-fiber wavelength exchange is assumed herein.

Figure 58A:
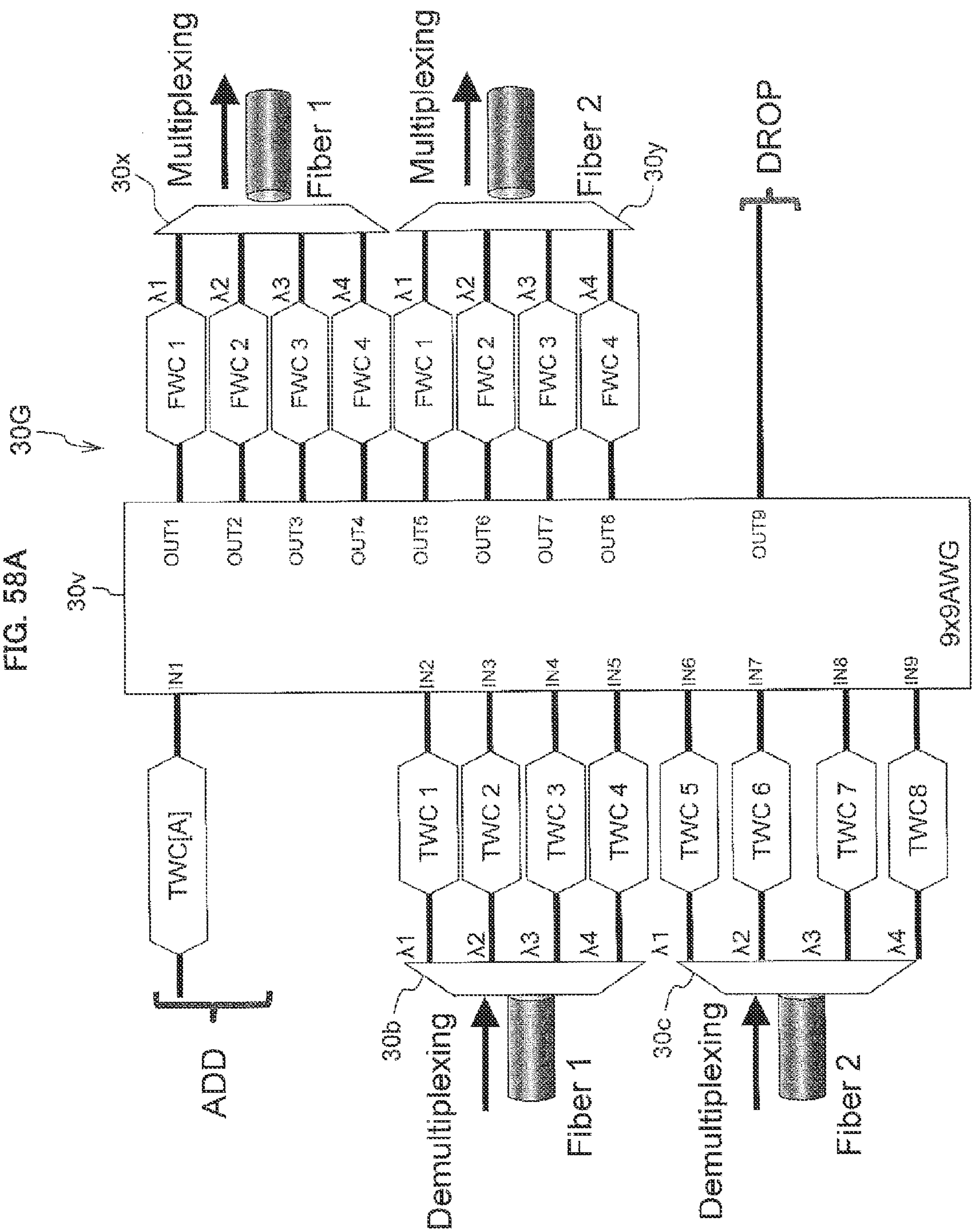
FIG. 58A is a diagram for explaining a configuration of an optical TS-SW unit according to Example 7.

FIG. 58A is a diagram for explaining an optical TS-SW unit 30G according to Example 7. FIG. 58B is a diagram illustrating TWC wavelength requirements of eight TWCs, TWC 1 to TWC 8, and the TWC [A] for Add in the optical TS-SW unit 30G.

The optical TS-SW unit 30G illustrated in FIG. 58A has a configuration same as that of the optical TS-SW unit 30F illustrated in FIG. 57A except that the wavelength requirements of the TWCs 1 to 8, and [A] are different, detailed description of which is thus omitted herefrom. In FIG. 58A and FIG. 58B, let "r" be a suffix of a wavelength for THRU; "g", for DROP; "b", for ADD; and "y", for in-fiber exchange, so as to distinguish one wavelength from another.

The in-fiber exchange herein means that, for example: a signal inputted in any one of IN2 to IN5 of the AWG 30*v* is outputted to any output destination other than OUT1 to OUT 4 for THRU; and that a signal inputted in IN6 to IN9 of the AWG 30*v* is outputted to any output destination other than OUT5 to OUT8 for THRU. Next are described detailed operations with reference to FIG. 58A and FIG. 58B. The operations herein are similar to those of Example 6 in the cases of ADD, DROP, and THRU. A case of the in-fiber exchange is thus described taking the TWC 1 as an example. In a case where an output destination of a signal inputted into IN2 of the AWG 30*v* is changed to OUT2, a wavelength of the signal inputted into the TWC 1 is changed to λ3y. Similarly, when the output destination is changed to OUT3, λ4y; and, to OUT4, λ5y.

Example 8

Next is described a configuration of an optical TS-SW unit according to Example 8. A case of a double ring (1 ring 4 wavelengths), ADD/DROP 1 CH, inter-fiber and in-fiber wavelength exchange is assumed herein.

Figure 59A:
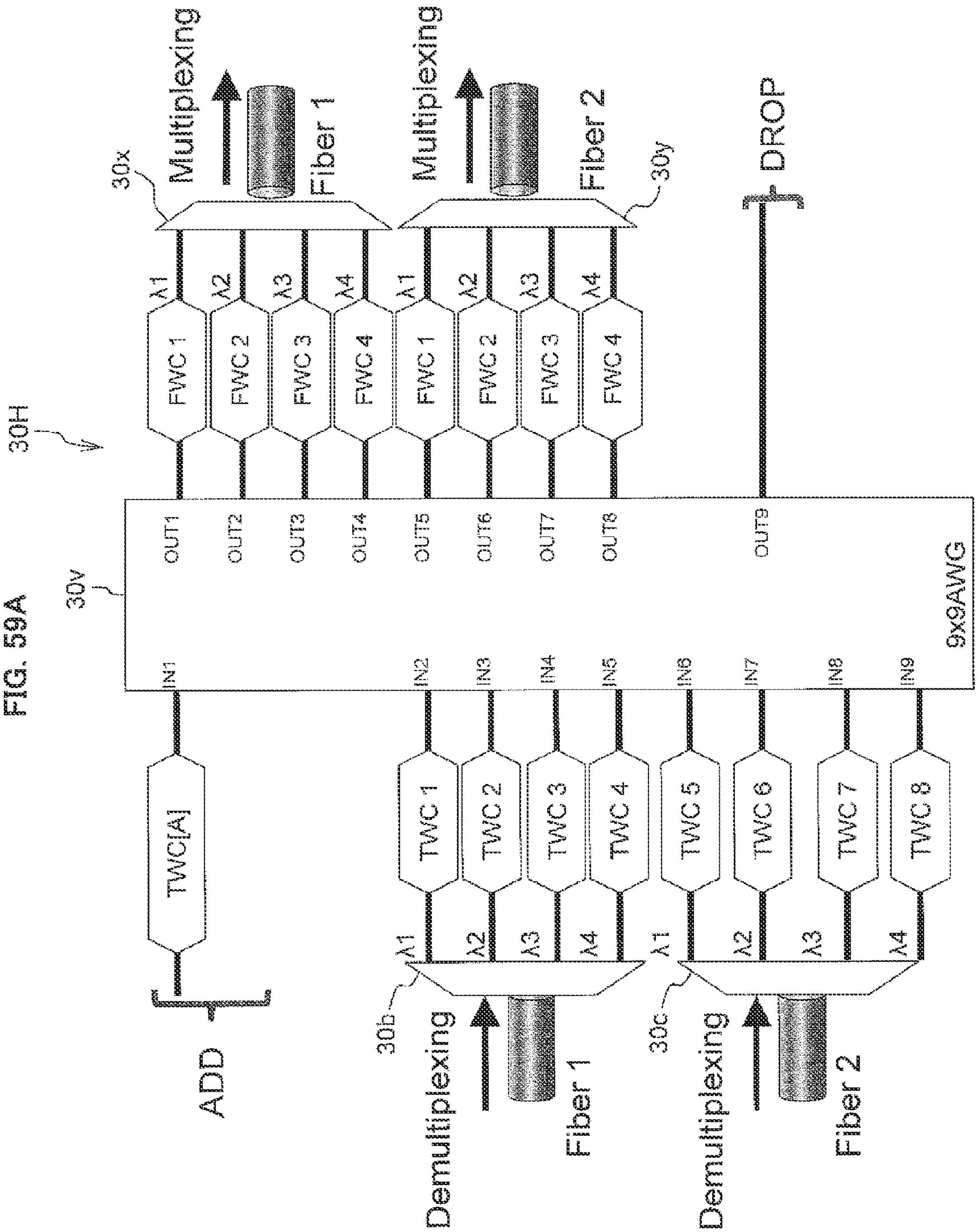
FIG. 59A is a diagram for explaining a configuration of an optical TS-SW unit according to Example 8.

FIG. 59A is a diagram for explaining a configuration of an optical TS-SW unit 30H of Example 8. FIG. 59B is a diagram illustrating TWC wavelength requirements of eight TWC 1 to TWC 8 and a TWC [A] for ADD in the optical TS-SW unit 30H.

The optical TS-SW unit 30H has a configuration similar to that of the optical TS-SW unit 30F illustrated in FIG. 57A except that the wavelength requirements of TWCs 1 to 8, and [A] are different, detailed description of which is thus omitted herefrom. In FIG. 59A and FIG. 59B, let "r" be a suffix of a wavelength for THRU; "g", for DROP; "b", for ADD; "y", for in-fiber exchange; and "p", for inter-fiber exchange, so as to distinguish one wavelength from another.

The inter-fiber exchange used herein means that: a signal inputted in any one of IN2 to IN5 of the AWG 30*v* is outputted to any one of OUT5 to OUT8; and that a signal inputted in IN6 to IN9 of the AWG 30*v* is outputted to any one of OUT1 to OUT 4. Next are described detailed operations with reference to FIG. 59A and FIG. 59B. The operations herein are similar to those of Example 7 in the cases of ADD, DROP, THRU, and in-fiber exchange. A case of the inter-fiber exchange is thus described taking the TWC 1 as an example. In a case where an output destination of a signal inputted into IN2 of the AWG 30*v* is changed to OUT5, a wavelength of the signal inputted into the TWC 1 is changed to λ6p. Similarly, when the output destination is changed to OUT6, λ7p; to OUT7, λ8p; and, to OUT8, λ9p.

Next are described configurations of a TWC and a FWC.

Figure 60:
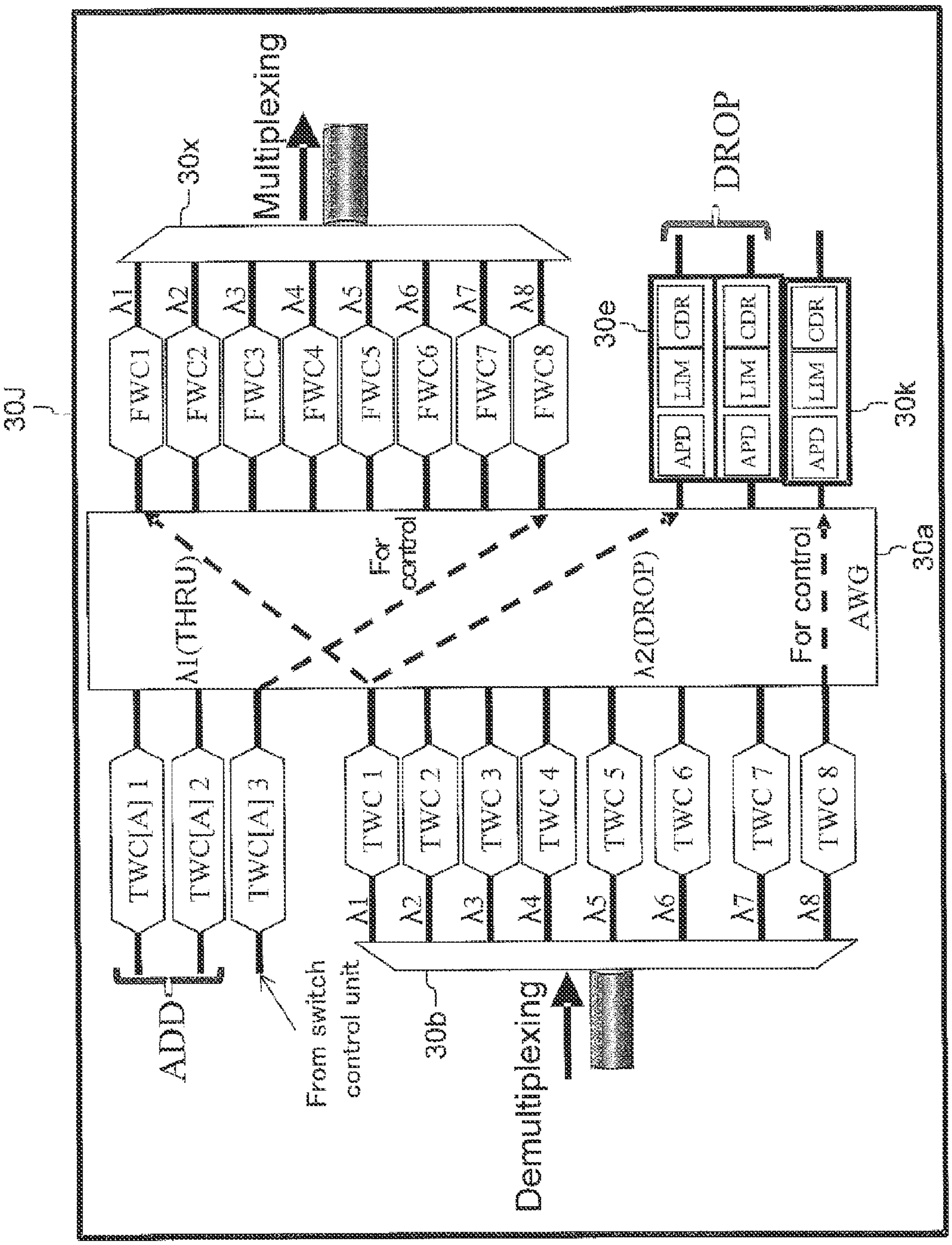
FIG. 60 is a block diagram illustrating a configuration example of an optical TS-SW unit including TWCs and FWCs.

FIG. 60 is a block diagram illustrating a configuration example of an optical TS-SW unit 30J including TWCs and FWCs.

The optical TS-SW unit 30J includes: a demultiplexer (demultiplexing unit) 30*b* that has one or more input ports and a plurality of output ports and demultiplexes an inputted optical signal having been wavelength multiplexed, for each wavelength; the AWG 30*a* that allocates an optical signal inputted in an input port to an output port according to a wavelength of the optical signal; TWC [A]1 to TWC [A]3, and TWC 1 to TWC 8 that perform wavelength conversion so as to select from among passing through (THRU), insertion (ADD), and branching (DROP) at an optical switch node; a multiplexer (multiplexing unit) 30*x* that wavelength multiplexes an outputted optical signal of each wavelength so as to transmit to a subsequent stage; FWC 1 to FWC 8 that perform wavelength conversion such that an optical signal is outputted to the same port at a demultiplexing unit (not shown) at the subsequent stage; and an optical receiver 30*e* that receives an optical signal which is branched (DROP) at the AWG 30*a*.

As seen in the figure, an optical signal having been transmitted from the subsequent stage by means of wavelength multiplexing is demultiplexed into wavelengths λ1 to λ8 by the demultiplexer 30*b*. The demultiplexed optical signals are inputted into the input port of the AWG 30*a* via TWC 1 to TWC 8. Separately from those signals, an optical signal to be inserted is inputted into the input port of the AWG 30*a* via TWC [A]1 to TWC [A]3. Eight of the output ports of the AWG 30*a* is used for transmission to the subsequent stage. An optical signal from any of the output ports is inputted into the multiplexer (multiplexing unit) 30*x* via FWC 1 to FWC 8 and is then wavelength multiplexed and transmitted to the subsequent step.

The AWG 30*a* also has the output ports each of which is used for branching (DROP). The output port is connected to the optical receiver 30*e*. The optical receiver 30*e* includes: a photoelectric device (APD) that performs photoelectric conversion; a limiting amplifier (LIM) that absorbs power differences between optical signals; and a clock data recovery circuit (CDR) that absorbs power differences between optical signals, which are connected in series in this order. The optical receiver 30*e* absorbs power/phase differences between signals and receives an optical signal.

In the example illustrated in FIG. 60, a wavelength λ8 is designed to be a fixed wavelength for control. One channel of each of ADD and DROP is also designed to be for control and is connected to a switch control unit 30*k* for controlling the optical TS-SW unit 30J. The switch control unit 30*k* also includes: an APD; a LIM; and a CDR.

Figure 61:
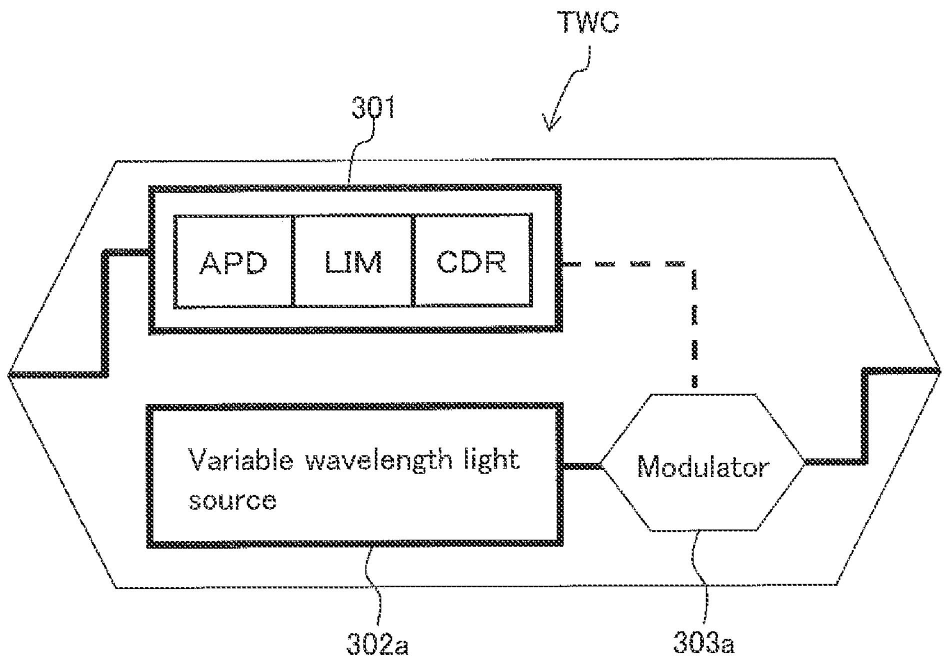
FIG. 61 is a block diagram illustrating a configuration example of the TWC illustrated in FIG. 60.

FIG. 61 is a block diagram illustrating a configuration example of the TWC 1 to TWC 8 (or the TWC [A]1 to TWC [A]3) illustrated in FIG. 60.

As illustrated in FIG. 61, the TWC includes: an optical burst receiver 301; a variable wavelength light source 302*a*; and a modulator 303*a*. The optical burst receiver 301 includes: an APD; a LIM; and a CDR. In FIG. 61, a transmission path of an optical signal is indicated by a solid line, and a transmission path of an electrical signal is indicated by a broken line.

The APD performs photoelectric conversion which converts an optical signal into an electrical signal. The LIM reduces a power difference generated between frames. The power difference is caused by, for example, a difference in loss owing to transmission paths different in length or in output power of light sources. The CDR reduces a phase difference generated between frames. The phase difference is caused by, for example, a difference in phase owing to transmission paths different in length.

The variable wavelength light source 302*a* varies oscillation wavelength so as to change an output destination at the AWG 30*a*. The modulator 303*a* puts a received signal on another wavelength.

The TWC with the above-described configuration performs OEO (Optical-Electrical-Optical) conversion, to thereby enable power of attenuated light to be recovered and eliminate a need of an optical amplifier, even if data is transmitted over a long distance through an optical signal.

Figure 62:
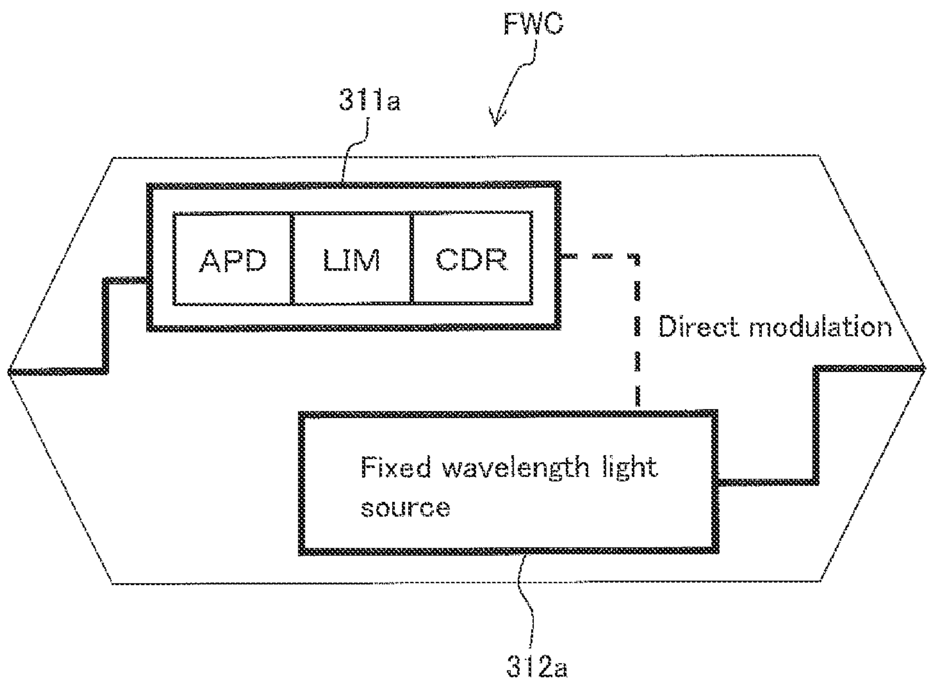
FIG. 62 is a block diagram illustrating a configuration example of the FWC illustrated in FIG. 60.

FIG. 62 is a block diagram illustrating a configuration example of the FWC 1 to FWC 8 illustrated in FIG. 60.

The FWC includes: an optical burst receiver 311*a*; and a fixed wavelength light source 312*a*. The optical burst receiver 311*a* includes: an APD, a LIM, and a CDR. In FIG. 62, a transmission path of an optical signal is indicated by a solid line, and a transmission path of an electrical signal is indicated by a broken line.

The APD performs photoelectric conversion. The LIM reduces a power difference generated between frames. The power difference is caused by, for example, losses received which are different from one port to another of an AWG, or differences in output power of light sources. The CDR reduces a phase difference generated between frames. The phase difference is caused by, for example, a difference in phase owing to a difference in optical paths of the different AWGs 30*a*.

The fixed wavelength light source 312*a* performs wavelength conversion such that a wavelength of a data for THRU has a wavelength same as that of a data for ADD, so as to output the both data to the same port in a demultiplexing unit (not shown) at a subsequent stage.

Next is described a case where the optical TS-SW unit is a spatial switch of broadcast and select type.

Figure 63:
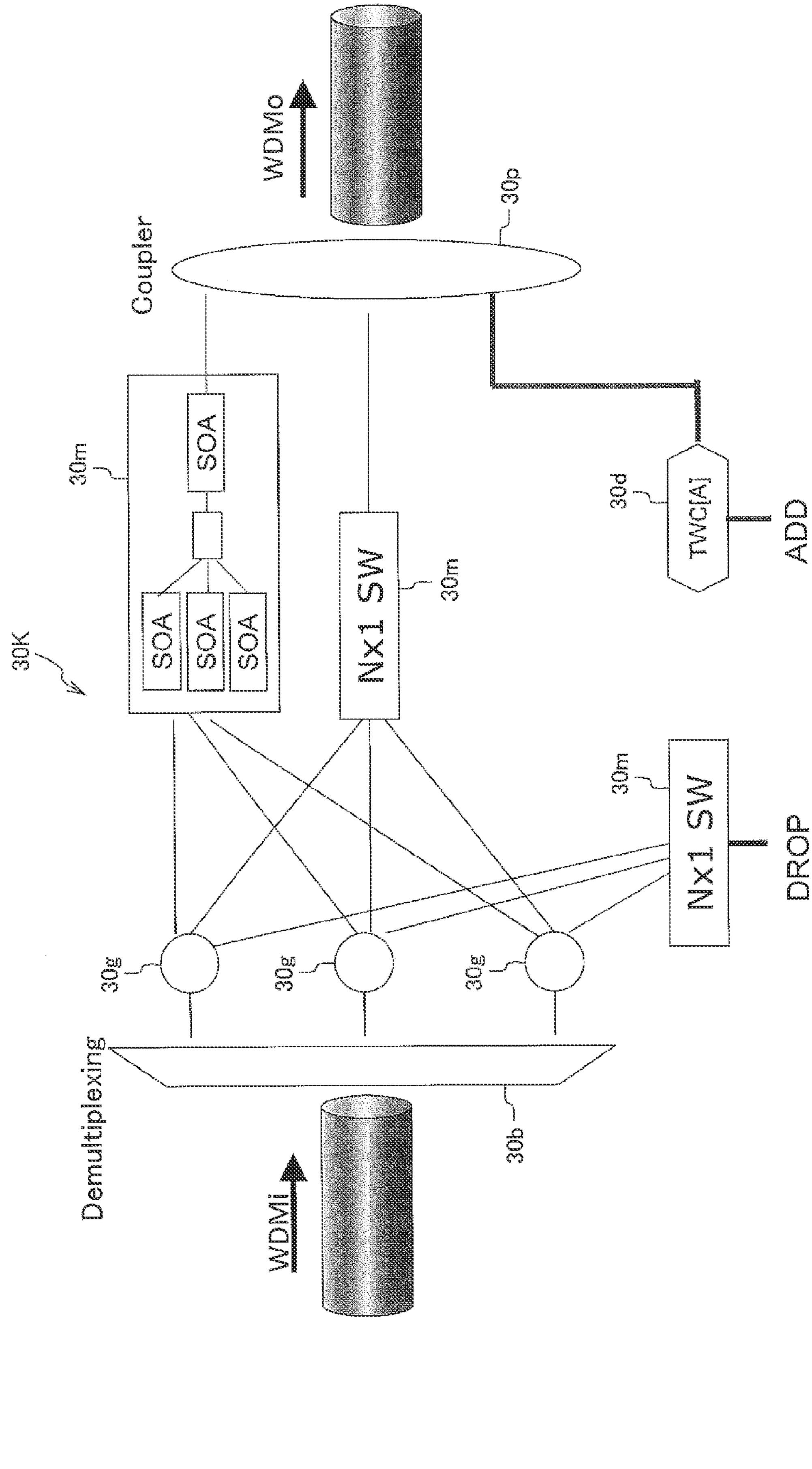
FIG. 63 is a block diagram illustrating a basic structure of a spatial switch of broadcast and select type.

FIG. 63 is a diagram illustrating a basic configuration of a spatial switch of broadcast and select type.

An optical TS-SW unit 30K illustrated in FIG. 63 includes: the AWG 30*b* that demultiplexes a wavelength multiplexed signal (WDMi); a plurality of N×1 SWs 30*m*; a N×1 SW 30*n* for DROP; a TWC 30*d* for ADD; and a coupler 30*p* that multiplexes optical signals from a plurality of the N×1 SWs 30*m*. The N×1 SWs 30*m* each include a semiconductor optical amplifier (SOA).

The AWG 30*b* of the optical TS-SW unit 30K demultiplexes an optical signal as a wavelength multiplexed signal (WDMi). A coupler 30*g* of the optical TS-SW unit 30K transmits the demultiplexed wavelength components to a plurality of the N×1 SWs 30*m*. Each of the N×1 SWs 30*m* controls transmission or interruption (through control) of a signal using the semiconductor optical amplifier (SOA). One of the N×1 SWs 30*m* is used as a port for DROP. The coupler 30*p*: multiplexes an output from the others of the N×1 SWs 30*m* and an output from the TWC 30*d* for ADD; and transmits the multiplexed output as a wavelength multiplexed signal (WDMo) to the subsequent stage. The N×1 SWs 30*m* each include: SOAs for each input port; a SOA of an output port; and a spatial switch. If the number of ports is N, the number of SOAs to be controlled is $N^2$.

Figure 64:
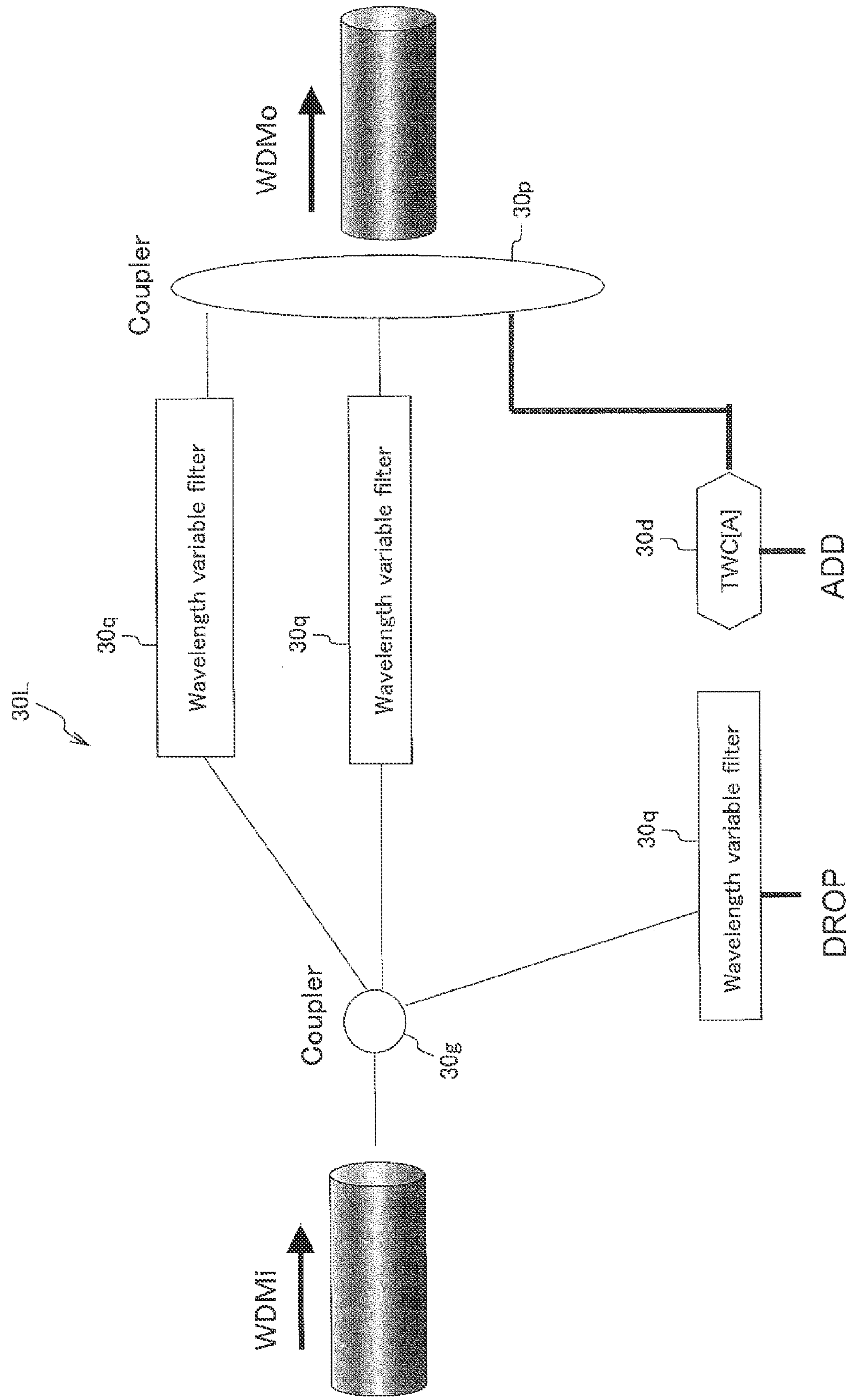
FIG. 64 is a diagram illustrating another example of the spatial switch of broadcast and select type.

FIG. 64 is a diagram illustrating another configuration example of the spatial switch of broadcast and select type.

An optical TS-SW unit 30L illustrated in FIG. 64 is similar to the optical TS-SW unit 30K illustrated in FIG. 63 except that: the AWG 30*b* at the prior stage is not included; and the N×1 SWs 30*m* using the SOAs are replaced by a wavelength variable filter 30*q*, so as to switch between transmission and interruption of an arbitrary wavelength. The wavelength variable filter 30*q* performs controls transmission or interruption (through control) of a signal with respect to an arbitrary wavelength using a wavelength filter. This configuration does not require the AWG 30*b* at the prior stage, which makes it possible to reduce the number of devices providing control for switches from $N^2$ units to N units, compared to the configuration illustrated in FIG. 63.

Sixth Embodiment

Next is described a sixth embodiment with reference to related drawings.

In an optical network according to the sixth embodiment, an optical network by wavelength division multiplexing (WDM) also uses a processing by time division multiplexing (TDM), by adding a concept of a time slot (TS) in a prescribed time period. In the network, TS allocation and wavelength allocation is dynamically changed according to an incoming traffic volume. This realizes a dynamic bandwidth allocation according to point-to-point traffic volume, and thus improves traffic accommodation efficiency of the entire system. When wavelength division multiplexing alone is used, because different wavelengths are used between different points to points, a problem of data collision occurred in a fiber network can be ignored. In the optical network according to this embodiment, however, because the TS is also used, it is necessary to accurately control transmission and reception timing of each node, also taking a propagation delay into account. Thus, in the optical network according to this embodiment, a master node and an optical switch node which corresponds to an OADM node in a conventional optical network are provided, and the master node dynamically changes TS allocation and wavelength allocation at each optical switch node.

Figure 65A:
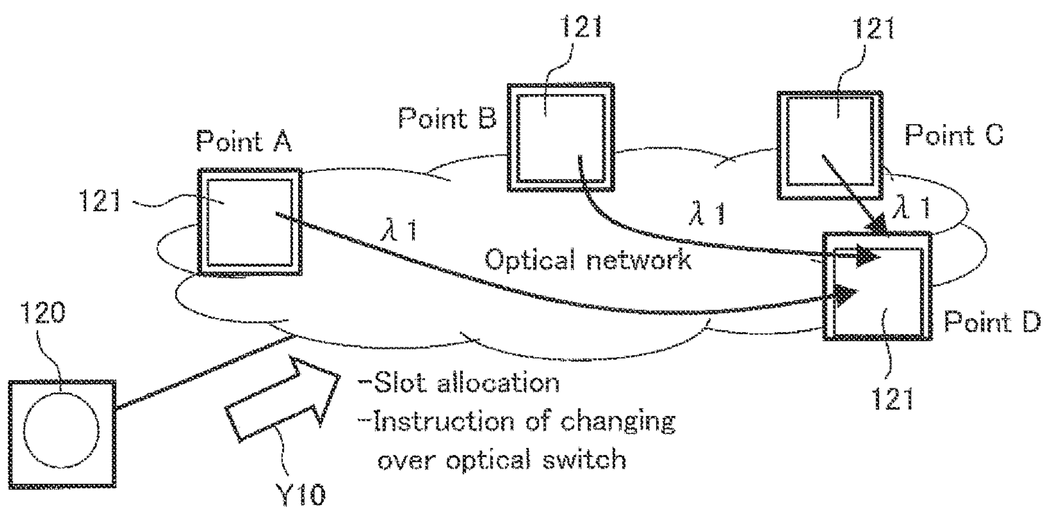
FIG. 65A is a system diagram for explaining an outline of operations of an optical network of the present invention.
Figure 65B:
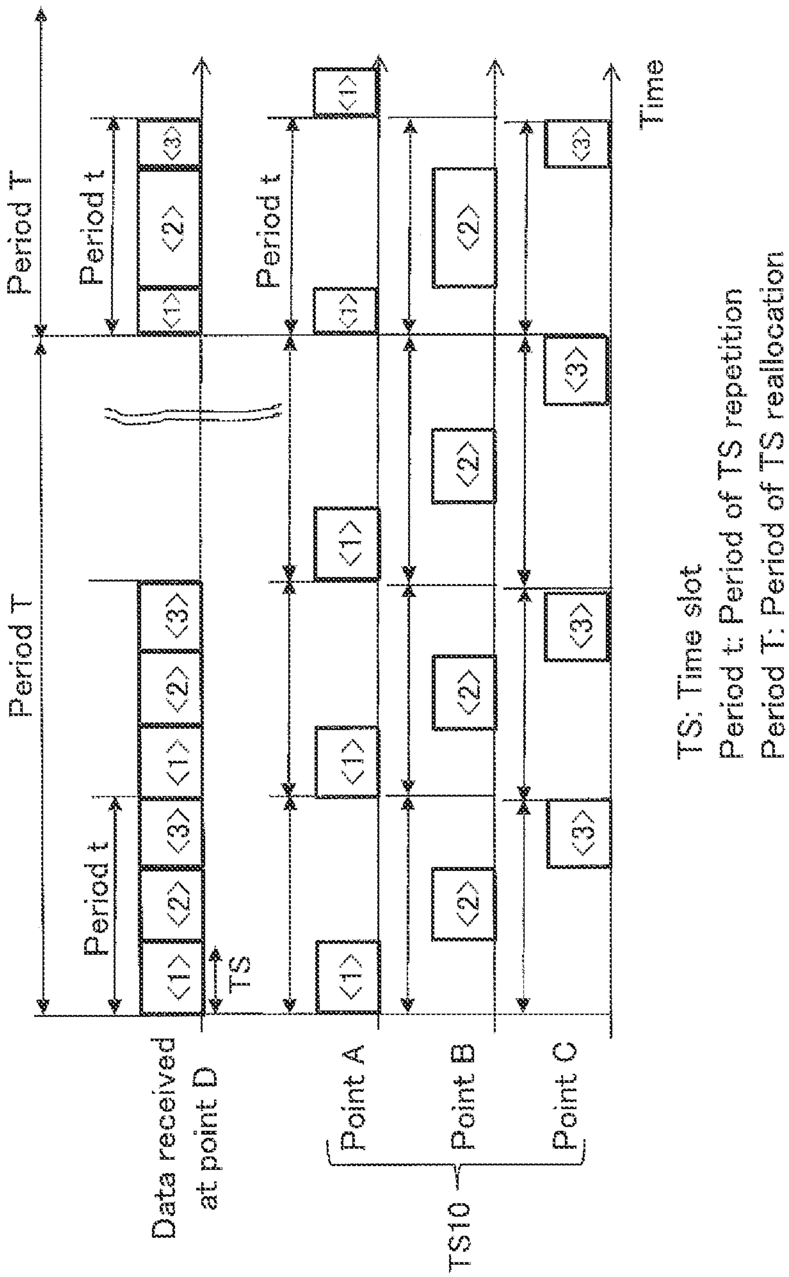
FIG. 65B is a time-series diagram for explaining the outline of operations of the optical network of the present invention.

FIG. 65A and FIG. 65B are diagrams each illustrating an outline of operations in the optical network according to this embodiment. Herein, as illustrated in FIG. 65A, an optical switch node 121 is installed at each of points A to D, and data is transmitted between the points via a ring-shaped optical network by means of optical communications. The master node 120 is provided that instructs the optical switch node 121 to perform TS allocation and change over an optical switch. Though the master node 120 is herein illustrated separately from the optical switch node 121, any of the optical switch nodes 121 may be configured to serve as the master node 120. That is, the master node 120 may be provided in any of the optical switch nodes 121. The optical switch node 121 performs data transmission and switching in accordance with allocated TS information, as indicated by an arrow Y10 from the master node 120. This makes it possible to transmit a plurality of pieces of data having the same destinations using single wavelength, without generating data collision. In the illustrated example, a plurality of pieces of data transmitted from the points A to C, to the point D are all transmitted using a single wavelength λ1. In order to prevent data collision, as illustrated in FIG. 65B, <1>, <2>, and <3> of the time slots TS are allocated to the points A, B, and C, respectively. Further, in this configuration, the WDM can be realized by a change in wavelengths used in <1>, <2>, and <3> of the time slots TS. For example, for different destinations, different wavelengths are used, and, for the same destination, time slots are allocated for each transmission source node.

Figure 66A:
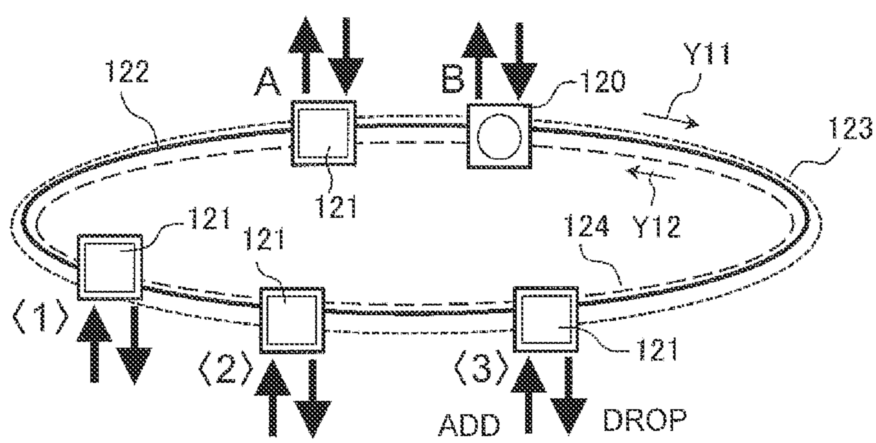
FIG. 66A is a diagram illustrating a network configuration of an optical network according to an embodiment of the present invention.

FIG. 66A is a diagram illustrating a configuration of another optical network system according to this embodiment. A ring optical network is provided, on which are installed: the master node 120; and a plurality of the optical switch nodes 121. The optical network includes: a unidirectional transmission data line 122 that is used for transmitting a data; and control lines 123, 124 each of which is used for transmitting a controlled data. The control line 123 transmits control information on a network clockwise in the figure, and the control line 124 transmits control information counterclockwise in the figure.

The optical network system is a WDM/TDM ring network with N wavelength multiplexing which uses both wavelength multiplexing and time multiplexing making use of a time slot (TS), to thereby perform ADD/DROP of data. In the network system, bandwidth allocation is dynamically performed according to a traffic volume from an external network. The bandwidth allocation can be realized by changing a wavelength and a TS allocated amount defined in the optical network system. At an entrance of the optical network system, a data from the external network is converted into a data in a time slot, in accordance with the TS allocated amount. On the other hand, inside the optical network system, switching is performed bufferless/headerless by WDM/TDM where light is as it is.

The master node 120 has functions as follows:

(a) periodically collect a traffic volume coming from each of the optical switch nodes 121; and determines a TS allocated amount to be allocated to each of the switch nodes, by making the TS allocated amount correspond to the traffic volume;

(b) specify a timing for an operation start according to the allocated TS, taking into account a transmission delay time between buffers of different optical switch nodes 121; and (c) carry out re-allocation of a time slot according to the traffic volumes collected from each of the optical switch nodes at intervals of a prescribed time period (T). As described above, the master node 120 may be provided in the optical switch node.

Each of the optical switch nodes 121 includes a WDM/TDM switch. The optical switch node disposed at an edge of the optical network includes a buffer unit that performs TS conversion, in addition to the WDM/TDM switch. The optical switch node 121 has functions as follows:

(a) accumulate an input signal from an external network in the buffer unit; and notifies the master node 120 of a data amount for each destination;

(b) change a route for data transmission (ADD) from the buffer unit thereof and for the WDM/TDM switch, according to a TS table set by the master node 121; and (c) perform an operation of transmission/switching according to a TS table in which information on an operation in a prescribed period (period t), until the master node 121 updates the TS table. The optical switch node 121 as described above includes an optical TS-SW unit that realizes ADD/DROP and WDM/TDM switching, which will be detailed hereinafter.

In transmitting information between the master node 120 and the optical switch node 121, a wavelength for control which is different from that for data is used. Or, a fiber which is different from that for data (for example, control lines 123, 124 as illustrated) is used. This is to ensure reachability of the TS table for operating an active optical TS-SW unit (WDM/TDM switch) to each of the optical switch nodes 121. The master node 120 performs TS allocation to a control signal and a data signal transmitted from the optical switch node 121, so as not to occur packet collision on the ring. Note that there are two types of signal lines connected to the optical TS-SW unit, namely, a control signal which transmits a control packet and a control signal which transmits a data packet. The buffer unit of the optical switch node 121 may not be necessarily provided in the same unit and may be thus disposed at a geographically distant location. In this case, the system is preferably configured to further include a mechanism for measuring a distance such as a delay measurement between the buffer unit and the switch control unit. Further, a control signal line and a data line between the optical switch nodes 121 may share one fiber by means of wavelength multiplexing.

Figure 66B:
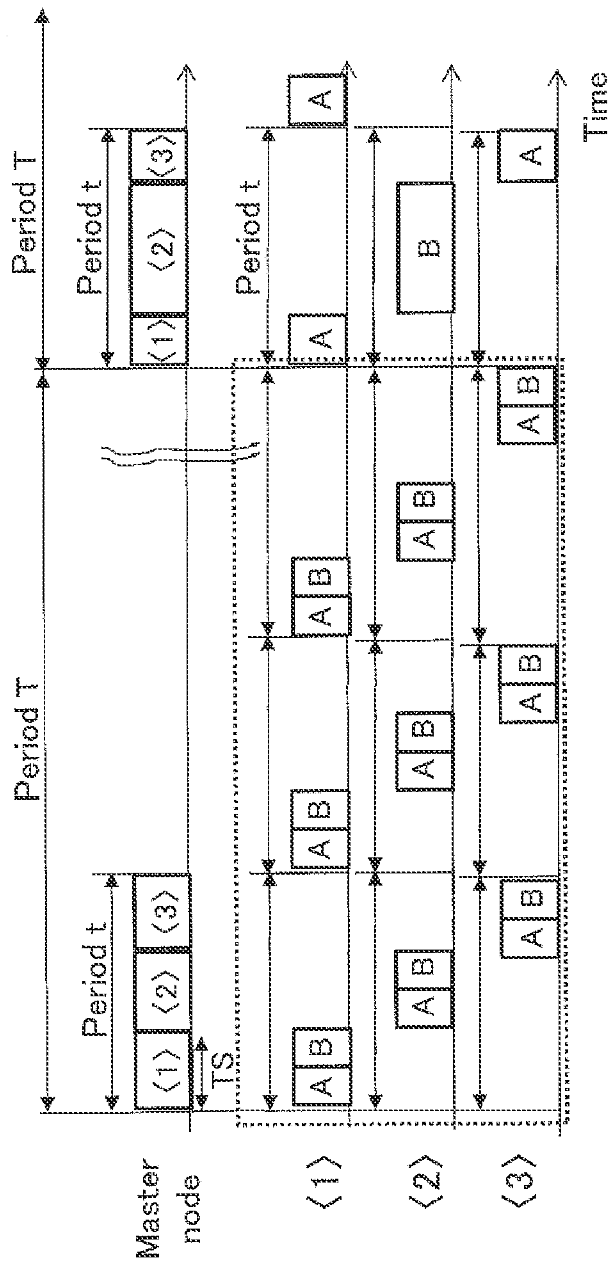
FIG. 66B is a timing diagram illustrating data transmission timing.

FIG. 66B is a diagram illustrating an example of TS allocation in which the optical switch nodes 121 indicated by <1> to <3> in FIG. 66A each transmit data to the optical switch nodes 121 indicated by A and B (B is also the master node 120) in FIG. 66B. The optical switch nodes 121 indicated by <1> to <3> each transmit the data at the allocated time slot, and repeat the transmission using the same time slot until the time slot is reallocated.

In the optical network system according to this embodiment, it is necessary to accurately control transmission and reception timing at the optical switch node. Two types of configurations are thus assumed, namely, a trigger type and a time synchronization type. The configuration of the master node 120 and the optical switch node 121 varies depending on whether the trigger type or the time synchronization type is used.

The optical switch node 121 of trigger type performs slot transmission and switching at an exact moment when TS information (a trigger) arrives thereto from the master node 120, on an assumption that a control packet and a data packet pass through the same route, that is, have the same propagation delay time. This can prevent slot collision between the optical switch nodes from occurring, without taking propagation delay into account.

The optical switch node 121 of time synchronization type measures propagation delay times between the buffers as well as between the optical switch nodes, and performs time synchronization control, taking the propagation delay into account, even when a control packet and a data packet do not pass through the same route. This can prevent slot collision between the optical switch nodes from occurring.

Figure 67A:
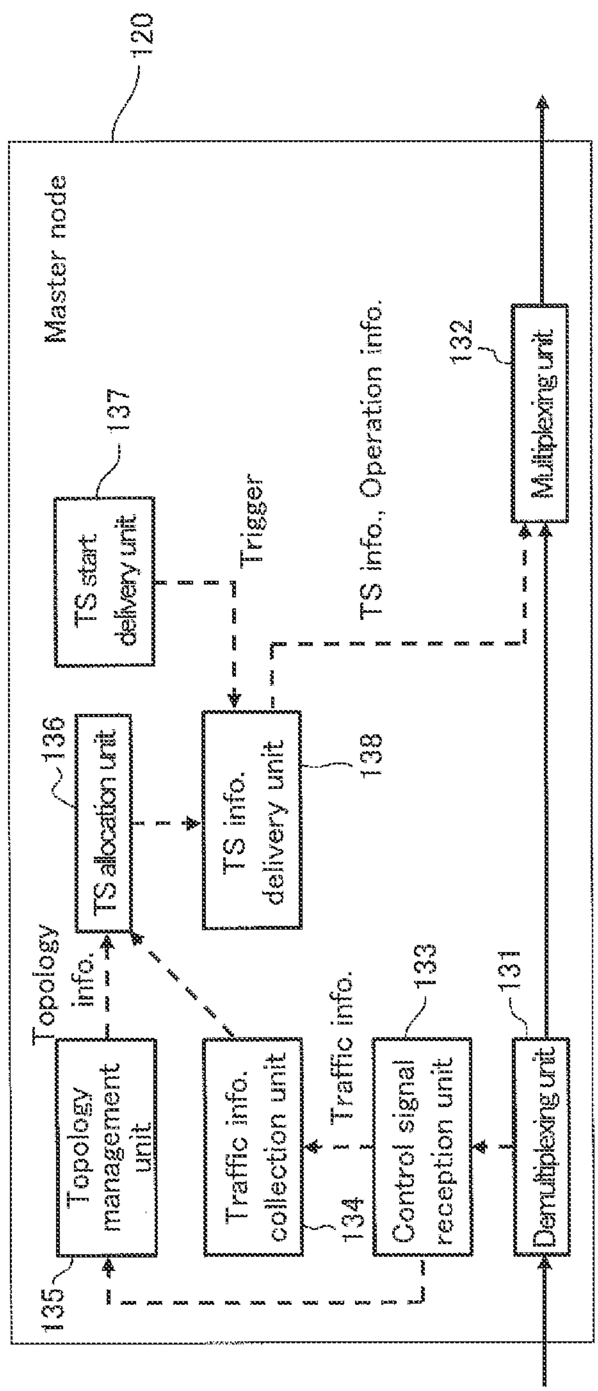
FIG. 67A is a block diagram illustrating a configuration of a master node of trigger type configuration according to the embodiment of the present invention.
Figure 67B:
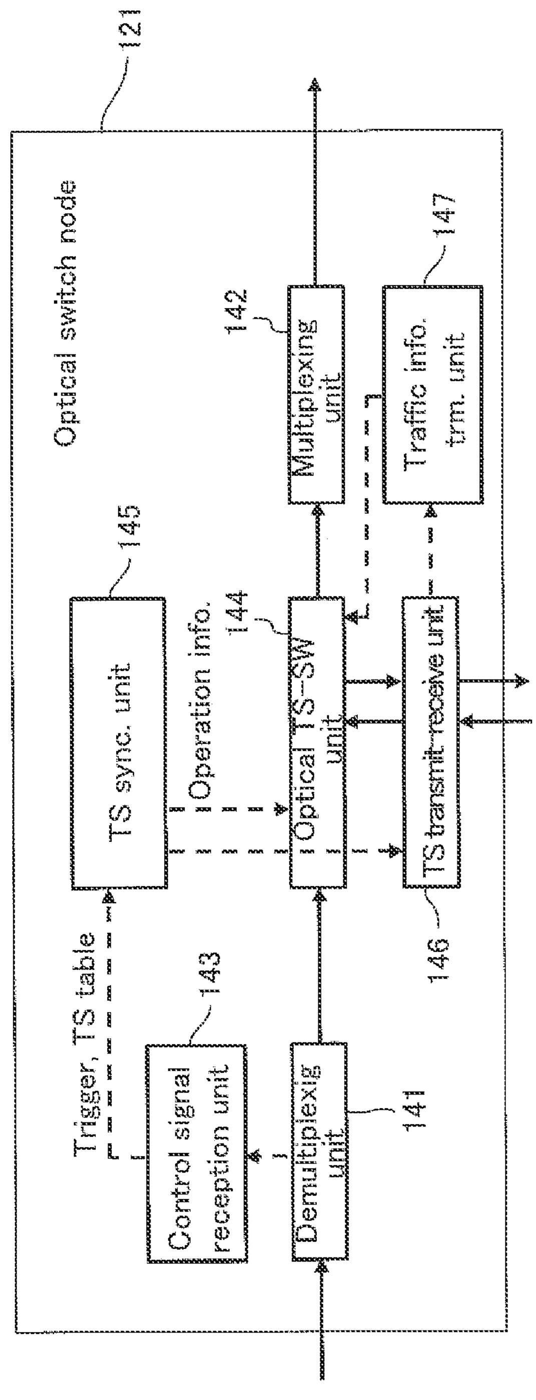
FIG. 67B is a block diagram illustrating a configuration of an optical switch node of trigger type configuration according to the embodiment of the present invention.

FIG. 67A illustrates a configuration of the master node 120 of trigger type. FIG. 67B illustrates a configuration of the optical switch node 121 of trigger type. In the figures, a solid-line arrow indicates a path of a data signal, and a broken-line arrow indicates a path of a control signal.

The master node 120 of trigger type includes: a demultiplexing unit 131 that wavelength demultiplexes an optical signal entering from a transmission path; a multiplexing unit 132 that wavelength multiplexes a signal outputted to a transmission path; a control signal reception unit 133 that receives a control signal demultiplexed by the demultiplexer (demultiplexing unit) 131; a traffic information collection unit 134 that organizes traffic information transmitted from each of the optical switch nodes; a topology management unit 135 that manages information on connection of an optical TS-SW unit of the optical switch node; a TS allocation unit 136 that performs TS allocation to the optical switch node 121, based on the traffic information organized by the traffic information collection unit 134 and the topology information obtained by the topology management unit 135; a TS start delivery unit 137 that generates a trigger pulse at regular intervals; and a TS information delivery unit 138 that delivers the TS information with the trigger pulse to each of the optical switch nodes.

The optical switch node 121 of trigger type includes: a demultiplexing unit 141 that wavelength demultiplexes an optical signal entering from a transmission path; a multiplexing unit 142 that wavelength multiplexes a signal to be outputted to transmission path; a control signal reception unit 143 that receives a control signal demultiplexed by the demultiplexer (demultiplexing unit) 141; an optical TS-SW unit 144 that is disposed between the demultiplexing unit 141 and the multiplexing unit 142, and realizes ADD/DROP and WDM/TDM switching; a TS synchronization unit 145 that is connected to the control signal reception unit 143 and realizes time slot synchronization; a TS transmit-receive unit 146 that has a buffer for accumulating a data inputted from an external unit, transmits the data from the buffer to the optical TS-SW unit 144, receives a data from the optical TS-SW unit 144, and transmits the data to the external unit; and a traffic information transmission unit 147 that transmits an amount of data accumulated in the buffer of the TS transmit-receive unit 146, to the traffic information collection unit 134 of the master node 120. Herein, the TS synchronization unit 145: detects a trigger for synchronizing timing of time slots of the optical switch node, from the signal received by the control signal reception unit 133; counts an elapsed time from receipt of trigger information notification; and instructs the TS transmit-receive unit 146 and the optical TS-SW unit 144 to transmit the data at a time slot allocated to the node itself, according to the time slot information notified with the trigger information. In response to the switching instruction from the TS synchronization unit 145, the optical TS-SW unit 144 switches a route, and the TS transmit-receive unit 146 transmits the data from the buffer to the optical TS-SW unit 144.

Figure 68A:
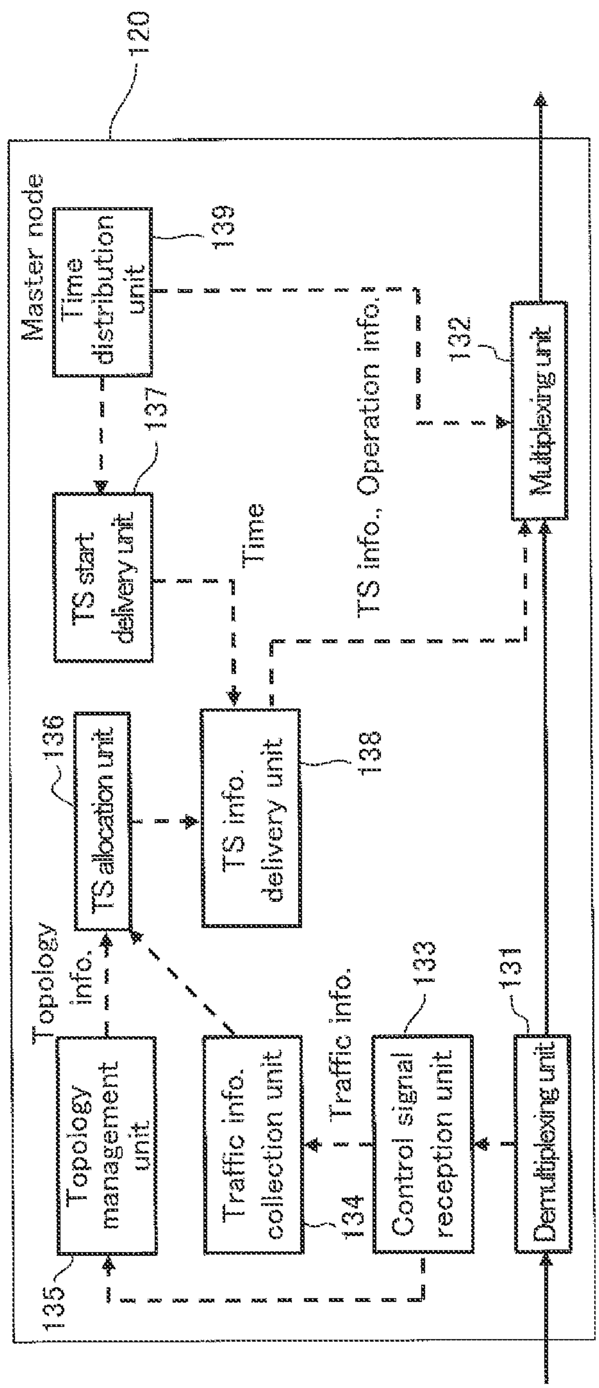
FIG. 68A is a block diagram illustrating a configuration of a master node of time synchronization type configuration according to the embodiment of the present invention.
Figure 68B:
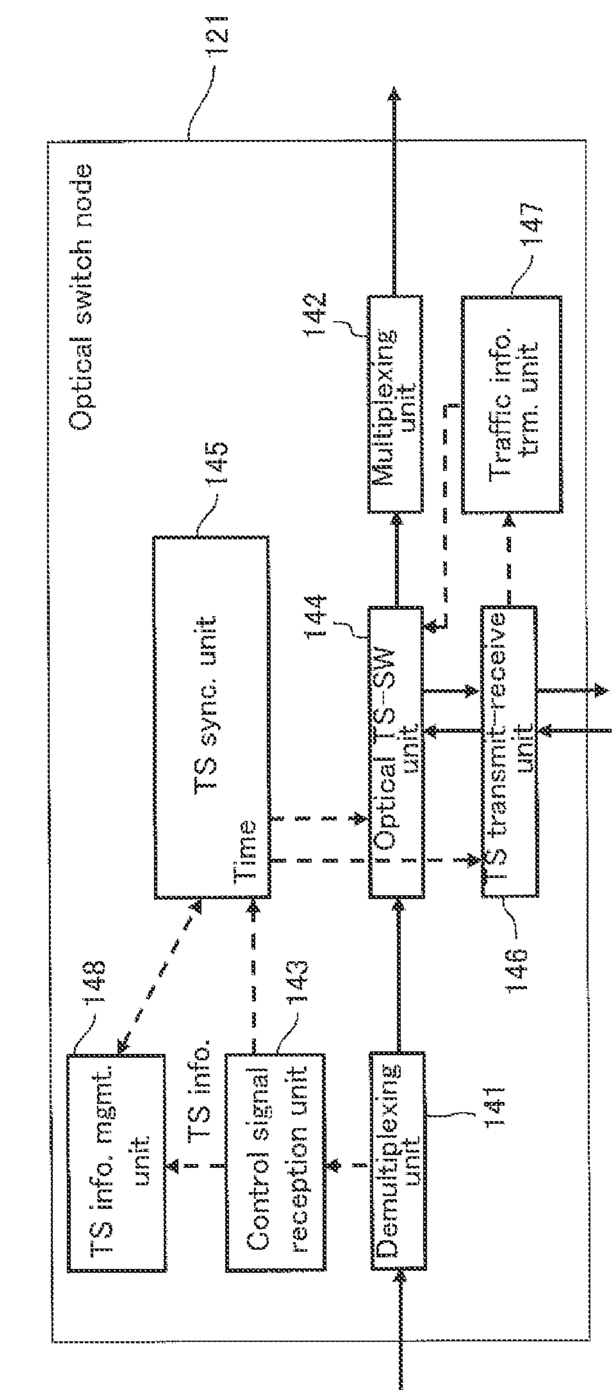
FIG. 68B is a block diagram illustrating a configuration of an optical switch node time synchronization type configuration according to the embodiment of the present invention.

FIG. 68A illustrates a configuration of the master node 120 of time synchronization type. FIG. 68B illustrates a configuration of the optical switch node 121 of time synchronization type. In the figures, a solid-line arrow indicates a path of a data signal, and a broken-line arrow indicates a path of a control signal.

The master node 120 of time synchronization type has a configuration similar to that of trigger type illustrated in FIG. 67A except that the former further includes a time delivery unit 39 that delivers a local time of the node itself to each of the optical switch node. In the master node 120 of time synchronization type, instead of generating a trigger pulse by the TS start delivery unit 137, the optical switch node specifies a time of an operation start based on the TS information, and the TS information delivery unit 138 delivers the TS information to each of the optical switch nodes.

The optical switch node 121 of time synchronization type has a configuration similar to that of trigger type illustrated in FIG. 67B, except that the former further includes a TS information management unit 148 that holds received time slot information. The TS synchronization unit 145: detects a control signal for synchronizing timing of time slots of nodes; notifies a time counter (not shown) of a time stamp value in the signal; and instructs the TS transmit-receive unit 146 and the optical TS-SW unit 144 to transmit appropriate data at a time slot allocated to the node itself, according to a time slot start time (which may also be referred to as a TS start time hereinafter) in the signal.

If you compare the trigger type with the time synchronization type, in the trigger type, the master node 120 simultaneously delivers time slot information and a trigger indicating a time slot start to each of the optical switch nodes 121. This eliminates a need for providing the TS information management unit 148 in each of the optical switch nodes 121. Note that, by increasing the number of fibers of a transmission path, the demultiplexing units 131, 141 and the multiplexing unit 132, 142 can be omitted from each of the configuration illustrated in FIG. 67A and FIG. 67B, and FIG. 68A and FIG. 68B.

In the optical network system, the master node 120 collects traffic information from each of the optical switch nodes 121. In this case, it is necessary to avoid collision of traffic information from a plurality of the optical switch node 121 with respect to a fiber or a wavelength for control. Thus, the master node 121 also performs time slot allocation for transmitting a control signal. In this embodiment, each of the optical switch nodes 121 is thus configured to start time slot counting for a control signal from a moment when a control signal transmission TS allocation signal is received. Slot numbers are incremented by 1 for each time slot, with the slot number of a time slot at the start as 1. When the incremented slot number matches a time slot number described in the control signal transmission TS allocation signal, the optical switch node can transmit traffic information (for each TS transmit-receive unit) to the master node 120. Note that the time slot is circular, and the optical switch node 121 can transmit a control signal at regular intervals.

Figure 69:
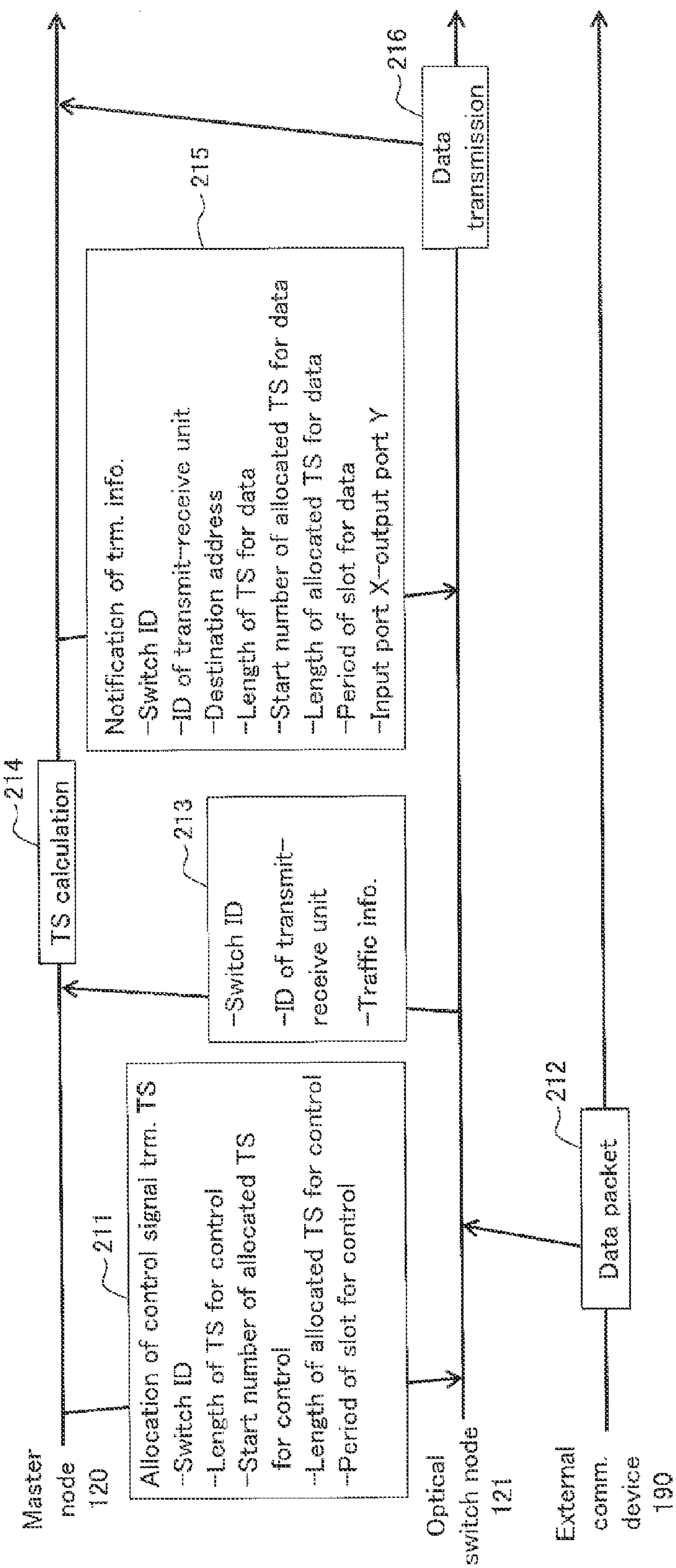
FIG. 69 a time sequence diagram illustrating a processing of notifying traffic information.

FIG. 69 is a diagram illustrating a procedure of transmitting traffic information from the optical switch node 121 to the master node 120 under the control as described above.

Next is described the procedure. In step 211, the master node 120 performs allocation of a time slot for control to each of the optical switch nodes 121, using a control signal. In step 212, the optical switch node 121 receives a data packet transmitted from an external communication device 190 and measures a traffic volume. In step 213, the optical switch node 121 transmits the traffic volume as traffic information to the master node 120.

In step 214, the master node 120: acquires a traffic volume from the traffic information; and calculates an allocation amount (time slot length) of a time slot according to the traffic volume. In step 215, the master node 120 notifies the optical switch node 121 of the calculated time slot length. In step 216, the optical switch node 121: sets a time slot having the notified time slot length; and transmits data accordingly.

Next is described an example of traffic information notified from the optical switch node 121 to the master node 120.

One example of a traffic information notification is a notification which notifies a data size accumulated in a buffer of the TS transmit-receive unit 146 and a predicted time of how long it will take to generate a buffer overflow. The predicted time of how long it will take to generate a buffer overflow used herein means an estimation of how many seconds later a buffer of the TS transmit-receive unit 146 generates a buffer overflow. By notifying the master node 120 of the predicted time, a larger TS can be allocated preferentially to a virtual queue in the transmit-receive unit 146 in which a buffer overflow may be possibly generated, thus allowing the buffer overflow to be prevented.

Figure 70:
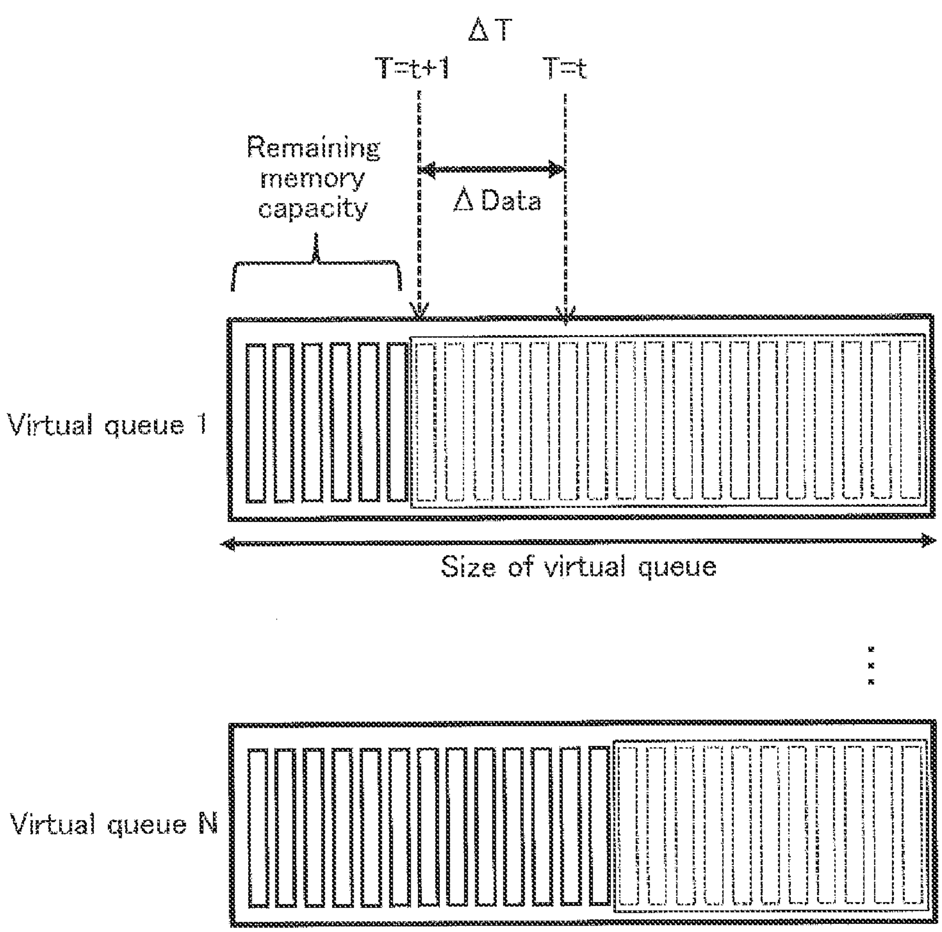
FIG. 70 is a diagram for explaining how to predict a buffer overflow.

FIG. 70 is a diagram for explaining how to predict a buffer overflow. It is assumed herein that the TS transmit-receive unit 146 has a plurality of virtual queues 1 to N set therein. How many seconds later the buffer overflows is predicted from a degree of reduction of a remaining memory capacity in the virtual queue. Let $\Delta T$ be a time interval between time t and time t+1, during which the remaining memory capacity of the virtual queue is assumed to reduce by $\Delta$data. Then, [(Remaining memory capacity at time t+1)/$\Delta$data]$\times\Delta T$ is a predicted time until a buffer overflow is generated.

Figure 71:
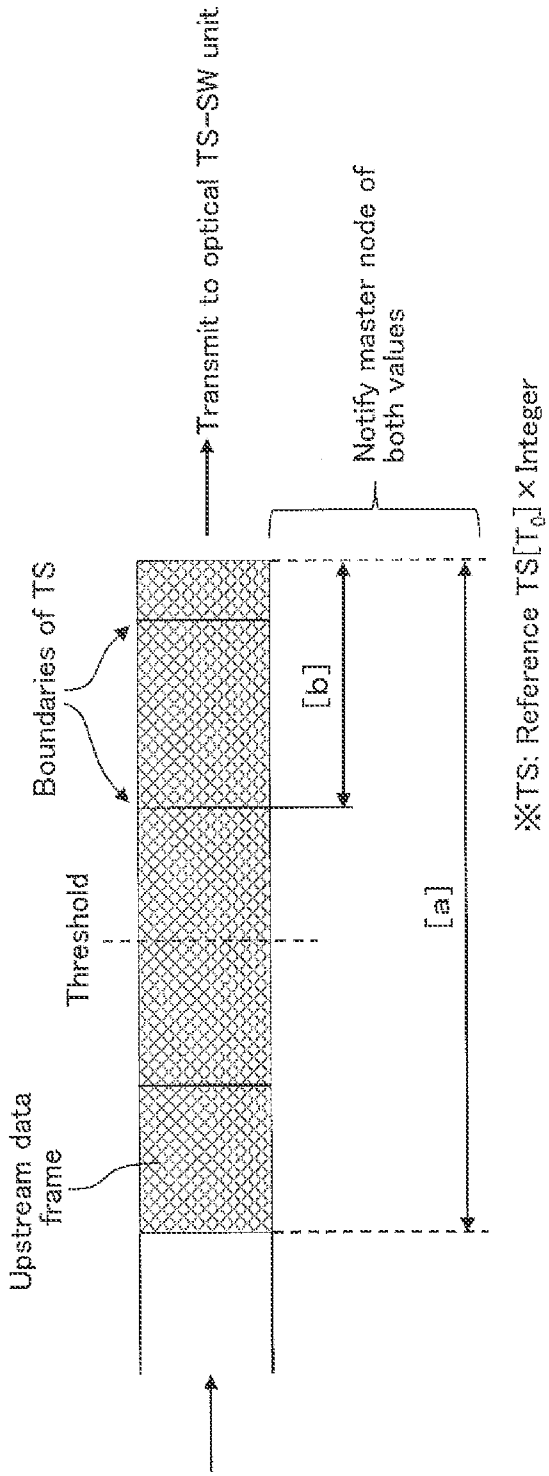
FIG. 71 is a diagram for explaining an example of information notified from the TS transmit-receive unit.

Alternatively, such information may be notified the master node 120 of: (a) a total current accumulated data amount; and (b) a maximum TS amount that is not larger than a set threshold, as the traffic information. FIG. 71 is a diagram illustrating a relation of the threshold, the total current accumulated data amount (indicated by [a]) represented by an upstream data frame, and the maximum TS amount that is not larger than the threshold (indicated by [b]).

Next is described a specific example of TS start delivery and TS synchronization in the configuration of trigger type.

FIG. 72 is a diagram illustrating various assumed examples when the TS start delivery and the TS synchronization is performed using a trigger. It is assumed herein that a trigger and a data are transmitted through the same path by means of, for example, wavelength multiplexing.

Figure 73:
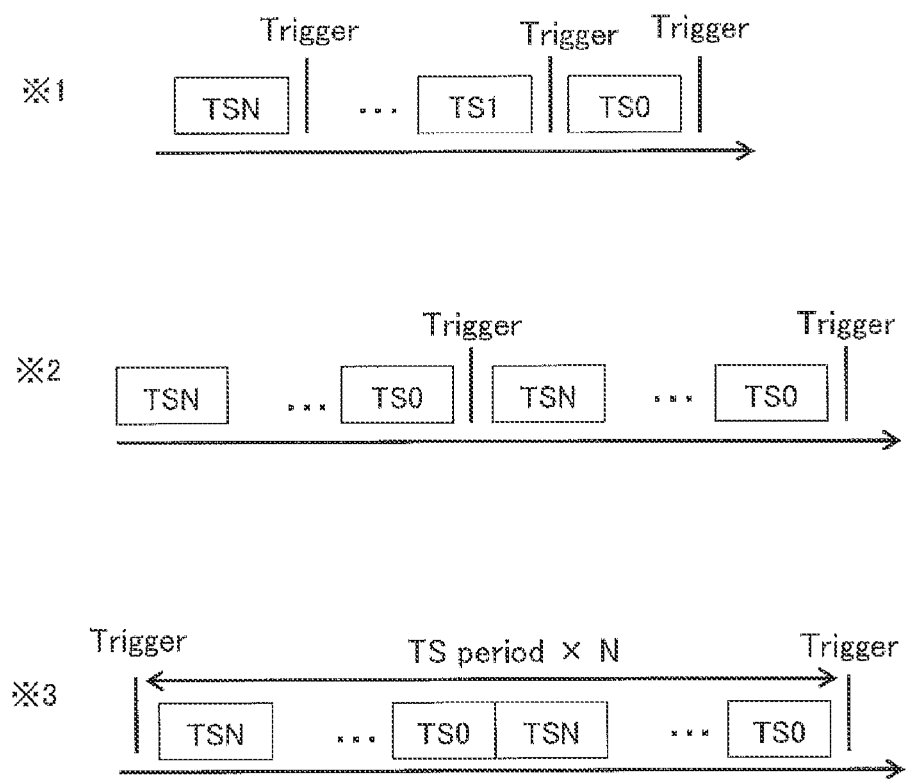
FIG. 73 is a diagram for explaining a relation between a time slot and a trigger in the trigger type configuration.

FIG. 73 is a diagram for explaining a relation between a time slot and a trigger. As illustrated in No. 1011 of FIG. 72, an example in which a trigger is outputted for each time slot is illustrated in ※1 of FIG. 73. As illustrated in No. 1012 or No. 1013, an example in which a trigger is outputted for each TS period is illustrated in ※2 of FIG. 73. As illustrated in No. 1014 or No. 1015 of FIG. 72, in which a trigger is outputted for each n times the TS period is illustrated in ※3 of FIG. 73.

Figure 74:
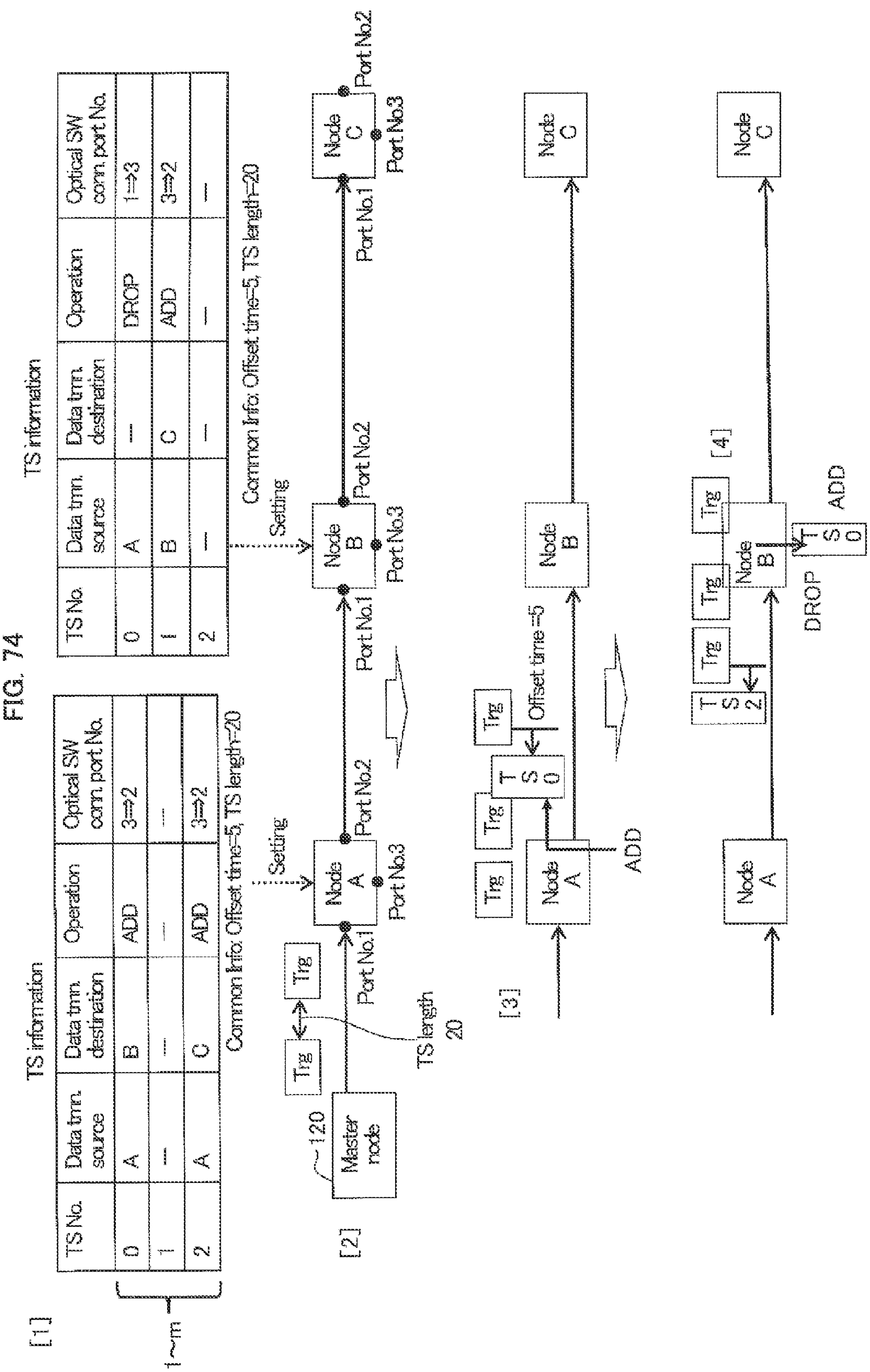
FIG. 74 is a diagram for explaining an example of operations of the TS start delivery and the TS synchronization in the trigger type configuration.

FIG. 74 is a diagram illustrating an operation example in which, in a case illustrated in No. 1011 of FIG. 72 (in ※1 of FIG. 73), a data is each transmitted from node A to node B, from node A to node C, and from node B to node C. As illustrated in [1], the master node 120 sets TS information to each of the optical switch nodes. A TS number of a time slot to be inserted (ADD) in one wavelength is determined so as not to duplicate among the nodes. The TS length is set at one over the integers of a length of a ring. The length of a ring used herein means a propagation delay when a signal circulates through a ring. Then, as illustrated in [2], the master node 120 transmits a trigger at intervals of the TS length. The trigger makes one round of the ring because a ring network is assumed herein. The trigger after making one round of the ring terminates at the master node 120. As described above, a trigger transmitted is sequentially received by each of the nodes. As illustrated in [3], upon receipt of a trigger, node A performs an operation in line 1 of the TS information after an offset time (herein, 5 counts) (that is, inserts (performs an ADD of) a data of node B as a destination at a time slot TS0). Similarly, upon receipt of the next trigger, node A performs an operation in line 2 of the TS information. Upon receipt of a further next trigger, node A performs an operation in line 3 of the TS information (that is, performs an ADD of a data of node C as a destination to a time slot TS2). The data is also received by node B because the trigger propagates on the ring. As illustrated in [4], however, upon receipt of the trigger, node B performs an operation in line 1 of the TS information after the offset time (5 counts) (that is, branches (performs a DROP of the data at a time slot TS0). Similarly, upon receipt of a still further next trigger, node A performs an operation of the TS information (performs an Add of the data of node C as a destination to TS1).

As described above, the allocated TS is subjected to such processings as ADD and DROP.

Figure 75:
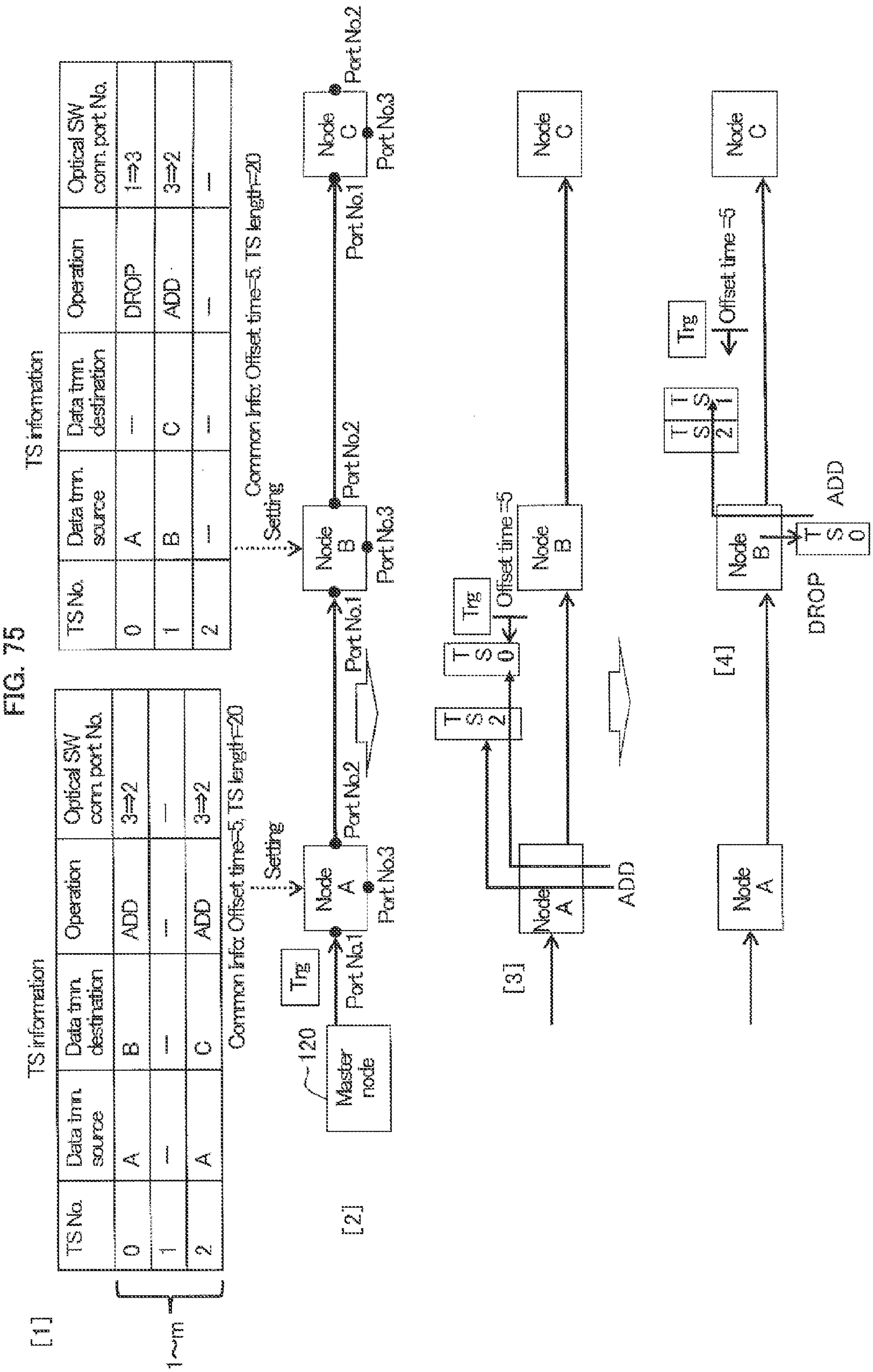
FIG. 75 is a diagram for explaining another example of the operations of the TS start delivery and the TS synchronization in the trigger type configuration.

FIG. 75 is a diagram illustrating an operation example in which, in a case illustrated in No. 1012 and No. 1013 of FIG. 72 (in ※2 of FIG. 73), a data is each transmitted from node A to node B, from node A to node C, and from node B to node C. As illustrated in [1], the master node 120 sets TS information to each of the optical switch nodes 121. A TS number of a time slot to be inserted (ADD) in one wavelength is determined so as not to duplicate among the nodes. The TS length is set such that the TS period (TS length×m) becomes one over the integers of the length of the ring. Then, as illustrated in [2], the master node 120 transmits a trigger at intervals of the TS period. The trigger after making one round of the ring terminates at the master node 120. As illustrated in [3], upon receipt of the transmitted trigger, node A sequentially performs operations in lines 1 through m of the TS information after an offset time (herein, 5 counts) from the receipt of the trigger. That is, node A performs ADD of the data of node B as a destination to the time slot TS0 after the offset time, and also performs an Add of the data of node C as a destination to the time slot TS2 after 45 counts (offset time+TS number×TS length=5+2×20). Similarly, as illustrated in [4], upon receipt of the trigger, node B sequentially performs operations in lines 1 through m of the TS information after an offset time (herein, 5 counts) from the receipt of the trigger. That is, node B performs a DROP of the data at TS0 after the offset time, and performs an ADD of the data of the destination node C to TS1 after 25 counts (offset time+TS number×TS length=5+1×20).

Figure 76:
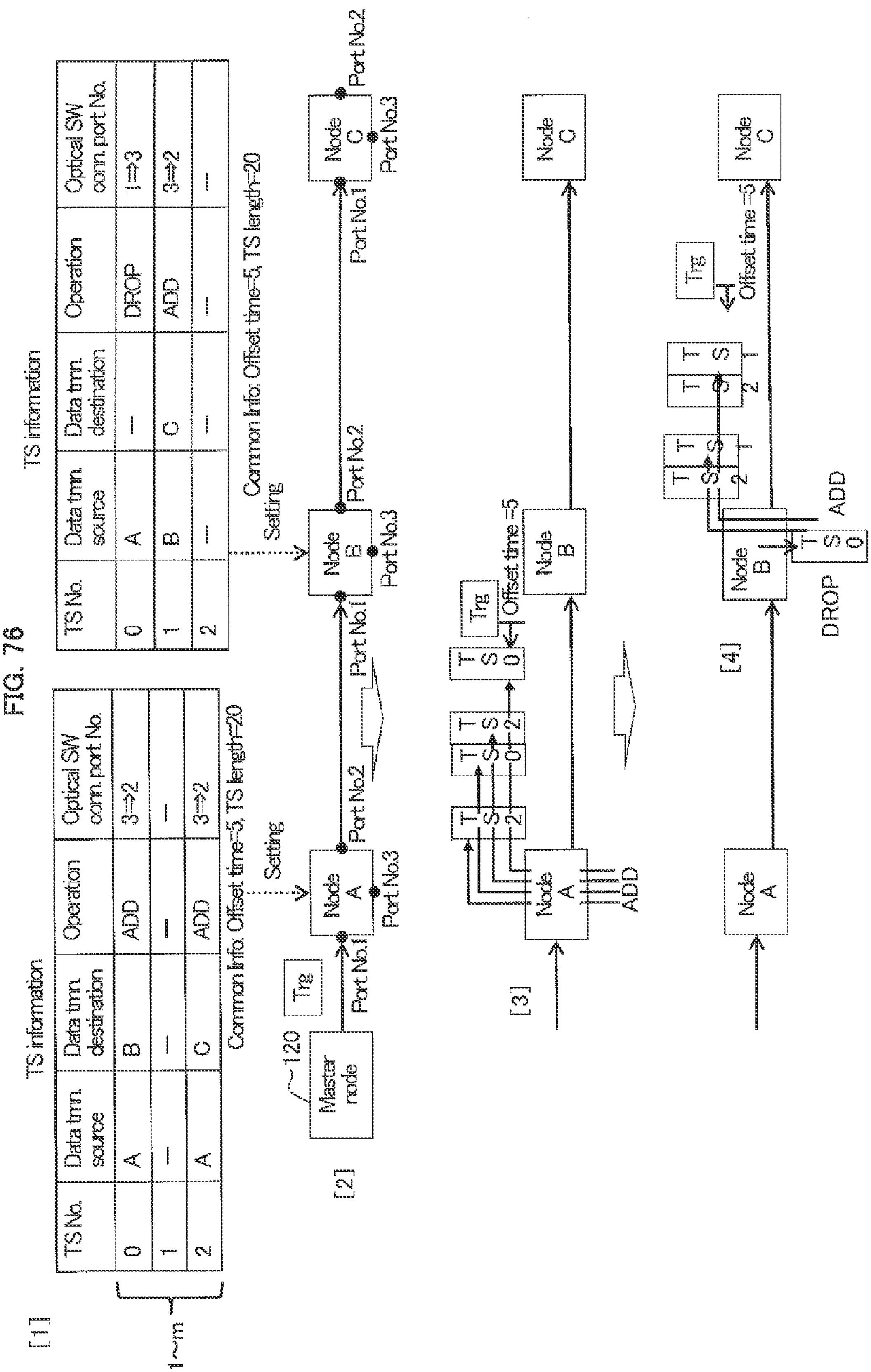
FIG. 76 is a diagram for explaining a still another example of the operations of the TS start delivery and the TS synchronization in the trigger type configuration.

FIG. 76 is a diagram illustrating an operation example in which, in cases illustrated in No. 1014 and No. 1015 of FIG. 72 (in ※3 of FIG. 73), a data is each transmitted from node A to node B, from node A to node C, and from node B to node C. As illustrated in [1], the master node 120 sets TS information to each of the optical switch nodes 121. A TS number of a time slot to be inserted (ADD) in one wavelength is determined so as not to duplicate among the nodes. The TS length is set such that the TS period (TS length×m) becomes one over the integers of the length of the ring. Then, as illustrated in [2], the master node 120 transmits a trigger at intervals of the TS period×n. The trigger after making one round of the ring terminates at the master node 120. As illustrated in [3], upon receipt of the trigger, node A sequentially performs operations in lines 1 through m of the TS information after an offset time (herein, 5 counts) from the receipt of the trigger. After performing the operation in line m, node A repeats the operations in lines 1 through m until node A receives the next trigger. As illustrated in [4], upon receipt of the trigger, node B sequentially performs operations in lines 1 through m of TS information after an offset time (herein, 5 counts), and repeats the operations until node B receives the next trigger. Upon receipt of the next trigger, similarly, node B the operations in lines one through m of the TS information.

Next is described a relation among a ring length, a TS length, and a TS period.

Figure 77A:
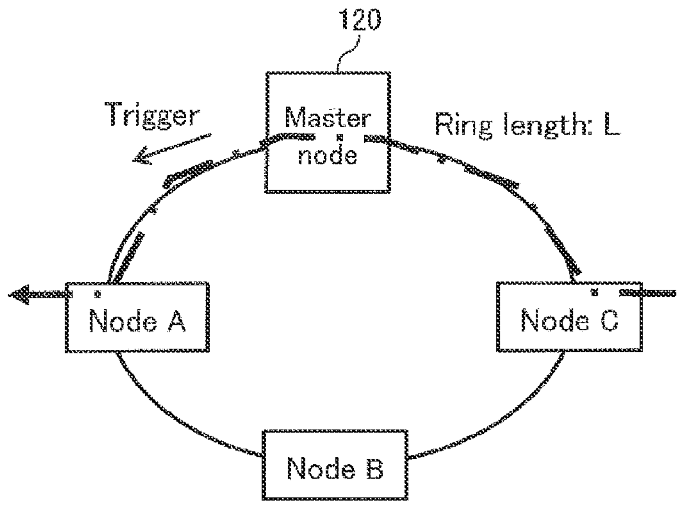
FIG. 77A is a diagram illustrating a ring-shaped network configuration.
Figure 77B:
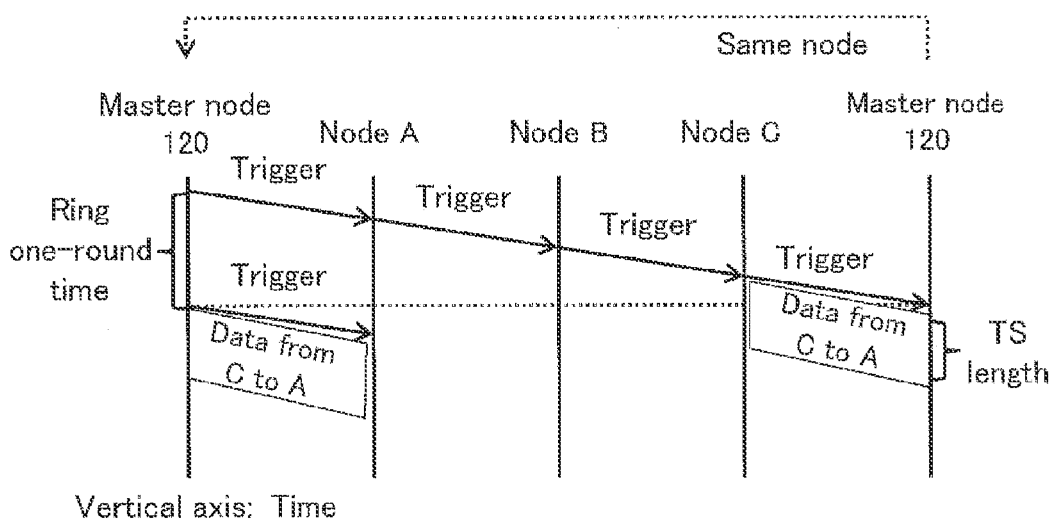
FIG. 77B is a diagram illustrating a relation among the ring length, the TS (time slot) length, and the TS period.

When a master node and a plurality of optical switch nodes are arranged in a ring network, it is sometimes necessary to transmit or receive a data across the master node in the network. FIG. 77A is a diagram illustrating a network configuration in the case. In the figure, when a data is transmitted from node C to node A, it is necessary to transmit the data across the master node 120. Thus, as illustrated in FIG. 77B, the TS length or the TS period may be set at one over the integers of the ring length so as to receive the data across the master node 120 (if a trigger output interval is the TS length, the TS length is set at one over the integers of the ring length, and, if the trigger output interval is a TS period or a TS period×N, the TS period is set at one over the integers of the ring length). This makes it possible for node A to receive a data transmitted from node C using a trigger newly-transmitted from the master node 120.

Figure 78:
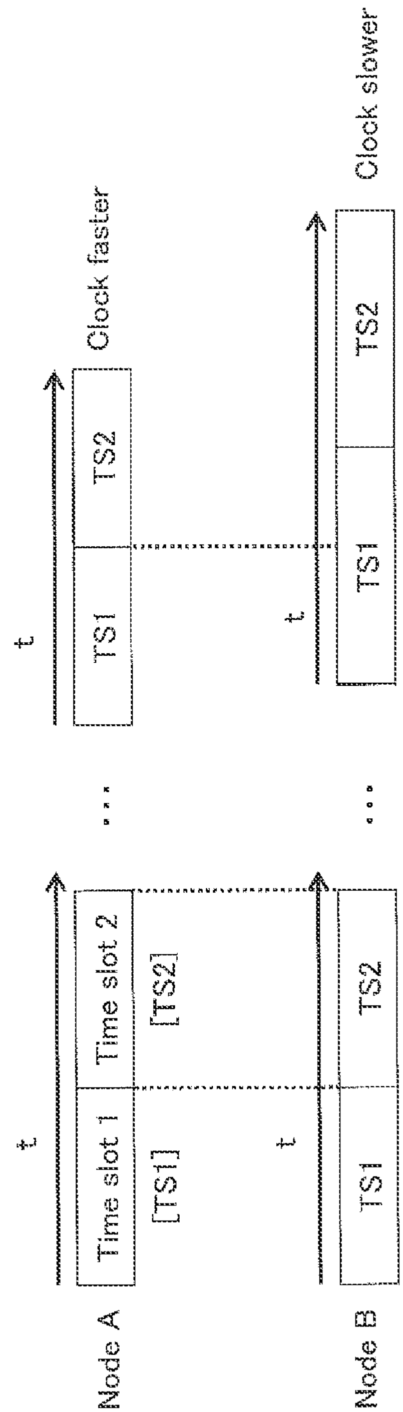
FIG. 78 is a diagram for explaining deviation of timing of a time slot due to clock fluctuation.
Figure 79:
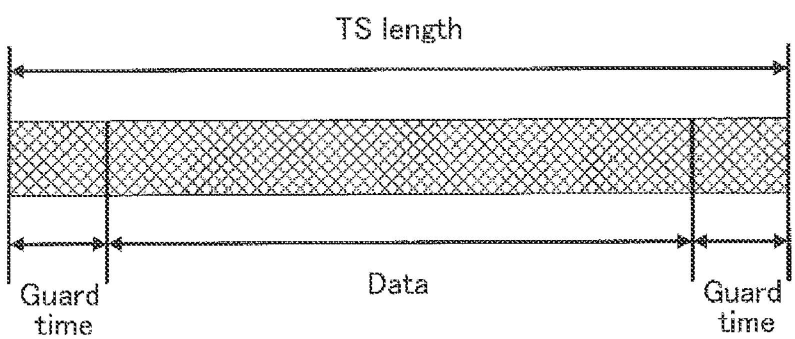
FIG. 79 is a diagram for explaining a relation between a data and a guard time in a time slot.

In some cases, transmission and reception timing of time slots of the nodes is deviated due to fluctuations of a clock or the like. For example, a trigger output interval of the master node 120 may fluctuate. When a time slot is periodically transmitted as illustrated in No. 1014 and No. 1015 of FIG. 72, the transmission and reception timing of the time slot may be deviated. FIG. 78 is a diagram for explaining deviation of timing of a time slot. If clocks are matched, timing of time slots received by the nodes 120 and A to C coincides. However, when, for example, a clock is fast in node A or is slow in node B owing to clock fluctuations, there is a possibility that timing of the time slots TS1 and TS2 is deviated, to thereby generate an overlap of the time slots between nodes A to C. Hence, in order to prevent data collision even when such a clock fluctuation is generated, as illustrated in FIG. 79, guard times are set before and after a data in a clock slot, taking into account the overlap of the time slots owing to the clock fluctuation.

Next is described a relation between a ring topology in a trigger type configuration and a configuration of an optical switch node.

Figure 80A:
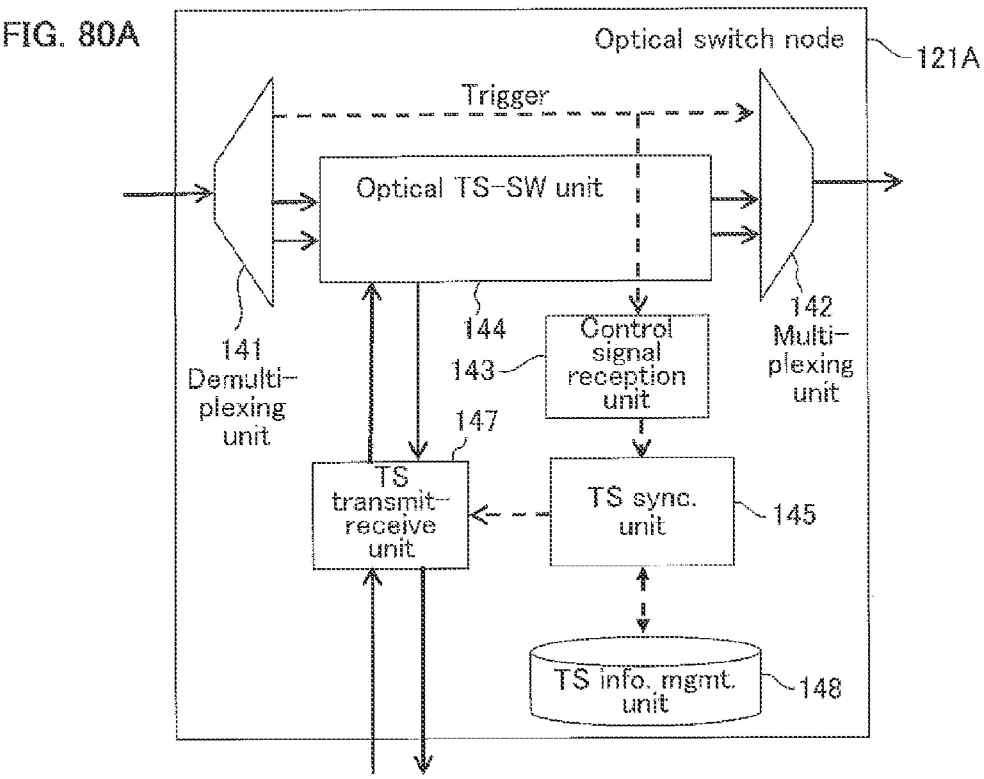
FIG. 80A is a diagram for explaining a ring topology of an optical switch node on a unidirectional ring in the trigger type configuration.
Figure 80B:
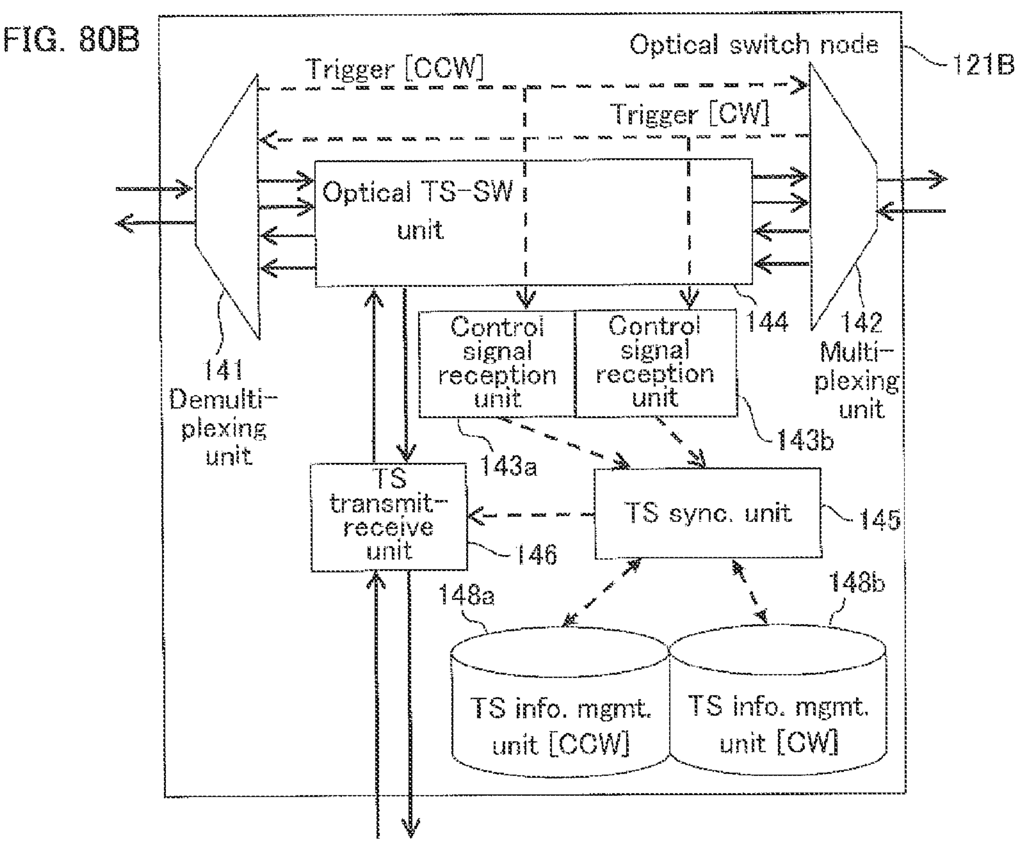
FIG. 80B is a diagram for explaining a ring topology of an optical switch node on a bidirectional ring in the trigger type configuration.

In the ring network, data may be transmitted in whichever direction, unidirectionally (either one of clockwise and counterclockwise) or bidirectionally (both clockwise and counterclockwise). Because a trigger in the network is transmitted in a route same as that of a data, the trigger can be transmitted in whichever direction, unidirectionally or bidirectionally. FIG. 80A is a diagram illustrating a configuration of the optical switch node 121A on a unidirectional ring. In FIG. 80A, illustration of traffic information transmission unit 147 is omitted, which makes the optical switch node 121A equivalent to that illustrated in FIG. 67B or FIG. 68B. Meanwhile, FIG. 80B illustrates a diagram of a configuration of the optical switch node 121B suited for a bidirectional ring. If the physical topology is bidirectional, the optical switch node 121B is equipped with a pair of control signal reception units 143*a*, 143*b* and a pair of TS information management units 148*a*, 148*b*, each for clockwise and counterclockwise, are provided. The master node 120 transmits a trigger both clockwise and counterclockwise. Based on appropriate TS information in the TS information management unit 148*a*, 148*b* corresponding to directions in which the trigger is transmitted or received, each of the optical switch nodes 121A, 121B performs data transmission and receipt and switching in a direction same as that of the trigger transmission and receipt.

Next is described in detail a configuration of time synchronization type. The time synchronization type is characterized in that a TS start is specified by a time. In synchronization by the above-described trigger type, it is necessary to transmit a trigger and a data in a same route. In the TS synchronization by the time, a TS start time can be set previously. Also, it is not necessary to deliver a TS start time on a route same as that of a data. How to set a time of each of the nodes in the case of the time synchronization type includes: (a) setting a time in which a delay time corresponding to a data transmission path is added to a time at the master node 120, to each of the nodes; and (b) setting a common time to all of the master node 120 and the optical switch nodes 121. (a) setting a time to which a delay time is added (a time with delay difference) is characterized in that all of the nodes can have the same value of the TS start time in common. (b) setting of a common time is characterized in that the time can be set making use of the GPS (Global Positioning System) or the like.

Next is described the time setting using the time with delay difference. When a TS start delivery and a TS synchronization are set using the time with delay difference, a time to which a time difference corresponding to a delay time between nodes is set to each of the nodes. In this case, how to set the TS start delivery and the TS synchronization can be achieved in several ways as illustrated in FIG. 81.

Figure 82:
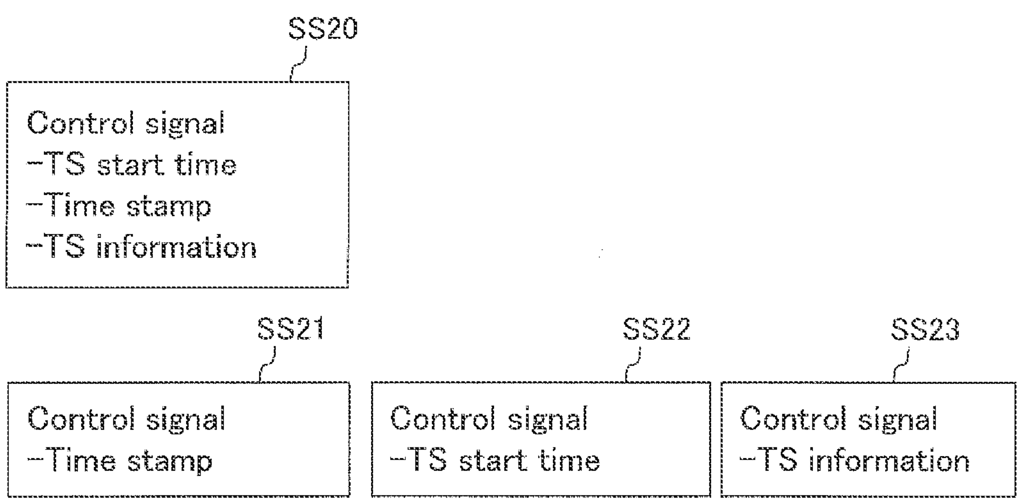
FIG. 82 is a diagram for explaining an example of how to deliver a control signal for setting in the time synchronization type configuration using the time with delay difference.

How to deliver information as a control signal for the setting by the master node 120 includes: a TS start time, a time stamp, and TS information are combined together and then transmitted, as indicated by reference character SS20 in FIG. 82; and those described above are separately transmitted as indicated by reference characters SS21 to SS23 in FIG. 82. In the latter case, because the time stamp is transmitted individually, deviation of a counter value can be corrected.

Figure 83A:
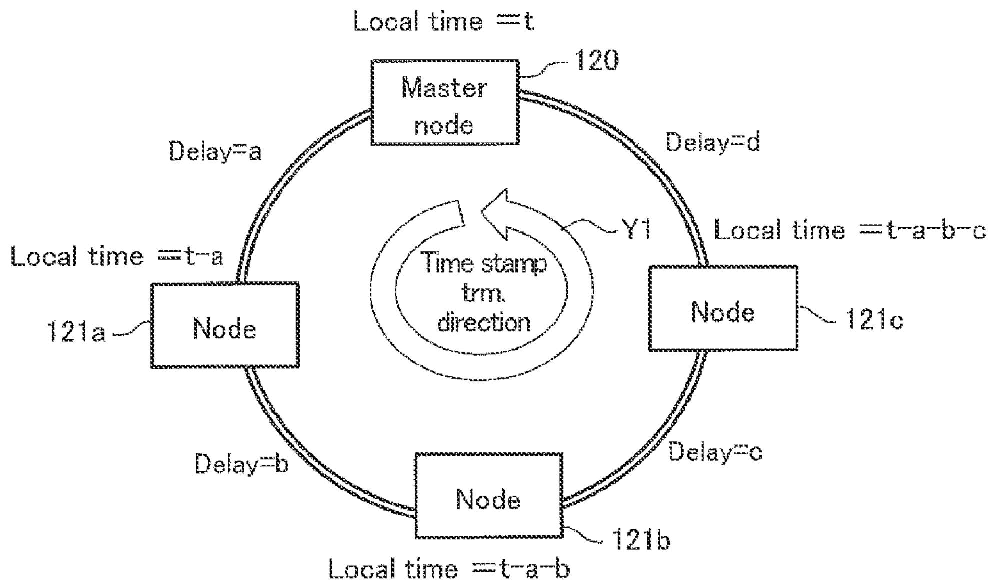
FIG. 83A is a diagram for explaining counterclockwise setting in the time synchronization type configuration using the time with delay difference.
Figure 83B:
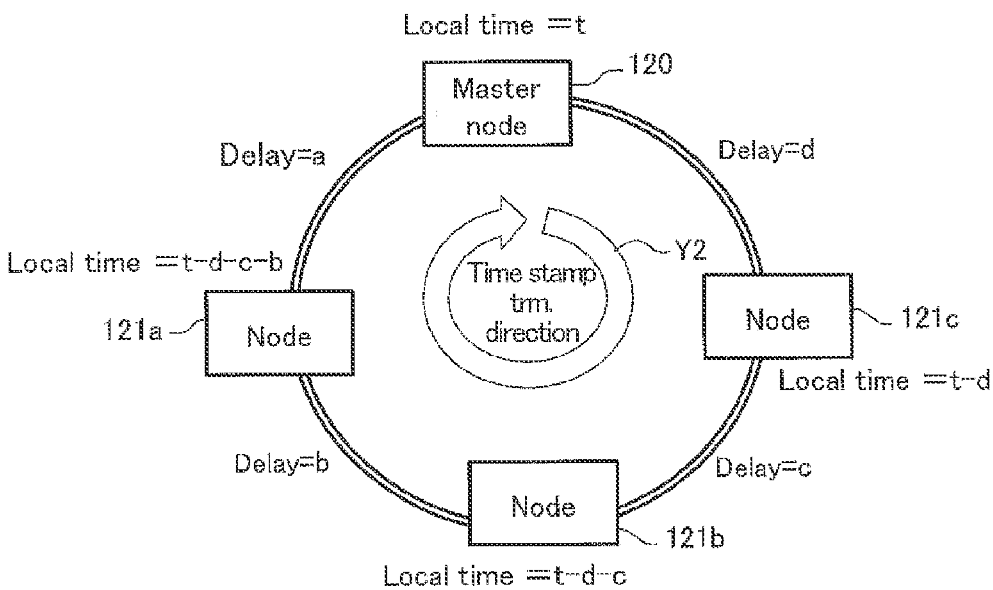
FIG. 83B is a diagram for explaining clockwise setting in the time synchronization type configuration using the time with delay difference.

With respect to a direction of transmitting a control signal with a time stamp from the master node 120, a unidirectional setting and a bidirectional setting can be assumed whether or not a ring topology is a unidirectional topology or a bidirectional topology. FIG. 83A is a diagram illustrating an example in which the master node 120 transmits a control signal counterclockwise, as indicated by arrow Y1. If the master node 120 transmits a control signal with a time stamp at a local time t, a delay is accumulated while the control signal is transmitted through a node 121*a*, a node 121*b*, and a node 121*c*. Upon receipt of the control signal with the time stamp, each of the nodes 121*a* to 121*c* sets the time stamp of the control signal to a time counter thereof. As a result, each of the set local times is set at a time shifted by a delay time. FIG. 83B is a diagram illustrating an example in which the master node 120 transmits a control signal clockwise, as indicated by arrow Y2.

In the bidirectional setting, the master node 120 transmits a control signal with a time stamp either clockwise or counterclockwise. Because a clockwise delay is naturally different from a counterclockwise delay at a given node, each of the nodes has a clockwise and a counterclockwise time counters and manages respective local times thereof.

Figure 84A:
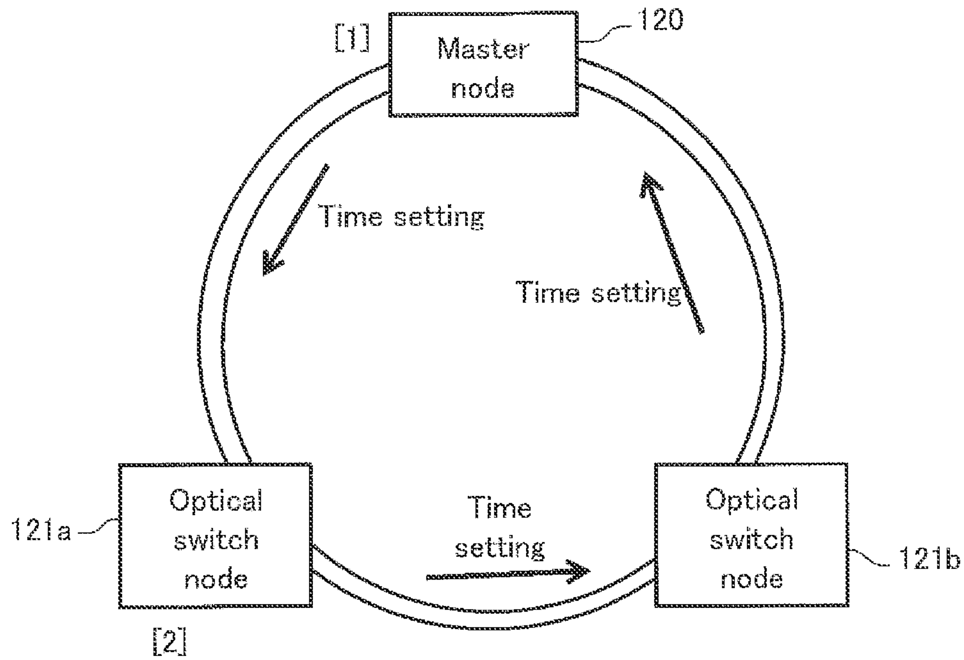
FIG. 84A is a system diagram for explaining an example of how to set a time in the time synchronization type configuration using the time with delay difference.
Figure 84B:
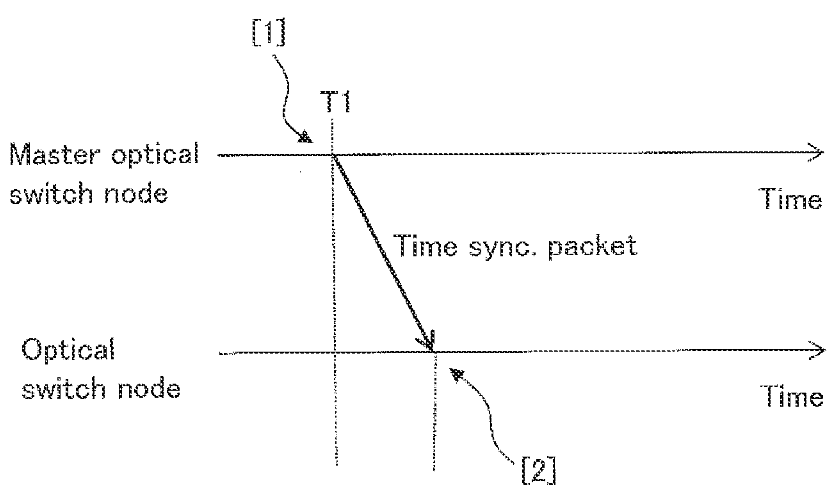
FIG. 84B is a time-series diagram for explaining the example of how to set a time in the time synchronization type configuration using the time with delay difference.

FIG. 84A is a diagram illustrating a configuration of an optical network system. FIG. 84B is a diagram illustrating a time setting time chart of time synchronization using a time with delay difference. In optical network system according to this embodiment, the master node 120 controls each of the optical switch nodes (which may also be simply referred to as switch nodes or nodes) 121*a*, 121*b* by specifying an optical switch switching time and a packet transmission time. This means that the master node 120 needs to set a time of each of the switch nodes 121*a*, 121*b*. As indicated by [1] in the figure, the master node 120 transmits a time setting packet with a time stamp given thereto to each of the optical switch nodes 121*a*, 121*b*. As illustrated in [2], each of the optical switch nodes 121*a*, 121*b* upon receipt of the time setting packet, sets a value described in the time stamp as a current time of its own. At this time, a relation as follows holds: Each of times set to the optical switch nodes 121*a*, 121*b*=Time at master node−Each of respective unidirectional propagation delay times. Because the master node 120 previously has the unidirectional propagation delay time, the master node 120 can also obtain the time set to each of the optical switch nodes 121*a*, 121*b*.

Meanwhile, in order to previously have the unidirectional propagation delay time to each of the nodes 121*a*, 121*b*, the master node 120 needs to measure an actual delay thereof. A propagation delay time can be measured in such a manner that a time stamp given by the master node 120 is transmitted and received between the master node 120 and the optical switch nodes 121*a*, 121*b* while the time stamp is made to go and return in the same route.

Figure 85A:
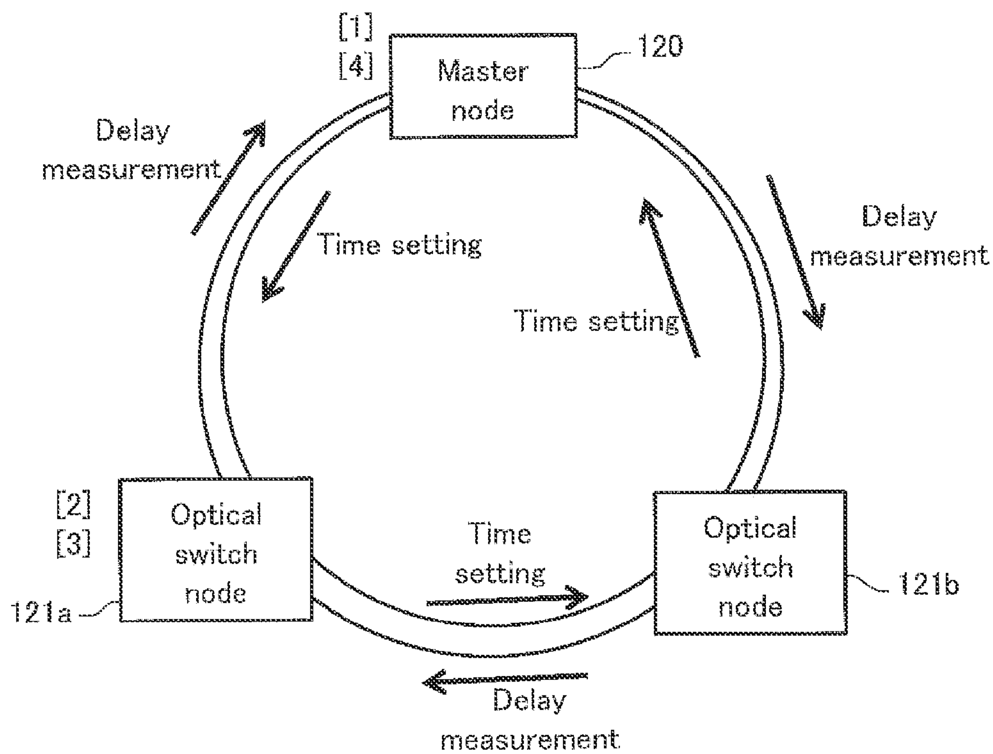
FIG. 85A is a system diagram for explaining an example of how to measure a delay in the time synchronization type configuration using the time with delay difference.
Figure 85B:
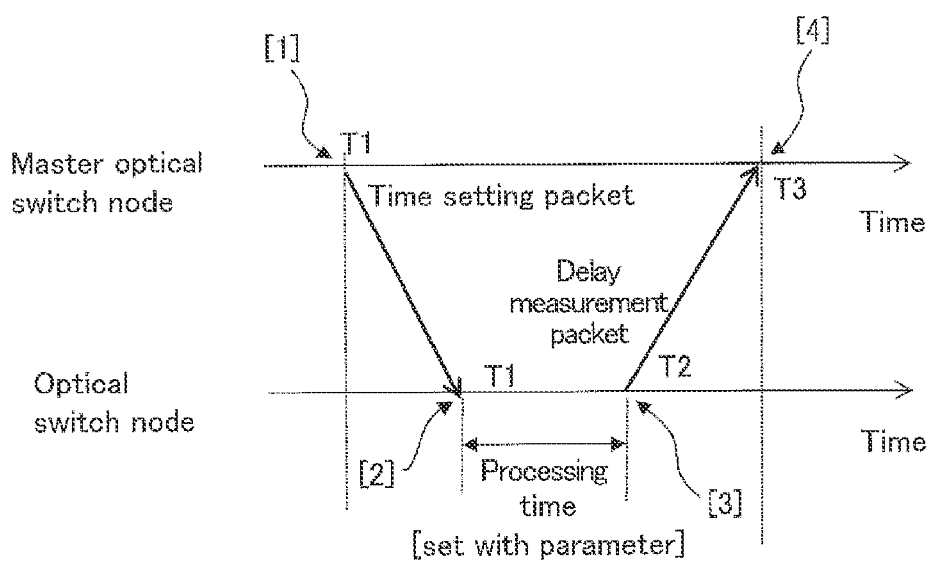
FIG. 85B is a time-series diagram for explaining the example of how to measure a delay in the time synchronization type configuration using the time with delay difference.

FIG. 85A and FIG. 85B are diagrams each for explaining such a delay time measurement. As illustrated in the figures [1], the master node 120 transmits a time setting packet with a time stamp given thereto. As respectively illustrated in [2] and [3], upon receipt of the time setting packet, the optical switch nodes 121*a*, 121*b* return a delay measurement packet containing the time stamp given by the master node 120, as a acknowledgment packet to the master node 120. As illustrated in [4], the master node 120 calculates a unidirectional propagation delay time based on a difference from an arrival time of the acknowledgment packet to a time of the first time stamp. In practice, because a processing delay at the optical switch is present as illustrated in the figures, a time required for the processing should be included in the calculation.

Figure 86A:
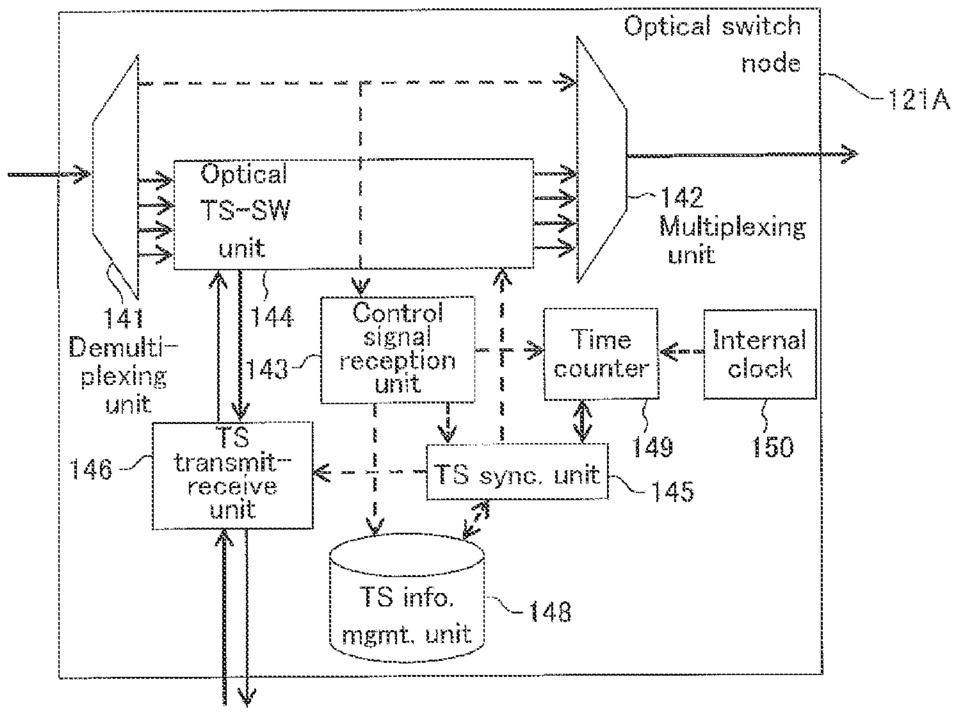
FIG. 86A is a diagram for explaining a ring topology of an optical switch node on a unidirectional ring in the time synchronization type configuration using the time with delay difference.

Also in the case of time synchronization using the time with delay difference, similarly to the case of trigger type, a configuration of the optical switch node varies according to whether the physical topology is of unidirectional ring or bidirectional ring. FIG. 86A is a diagram illustrating an optical switch node 121A suited for the unidirectional ring. The optical switch node 121A is substantially similar to the optical switch node 121 of FIG. 68B, except that: illustration of the traffic information transmission unit 147 is omitted; and the time counter 149 and the internal clock 150 are illustrated so as to make clear the time synchronization performed by the TS synchronization unit 145.

Figure 86B:
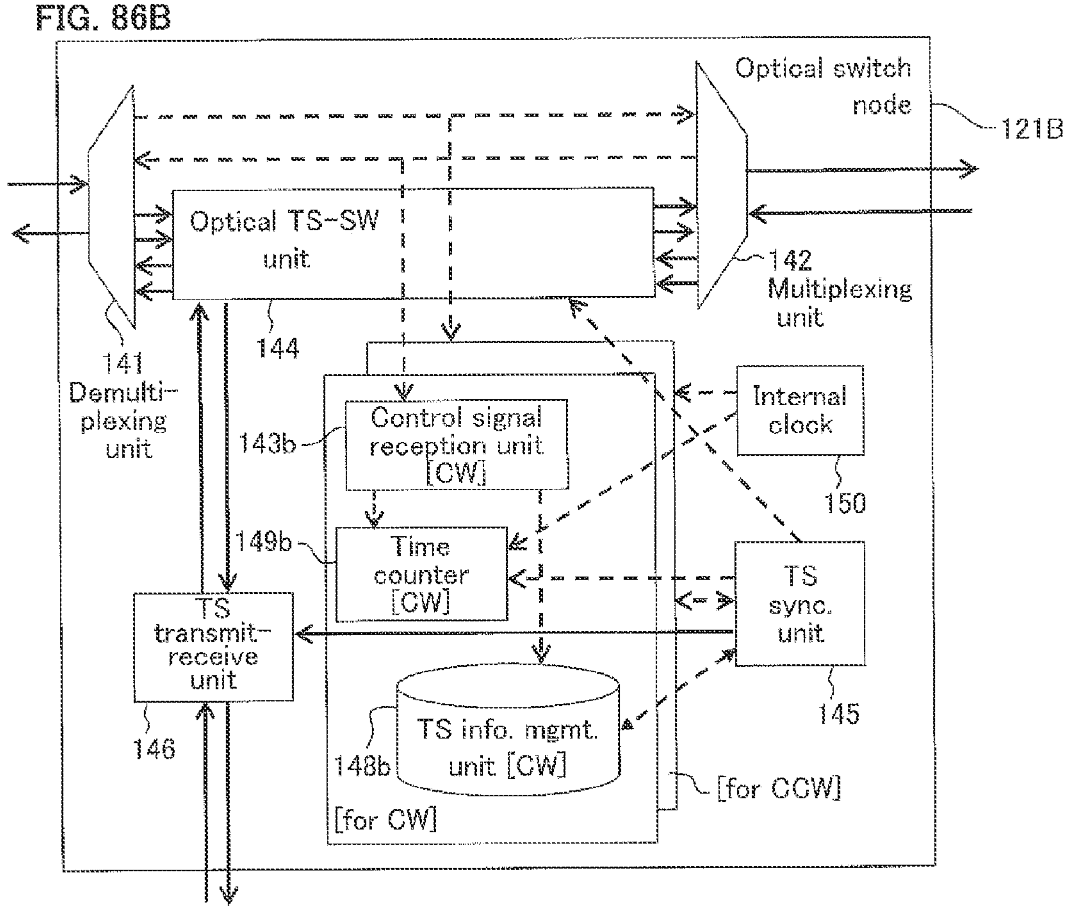
FIG. 86B is a diagram for explaining a ring topology of an optical switch node on a bidirectional ring in the time synchronization type configuration using the time with delay difference.

On the other hand, in the case in which the physical topology is bidirectional, the optical switch node 121B includes a pair of: control signal reception units; TS information management units; and time counters, each for clockwise use and for counterclockwise use. FIG. 86B illustrates, as those for clockwise use, a control signal reception unit 143*b*, a TS information management unit 148*b*, and a time counter 149*b*. The master node 120 transmits a control signal both clockwise and counterclockwise of a ring. Each of the optical switch nodes 121A, 121B performs an appropriate operation based on TS information of the TS information management unit and the time counter corresponding to transmission and receipt directions of the control signal. For example, in response to a clockwise control signal, the TS information management unit 48*b* for clockwise use is operated.

Figure 87A:
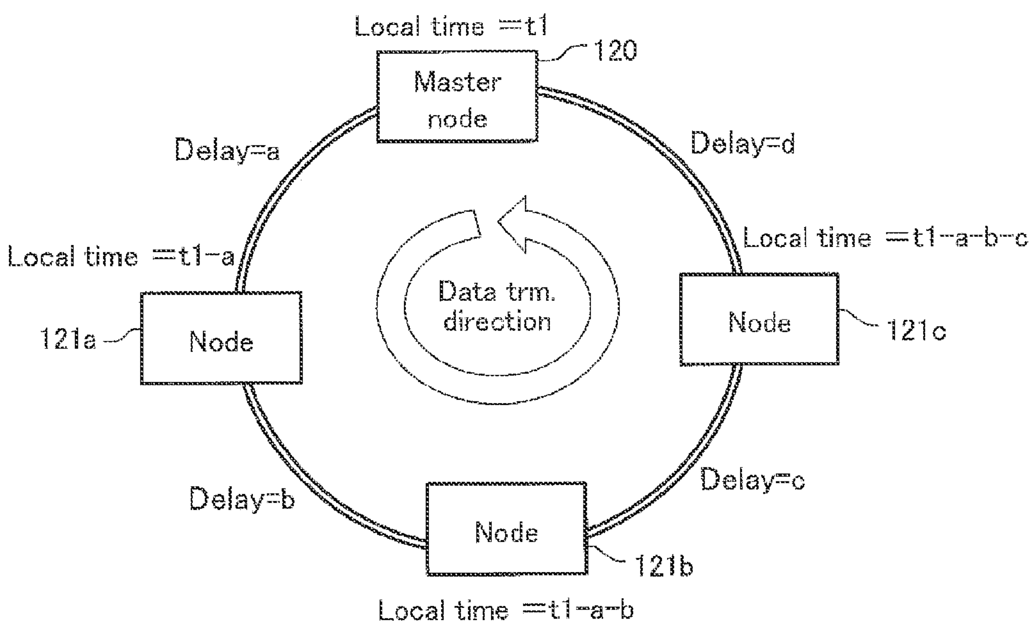
FIG. 87A is a system diagram for explaining a DROP switching time at a master node in the time synchronization type configuration using the time with delay difference.

On the other hand, in the case of the time synchronization using time with delay difference, each of the nodes has a local time set with a time difference corresponding to a delay from a time of the master node. Thus, if a data is transmitted in a direction same as that in which a time stamp has been transmitted, a relation as follows holds: "Reception time of local time of receiving node"="Transmission time of local time of transmitting node". For example, in a case illustrated in FIG. 87A and FIG. 87B, when the master node 120 transmits a data at a local time=t1, each of the nodes 121*a* to 121*c* receives the data at a local time=t1 of its own. However, in a case in which each of the nodes 121*a* to 121*c* transmits a data to the master node 120 or any of the nodes 121*a* to 121*c* transmit or receive a data therebetween, jumping over the master node 120, a relation as follows holds: "Reception time of local time of receiving node"="Transmission time of local time of transmitting node"+"Time required for making one round of a ring (a+b+c+d)". For example, if the node 121*a* transmits a data at a local time=t2 of its own, the master node 120 receives the data at a local time of its own=t2+a+b+c+d. In order to branch (DROP) the data at the master node 120, it is necessary to set a DROP switching time at the master node 120, at "TS start time+Ring one-round time". Similarly, in a case of transmitting or receiving a data, jumping over the master node 120, such as from the node 121*c* to the node 121*a*, it is necessary to set the DROP switching time at "TS start time+Ring one-round time" or perform a TS setting in reverse so as not to jump over the master node 120.

How to calculate or set a ring one-round time includes, for example: measuring a delay time using a measuring instrument such as an OTDR (Optical Time Domain Reflectometer) and setting a result of the measurement in the TS information management unit manually or the like; and calculation based on a control signal which makes one round in the ring. In the case of calculating based on the control signal subjected to one round of the ring, for example, the master node generates and transmits a control signal with a time stamp given thereto. A delay measurement function unit (not shown) of the master node receives the control signal after making one round of the ring, and calculates a ring one-round time by subtracting a time stamp value from a reception time.

Figure 88:
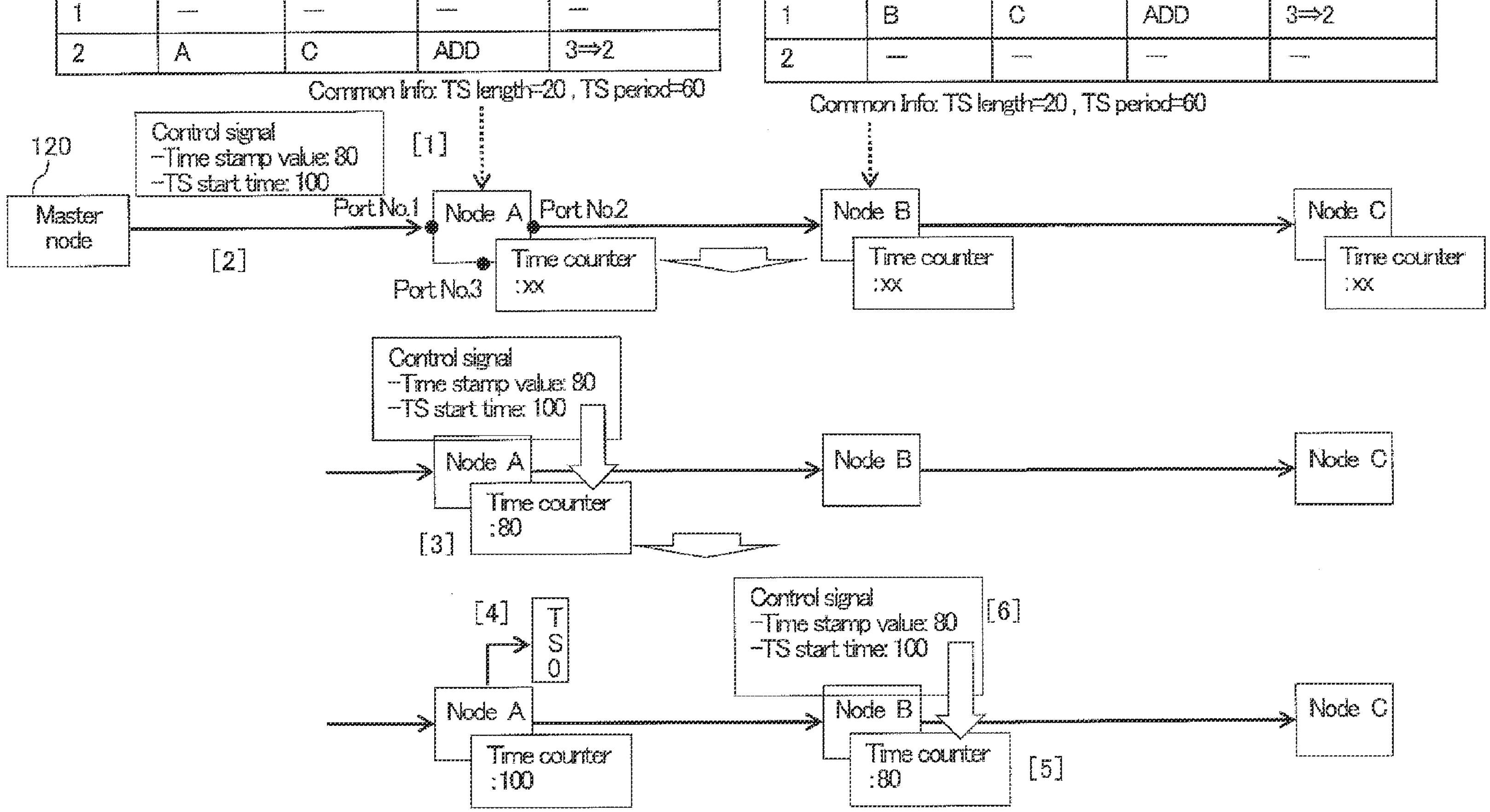
FIG. 88 is a diagram for explaining an example of operations of how a local time and a TS start time is delivered in the time synchronization type using the time with delay difference.

FIG. 88 is a diagram illustrating an operation example in which a local time and a TS start time are delivered in a configuration of time synchronization type using a time with delay difference in a case of No. 2013 of FIG. 81. It is assumed herein that all TSs are already set. As illustrated in [1], the master node 120 time slot information to node A. As illustrated in [2], the master node 120 transmits a control signal containing a TS start time and a time stamp value for each TS period. As illustrated in [3], upon receipt of the control signal, node A sets a time counter of its own as a time stamp value of the control signal. As illustrated in [4], node A sequentially starts operations at a time slot TS0, when the time counter reaches the TS start time. That is, node A performs an operation of the TS information when "TS start time+TS number×TS length" has arrived.

In a case of the illustrated node A, the node A: performs an ADD at the time slot TS0 of time counters 100 to 120; and performs an ADD to a time slot TS2 at time counters 140 to 160. Node A repeats the operation until the next TS start time is transmitted. Then, as illustrated in [5], upon receipt of another control signal, node B sets a time counter of its own as a time stamp value of the control signal. As illustrated in [6], node B sequentially starts operations at a time slot TS0, when the time counter reaches the TS start time. In a case of the illustrated node B, the node B: performs a DROP of TS0 at the time counters 100 ((time counter=TS start time+TS number×TS length) to 120; and performs an ADD to S2 at time counters 120 to 140. Node B repeats the operation according to the TS information until the next TS start time is transmitted.

Next is described the time synchronization using a common time.

In this case of the common time, each of the nodes independently sets a time thereof based on the common time. This makes it unnecessary to deliver a signal for setting a local time of each of the nodes. The common time used herein is information on time which any of the nodes can obtain independently of the others. The common time is thus a single time system and does not depend on a propagation delay at each of the nodes. The common time as described above includes: a high-accuracy internal clock installed at each of the nodes (for example, an atomic time standard such as a cesium oscillator and a rubidium oscillator, and a crystal oscillator); and an external clock equally shared by each of the nodes (for example, a GPS clock and a JJY clock (Japan standard atomic radio clock)). When the internal clock is used for each of the nodes, a time thereof is set at an identical and the most accurate time with high accuracy. The TS synchronization using the common time can be achieved in several ways as illustrated in FIG. 89.

Even if all local times of the nodes including the master node and the optical switch nodes are matched with accuracy by using the common time such as the GPS, it is still necessary to prevent data collision taking a delay between the nodes into account in allocating a time slot. A delay therefore needs to be measured even in the case of using the common time.

Figure 90A:
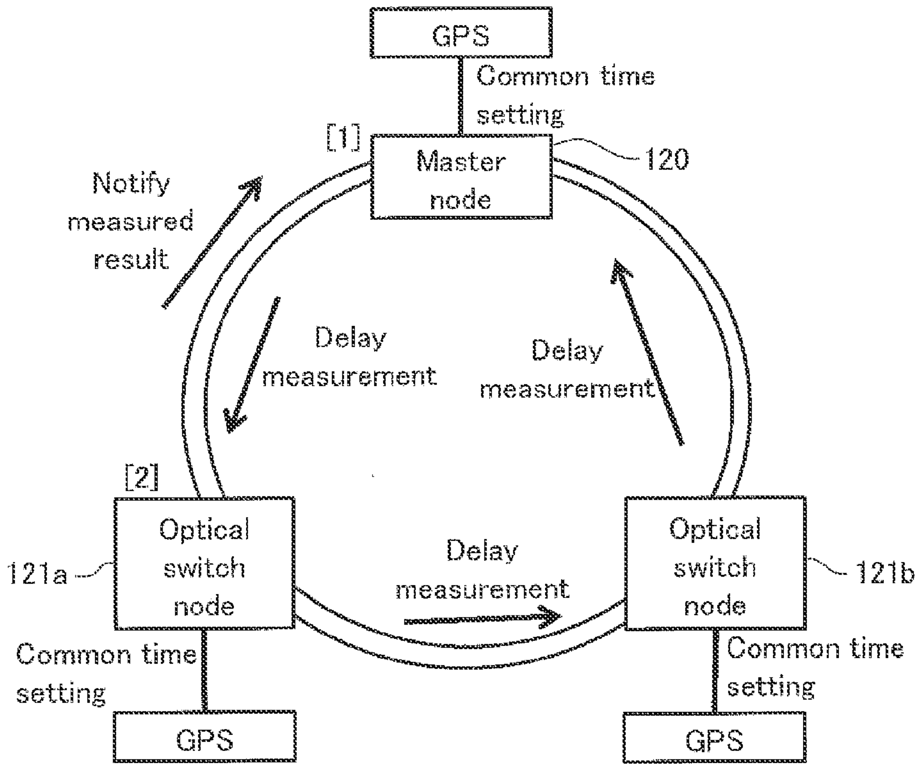
FIG. 90A is a system diagram for explaining how to deliver a time and how to measure a delay in the time synchronization type configuration using the common time.
Figure 90B:
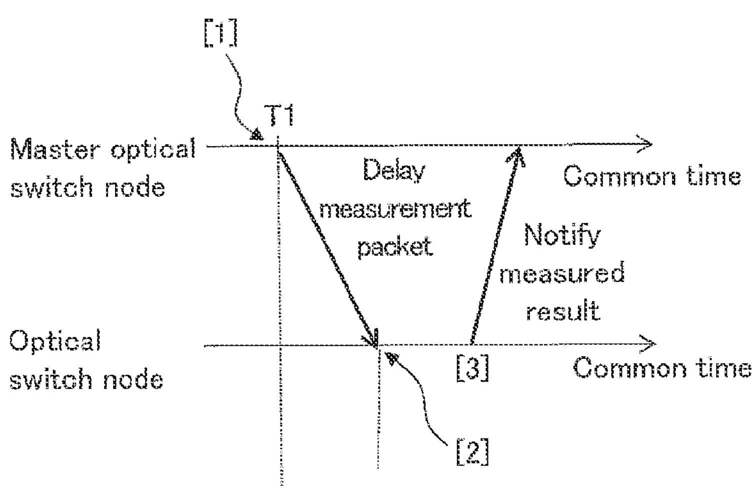
FIG. 90B is a time-series diagram for explaining how to deliver the time and how to measure a delay in the time synchronization type configuration using the common time.

FIG. 90A is a diagram illustrating a configuration of an optical network system. FIG. 90B is a diagram illustrating a procedure of delivering a common time to each of the nodes using the GPS, and measuring a delay.

The master node 120 and the optical switch nodes 121*a*, 121*b* are each connected to a GPS receiver, to thereby set an accurate time obtained from the GPS, as a local time of each of the nodes 120, 121*a*, 121*b*. As illustrated in [1], the master node 120 transmits a delay measurement packet to which a time (T1) inside the master node itself is given as a time stamp. As illustrated in [2], upon receipt of the delay measurement packet, each of the nodes 121*a*, 121*b* calculates a propagation delay time from a value of the time stamp in the received packet (at T1) and a current time at the node itself, that is, "Propagation delay time=Current time−Time stamp value. As illustrated in [3], each of the nodes 121*a*, 121*b* notifies the master node 120 of the measured propagation delay time.

Note that the time synchronization using the common time does not necessarily require doubly-provided control signal lines (clockwise and counterclockwise control lines), and a singly-provided or a unidirectional control line can also be used. Each of the nodes can transmit the measured propagation delay time without collision, by performing a TS allocation in a direction same as that of the delay measurement packet.

Figure 91A:
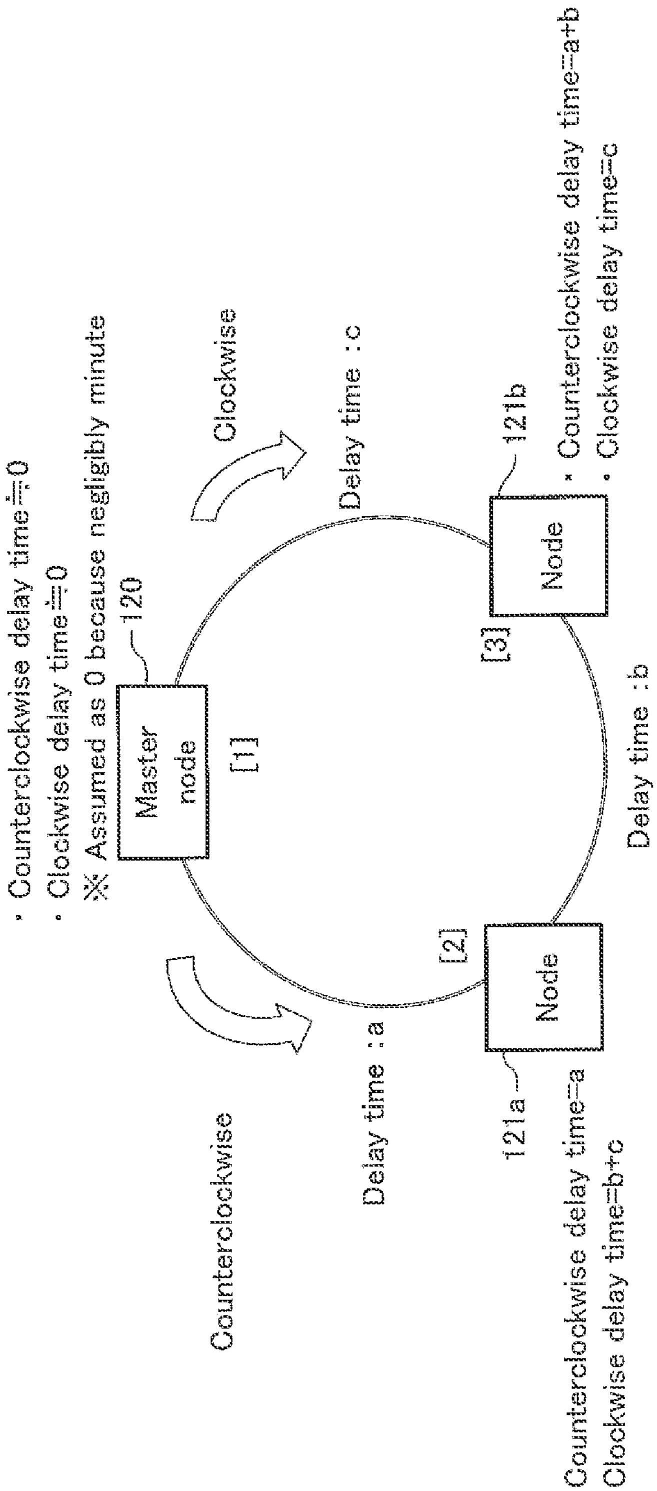
FIG. 91A is a system diagram for explaining a TS start time in the time synchronization type configuration using the common time.
Figure 91B:
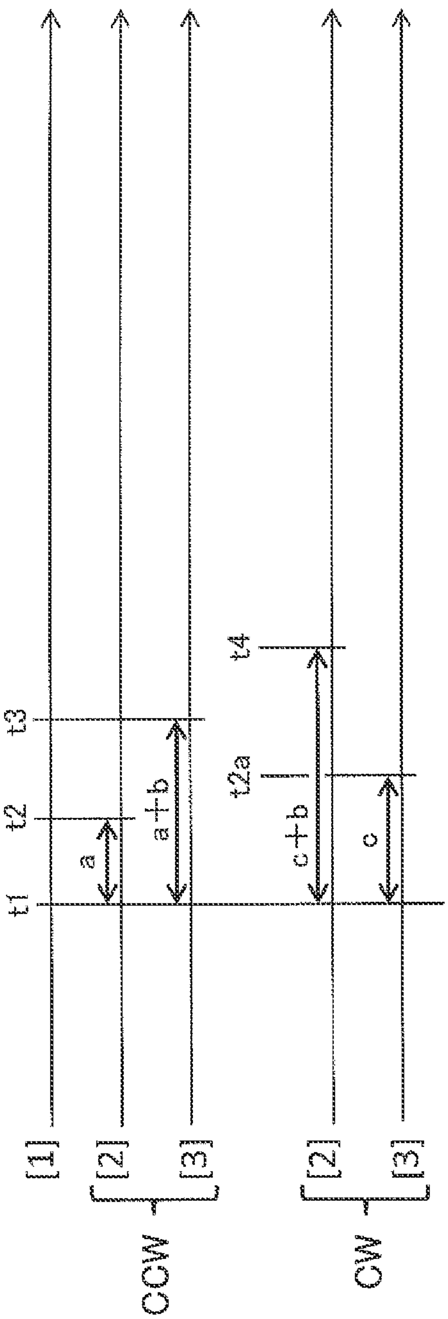
FIG. 91B is a time-series diagram for explaining the TS start time in the time synchronization type configuration using the common time.

Next is described a TS start time in a case in which the time synchronization is performed using a common time. In the time synchronization using the common time, local times of each of the nodes are accurately matched. It is thus necessary to take a delay between the nodes into account so as to determine a start time of a time slot such that no data collision occurs. That is, it is necessary for each of the nodes to update the TS start time by adding a delay time from that of the master node to a TS start time "t" which is transmitted by the master node. FIG. 91A and FIG. 91B are diagrams each for explaining how to determine such a TS start time.

In the explanation, as illustrated in FIG. 91A, designated at [1] is the ring-connected master node 120; at [2], the node 121*a*; and at [3], the node 121*b*, which may be collectively referred to as each of the nodes [1] to [3]. Also in FIG. 91B, the nodes are indicated by respective numeric characters [1] to [3].

In a counterclockwise direction of the ring illustrated in FIG. 91A, a TS start time of the master node [1] corresponds to a time t1 in FIG. 91B. In the counterclockwise direction, let "a" be a delay time between the master node [1] and the node [2] in transmitting a signal. The TS start time at the node [2] in the counterclockwise direction is "t1+a=t2". Similarly, let "a+b" be a delay time between the master node [1] and the node [3]. The TS start time at the node [3] in the counterclockwise direction is "t1+a+b=t3".

In a clockwise direction, let "c" be a delay time between the master node [1] and the node [3]. The TS start time at the node [3] in the clockwise direction is "t1+c=t2a". Similarly, let "c+b" be a delay time between the master node [1] and the node [2]. The TS start time at the node [2] in the clockwise direction is "t1+c+b=t4".

Figure 92:
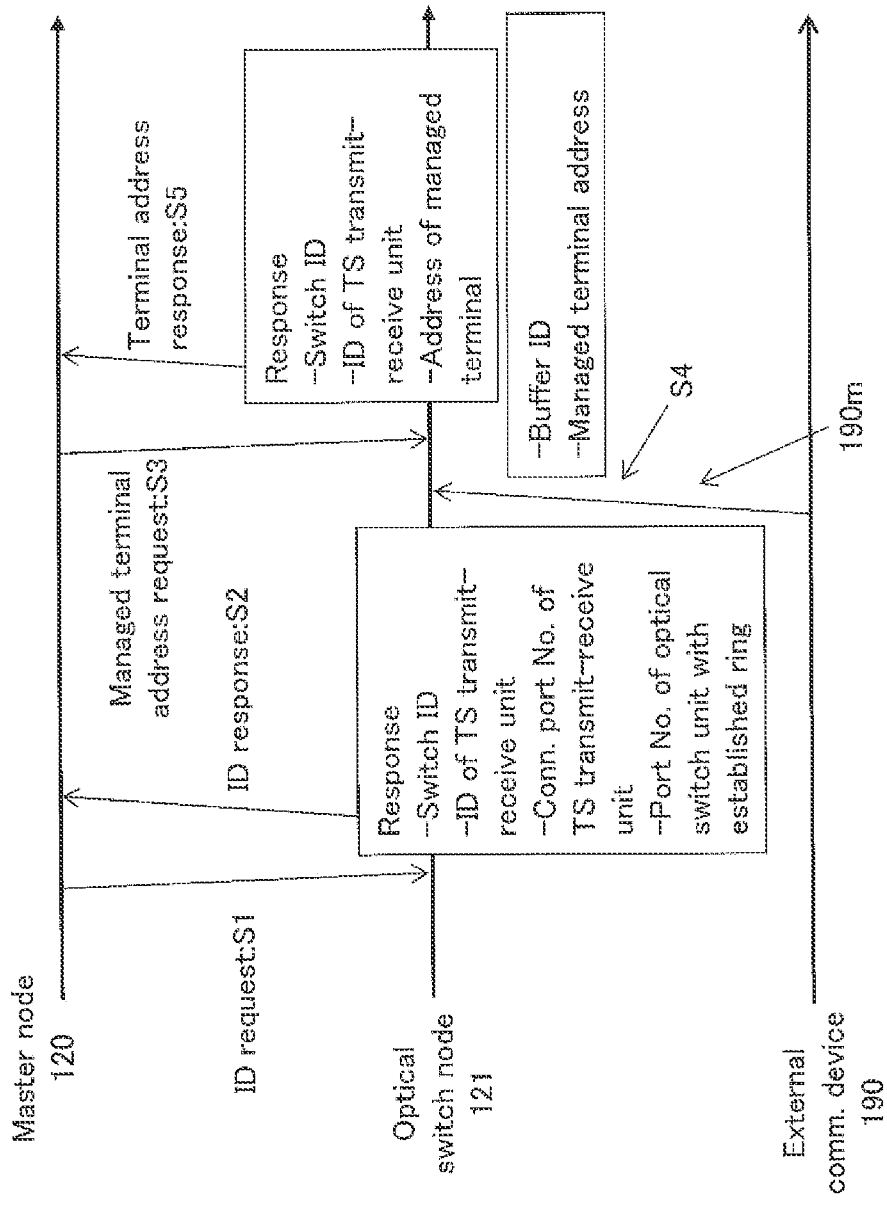

Next is described a processing of recognizing a topology at the topology management unit 135 of the master node 120. FIG. 92 is a time sequence diagram illustrating operations of recognizing a topology in the case of a single control ring.

The master node 120 requests an ID (identification number) of a switch thereof, an ID of an interface (TS transmit-receive unit) of the switch, and the like from each of the optical switch nodes 121 (ID request S1), so as to recognize a connection configuration between the optical switch nodes 121 connected to a ring network and a terminal (external communication device) 190 connected to the optical switch node 121. The optical switch node 121 returns an ID response S2 to the ID request S1. The master node 120 requests, as a managed terminal address request, an address or the like of a terminal (external communication device) 190 connected to the optical switch node 121, from the optical switch node 121 itself (managed terminal address request S3). The optical switch node 121: is notified of an updated address of the terminal 190 connected to the optical switch node 121 (S4), each time the terminal address is updated; and stores therein the terminal address 190*m*. Thus, the optical switch node 121 notifies the master node 120 of an address or the like of the managed terminal (external communication device) 190, as a terminal address response S5, in response to the managed terminal address request S3. This makes it possible for the master node 120 to recognize the switch ID of the optical switch node 121 connected to the ring network, the ID of the TS transmit-receive unit, a port number connected to the TS transmit-receive unit of the optical switch node 121, a port number used for establishing a ring at the optical switch node 121, and the address of the terminal 190 in control of the optical switch node 121.

In order to prevent collision of a data for topology management since the single control ring is assumed herein, upon receipt of a control signal from the master node 120, each of the optical switch nodes 121: adds information requested by the master node 120 behind a received packet like a string; and transmits the packet to the optical switch node 121 at a next stage.

Next is described a configuration of transmitting a trigger and a control signal in the optical network system according to this embodiment. In each of the optical switch nodes, a data is required to be transmitted to the optical switch node at the next stage via the optical TS-SW unit or to be subjected to a DROP. A trigger (or a control signal) is required to be transmitted to the optical switch node at the next stage and also to be given to the control signal reception unit of the node itself. The configuration of transmitting the trigger or the control signal has variations, for example, those illustrated in FIG. 93A to FIG. 93D, in each of which the trigger or the control signal is assumed to be transmitted at a wavelength for control λc. In explanations with reference to FIG. 93A to FIG. 93D, it is assumed that a trigger includes a control signal.

Figure 93A:
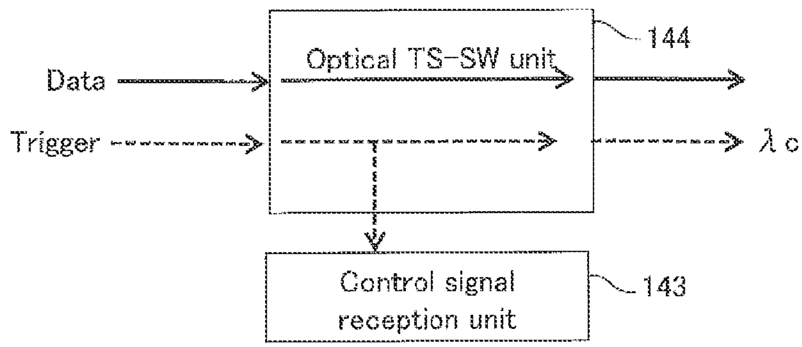

In FIG. 93A, a trigger is made to pass through the optical TS-SW unit 144. The trigger branches in the optical TS-SW unit 144 and is supplied to the control signal reception unit 143. In this case, the optical TS-SW unit 144 is set at broadcasting.

Figure 93B:
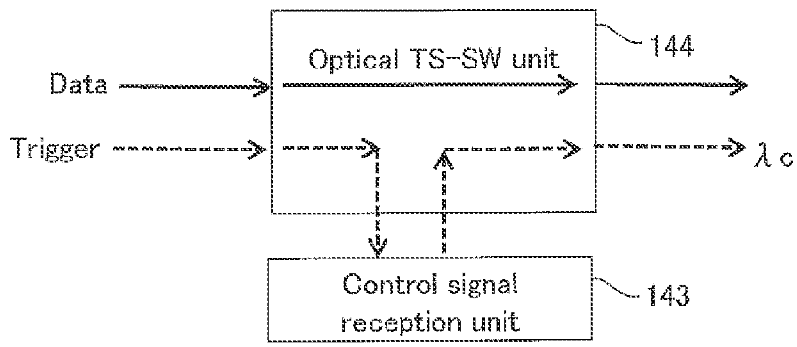

In FIG. 93B, a trigger is also made to pass through the optical TS-SW unit 144, and the optical TS-SW unit 144 is set at DROP and ADD. The trigger is subjected to a DROP in the optical TS-SW unit 144 and is supplied to the control signal reception unit 143. The control signal reception unit 143 branches the trigger. The optical TS-SW unit 144 performs an ADD of a portion of the trigger required to be transmitted to the next stage.

Figure 93C:
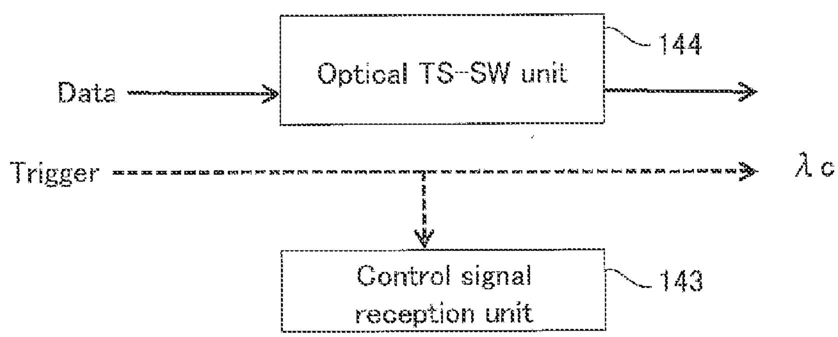

In FIG. 93C, a trigger is not made to pass through the optical TS-SW unit 144. The trigger is branched in a state of an electrical signal by being subjected to OE (optical/electrical)−EO (electrical/optical) conversion with respect to the wavelength for control λc or is branched using an optical coupler, and is then given to the control signal reception unit 143.

Figure 93D:
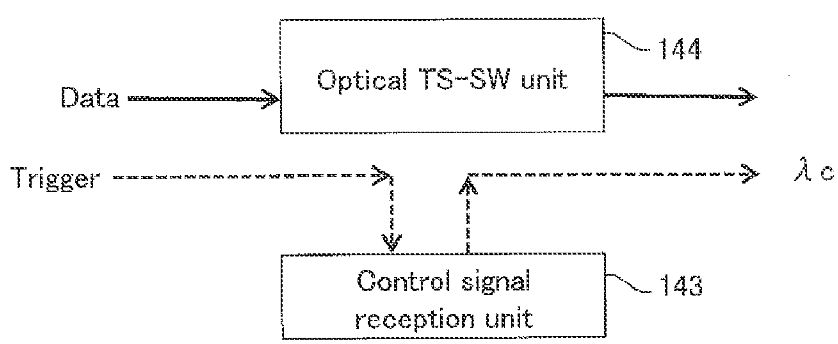

In FIG. 93D, a trigger is not also made to pass through the optical TS-SW unit 144. The trigger is branched separately from a data with respect to the wavelength for control λc at the control signal reception unit 143.

Next is described a connection configuration between the optical TS-SW unit and the TS transmit-receive unit. The connection configuration between the optical TS-SW unit and the TS transmit-receive unit has variations, for example, those illustrated in FIG. 94A to FIG. 94C.

Figure 94A:
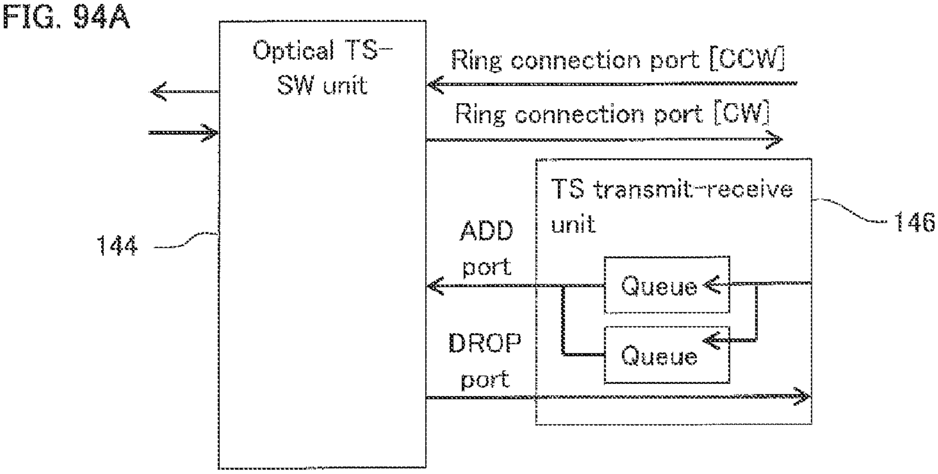

In FIG. 94A, the TS transmit-receive unit 146 is configured to be 1 output 1 input. A transmitted data is stored in a separate queue in the TS transmit-receive unit 146 for each destination. The TS transmit-receive unit 146 is connected to the optical TS-SW unit 144 with 1 port for each of ADD and DROP.

Figure 94B:
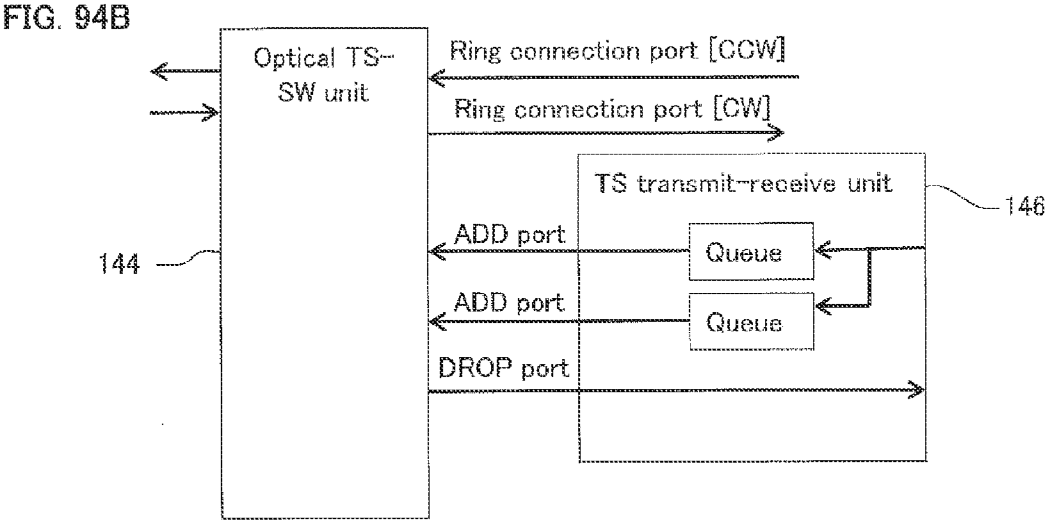

In FIG. 94B, the TS transmit-receive unit 146 is configured to have 1 input for the entire TS transmit-receive unit 146 itself and 1 output for each queue. A transmitted data is stored in a different queue in the TS transmit-receive unit 146 according to a destination of the data. Connection of the TS transmit-receive unit 146 with the optical TS-SW unit 144 uses one ADD port for each queue. One DROP port is used for the entire TS transmit-receive unit 146. Usage of one ADD port for each queue makes it possible for data with different destinations to be simultaneously outputted if ring transmission directions of the data are different.

Figure 94C:
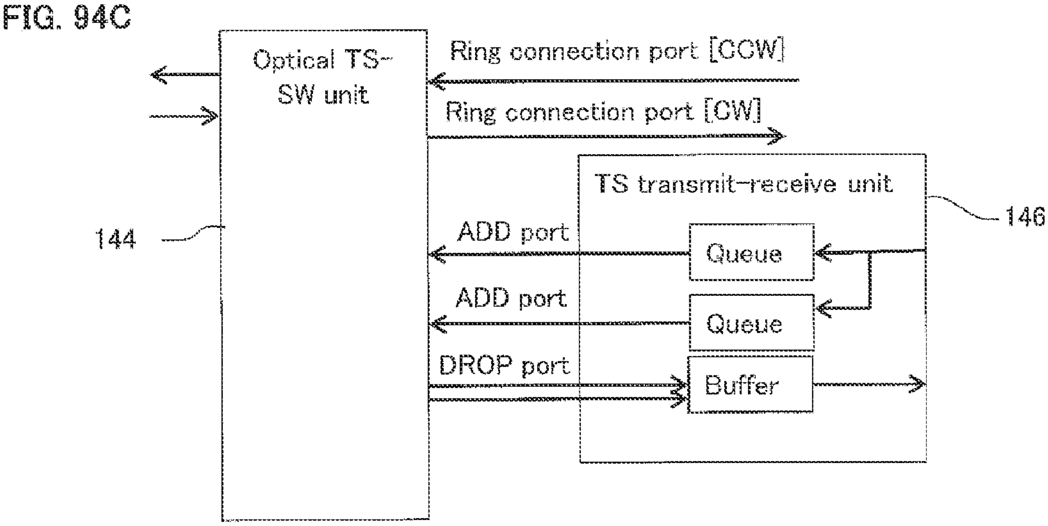

In FIG. 94C, the TS transmit-receive unit 146 is configured to further include therein a buffer at which data is received from two DROP ports, compared to the TS transmit-receive unit 146 illustrated in FIG. 94B. Usage of the two DROP ports makes it possible to simultaneously receive data from both ring clockwise and counterclockwise directions.

Next is described a configuration of the optical TS (time slot)-SW (switch) unit 144 provided in the optical switch node 121.

Figure 95A:
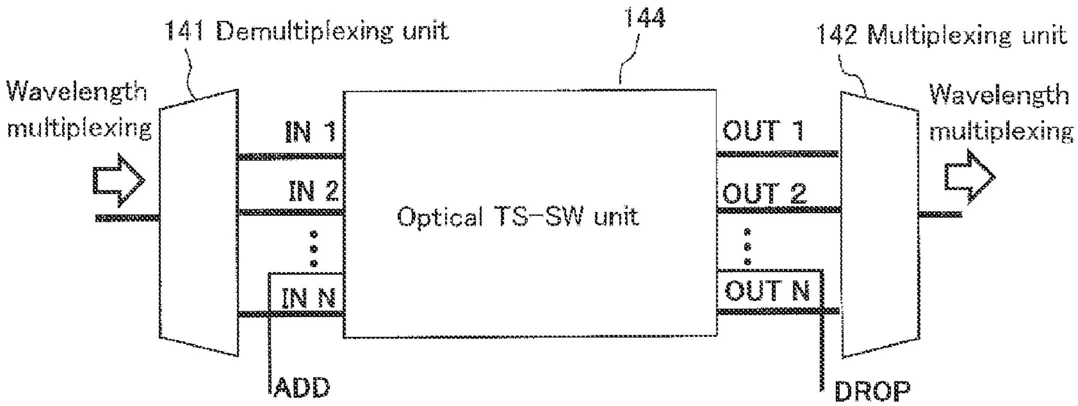
Figure 95B:
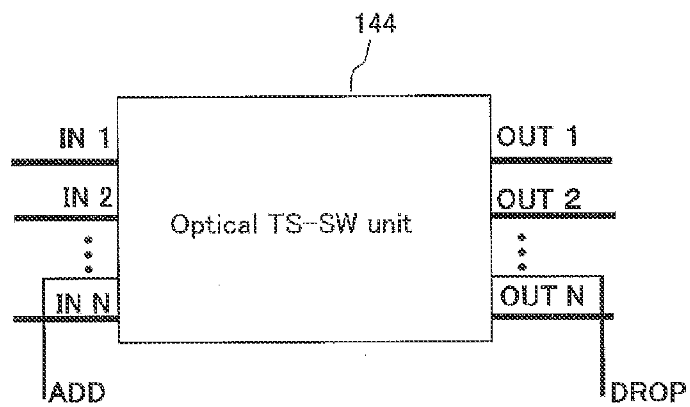

As described above, the optical TS-SW unit 144: is equipped with an input port and an output port in each of which a data line of a ring network is accommodated; changes a connection relation between the input port and the output port according to an instruction from the master node 120; and also performs a processing such as wavelength conversion where necessary. The optical TS-SW unit 144 as described above may be configured as a wavelength routing switch using wavelength conversion or as a spatial switch of broadcast and select type, which will be specifically described hereinafter. The data line accommodated in the optical TS-SW unit 144 is grouped into a multiplexed data line and a non-multiplexed data line. FIG. 95A and FIG. 95B are diagrams each illustrating an outline of the optical TS-SW unit 144 configured as a wavelength switch. FIG. 95A illustrates a case in which a multiplexed data line is accommodated. FIG. 95B illustrates a case in which a non-multiplexed data line is accommodated.

In the case of accommodating a multiplexed data line, as illustrated in FIG. 95A, the demultiplexing unit 141 is disposed before the optical TS-SW unit 144. A data inputted by wavelength multiplexing is demultiplexed into, for example, N wavelengths, which are respectively given to input ports IN 1 to IN N. A multiplexing unit 142 is disposed at a subsequent stage of the optical TS-SW unit 144. The multiplexing unit 142 multiplexes optical signals from N output ports OUT 1 to OUT N of the optical TS-SW unit 144 and transmits the multiplexed data to a next (subsequent) node on the ring network. The optical TS-SW unit 144 also has functions of insertion of an optical signal (ADD) and branching of an optical signal (DROP). The optical TS-SW unit 144 is equipped with a port for ADD as an input port. The optical TS-SW unit 144 is also equipped with a port for DROP as an output port.

In the case of accommodating a non-multiplexing data line, as illustrated in FIG. 95B, neither demultiplexing unit nor multiplexing unit is provided. In this case, the number of data lines on the ring is equal to the number of end terminals (ports) from which the number of interfaces for ADD/DROP at the optical switch is subtracted.

Figure 96:
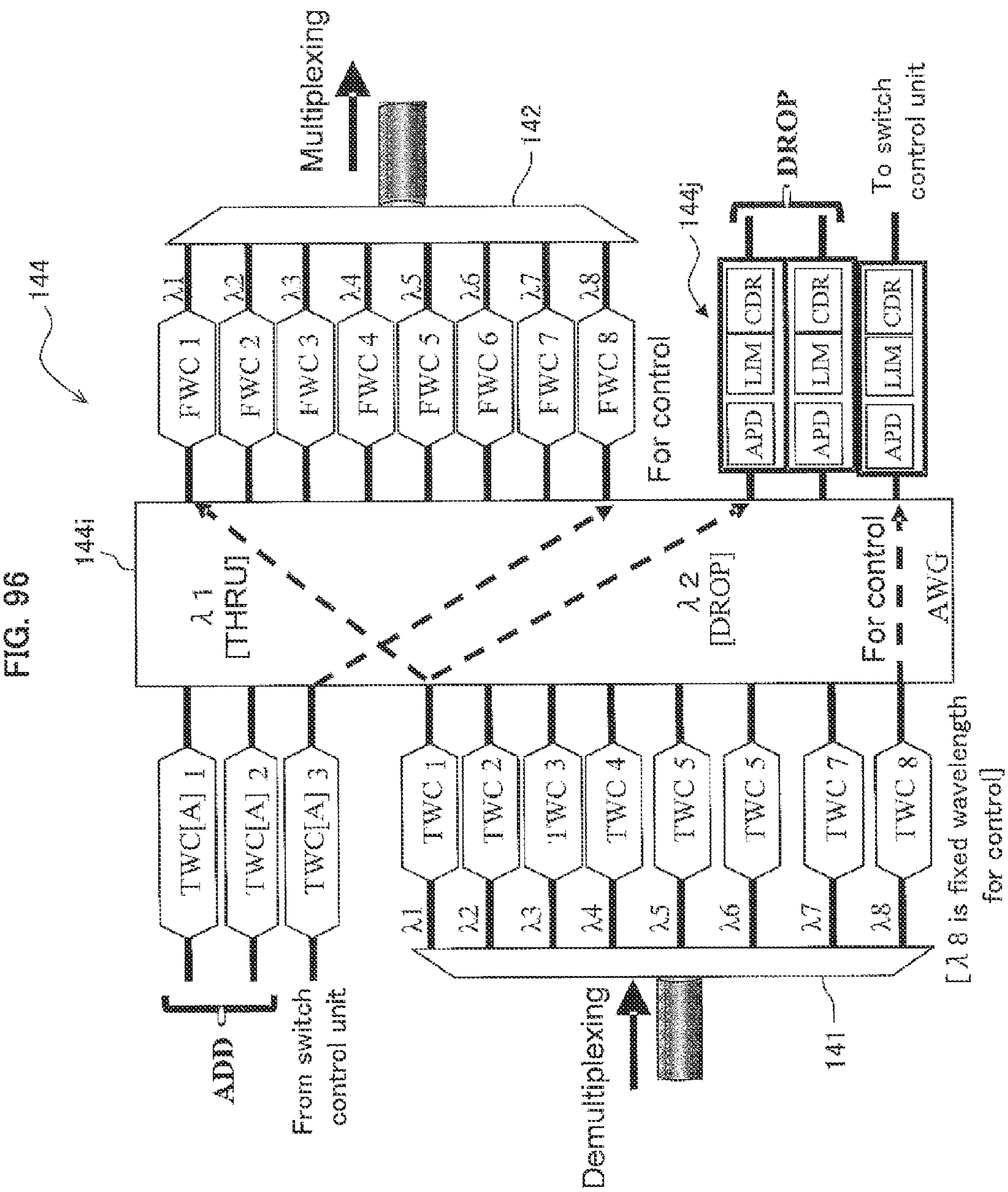

FIG. 96 is a diagram illustrating a basic configuration of the optical TS-SW unit 144 which is configured as a wavelength switch. The optical TS-SW unit 144 is equipped with one or more input ports and a plurality of output ports, and includes: a demultiplexer 141 that demultiplexes a multiplexed input optical signal for each wavelength; an AGW (arrayed waveguide grating) **144*i* that distributes an optical signal inputted into each of the input ports into an appropriate output port in accordance with a wavelength of the optical signal; TWC (variable wavelength converter: tunable wavelength converter) 1 to TWC 8 and TWC [A]1 to TWC [A]3 each of which perform wavelength conversion so as to select from passing through (THRU), insertion (ADD), and branching (DROP) at the optical switch node; a multiplexer (multiplexing unit) 142 that multiplexes an output optical signal at each of wavelengths so as to transmit the optical signal to a next stage; FWC (fixed wavelength converter: fixed wavelength converter) 1 to FWC 8 each of which performs such wavelength conversion that the optical signals are outputted to the same port in the demultiplexing unit at the next stage; and an optical receiver 144*j* that receives the optical signals having been branched (DROP) by the AWG 144*i***.

In the illustrated example, the demultiplexer 141 demultiplexes the optical signal transmitted by wavelength multiplexing from the prior stage, into wavelengths λ1 to λ8. The demultiplexed optical signals are given to respective input ports of the AWG **144*i* via the TWC 1 to the TWC 8. In addition, another optical signal to be inserted are given to respective input ports of the AWG 144*i* via the TWC [A]1 to the TWC [A]3. Eight of the output ports of the AWG 144*i* are for use in transmission to the next stage. The optical signals from those output ports: are inputted into the multiplexer 142 via the FWC 1 to the FWC 8, respectively; are multiplexed: and are transmitted to the next stage. The AWG 144*i* is further equipped with output ports used for branching (DROP). The output ports are connected to the optical receiver 144*j*. The optical receiver 144*j* includes: a photoelectric device (APD) that performs photoelectric conversion; a limiting amplifier (LIM) that absorbs power difference between optical signals; and a clock data recovery circuit (CDR) that absorbs phase difference between the optical signals, which are connected in series in this order. The optical receiver 144*j* absorbs power difference/phase difference between signals and receives an optical signal. Note that in the example illustrated in FIG. 96, the wavelength λ8 is designed to be a fixed wavelength for control. One channel of each of ADD and DROP is also designed to be for control and is connected to a switch control unit for controlling the optical TS-SW unit 144**.

FIG. 97A is a diagram illustrating an example of a configuration of the TWC. In the figure, an optical signal is indicated by a bold solid line, and an electrical signal is indicated by a bold broken line. The TWC includes, similarly to the described above: an optical burst receiver 170 that includes an APD, a LIM, and a CDR; a variable wavelength light source 171 that can vary oscillation wavelength so as to change an output destination at the AWG; and a modulator 172 that modulates light from the variable wavelength light source 171 using an electrical signal from the optical burst receiver 170. In the TWC, the LIM is provided so as to absorb a difference in loss owing to transmission paths different in length or in output power of light sources. The CDR is provided so as to absorb a phase difference owing to transmission paths different in length. The TWC as described above can recover power of light attenuated due to long distance transmission, by performing optical-electrical-optical conversion. Thus, usage of the TWC eliminates a need of an optical amplifier.

FIG. 97B is a diagram illustrating an example of a configuration of the FWC. In the figure, an optical signal is indicated by a bold solid line, and an electrical signal is indicated by a bold broken line. The FWC includes: the optical burst receiver 170 including an APD, a LIM, and a CDR; and a fixed wavelength light source 173 that performs wavelength conversion such that a pass-through data and an ADD data have the same wavelength and are outputted to the same port of the demultiplexing unit at the next stage. In the FWC, the LIM is provided so as to absorb a difference in loss varying for each port of the AWG or in output power of light sources. The CDR is provided so as to absorb a phase difference due to different transmission paths at the AWG.

The optical TS-SW unit of wavelength switch type may have various configurations. FIG. 98 is a diagram illustrating the various possible configurations. Herein, the possible configurations are shown according to: how many fibers per AWG are provided; whether or not the FWC is provided; whether a port for ADD connection is provided at a prior stage or at a subsequent stage of the AWG; and whether a wavelength exchange is performed between fibers or in the fibers. If the configuration is free of the FWC, cost can be reduced accordingly. If the wavelength exchange between fibers is used, even if one of the optical fibers is disconnected, communications are possible, thus improving failure resistance. Further, if the in-fiber wavelength conversion is used, flexible operations become possible.

Next are described some specific configuration examples of the optical TS-SW unit of wavelength switch type.

FIG. 99 is a diagram illustrating the configuration example of the optical TS-SW unit 144, corresponding to a case of [1] of FIG. 98 in which: a k-fold ring having k fibers is used; and N wavelengths per ring are used. It is assumed in the figure that K=2 and N=4. How a wavelength exchange between k fibers is performed is herein exemplified in a case where the FWC is not provided. With respect to kN wavelengths of λi (0≤i≤kN−1), a plurality of wavelengths whose "i MOD N" take the same value are deemed as the same wavelengths. This makes it possible to input a signal after switching by the same wavelength unit at the wavelength conversion unit (TWC) at a subsequent stage, without using the FWC. More specifically, kN×kN circular AWGs 141*a*, 141*b* are provided. At a subsequent stage thereof, N TWC 1 to TWC 8 and k circular 1×N AWG 144*i* as a demultiplexing unit are provided. At a further subsequent stage thereof, k output ports 144*k*, 144*l* are provided.

FIG. 100 is a diagram illustrating the example corresponding to a case of [1a] of FIG. 98 in which: the k-fold ring and N wavelengths per ring are used; and a wavelength exchange between fibers is performed by means of 1 ADD/1 DROP without using the FWC. It is assumed in the figure that K=2 and N=4. With respect to kN wavelengths λi (0≤i≤kN−1), a plurality of wavelengths whose "i MOD N" take the same value are deemed as the same wavelengths. A kN×kN circular AWG 144*i* is provided. At a prior stage thereof: k circular 1×N AWGs 141*c*, 141*d*; k(N−2) TWC 1 to TWC 4 for use in pass-through (THRU)/branching (DROP); and one TWC [A] for use in insertion (ADD). The k circular 1×N AWGs 141*c*, 141*d* each of which functions as a demultiplexing unit that also performs wavelength conversion. The optical receiver 144*j* that is an interface for branching and k (N−1)×N multiplexing units 142*c*, 142*d* are provided on an output side of the kN×kN circular AWG 144*i*.

FIG. 101 is a diagram illustrating the example corresponding to also the case of [1a] of FIG. 98 in which: the k-fold ring and N wavelengths per ring are used; a wavelength exchange between fibers is performed by means of 1 ADD/1 DROP without using the FWC; and a control wavelength is also used. It is assumed in the figure that K=2 and N=4. With respect to kN wavelengths of λi (0≤i≤kN−1), a plurality of wavelengths whose "i MOD N" take the same value are deemed as the same wavelengths. A kN×kN circular AWG 144*i* is provided. Ata prior stage thereof: k circular 1×N AWGs 141*c*, 141*d* each of which functions as a demultiplexing unit which also performs wavelength conversion; k(N−2) TWC 1 to TWC 4 for use in pass-through (THRU)/branching (DROP); and one TWC [A] for use in insertion (ADD) are provided. The optical receiver 144*j* that is an interface for branching, and k (N−1)×N multiplexing units 142*c*, 142*d* are provided on the output side of the kN×kN circular AWG 144*i*. Further, in this configuration, a wavelength for control is prepared for performing switch control, and, so as to ensure reachability of the wavelength for control, each of the demultiplexing units is connected to a coupler 144*r*, at which the wavelength for control is copied.

FIG. 102 is a diagram illustrating the example corresponding to also the case of [1b] of FIG. 98 in which: the k-fold ring and N wavelengths per ring are used; and a wavelength exchange between fibers is performed by means of 1 ADD/1 DROP without using the FWC. It is assumed in the figure that K=2 and N=4. The kN×kN circular AWG 144*i* is provided. At the prior stage thereof: k circular 1×N AWGs 141*c*, 141*d* each of which functions as a demultiplexing unit which also performs wavelength conversion; and k(N−2) TWC 1 to TWC 4 for use in pass-through (THRU)/branching (DROP) are provided. At the subsequent stage of the kN×kN circular AWG 144*i*: a TWC [A] for use in insertion (ADD); an AWG 141*e* for branching at a subsequent stage of the TWC [A]; the optical receiver 144*j* that is an interface for branching; and k(N−1)×N multiplexing units 142*c*, 142*d* are provided.

FIG. 103 is a diagram illustrating the example corresponding to the case of [2] of FIG. 98 in which: the k-fold ring and N wavelengths per ring are used; the optical TS-SW unit 144 is capable of performing a wavelength exchange between fibers and a wavelength exchange in fibers without using the FWC. It is assumed in the figure that K=2 and N=4. With respect to kN wavelengths λi (0≤i≤kN−1), a plurality of wavelengths whose "i MOD N" take the same value are deemed as the same wavelengths. This makes it possible to input a signal after switching by the same wavelength unit at the wavelength conversion unit at a subsequent stage, without using the FWC. More specifically, the kN×kN circular AWG 144*i* are provided. At the prior stage thereof: the TWC 1 to TWC 8; and k circular 1×N AWGs 141*c*, 141*d* each of which functions as a demultiplexing unit are provided. At the subsequent stage thereof: k N−2 N×1 star coupler 144*s*, 144*t*; and k output ports 144*k*, 144*l* are provided.

FIG. 104 is a diagram illustrating the example corresponding also to the case of [3] of FIG. 98 in which: the k-fold ring (having N wavelengths per ring) are used with 1 fiber per AWG; and the 1 ADD/1 DROP configuration is used without using the FWC; and a control wavelength is used. It is assumed in the figure that K=2 and N=4. With respect to kN wavelengths of λi (i=0 to kN−1), a plurality of wavelengths whose "i MOD N" take the same value are deemed as the same wavelengths. k N×N circular AWGs (2 4×4 circular AWGs in the FIG. 144*h*, 144*i* are provided. Ata prior stage of the k N×N circular AWGs 144*h*, 144*i*: k circular 1×N AWGs 141*c*, 141*d* each of which functions as a demultiplexing unit which also performs wavelength conversion; k(N−2) TWC 1 to TWC 4 for use in pass-through (Through)/branching (DROP); and one TWC [A] for use in insertion (ADD) are provided. The TWC [A] for insertion is connected to the 4×4 AWG 144*h* which is positioned in an upper part of the figure. At the subsequent stage of the k N×N circular AWGs 144*h*, 144*i*, the optical receiver 144*j* that is an interface for branching; and k N×N multiplexing units 142*c*, 142*d* are provided. The optical receiver 144*j* is connected to the optical receiver 144*j* which is positioned in a lower part of the figure. A TWC [A/D] for ADD/DROP between the fibers is provided such that an output of the upper 4×4 AWG 144*h* is connected to an input of the 4×4 AWG 144*i*. Further, so as to ensure reachability of a wavelength for control, each of the demultiplexing units is connected to the coupler 144*r*, at which the wavelength for control is copied.

FIG. 105 is a diagram illustrating a specific example of the basic configuration illustrated in FIG. 96. It is assumed herein that: a double ring having 4 wavelengths per ring is used; and ADD/DROP is performed via 1 channel. As the AWG 144*i*, a 9×9 AWG 144*g* is used. Output ports of the AWG 144*g* except a DROP port are connected to FWC 1 to FWC 4+FWC 1 to FWC 4, respectively. FIG. 105B is a diagram illustrating requirements of wavelength at the TWC [A] and TWC 1 to TWC 8 which are disposed on an input side of the AWG 144*g*.

FIG. 106A is a diagram illustrating the example corresponding to the case of [0a] of FIG. 98 in which a double ring having 4 wavelengths per ring is used. At the subsequent stage of the 9×9 AWG 144*g*, the FWC 1 to FWC 4+FWC 1 to FWC 4 are provided. ADD/DROP is performed via 1 channel. Wavelength exchange is performed in the fibers. FIG. 106B is a diagram illustrating requirements of wavelength at the TWC [A] and TWC 1 to TWC 8 which are disposed on the input side of the AWG 144*g*.

FIG. 107A is a diagram illustrating the example corresponding to the case of [0b] of FIG. 98 in which a double ring having 4 wavelengths per ring is used. At the subsequent stage of the 9×9 AWG 144*g*, the FWC 1 to FWC 4+FWC 1 to FWC 4 are provided. ADD/DROP is performed via 1 channel. Wavelength exchange is performed between the fibers as well as in the fibers. FIG. 107B is a diagram illustrating requirements of wavelength at the TWC [A] and TWC 1 to TWC 8 which are disposed on the input side of the AWG 144*g*.

Next is described a configuration of the optical TS-SW unit configured as a spatial switch of broadcast and select type.

FIG. 108 is a basic configuration of the optical TS-SW unit 144A of broadcast and select type. The AWG 141 demultiplexes an optical signal inputted through wavelength multiplexing (WDM). The coupler 144*r* transmits the demultiplexed wavelength components to a plurality of N×1 SWs (switches) 144*t*. The N×1 SWs 144*t* provide control (through control) of transmission/interruption of a signal using a semiconductor optical amplifier (SOA). One of the N×1 SWs 144*t* is saved as a port for DROP. A coupler 142 multiplexes output from the other N×1 SWs 144*t* and outputs from the TWC [A]1 and transmits the multiplexed outputs as a wavelength multiplexed signal. Each if the N×1 SWs 144*t* includes: a semiconductor optical amplifier (SOA) 144*u* for each input port; a SOA 144*w* for each output port; and a spatial switch 144*v*. If the number of ports is N, the number of the SOAs to be controlled is $N^2$.

FIG. 109 is a diagram illustrating another example of the optical TS-SW unit 144B of broadcast and select type. The configuration illustrated in FIG. 108 requires a number of the SOAs 144*u*, 144*w* to constitute the N×1 SWs 144*t*. The configuration illustrated in FIG. 109 thus includes, instead of the N×1 SWs 144*t* illustrated in FIG. 108, a wavelength variable filter 144*x*, each of which provides control (through control) of transmission or interruption of a signal with respect to an arbitrary wavelength, using a wavelength filter. The configuration does not require the AWG 144*i* at the prior stage. The configuration illustrated in FIG. 109 allows the number of elements which provide control on the switches, to be reduced from $N^2$ to N, compared to the configuration illustrated in FIG. 108.

Seventh Embodiment

Next is described a seventh embodiment with reference to related drawings. Referring to FIG. 110, a definition of time slot synchronization is described.

When a time slot transmitting node (node A) and a time slot receiving node (node B) are present, a signal transmitted from node A arrives at node B after a delay of a propagation delay time 301AB between nodes A, B. A start timing 301A of time slots TS1 to TS5 which operate at node A is thus made advanced from time slots TS1 to TS5 which operate at node B by the propagation delay time (plus guard band) 301AB. This makes the time slots TS1 to TS5 which operate at node A and the time slots TS1 to TS5 which operate at node B to be synchronized. The time slots TS1 to TS5 operate periodically, and a start timing of a time slot period is hereinafter referred to as a time slot start position. Counters each provided within nodes A, B measure an operation period and a length of each of the time slots, by counting up for each 1 clock of a local clock frequency.

Referring to FIG. 111, next is described a basic idea of the present invention by exemplifying a multi-ring network (which may also be simply referred to as a multi-ring) 302 of a unidirectional communication.

The multi-ring 302 includes: an upper ring 303; and a plurality of lower rings 304, which are connected to each other at node A as a ring intersection point.

(1) A reference time slot (first time slot) 305 is made to operate at node A as the ring intersection point and each of nodes B of the lower rings 304.

The reference time slot 305 is a time slot synchronizing with a time slot operating in a source node A0 existing in the upper ring 303. The source node A0 used herein is any one of a plurality of nodes connected to a given ring and is determined as a source node. The source node A0 corresponds to the above-described master node.

The reference time slot can be synchronized in such a manner that: the source node A0 transmits a synchronization frame (in which a time value in the source node at a time of transmitting the synchronization frame is inserted) at a timing of a reference time slot start position in the source node A0, to the nodes other than the source node; and, upon receipt of the synchronization frame from the source node A0, each of the nodes other than the source node sets the time value in the synchronization frame as a current time of its own node and starts the reference time slot. Similarly, upon receipt of the synchronization frame from the source node A0, each of nodes B of the lower rings 304 starts a reference time slot. At this time, it is necessary to deliver the synchronization frame from the source node A0 to the nodes of the upper ring 303 other than the source node and nodes B of the lower rings 304. This can be realized by branching the synchronization frame at each of the nodes using an optical coupler.

(2) Node A as the ring intersection point sets a time slot for the upper ring 303 (which may also be referred to as a second time slot) 306 which is obtained by shifting the reference time slot (first time slot) 305 of its own node by the synchronized offset value (delay time), to node B on the lower ring 304 in which transmission is performed as illustrated in TS1 indicated by an arrow Y20. The offset value DB used herein corresponds to the propagation delay time DB from node B to node A as the ring intersection point shown in the multi-ring 302.

This can synchronize the time slot 306 for the upper ring 303 of node B with the reference time slot 305 of the ring intersection point node A. Further, node B uses the reference time slot 305 in a downstream communication which is a transmission from the upper ring 303 to the lower ring 304 indicated by the arrow Y20; and uses the time slot 306 for the upper ring 303 in an upstream communication which is a transmission as in a case of TS5 from the lower ring 304 to the upper ring 303 indicated by an arrow Y21. TS5 used herein is a time slot into which a data is to be inserted.

This can separate, at node B, a time slot transmission (ADD) to the upper ring 303, from a TDM control timing used for a time slot reception (DROP) from the upper ring 303.

As described above, the time slot 306 for the upper ring of each of nodes B on the lower ring 304 is synchronized with the reference time slot 305 of the ring intersection point node A; and the time slot 306 for the upper ring is used in the upstream communication from the lower ring 304 to the upper ring 303. This makes it possible to exchange time slots between the rings without occurrence of time slot collision. Further, a length of a guard band to be required can be reduced. Note that the figure also illustrates a concept of a logical configuration in which upstream and downstream time slots are used (arrow Y22).

Referring to FIG. 112, how to synchronize a time slot of the lower ring 304 with a time slot of the ring intersection point node A in a multi-ring network of a unidirectional communication is described.

(1) Source node A0 starts a reference time slot and makes each of nodes other than the source node synchronize with the reference time slot. The reference time slot can be synchronized in such a manner that: the source node A0 transmits a synchronization frame (in which a time value in the source node at a time of transmitting the synchronization frame is inserted) at a timing of a reference time slot start position in the source node A0, to the nodes other than the source node; and, upon receipt of the synchronization frame from the source node A0, each of the nodes other than the source node sets the time value in the synchronization frame as a current time of its own node and starts the reference time slot. This can synchronize the reference time slot 308 between the source node A0 and the nodes other than the source node. Usage of the reference time slot 308 allows ADD/DROP of a time slot between different frames with respect to a direction of delivering the synchronization frame.

(2) Node A as the ring intersection point sets a time slot 309 for the upper ring which is synchronized with the reference time slot 308 of the ring intersection point node A, to each of nodes B on the lower ring 304. In order to set the time slot 309 for the upper ring to each of the node B on the lower ring 304, the ring intersection point node A measures a one-round delay of the lower ring B.

The lower ring one-round delay time is required because: on the multi-ring 302, a time slot 309 transmitted from the node B on the lower ring 304 arrives at the ring intersection point node A a time D1 after; a start timing of the reference time slot of the node B on the lower ring 304 is delayed in comparison with the reference time slot 308 of the ring intersection point node A by a time D2; and an addition of (D1+D2) is the lower ring one-round delay time. The time D1 used herein means a delay time on a path heading from a lower node (for example, B) to an upper node (for example, A). The time D2 used herein means, in contrast, a delay time on a path heading from the upper node A to the lower node B.

As a result of the described above, the time slot for upper ring 309 of the node B on the lower ring 304 can be synchronized with a time slot start timing of the reference time slot 308 of the ring intersection point node A, by starting the time slot for upper ring 309 itself by a ring one-round time with respect to a time slot start timing of a reference time slot of its own node B on the lower ring 304.

The lower ring one-round delay time is measured as follows: (a) The ring intersection point node A transmits a lower ring one-round delay measurement frame; (b) The ring intersection point node A receives the lower ring one-round delay measurement frame; and (c) A counter value at a time of processing (b) is subtracted from counter value at a time of processing (a).

(3) Each the nodes B on the lower ring 304 ticks a time slot (a time slot for upper ring) 309 which is shifted by an offset value from a time slot start timing of the reference time slot 308 of its own node. This can synchronize the time slot for upper ring 309 of each of the nodes B on the lower ring 304 with the reference time slot 308 of the ring intersection point node A. The ring intersection point node A transmits a synchronization frame for starting a ticking of the time slot for upper ring 309, to each of the nodes B on the lower ring 304. At this time, the ring intersection point node A transmits the synchronization frame with the measured lower ring one-round delay as a time stamp added thereto. A timing of the transmission is made to synchronize with a start timing of a time slot period of the reference time slot after the lower ring one-round time is measured, such that the synchronization frame arrives at a head position of the head position of each of the nodes B on the lower ring 304. Upon receipt of the synchronization frame, each of the nodes B of the lower ring 304 advances the reference time slot 308 of its own node by the lower ring one-round time described in the synchronization frame, to thereby tick the time slot for upper ring 309. More specifically, each of the nodes B starts a counter of a time slot for the upper ring, by taking a value obtained by adding a time stamp value in the synchronization frame to a reference counter value at a time of receiving the synchronization frame, as an initial value. Usage of the time slot for upper ring 309 enables transmission and receipt of a time slot from the node B on the lower ring 304 to the node A0 on the upper ring 303.

Next is described how to synchronize a reference time slot operating in the source node A0 and a time slot used at a time of jumping over the source node A0 (a time slot for jump) in a single unidirectional network.

(1) The reference time slot is synchronized between all nodes. The reference time slot can be synchronized by delivering a synchronization frame from the source node A0 to each of the all nodes other than the source node. A wavelength for control different from that for data is used in communications of the synchronization frame, to thereby ensure reachability between the nodes.

More specifically, the source node A0 transmits the synchronization frame at a head start position of the reference time slot of its own node. The nodes other than the source node: receives the synchronization frame by copying a control signal using a optical coupler; starts a bit counter for the reference time slot from a timing of receiving the synchronization frame; and starts a ticking of the reference time slot. A counter is used for counting a time slot period and a time slot length and counts up for each clock of a local clock frequency. As a result, the reference time slot operates with a delay of a start time of a time slot period by a propagation delay time between the nodes, which makes it possible to synchronize the reference time slot between the nodes. Usage of the reference time slot allows ADD/DROP of a time slot between different frames with respect to a direction of delivering the synchronization frame.

(2) In the ring one-round delay measurement, the source node A0 measures one-round delay so as to synchronize time slot start timing of time slots for jump of the nodes other than the source node in accordance with the reference time slot of the source node A0. The ring one-round delay measurement is required because: a time slot transmitted from the node other than the source node arrives at the source node A0 a time D1 after; a start timing of the reference time slot of the node other than the source node is delayed in comparison with the reference time slot of the source node A0 by a time D2; and an addition of (D1+D2) is a ring one-round delay time.

As a result of the described above, the time slot for jump of the node other than the source node can be synchronized with a time slot start timing of the reference time slot of the source node A, by starting the time slot for jump itself by a ring one-round time with respect to a time slot start timing of a reference time slot of its own node (the node other than the source node).

The ring one-round delay time is measured as follows: (a) The source node A0 transmits a synchronization frame; (b) The source node receives the synchronization frame having been made one round of a ring; and (c) A counter value at a time of processing (b) is subtracted from counter value at a time of processing (a).

(3) Next is described how to set a time slot for jump synchronized with the reference time slot of the source node A0. The source node A0 transmits a synchronization frame for starting a ticking of the time slot for jump, to the nodes other than the source node. At this time, the source node A0 transmits the synchronization frame with the measured one-round delay as a time stamp added thereto. A timing of the transmission is made to be a time slot start position of the reference time slot after the ring one-round time is measured, such that the synchronization frame arrives at a time slot start position of the reference time slot of the node other than the source node.

Upon receipt of the synchronization frame, each of the nodes advances the reference time slot of its own by the lower ring one-round time described in the synchronization frame, to thereby tick the time slot for jump. More specifically, the node other than the source node starts a counter for jump, by taking a value obtained by adding a time stamp value in the synchronization frame to a reference counter value at a time of receiving the synchronization frame, as an initial value. Usage of the time slot for jump enables transmission and receipt of a time slot from the nodes other than the source node to the source node A0.

Next is described a functional block of each of nodes with reference to FIG. 113.

The node includes: an optical switch unit (optical time slot switching unit) 311; a buffer unit 312; a control information transmission unit 313; a reference TS synchronization unit 314; a delay measurement unit 315; a plural TS management unit 316; a counter management unit 317; an internal clock unit 318; a TS control unit 319; a TS amount update timing calculation unit 320; and a control information receipt unit 321. Designated at a reference character "a" is a delay measurement result; at "b", a clock; at "c", a reference time; at "d", a current time; a "e", time stamp information from other node; at "f", allocation TS information; at "g", time stamp information at each TS; at "h", a TS transmission timing; at "i", an optical switch switching timing; at "j", a buffer accumulation amount; at "k", a head start position of a reference TS amount; at "l", TS change information; at "m", TS information and TS switching timing; and at "n", head start timing of a plurality of TSs.

The optical switch unit 311 performs ADD/DROP of a time slot.

The control information receipt unit 321 receives a control signal subjected to DROP by the optical switch unit 311.

The buffer unit 312: includes a buffer in which a data inputted from an external unit (not shown) is accumulated; and has a TX (transmitter) of the buffer from which a data is transmitted to the optical switch unit 311 and a RX (receiver) of the buffer in which a data is received from the optical switch unit 311 and from which the data is transmitted to the external unit.

The control information transmission unit 313 transmits a data amount accumulated in the buffer of the buffer unit 312 and a time counter value in the counter management unit 317, to a source node.

The reference TS synchronization unit 314 ticks a time slot at a prescribed period (a reference time slot) from a time set by the source node (a time when a synchronization frame is received from the source node).

The delay measurement unit 315: measures a propagation delay time between the node itself and other node, based on a time stamp in the control signal (a delay measurement frame) from other node and a time counter value in the counter management unit 317; calculates an inter-node propagation delay time, based on the measured propagation delay time; and obtains an offset value for determining a start timing of a time slot of each of the nodes.

The plural TS management unit 316 manages a time slot which is shifted from a reference time slot of each node by a start timing of the offset value, in accordance with the offset value from the delay measurement unit 315. The plural TS management unit 316 stores therein a time slot position allocated to each time slot.

The counter management unit 317: sets a time stamp in the synchronization frame received from the source as an initial time counter value; and increments the time counter value from a time when the synchronization frame is received, in accordance with a calculate of the internal clock unit 318.

The internal clock unit 318 supplies the counter management unit 317 with a clock for advancing the time counter value present in the counter management unit 317.

The TS control unit 319: compares the time counter value in the counter management unit 317 with a timing value described in a time slot processing scenario, in accordance with the time slot processing scenario in the plural TS management unit 316; and provides control of a time slot transmission and a time slot switch operation on the optical switch unit 311 and the buffer unit 312. Note that control of transmission or the like of a delay measurement frame and a frame for plural time slot start to be described hereinafter is provided by the TS control unit 319.

TS amount update timing calculation unit 320 calculates a time slot amount which is common to a plurality of time slots and switching timing of the time slots.

Input/output of the optical switch unit 311 and a (transmission) and a RX (receipt) of the buffer unit 312 are operated in accordance with at least one time slot.

Next are described definitions of an M-C, a Sub M-C, and an S-C taking a topology in a unidirectional communication and a two-step ring as an example, with reference to FIG. 114. Herein, an M-C 331 is a source node as a master node. SubM-Cs 332*a*, 332*b* (collectively, 332) are ring intersection point nodes as sub master nodes. S-Cs 333*a* to 333*c* (collectively, 333) are nodes as slave nodes (which correspond to the above-described optical switch nodes other than the master node).

The M-C 331 is a representative node (source node). Only one unit thereof is present in a optical network system.

The M-C 331 mainly serves as follows.

The M-C 331: transmits a synchronization frame for starting a time slot of each of the nodes 332, 333; and measures a propagation delay time and calculates an offset value between the nodes 332, 333.

The SubM-C 332 mainly serves as follows.

The SubM-C 332 transmits a plural time slots start frame which makes a new time slot start with a shift by the calculated offset value, to the time slot of each of the nodes 332, 333 which has already been operating. The SubM-C 332 is located at a ring intersection point and controls the optical switch unit 311 (see FIG. 113).

That is, the SubM-C 332 ticks a plurality of time slots in accordance with an instruction from the M-C 331. The SubM-C 332 controls the optical switch unit 311 of its own in accordance with a time slot allocated by the M-C 331.

The S-C 333 is a node which is located off the ring intersection point and controls the optical switch unit 311 and the buffer unit 312 (see FIG. 113).

The S-C 333 mainly serves as follows.

The S-C 333 ticks a plurality of time slots in accordance with an instruction from the M-C 331. The S-C 333 also controls the optical switch unit 311 and the buffer unit 312 of its own in accordance with a time slot allocated by the M-C 331.

Next is described how the source node 331 sets a time slot start timing with reference to FIG. 115A and FIG. 115B. Herein, in an optical network system of FIG. 115A: an upper ring 335 is connected to two lower rings 336*a*, 336*b* by two nodes, that is, SubM-Cs (ring intersection point nodes) 332*a*, 332*b*, respectively; the upper ring 335 includes the source node 331 and an S-C 333*c* which is a node (an optical switch node); and the lower rings 336*a*, 336*b* include nodes (optical switch nodes) 333*a*, 333*b*, respectively. Inter-node propagation delay times are assumed to be, as illustrated in FIG. 115B: "150" between the source node 331 and the node 332*a*; and "200" between the node 332*a* and the node 333*b*. The source node 331 may also be simply referred to as the node 331; the ring intersection point node 332, the node 332; and the optical switch node 333, node 333.

The setting of the time slot start timing is performed so as to shift a start timing of a time slot periodically operating at each of the nodes 331 to 333, by a propagation delay time between each of the nodes 332, 333 and the source node 331, respectively.

One source node 331 is provided in the optical network system. The source node 331 transmits a synchronization frame to each of the nodes other than the source node, that is, the nodes 332*a*, 333*b* so as to determine a time slot start timing t10, as indicated by arrows Y25, Y26, respectively. Each of the nodes 332, 333 other than the source node starts operating of a time slot thereof upon receipt of the synchronization frame. Thus, the start timing of the time slot operating in each of the nodes 332*a*, 333*b* other than the source node is shifted by the propagation delay times of "150, 200" between each of the nodes 332*a*, 333*b* and the source node 331, respectively.

That is, the start timing of the time slot synchronized with a burst transmission period of the node 332*a* is a time t11a which is a time shifted by a transmission delay of "150" from the timing time t10 of the source node 331. Further, the start timing of the time slot synchronized with a burst transmission period of the node 333*b* is a time t13a which is shifted by "150+200=350" from the transmission delay from the timing time t10.

With respect to the reference time slot, a time slot transmitted in a direction from the source node 331 toward arrows Y25, Y26 in FIG. 115B is hereinafter referred to as a forward direction time slot.

Next is described how to set a time at each of nodes with reference to FIG. 116.

The source node 331: adds a current time of its own to a synchronization frame as a time stamp; and transmits the synchronization frame to each of the nodes 332, 333 other than the source node. Upon receipt of the synchronization frame, each of the nodes 332, 333 other than the source node sets the time stamp in the synchronization frame as a current time of its own node. As a result, a time at each of the nodes 332, 333 other than the source node is set with a shift by a propagation delay time from the source node 331.

At this time, a wavelength for control which is different from that for data is used, because the synchronization frame is transmitted to each of the nodes 332, 333 via the optical switch unit 311 which is active.

To ensure that each of the nodes receives the synchronization frame, as illustrated in a box 324, the optical coupler 322 or the like may copy a wavelength for control for each of the nodes 332, 333. Or, as illustrated in a box 325, the synchronization frame may be transmitted P-to-P (Peer to Peer) using different wavelengths for control to the nodes 332, 333. That is, a plurality of nodes in equal relationship in a network may be directly P-to-P connected to each other, in which a data is transmitted and received.

Next is described an advantageous effect of the setting of a time slot start timing as illustrated in FIG. 115, with reference to FIG. 117A and FIG. 117B.

As indicated by a time t11 in FIG. 117B, a time slot transmission is performed by setting a time slot start timing by the source node 331 in a direction same as that of the synchronization frame, which is indicated by, in FIG. 117B, an obliquely downward arrow Y28, and, in FIG. 117A, the counterclockwise arrow Y28. Various operations become possible by controlling the buffer unit 312 and the optical switch unit 311 consistent with the forward direction time slot. Such operations include, as illustrated in FIG. 117B, ADD at TS2 of the node 331, THRU at TS2 of the node 332*a*; and DROP at TS2 of the node 333*b*.

Next is described how to measure a propagation delay time between adjacent nodes with reference to FIG. 118.

The source node 331 transmits a synchronization frame to which a current time (T1) in the source node 331 is given as a time stamp as indicated in a bix 118*e* of FIG. 118, to each of the nodes 332, 333 other than the source node as indicated by an arrow Y31.

Each of the nodes 332, 333 other than the source node sets the time stamp in the synchronization frame received from the source node 331 as a current time T1 of its own node. After a processing time to which is set with a parameter, each of the nodes 332, 333 transmits a delay measurement frame to which a current time T2 inside its own node is given as a time stamp, to the source node 331 as indicated by an arrow Y32. Explanations on the transmission are described also in a box 118*a*.

At this time, the delay measurement frame is transmitted through a path through which the source node 331 transmits the synchronization frame. Passing the delay measurement frame through the same path as the synchronization frame makes it possible to measure a propagation delay time between the nodes 331 to 333. Note that when the delay measurement frame is transmitted, there is a possibility of colliding with the delay measurement frame from each of the nodes 331 to 333. Thus, the delay measurement frame is repeatedly transmitted at random timing. Or, the delay measurement frame is transmitted in accordance with a time slot allocated to each of the nodes 331 to 333. Note that a wavelength for control which is different from that for data is used, because the delay measurement frame is transmitted to each of the nodes 332, 333 via the optical switch unit 311 which is active.

The source node 331 calculates, from the time T3 inside the source node 331 at a time of receiving the delay measurement frame and the time T2 of the time stamp inside the delay measurement frame, a propagation delay time (=(T3−T2)+2) from the source node 331 to each of the nodes 332, 333. The calculation includes a division by 2 because a one-way propagation delay time is calculated as indicated in a box 118*b*.

As described above, the source node 331: measures the propagation delay time between the nodes 332, 333 other than the source node; and calculates a propagation delay time between adjacent nodes, based on a result of the measurement. For example, the source node 331: calculates a difference between a propagation delay time between the nodes 331 and 333*b* and a propagation delay time between the nodes 331 and 332*a*; and determines the difference as a propagation delay time between the adjacent nodes 332*a*, 333*b*. A conceptual diagram and an explanation thereof of the propagation delay times measured and calculated as described above are illustrated in boxes 118*d*, 118*c* of FIG. 118, respectively. In the box 118*d*, reference characters A to E are given to nodes (optical switch nodes) other than a master node as the source node.

The source node 331 also measures a ring one-round delay time so as to use for a time slot for communication jumping over the source node. The ring one-round delay time is measured as follows: (a) the source node 331 transmits a transmits a ring one-round delay measurement frame; (b) the source node 331 receives the ring one-round delay measurement frame after making one round of the one-round; and (c) A counter value at a time of processing (b) is subtracted from a counter value at a time of processing (a).

The ring intersection point node 332 measures a lower ring one-round delay time so as to be used for a time slot for communication from the node 333*a*, 333*b* on lower rings 336*a*, 336*b* to the node 333*c* on the upper ring 335. The lower ring one-round delay time is measured as follows: (a) the ring intersection point node 332 transmits a lower ring one-round delay measurement frame; (b) the ring intersection point node 332 receives the ring one-round delay measurement frame after making one round on the lower ring; and (c) A counter value at a time of processing (b) is subtracted from a counter value at a time of processing (a).

Next is described how to measure a propagation delay time with reference to FIG. 119A and FIG. 119B.

Referring to FIG. 119A, a case in which a path of a synchronization frame is symmetrical to a path of a delay measurement frame is described.

Each of the nodes 332, 333 other than the source node: sets a time stamp in the synchronization frame as a current time of its own node; and transmits a delay measurement frame to which the time (or a time ticked from the time in accordance with a local clock of each of the nodes) is added as a time stamp, to the source node, through a path through which the synchronization frame is transmitted in a direction indicated by an arrow Y30, in a direction opposite thereto as indicated by an arrow Y31. At this time, to ensure that the delay measurement frame is received by the source node 331, an optical coupler 322 is disposed in a path difference from that of the optical switch unit 311, and the delay measurement frame is transmitted.

The source node 331 obtains a difference between the time stamp in the received delay measurement frame and a time inside thereof when the source node 331 itself receives the delay measurement frame, to thereby measure a round-trip propagation delay time between the nodes 332, 333.

Referring to FIG. 119B, a case in which a path of a synchronization frame is asymmetrical to a path of a delay measurement frame is described.

Each of the nodes 332, 333 other than the source node: sets a time common to the nodes (including the source node) 331 to 333 (common time) (for example, using a GPS receiver 324); and transmits a delay measurement frame to which the common time is added as a time stamp, to the source node 331, through a path through which the synchronization frame is transmitted in a direction indicated by an arrow Y30, in the same direction as indicated by an arrow Y32.

The source node 331 obtains a difference between the time stamp in the received delay measurement frame and a common time inside thereof when the source node 331 itself receives the delay measurement frame, to thereby measure a one-way propagation delay time between the nodes 332, 333.

(A) and (B) as follows are contemplated herein based on the operations with reference to FIG. 119A and FIG. 119B as illustrated above.

(A) If a plurality of the nodes 331 to 333 share a wavelength for control, each of the nodes 331 to 333 continues to transmit a delay measurement frame at random timing, to thereby make the delay measurement frame from each of the nodes 332, 333 arrive at the source node 331. In and after the second measurement, a time slot for control which is synchronized based on a delay time between the source node 331 and each of the nodes 332, 333 is used, thus allowing collision of different delay measurement frames between the nodes 332, 333 from being prevented.

(B) The delay measurement frame may be P-to-P transmitted to the source node using different wavelengths for control for each of the nodes 331 to 333.

The source node 331: transmits or receives a synchronization frame to and from itself using a wavelength for control; and measures a propagation delay time for one round on an upper ring, based on a time stamp in the synchronization frame and a time of its own.

The ring intersection point node 332: transmits or receives a synchronization frame to and from itself using a wavelength for control; and measures a propagation delay time on the upper ring 335 or one round on the lower ring 336, based on a time stamp in the synchronization frame and a time of its own. Note that the ring intersection point node 332 notifies the source node 331 of the propagation delay time for one round on the lower ring 336.

The source node 331 calculates a difference between each of propagation delay times between each of the nodes 332, 333 other than the source node and the source node 331, to thereby calculate a propagation delay time between the nodes 332, 333 other than the source node.

Next is described how to measure a propagation delay time for one round on a ring with reference to FIG. 120.

Each of the source node 331 and the ring intersection point nodes 332*a*, 332*b* transmits or receives a synchronization frame to and from itself, as illustrated in a box 120*a*; and calculates a difference between a current time of its own at a time of receiving the synchronization frame and a time stamp in the synchronization frame, to thereby measure a propagation delay time for one round on the ring.

Note that the synchronization frame is transmitted in such a manner that: an exclusive wavelength is allocated for the transmission to ensure that the node receives the synchronization frame from itself; or the node transmits the synchronization frame in accordance with a time slot allocated to the node itself.

Next is described a timing separation between an ADD onto the upper ring 335 illustrated in FIG. 120 and a DROP onto the lower ring 336, taking a propagation delay into account, with reference to FIG. 121. In this case, ADD interfaces as much as the number of time slots are provided. Or, one ADD interface and a variable time slot are provided.

The source node 331 sets a plurality of time slots to each of the nodes 332, 333 other than the source node, based on a propagation delay time between the nodes 332, 333, taking into account propagation delays corresponding to paths used.

The source node 331 transmits a plural time slots start frame in which an offset value from a forward direction time slot having already been operating in each of the nodes 332, 333 other than the source node is described, to each of the nodes 332*a*, 333*b* other than the source node, as indicated by an arrow Y33 starting from a time t11.

Upon receipt of the plural time slots start frame, each of the nodes 332*a*, 333*b* other than the source node starts ticking a time slot with a shift from the forward direction time slot by the offset value as indicated by an arrow Y34 (a time slot for upper ring), which is described in a box 121*f.*

The number of time slots require for each of the nodes 332, 333 is 2×Πi=1, N (the number of communication paths at a ring of each step).

In the expression described above, i=the number of steps of a ring to which each of the rings belongs, counting from the upper ring.

For example, in a case of a two-step ring of a unidirectional communication (a data arrives at each of the nodes unidirectionally), the number of time slots of the upper ring and the lower ring are (1) and (2) as follows, respectively.

(1) the number of time slots of upper ring is two (a forward direction time slot and a time slot for ring one round).

(2) the number of time slots of the lower ring is four (a forward direction time slot, a time slot for ring one round, a time slot for forward direction time slot of the upper ring, and a time slot for ring one round time slot of the upper ring).

Next is described a time slot directed from the lower ring 336 to the upper ring 335 with reference to FIG. 122A and FIG. 122B.

A case is assumed in which ADD is performed from the node 333*b* on the lower ring 336*b* to a forward direction time slot of the node 332*a* on the upper ring 335. Let "200" be an internode distance of a counterclockwise path from the node 332*a* to the node 333*b* (a propagation delay time be D45 corresponding thereto). Let "50" be an internode distance of a counterclockwise path from the node 333*b* to the node 332*a* (a propagation delay time be D54 corresponding thereto).

(1) a time slot start timing of the node 333*b* on the lower ring 336*b* is delayed from the node 332*a* on the upper ring 335 by the propagation delay time D45, as indicated by times t11a and t13a of 122B.

(2) A data in a time slot transmitted from the lower ring node 333*b* arrives at the upper ring node 332*a* by the propagation delay time D54, as indicated by an arrow Y35.

In light of the above-described (1) and (2), a time slot whose start timing is advanced by D45+D54 (=propagation delay time for one round on the lower ring 1) from the forward direction time slot operating in the lower ring node 333*b*, as indicated by an arrow Y36 (a time slot for upper ring) is used. This makes it possible to perform ADD at the node 333*b* onto the upper ring.

Next are described various types of time slots required when a bidirectional communication (a data in a time slot arrives both clockwise and counterclockwise with respect to a source node) is performed on a multi-ring, with reference to FIG. 123A and FIG. 123B.

Definitions of a propagation delay time are as follows as illustrated in FIG. 123A.

Dru: a propagation delay time for one round on an upper ring. Dn: a propagation delay time between M-C to S-C on the upper ring. Ds: a propagation delay time between M-C to Sub M-C on the upper ring. Drl: a propagation delay time for one round on a lower ring. Dp: a propagation delay time between Sub M-C to S-C on the lower ring.

Next is described FIG. 123B. In FIG. 123B, the source node 331 is described as an M-C. In explanations of FIG. 123A and FIG. 123B t: time slot period and t0: time slot length.

[1] A forward direction time slot is: on the upper ring, a time slot delayed from a forward direction time slot inside an M-C by a time Dn; and, on the lower ring, a time slot delayed from the forward direction time slot inside the M-C by a time Ds+Dp.

[2] A backward direction time slot is, on the upper ring, a time slot advanced from the forward direction time slot inside its own node by a time 2Dn.

Or, the backward direction time slot is a time slot delayed from the time slot in the forward direction inside its own node by a time t-MOD (2Dn, t) (Herein, MOD (A, B)

represents a residue of A+B. For example, MOD (3, 2)=1, and MOD (2, 7)=2. Ditto below.)

Or, the backward direction time slot is a time slot delayed from the time slot in the forward direction inside its own node, by a time t0-MOD (2Dn, t0).

The backward direction time slot is, on the lower ring, a time slot advanced from the time slot from the forward direction time slot inside its own node by a time 2(Ds+Dp).

Or, the backward direction time slot is a time slot delayed from the time slot in the forward direction inside its own node, by a time t-MOD (2(Ds+Dp), t).

Or, the backward direction time slot is a time slot delayed from the time slot in the forward direction inside its own node, by a time t0-MOD (2(Ds+Dp), t0).

[3] A forward direction jump time slot is, on the upper ring, a time slot advanced from the time slot in the forward direction inside its own node, by a time Dru.

Or, the forward direction jump time slot is a time slot delayed from the time slot in the forward direction inside its own node, by a time t-MOD (Dru, t).

Or, the forward direction jump time slot is a time slot delayed from the time slot in the forward direction inside its own node, by a time t0-MOD (Dru, t0).

The forward direction jump time slot is, on the lower ring, a time slot delayed from the time slot in the forward direction inside its own node, by a time Drl.

Or, the forward direction jump time slot is a time slot delayed from the time slot in the forward direction inside its own node, by a time t-MOD (Drl, t).

Or, the forward direction jump time slot is a time slot delayed from the time slot in the forward direction inside its own node, by a time t0-MOD (Drl, t0).

[4] A backward direction jump time slot is, on the upper ring, a time slot advanced from the time slot in the forward direction inside its own node, by a time 2Dn−Dru.

Or, the backward direction jump time slot is a time slot delayed from the time slot in the forward direction inside its own node, by a time t-MOD (2Dn−Dru, t).

Or, the backward direction jump time slot is a time slot delayed from the time slot in the forward direction inside its own node, by a time t0-MOD (2Dn−Dru, t0).

The backward direction jump time slot is, on the lower ring, a time slot advanced from the time slot in the forward direction inside its own node, by a time 2(Ds+Dp)−Drl.

Or, backward direction jump time slot is a time slot delayed from the time slot in the forward direction inside its own node, by a time t-MOD (2(Ds+Dp)−Drl, t).

Or, the backward direction jump time slot is a time slot delayed from the time slot in the forward direction inside its own node, by a time t0-MOD (2(Ds+Dp)−Drl, t0).

[5] A time slot for upper ring forward direction jump time slot is, on the lower ring, a time slot advanced from the time slot in the forward direction inside its own node, by a time Dru+Drl.

Or, the time slot for upper ring forward direction time slot for jump is, on the lower ring, a time slot delayed from the time slot in the forward direction inside its own node, by a time t-MOD (Dru+Drl, t).

Or, the time slot for upper ring forward direction time slot for jump is, on the lower ring, a time slot delayed from the time slot in the forward direction inside its own node, by a time t0-MOD (Dru+Drl, t0).

[6] A time slot for upper ring backward direction time slot for jump is, on the lower ring, a time slot advanced from the time slot in the forward direction inside its own node, by a time 2(Ds+Dp)−(Dru+Drl).

Or, the time slot for upper ring backward direction time slot for jump is a time slot delayed from the time slot in the forward direction inside its own node, by a time t-MOD (2(Ds+Dp)−(Dru+Drl), t).

Or, the time slot for upper ring backward direction time slot for jump is a time slot delayed from the time slot in the forward direction inside its own node, by a time t0-MOD (2(Ds+Dp)−(Dru+Drl), t0).

Next is described a time slot (in a forward direction) used on a single ring network with reference to FIG. 124A to FIG. 124C. A system configuration herein is assumed to include an M-C 351 and S-Cs 352, 353, and 355, which are ring connected via a transmission path 357. It is basically intended herein that each of the nodes 352 to 354 ticks a time slot in accordance with a time slot operating in the M-C 351.

FIG. 124A is a diagram illustrating a case of a forward direction communication as indicated by an arrow Y41, in which the time slots of the nodes 351 to 354 are all forward direction time slots 358 because there is no jump communication which jumps over the M-C 351. The jump communication in the forward direction communication used herein means that a signal passes between the M-C 351, which is the source node indicated by a bidirectional arrow Y42 of FIG. 124C, and the S-C 354 in a forward direction as indicated by an arrow Y43. In other words, the jump communication in the forward direction communication is a jump communication from a node 354 side to the source node (M-C) 351.

FIG. 124B is a diagram illustrating a case in which a jump over the M-C 351 is present, as indicated by an arrow Y44. Time slots of the nodes 353, 354 each of which jumps over the M-C 351 are forward direction jump time slots 359. The others are forward direction time slots 358.

Next is described a time slot (in a backward direction) used on a single ring network with reference to FIG. 125A to FIG. 125C. It is basically intended herein that each of the nodes 352 to 354 ticks a time slot in accordance with a time slot operating in the M-C 351.

FIG. 125A is a diagram illustrating a case of a backward direction communication as indicated by an arrow Y45, in which the time slots of the nodes 351 to 354 are all backward direction time slots 361 because there is no jump communication which jumps over the M-C 351. The jump communication in the backward direction communication used herein means a signal passing between the M-C 351, which is the source node indicated by a bidirectional arrow Y42 of FIG. 125C, and the S-C 354 in a backward direction as indicated by an arrow Y46. In other words, the jump communication in the backward direction communication is a jump communication from the source node (M-C) 351 to the node 354 side.

FIG. 125B is a diagram illustrating a case in which a jump over the M-C 351 is present, as indicated by an arrow Y47. A time slot of the node 354 which jumps over the M-C 351 is a backward direction jump time slots 362. The others are backward direction time slots 361.

Thus, in the case of the single ring network, the source node 351 determines an offset value to be set to the node (which may also be referred to as a specific node) 354 which needs to tick a time slot other than the forward direction time slot, from among the nodes 352 to 354 other than the source node, taking into account a direction of a time slot and presence or absence of a jump over the source node 351.

Next is described a time slot (in a forward direction) used on a multi-ring network with reference to FIG. 126A to FIG. 126D. A system configuration herein is assumed to: include an M-C 351 and S-Cs 352, 353, and 355, which are ring connected via a transmission path 357; and the upper ring 357 is connected to a lower ring 377 via a SubM-C 371 which is a ring intersection point node; and the lower ring 377 is connected to S-Cs 372, 373. It is basically intended herein that each of the nodes 352, 353, and 371 to 373 ticks a time slot in accordance with a time slot operating in the M-C 351.

FIG. 126A is a diagram illustrating a case of a forward direction communication as indicated by an arrow Y51, in which there is a communication from the lower ring 377 to the upper ring 357. A time slot of the node 373 on the lower ring 377 is a time slot for forward direction jump time slot 378, and the others are forward direction time slots 358.

The jump communication from the lower ring 377 to the upper ring 357 in the forward direction communication used herein means that the S-C 373 which is a node on the lower ring 377 indicated by a bidirectional arrow Y42b of FIG. 126D, and the SubM-C 371, in a forward direction as indicated by an arrow Y52. That is, as illustrated in FIG. 126B, a time slot of the node 373 on the lower ring 377 is the time slot for upper ring forward direction jump time slot 378. Note that, as illustrated in the same arrow Y52 of FIG. 126D, in a case where a signal passes between the S-C 353 and the M-C 351 which are the nodes on the upper ring 357 indicated by a bidirectional arrow Y42a, in a forward direction, the M-C 351 performs a jump communication (a forward direction jump communication).

FIG. 126B is a diagram illustrating a case in which a jump from the lower ring 377 to the upper ring 357 and a jump over the M-C 351 are present, as indicated by an arrow Y53. Time slots of the nodes 371, 353 each of which jumps over the M-C 351 are forward direction jump time slots 377*a*, 377*b*. A time slot of the node 373 which jumps over the lower ring 377 is a time slot for upper ring forward direction jump time slot 378. The other time slots are forward direction time slots 376.

FIG. 126C is a diagram illustrating a case in which a jump over the M-C 351 and a communication from the upper ring 357 to the lower ring 377 are present as indicated by an arrow Y54. A time slot of the node 353 on the upper ring 357 which jumps over the M-C 351 is a forward direction jump time slot 377*b*. The others are the forward direction time slots 376.

In a case other than the described above, in which a communication from the upper ring 357 to the lower ring 377 is present, but a jump over the M-C is not present, all the time slots are forward direction time slots 376.

Next is described a time slot (in a backward direction) used in a multi-ring network with reference to FIG. 127A through FIG. 127D. It is basically intended herein that each of the nodes 352, 353, and 371 to 373 ticks a time slot in accordance with a time slot operating in the M-C 351.

FIG. 127A is a diagram illustrating a case in which a communication from the upper ring 352 to the lower ring 377 is present in a backward communication, as indicated by an arrow Y55. A time slot of the node 373 on the lower ring 377 is a backward direction jump time slot 381. The others are backward direction time slots 382.

The jump communication from the upper ring 357 to the lower ring 377 in the backward direction used herein means that the SubM-C 371 which is a node on the upper ring 357 indicated by a bidirectional arrow Y42b of FIG. 127D, and the S-C 373 on the lower ring 377, in a backward direction as indicated by an arrow Y56. That is, as illustrated in FIG. 127B, a time slot of the node 373 on the lower ring 377 is the time slot for upper ring backward direction jump time slot 383. Note that, as illustrated in the same arrow Y56 of FIG. 127D, in a case where a signal passes between the S-C 353 and the M-C 351 which are the nodes on the upper ring 357 indicated by a bidirectional arrow Y42a, in a backward direction, the M-C 351 performs a jump communication (a backward direction jump communication).

FIG. 127B is a diagram illustrating a case in which a jump from the upper ring 357 to the lower ring 377 and a jump over the M-C 351 are present, as indicated by an arrow Y57. A time slot of the node 373 on the lower ring 377 is a time slot for upper ring backward direction time slot for jump 383. Time slots of the node 353 on the upper ring 357 and the SubM-C 371 which jump over the M-C 351 are backward direction jump time slots 384*a*, 384*b*, respectively. The others are backward direction time slots 382.

FIG. 127C is a diagram illustrating a case in which a communication from the lower ring 377 to the upper ring 357, and a jump over the M-C 351 are present, as indicated by an arrow Y58. A time slot of the node 353 on the upper ring 357 which jumps over the M-C 351 is a backward direction jump time slot 384. The others are backward direction time slots 382.

Further, in a case other than the described above in which: a communication from the lower ring 377 to the upper ring 357 is present, but a jump over the M-C is not present, all the time slots from the lower ring 377 to the upper ring 357 are backward direction time slots 382.

Thus, in the case of the single ring network, the source node 351 determines an offset value which is to be set to the nodes (specific nodes) 353, 373 which needs to tick a time slot other than the forward direction time slot, from among the nodes 352, 353, and 371 to 354 other than the source node, taking into account: a direction of a time slot; presence or absence of a jump over the source node 351; presence or absence of a jump from the upper ring 357 to the lower ring 377; and presence or absence of a jump from the lower ring 377 to the upper ring 357.

Next is described an operating sequence when an operation of delivering a time counter value at the M-C [1], with reference to FIG. 128. The operation herein is assumed to be performed in a system in which, in a multi-ring network illustrated in FIG. 123A: an M-C [1] and an S-C [2] are connected to an upper link; an upper ring and a lower ring are relay connected via SubM-Cs [3], [4]; and an S-C [5] is connected to the lower ring.

Propagation delay times D1 to D4 also illustrated in FIG. 128 each represent: a propagation delay time between the M-C [1] and the S-C [2] as D1; between the M-C [1] and the SubM-C [3] as D2; between the M-C [1] and the SubM-C as D3; and between the SubM-C [3] and S-C [5] as D4.

Upon input of a command, the M-C [1]: starts counting of a time counter value of the counter management unit 317 (see FIG. 113) in the M-C [1] itself; and also starts ticking of both a forward direction time slot for control and a forward direction time slot for data. In FIG. 128, an initial value of the time counter value is "100", and the time slot for control starts at TS1. The time slot is incremented according to a count up of the time counter value such as, at "200", TS2, and, at "300", TS3. Note that, in addition to the time slot for control, ticking of the time slot for data not shown is simultaneously performed.

Next is described an operating sequence when an operation of delivering an initial time counter value at the M-C [1] is set, with reference to FIG. 129.

The M-C [1] sets how an initial time counter value is delivered to each of nodes [2] to [5] other than the M-C. The initial time counter value is delivered by containing in command setting information in a synchronization frame. In the command setting information: a number of a forward direction time slot for control which is used in delivering the initial time counter value; a destination MAC address, a destination controller ID; a number of a time slot for allocation control which is allocated used for responding to the initial time counter value are set. Note that the initial time counter value may be contained in a time counter operation start command.

Next is described an operating sequence when an initial time counter value in the M-C [1] is delivered to an upper ring, with reference to FIG. 130.

The M-C [1] delivers a synchronization frame to which an appropriate initial time counter value such as "100, 200, 300, . . . " at the forward direction time slot for control are given as a time stamp, to each of the nodes [2] to [5] other than the M-C.

For example, in transmitting at the forward direction time slot for control TS3, the M-C [1]: adds a time stamping processing delay time (for example, 1) to a head of the time counter value "300" of the forward direction time slot for control TS3; and gives a value obtained by the addition "300+1=301" as a time stamp. The time stamping processing delay time used herein is a time required for a processing of giving a time stamp. The obtained value "301" is transmitted to the SubM-C [3] as indicated by an arrow Y61.

In this case, a start time counter value of the forward direction time slot for control is the head of the counter value "300" of the forward direction time slot for control which has been used for the transmission. A start time slot number of the forward direction time slot for control is "TS3" which is a time slot number of the forward direction time slot for control corresponding to the SubM-C [3]. A start time counter value of a forward direction time slot for data is "450", which is a value of a counter head as a boundary of a forward direction time slot for data immediately after the forward direction time slot for control used for the transmission.

A time slot number of the forward direction time slot start for data is "TS2" which is a forward direction time slot for data corresponding to the SubM-C [3].

Next is described an operating sequence when an initial time counter value in the SubM-C [3], [4] on the upper ring are received, with reference to FIG. 131.

Upon receipt of the synchronization frame described with reference to FIG. 130 described above, the SubM-C (for example, [3]): subtracts "1" as a circuit processing delay time until the initial time counter value is transmitted, from the time counter value "301" in the synchronization frame; and gives a value of "301−1=300" obtained by the subtraction to the time counter value of its own node. The subtraction of "1" is performed because, when the M-C [1] transmits the synchronization frame, "1" is added to the time counter value as the time stamping processing delay time, which allows an accurate counter value of "300" to be obtained.

The SubM-C [3] also receives the start time counter value of "450" of the forward direction time slot for data, which is also ticked.

Next is described an operating sequence when a setting of delivery of an initial time counter value in the M-C [1] to a lower ring is performed, with reference to FIG. 132.

The M-C [1] delivers a synchronization frame to which an initial time counter value is given as a time stamp at a forward direction time slot for control, to each of the nodes [2] to [4] other than the M-C [1]. The S-C [2] starts a counterclockwise time slot (including a time slot for data). Note that each of the SubM-Cs [3], [4], and S-C [5] simultaneously ticks a time slot for data, in addition to the time slot for control.

The M-C [1] simultaneously delivers synchronization frames both clockwise and counterclockwise in some cases.

Continued is description of the operating sequence when an initial time counter value in the M-C [1] is delivered to the lower ring, with reference to FIG. 133.

Upon receipt of the synchronization frame to which the initial time counter value is given as the time stamp delivered from the M-C [1], each of the nodes [2] to [5] other than the M-C uses a forward direction time slot for control in responding to the delivered initial time counter value.

For this purpose, the M-C [1] allocates time slots for control having lower numbers in order from nearest to farthest from the M-C [1], to each of the nodes [2] to [5] other than the M-C on the upper ring, as indicated by arrows Y63, Y64, Y65.

The M-C [1] also allocates a slot having a lower number from among the time slots for control other than the time slot for control allocated on the upper ring, in order from nearest to farthest from the M-C [1] or the SubM-Cd [3], [4] (for example, [5]), to the nodes on the lower ring, as indicated by an arrow Y66.

Note that each of the SubM-Cs [3], [4] is assumed to previously obtain a lower ring topology and a controller ID and set the previously obtained information using a command. Each of the SubM-Cs [3], [4] is also assumed to deliver an initial time counter value to the lower ring at a timing within a period starting from receipt of the initial time counter value.

Each of the SubM-Cs [3], [4] ticks the time slot for data, in addition to the forward direction time slot for control.

Next is described an operating sequence when the S-Cs [5], [6] on the lower ring respond times, with reference to FIG. 134. Herein, the S-C [6] is assumed as a node connected to a lower ring to which the S-C [5] is connected.

Each of the S-Cs [5], [6] on the lower ring transmits a delay measurement frame to which the initial time counter value of its own node is give n as a time stamp, to the SubM-C [3], using forward direction time slots for control TS7, TS8 allocated from the M-C [1] to its own node, as indicated by arrows Y67, Y68, respectively. Note that each of the S-Cs [5], [6] responds the initial time counter value to the SubM-C [3] at a timing within a period starting from receipt of the initial time counter value. Each of the S-Cs [5], [6] adds a circuit processing delay time from the time counter value to the transmission of the initial time counter value (for example, 1) and takes the obtained sum as a time counter value of its own node.

Next is described an operating sequence when the SubM-C [3] transfers the times responded by the S-C [5], [6], with reference to FIG. 135.

Upon receipt of the delay measurement frame to which the S-C [5] on the lower ring has given the initial time counter value as a time stamp, as indicated by an arrow Y67, the SubM-C [3] measures a propagation delay time as indicated in a box 135*a*. The SubM-C [3] also transmits the delay measurement frame to which the S-C [5] has given the initial time counter value as the time stamp, to the M-C [1] at a time slot "TS12" as indicated by an arrow Y69, using the forward direction time slot for control allocated from the M-C [1] to the SubM-C [3] itself. After the transmission, if the SubM-C [3] newly receives another initial time counter value from the S-C [6] on the lower ring as indicated by an arrow Y68, the SubM-C [3] transmits the new initial time counter value at a forward direction time slot for control allocated in the next period.

Next is described an operating sequence when the SubM-C [3] transfers the times responded by the S-C [5], with reference to FIG. 136A and FIG. 136B. Note that FIG. 136A is a configuration diagram illustrating a multi-ring network in which reference numerals [1] to [5] are given to respective nodes.

The SubM-C [3] delivers a synchronization frame which is destined for the S-C [5] on the lower ring and to which an initial time counter value is given as a time stamp, at a time slot "T59" indicated by an arrow Y71. After the synchronization frame makes one round of the lower ring and returns to the SubM-C [3], the SubM-C [3] performs DROP to the synchronization frame. The SubM-C [3] thereby measures a propagation delay time for one round on the lower ring as indicated in a box 136*a*.

Further, the SubM-C [3] receives a delay measurement frame to which the S-C [5] on the lower ring has given an initial time counter value as a time stamp, from the S-C [5]. The SubM-C [3] then transmits a delay measurement frame to which the initial time counter value of the S-C [5] has been given as a time stamp, to the M-C [1] as indicated by an arrow Y72, using a forward direction time slot for control allocated from the M-C [1] to the SubM-C [3] itself. After the transmission, if the SubM-C [3] newly receives another initial time counter value from the S-C on the lower ring, the SubM-C [3] transmits the new initial time counter value at a forward direction time slot for control allocated in the next period.

Next is described a timing of generating a time slot suited for a backward direction/M-C jump, with reference to FIG. 137.

Upon receipt of a plural time slots start frame from the M-C [1] as indicated by an arrow Y73, the S-C [2] (or the SubM-C) generates a next time slot as indicated by an arrow Y74, based on forward direction time slots for control and for data operating in the S-C [2] itself, as indicated by a reference character 137*b* in a box 137*a*. That is, the S-C [2] generates: a backward direction time slot for control or for data designated at a reference numeral 137*c*; a forward direction jump time slot designated at a reference numeral 137*d*; a backward direction jump time slot designated at a reference numeral 137*e*; a time slot for upper ring forward direction time slot for jump designated at a reference numeral 137*f*; and a time slot for upper ring backward direction time slot for jump designated at a reference numeral 137*g*.

Next is described how to generate a backward direction time slot with reference to FIG. 138.

As explained above with reference to FIG. 137, upon receipt of the plural time slots start frame from the M-C as indicated by an arrow Y73, the S-C [2] (or the SubM-C) starts an operation of a time slot [TS4] which is advanced from a head position of a forward direction time slot for data by an offset value in accordance with an offset value (2×Dn) described in the plural time slots start frame. The time slot is herein referred to as a backward direction time slot.

Next is described how to generate a forward direction jump time slot with reference to FIG. 139.

Upon receipt of the plural time slots start frame from the M-C [1] as indicated by an arrow Y73, the S-C [2] (or the SubM-C) starts an operation of a time slot which is advanced from a head position of a forward direction time slot for data by an offset value in accordance with an offset value (Dru) described in the plural time slots start frame. The time slot is herein referred to as a forward direction jump time slot.

Next is described how to generate a backward direction jump time slot with reference to FIG. 140.

Upon receipt of the plural time slots start frame from the M-C [1] as indicated by an arrow Y73, the S-C [2] (or the SubM-C) starts an operation of a time slot which is advance from a head position of a forward direction time slot for data by an offset value, in accordance with an offset value (2Dn−Dru) described in the plural time slots start frame. The time slot is herein referred to as a backward direction jump time slot.

Next is described a first implementation example of a node on a lower ring (for example, the S-C [5]) with reference to FIG. 141.

The first implementation example is an implementation example of a lower ring on a multi-ring which performs a unidirectional communication (an upstream path and a downstream path are asymmetric). An arrow Y76 indicates ADD/DROP in the lower ring; an arrow Y77, ADD for an upper ring from a TX1 as a transmission unit; and an arrow Y78, ADD for upper ring from a TX2.

Different time slots need to operate depending on ADD to a time slot on the lower ring and ADD to a time slot on the upper ring.

Units corresponding to the number of time slots of TXs (ADD interfaces) are thus provided. Wavelengths used in each of the time slot are designed to be different from each other.

At this time, because different ADD interface are provided for each time slot, a start timing of a "TS1" of a time t33a illustrating in a box 141*f* is advanced by a time corresponding to one round of the lower ring, to a time t31 as indicated by an arrow Y79. This makes it possible to perform ADD at different time slots at the same timing. For example, a simultaneous transmission becomes possible at a forward direction time slot TS1 [TX1] and a time slot for upper ring TS3 [TX2]. A receipt also becomes possible at a forward direction time slot TS1 [RX].

Next is described a second implementation example of a node on the lower ring (for example, the S-C [5]) with reference to FIG. 142.

The second implementation example is also an implementation example of a lower ring on a multi-ring which performs a unidirectional communication (an upstream path and a downstream path are asymmetric). In the second implementation example, unlike the first implementation example, an ADD interface is used both for an upper ring and for a lower ring, as described in a box 142*a*. This can reduce device cost because it is not necessary to provide units corresponding to the number of time slots of the ADD interfaces. An arrow Y76 indicates DROP in the lower ring; and arrows Y79a and Y79b, ADD for upper ring from a TX as a transmission unit.

At this time, time slots "TS1 to TS7" which operate at an ADD interface and are illustrated in a box 142*b* define time slots at unequal intervals having a period "t−n".

Herein, let "Pa" and "Pb" be head positions of the earliest and the last time slots, respectively, of a plurality of time slots in a period t having the same cycle number. The period t−n is "Pb−Pa".

At this time, because the number of the ADD interfaces is 1 (one), it is not possible to simultaneously perform ADD to all the time slots. Therefore, as illustrated in a box 142*c*, for example, a time slot TS1 of [2] TS for upper ring, a time slot TS1 of [1] forward direction TS, a time slot TS4 of [2] TS for upper ring, and a time slot TS4 of [1] forward direction TS are transmitted in this order. This means that a front half TS2a of a time slot TS2 of [2] TS for upper ring or the like becomes an unavailable area.

Next is described a multi-ring network according to a seventh embodiment with reference to FIG. 143.

This embodiment describes a multi-ring network (a unidirectional communication and a bidirectional communication) as illustrated in FIG. 143, in which time slots in a WDM/TDM network in the multi-ring network can be exchanged.

In this embodiment, problems of control, in particular, enclosed by broken lines can be solved.

More specifically, in this embodiment, in a multi-ring network in which a unidirectional communication takes an upstream path and a downstream path asymmetric with each other, even if a propagation delay time for one round on an upper ring is not a multiple integer of a time slot, the time slot at a time of making one round of the ring can be synchronized. This is because a propagation delay time for one round on the ring is measurable. Also, a time slot is transmitted from the lower ring to the upper ring can be synchronized. This is because time slot collision at a ring intersection point node can be prevented.

In this embodiment, in a multi-ring network of a bidirectional communication, when clockwise and counterclockwise time slots arrive at the same outputs interface of the same source node, the two time slots can be synchronized. This is because a time slot can be set differently depending on a direction of the time slot, presence or absence of a jump over a ring, presence or absence of a jump over an M-C, and the like.

Next is described a single ring network to which this embodiment is directed to, with reference to FIG. 144.

In this embodiment, a single ring network (such a unidirectional communication and a bidirectional communication) is described, in which a time slot exchange becomes possible in a WDM/TDM network in which a single ring network and a plurality of source nodes are present.

In this embodiment, problems of control, in particular, enclosed by broken lines can be solved.

More specifically, in this embodiment, in a single ring network in which a unidirectional communication takes an upstream path and a downstream path asymmetric with each other, even if a propagation delay time for one round on an upper ring is not a multiple integer of a time slot, the time slot at a time of making one round of the ring can be synchronized. This is because a propagation delay time for one round on the ring is measurable.

In this embodiment, in a single ring network of a bidirectional communication, when clockwise and counterclockwise time slots arrive at the same outputs interface of the same source node, the two time slots can be synchronized. This is because a time slot can be set differently depending on a direction of the time slot, presence or absence of a jump over a ring, and the like.

FIG. 145 is a diagram illustrating a wrap-up of problems in conventional technologies and specific means for solving the problems in the present invention.

In this embodiment, the means for solving the problems encircled by a broken line is distinctively characteristic. Detailed description of the means for solving the problems including those encircled by a broken line have been described above and are herein omitted.

As described above, in the seventh embodiment, a source node makes each of nodes other than the source node have up to two types of time slots for data, based on a propagation delay time between the source node and each of nodes other than the source node and based on a propagation delay time for one round on a ring.

As described above, because each of the nodes other than the source node has two types of time slots for data, in a multi-ring network, a time slot for upper ring which is synchronized with a reference time slot of a ring intersection point node can be arranged at a node on a lower ring. This achieves such an advantageous effect that time slot collision at a ring intersection point node can be prevented.

Further, in arranging a time slot, because a propagation delay time for one round on a ring is taken into account, even when the propagation delay time for the ring one round is not an integer time of a time slot in a single ring network, a source node can perform an appropriate processing to the time slot arrived. This achieves such an advantageous effect that a time slot from other node can be transferred.

DESCRIPTION OF REFERENCE NUMERALS

10 TS information management unit
21 trigger detection unit
22 optical SW control unit
23 transmission control unit
26 control signal processing unit
50 trigger generation unit
60 TS information delivery unit
80 TS start delivery unit
81 control signal generation unit
90 delay time calculation unit
20, 25, 145 TS synchronization unit
30, 152 optical TS-SW unit
40, 153 TS transmit-receive unit
101A to 101D optical switch node
120 optical master node (master node)
121 optical switch node
122 data line
123, 124 control line
31, 141 demultiplexing unit
32, 142 multiplexing unit
133, 143, 143*a*, 143*b* control signal reception unit
134 traffic information collection unit
135 topology management unit
136 TS (time slot) allocation unit
137 TS start delivery unit
138 TS information delivery unit
139 time delivery unit
144 optical TS-SW unit (switch) unit
145 TS synchronization unit
146 TS transmit-receive unit
147 traffic information transmission unit
148, 148*a*, 148*b* TS information management unit
149, 149*b* time counter
150 internal clock
311 optical switch unit
312 buffer unit
313 control information transmission unit
314 reference TS synchronization unit
315 delay measurement unit
316 plural TS management unit
317 counter management unit
318 internal clock unit
319 TS control unit
320 TS amount update timing calculation unit
321 control information receipt unit
530 ROADM (Reconfigurable Optical Add/Drop Multiplexer) device
531 optical fiber network

The invention claimed is:

1. An optical network system, comprising:

a master node; and a plurality of optical switch nodes, wherein the master node is configured to divide a wavelength path having an arbitrary wavelength into time slots each having a prescribed time period, allocate the time slots to each of the optical switch nodes, deliver a control signal including a time slot start time and a time stamp to each of the optical switch nodes, and wherein, upon receipt of the control signal from the master node, each of the optical switch nodes is configured to synchronize the time slots, based on a time common to all of the optical switch nodes, the common time being determined by setting a time shifted by a propagation delay time, and thereby transmit or receive a data or perform route switching.

2. The optical network system according to claim 1, wherein each of the optical switch nodes is configured to synchronize the time slot based on a trigger delivered from the master node.

3. The optical network system according to claim 2, wherein the trigger contains therein time slot information showing instruction contents on data processing.

4. The optical network system according to claim 1, wherein the master node is configured to deliver time slot information showing instruction contents on data processing, to each of the optical switch nodes.

5. The optical network system according to claim 1, wherein the master node is configured to deliver a control signal including a time slot start time and a time stamp to each of the optical switch nodes, and wherein each of the optical switch nodes is configured to: share information on a common time; upon receipt of the control signal from the master node, synchronize the time slots, based on a delay time obtained by subtracting a value of a time stamp from a receipt time of the control signal; and thereby transmit or receive a data or performs route switching.

6. The optical network system according to claim 1, further comprising a ring optical network that performs optical transmission by means of wavelength multiplexing, wherein each of the optical switch nodes is provided in the optical network, and is configured to perform an optical switch operation and insertion and branching of a data, and wherein the master node is configured to: allocate time slots to each of the optical switch nodes such that collision of data does not occur in the optical network; deliver time slot information showing the allocated time slots to each of the optical switch nodes; and perform a bandwidth allocation by reallocating the time slots according to traffic volumes between the optical switch nodes.

7. The optical network system according to claim 6, wherein the master node is provided in one of a plurality of the optical switch nodes.

8. The optical network system according to claim 6, wherein the master node comprises: a traffic information collection unit that is configured to collect traffic information transmitted from each of the optical switch nodes; a time slot allocation unit that is configured to allocate a time slot to each of the optical switch nodes using the collected traffic information; and a time slot delivery unit that is configured to deliver the time slot information, and wherein the optical switch node comprises: an optical time slot switching unit that is configured to perform an optical switch operation and insertion and branching of a data; a time slot transmit-receive unit that is configured to transmit or receive a data between an external communication device connected to the optical switch node and the optical time slot switching unit; and a time slot synchronization unit that is configured to control the optical switch operation at the optical time slot switching unit and timing of the data transmission and reception at the time slot transmit-receive unit, based on the time slot information delivered to the optical switch node.

9. The optical network system according to claim 8, wherein the master node: further comprises a time slot start delivery unit that is configured to generate a trigger indicating a start of a time slot at prescribed periods; and deliver the time slot information and the trigger on the same path, and wherein the time slot synchronization unit of the optical switch node is configured to provide control on the optical time slot switching unit and the time slot transmit-receive unit such that the trigger received by the optical switch node is detected, and, based on the trigger, a processing specified by the time slot information is performed.

10. The optical network system according to claim 9, wherein, in the optical network, the trigger is transmitted using a wavelength for control in the optical network or using a fiber which is different from that used for data transmission between the optical switch nodes.

11. The optical network system according to claim 6, wherein a time length of the time slot or a repetition period of the time slot is set at one over the integers of a propagation delay for one round of the optical network.

12. The optical network system according to claim 8, wherein the time slot information includes information on a start time of a time slot, and wherein each of the optical switch nodes is configured to perform a processing specified by the time slot information in accordance with the start time, based on a local time of the optical switch node.

13. The optical network system according to claim 12, wherein the master node further comprises a time delivery unit that is configured to deliver a time synchronization frame which has a local time of the master node as a time stamp, to the optical switch node, and wherein, upon receipt of the time synchronization frame, each of the optical switch nodes is configured to set a local time of its own at a time indicated by the time stamp.

14. The optical network system according to claim 13, wherein, in the optical network, the time synchronization frame is transmitted using a wavelength for control in the optical network or using a fiber which is different from that used for a data transmission between the optical switch nodes.

15. The optical network system according to claim 12, wherein a common time independent of a propagation delay is set to each of the master node and the optical switch nodes, as a local time, and wherein the master node is configured to allocate the time slots based on a measurement result of a propagation delay time of each of the optical switch nodes, such that data collision does not occur.

16. The optical network system according to claim 8, wherein a time length of the time slot or a repetition period of the time slot is set at one over the integers of a propagation delay for one round of the optical network.

17. The optical network system according to claim 9, wherein a time length of the time slot or a repetition period of the time slot is set at one over the integers of a propagation delay for one round of the optical network.

18. The optical network system according to claim 10, wherein a time length of the time slot or a repetition period of the time slot is set at one over the integers of a propagation delay for one round of the optical network.

19. The optical network system according to claim 1, comprising a single ring network comprising a single ring, or a multi-ring network in which a plurality of rings are connected in multiple stages, wherein one of the nodes on the ring is a master node, wherein the master node is configured to set a time of each of the nodes other than the master node as an optical switch node, wherein each of the nodes other than the master node is configured to tick a first time slot starting from a time set by the master node, wherein, based on a propagation delay time between the master node and each of the nodes other than the master node and on a propagation delay time for one round on the ring, the master node is configured to calculate an offset value of a specific node which is specified from among the nodes other than the master node and set the calculated offset value to the specific node, and wherein the specific node is configured to tick a second time slot which is a time slot having a start timing shifted from a start timing of the first time slot of its own node by the offset value set by the master node.

20. The optical network system according to claim 19, wherein the master node is configured to transmit a synchronization frame to which a current time inside the master node is given as a time stamp, to each of the nodes other than the master node, wherein each of the nodes other than the master node is configured to: set, upon receipt of the synchronization frame, the time stamp in the synchronization frame as a current time inside its own node; and transmit a delay measurement frame to which the current time inside its own node as a time stamp, to the master node, and wherein the master node is configured to measure, upon receipt of the delay measurement frame, a propagation delay time between the master node itself and each of the nodes other than the master node, based on the time stamp in the delay measurement frame and on the current time inside the master node itself.

21. The optical network system according to claim 20, comprising the single ring network, wherein the master node is configured to: transmit a synchronization frame to the master node itself; and measure, upon receipt of the synchronization frame, a propagation delay time for one round on the ring, based on a time stamp in the synchronization frame and on a current time inside the master node itself.

22. The optical network system according to claim 21, wherein the master node is configured to determine an offset value to be set to the specific node, based on a result of the measurement of the propagation delay time between the master node and each of the nodes other than master node and on a result of the measurement of the propagation delay time for one round on the ring, also taking into account a direction of a time slot and presence or absence of a jump over the master node.

23. The optical network system according to claim 6, wherein the time slot information includes information on a start time of a time slot, and wherein each of the optical switch nodes is configured to perform a processing specified by the time slot information in accordance with the start time, based on a local time of the optical switch node.

24. The optical network system according to claim 23, wherein the master node further comprises a time delivery unit that is configured to deliver a time synchronization frame which has a local time of the master node as a time stamp, to the optical switch node, and wherein, upon receipt of the time synchronization frame, each of the optical switch nodes is configured to set a local time of its own at a time indicated by the time stamp.

25. The optical network system according to claim 24, wherein, in the optical network, the time synchronization frame is transmitted using a wavelength for control in the optical network or using a fiber which is different from that used for a data transmission between the optical switch nodes.

26. The optical network system according to claim 23, wherein a common time independent of a propagation delay is set to each of the master node and the optical switch nodes, as a local time, and wherein the master node is configured to allocate the time slots based on a measurement result of a propagation delay time of each of the optical switch nodes, such that data collision does not occur.

27. The optical network system according to claim 20, wherein the multi-ring network comprises an upper ring and a lower ring which are connected by a ring intersection point node, and the master node is located on the upper ring, wherein the master node is configured to: transmit a synchronization frame to the master node itself; and measure, upon receipt of the synchronization frame, a propagation delay time for one round on the upper ring, based on a time stamp in the synchronization frame and on a current time inside the master node, and wherein the ring intersection point node is configured to: transmit a synchronization frame to the ring intersection point node itself; and measure, upon receipt of the synchronization frame, a propagation delay time for one round on the lower ring, based on a time stamp in the synchronization frame and on a current time inside the ring intersection point node.

28. The optical network system according to claim 27, wherein the master node is configured to determine an offset value to be set to the specific node, based on a result of the measurement of the propagation delay time between the master node and each of the nodes other than the master node and on a result of the measurement of the propagation delay time for one round on each of the upper ring and the lower ring, also taking into account a direction of a time slot, presence or absence of a jump over the master node, presence or absence of a jump from the upper ring to the lower ring, and presence or absence of a jump from the lower ring to the upper ring.

29. An optical switch node connected to a master node via a transmission path, comprising:

a time slot synchronization unit that is configured to, upon receipt of a control signal including a time slot start time and a time stamp from the master node, synchronize time slots at prescribed periods allocated to the master node, and thereby give an instruction of transmitting or receiving a data or performing route switching, based on a time common to all of the optical switch nodes, the common time being determined by setting a time shifted by a propagation delay time; and an optical time slot switching unit that is configured to transmit or receive a data or perform route switching in accordance with the instruction from the time slot synchronization unit.

30. A master node which is connected to a plurality of optical switch nodes via a transmission path, comprising:

a time slot synchronization unit that is configured to divide a wavelength path having an arbitrary wavelength into a plurality of time slots each having a prescribed time period and allocate the time slots to each of the optical switch nodes; and an optical time slot switching unit that is configured to deliver, to each of the optical switch nodes, information for making each of the optical switch nodes synchronize the time slots allocated thereto by the time slot synchronization unit and thereby transmit or receive a data or perform route switching, the information including a control signal including a time slot start time and a time stamp, based on a time common to all of the optical switch nodes, the common time being determined by setting a time shifted by a propagation delay time.

* * * * *